United States Patent
Limberg

(10) Patent No.: US 10,637,711 B2
(45) Date of Patent: Apr. 28, 2020

(54) COFDM DCM COMMUNICATIONS SYSTEMS WITH PREFERRED LABELING DIVERSITY FORMATS

(71) Applicant: Allen LeRoy Limberg, Port Charlotte, FL (US)

(72) Inventor: Allen LeRoy Limberg, Port Charlotte, FL (US)

(*) Notice: Subject to any disclaimer, the term of this patent is extended or adjusted under 35 U.S.C. 154(b) by 0 days.

(21) Appl. No.: 16/276,515

(22) Filed: Feb. 14, 2019

(65) Prior Publication Data
US 2019/0199572 A1 Jun. 27, 2019

Related U.S. Application Data

(63) Continuation-in-part of application No. 16/039,259, filed on Jul. 18, 2018, which is a continuation-in-part
(Continued)

(51) Int. Cl.
*H04L 27/34* (2006.01)
*H04L 27/36* (2006.01)
(Continued)

(52) U.S. Cl.
CPC ........ *H04L 27/3477* (2013.01); *H04L 1/0041* (2013.01); *H04L 1/0045* (2013.01); *H04L 1/0063* (2013.01); *H04L 1/0071* (2013.01); *H04L 5/0048* (2013.01); *H04L 25/0226* (2013.01); *H04L 27/2607* (2013.01);
(Continued)

(58) Field of Classification Search
CPC ... H04L 1/0033; H04L 1/0041; H04L 1/0045; H04L 1/0063; H04L 1/0071; H04L 5/0007; H04L 5/0048; H04L 25/0226; H04L 27/2602; H04L 27/2607; H04L 27/2626; H04L 27/2628; H04L 27/263; H04L 27/2634; H04L 27/2639; H04L 27/265; H04L 27/2655; H04L 27/2698; H04L 27/28; H04L 27/3411; H04L 27/3477; H04L 27/36; H04L 27/363; H04L 27/38; H04W 72/0446
USPC ........ 375/260–262, 265, 267, 295, 297–301; 370/208, 210
See application file for complete search history.

(56) References Cited

U.S. PATENT DOCUMENTS

2013/0028269 A1* 1/2013 Limberg ............... H04L 1/0066
370/474
2014/0119458 A1* 5/2014 Limberg ............... H04N 19/89
375/240.27
(Continued)

*Primary Examiner* — Young T Tse

(57) ABSTRACT

Transmitting apparatus and receiving apparatus for communication systems using coded orthogonal frequency-division multiplexed (COFDM) dual-subcarrier modulation (DCM) signals. The same coded data is mapped both to COFDM subcarriers located in the lower-frequency half spectrum of the DCM signal and to COFDM subcarriers located in its upper-frequency half spectrum. The mapping of COFDM subcarriers in those half spectra employ labeling diversity preferred for reception of DCM with less error when accompanied by interfering additive white Gaussian noise (AWGN). In preferred forms of COFDM DCM signal, the quadrature amplitude modulation (QAM) of COFDM subcarriers is Gray mapped to position palindromic lattice-point labels along one of the diagonals of each square QAM constellation.

23 Claims, 80 Drawing Sheets

Related U.S. Application Data of application No. 15/960,681, filed on Apr. 24, 2018, now abandoned, and a continuation-in-part of application No. 15/796,834, filed on Oct. 29, 2017, now abandoned.

(51) Int. Cl.

| | | |
|---|---|---|
| *H04L 5/00* | (2006.01) | |
| *H04L 1/00* | (2006.01) | |
| *H04L 27/26* | (2006.01) | |
| *H04L 27/28* | (2006.01) | |
| *H04W 72/04* | (2009.01) | |
| *H04L 25/02* | (2006.01) | |

(52) U.S. Cl.
CPC ...... *H04L 27/2626* (2013.01); *H04L 27/2698* (2013.01); *H04L 27/28* (2013.01); *H04L 27/3411* (2013.01); *H04L 27/36* (2013.01); *H04W 72/0446* (2013.01); *H04L 27/2602* (2013.01)

(56) References Cited

U.S. PATENT DOCUMENTS

| | | | |
|---|---|---|---|
| 2015/0055727 A1* | 2/2015 | Kim | H04H 20/33 375/295 |
| 2015/0256376 A1* | 9/2015 | Limberg | H04L 27/2646 375/261 |
| 2015/0341586 A1* | 11/2015 | Allison | H04N 5/40 348/724 |
| 2015/0358106 A1* | 12/2015 | Limberg | H04L 27/2003 375/308 |
| 2016/0087649 A1* | 3/2016 | Limberg | H04N 21/2383 714/776 |

* cited by examiner

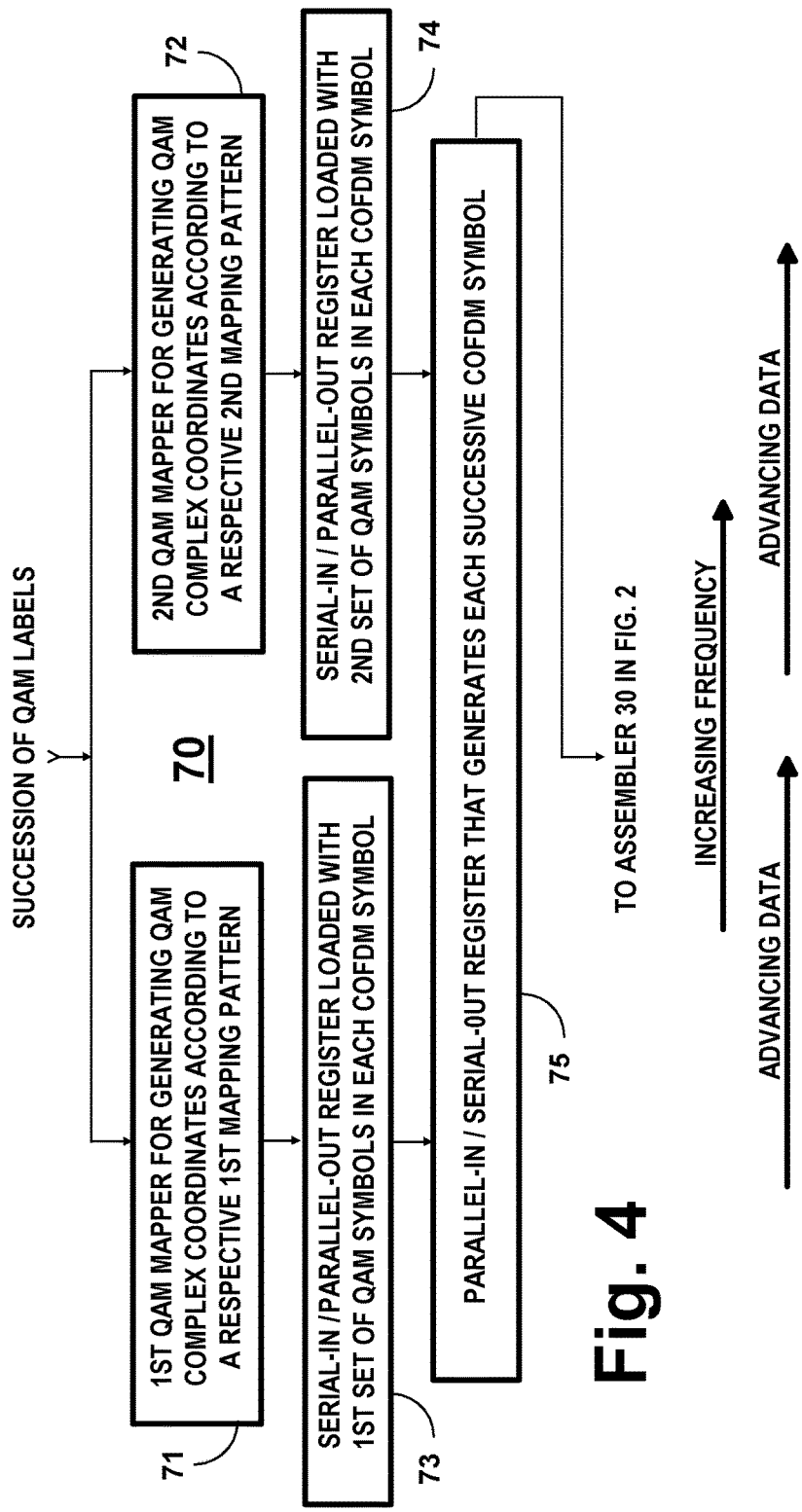
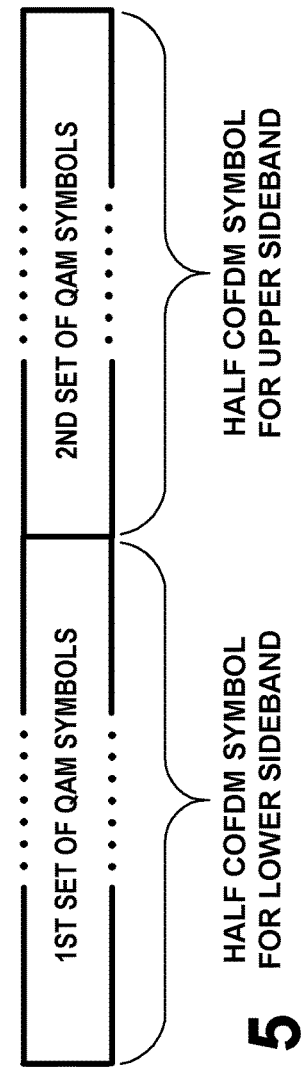
Fig. 4
Fig. 5

Fig. 6 1st Gray Map of 16QAM
(Labels mirror those of Fig. 7 2nd Gray Map of 16QAM)

Fig. 7 2nd Gray Map of 16QAM
(Labels mirror those of Fig. 6 1st Gray Map of 16QAM)

Fig. 8 3rd Gray Map of 16QAM
(180° rotation of Fig. 6 1st Gray Map of 16QAM)

Fig. 9 4th Gray Map of 16QAM
(180° rotation of Fig. 7 2nd Gray Map of 16QAM)

Fig. 10 1ˢᵗ SCM Map of 16QAM
(Labels mirror those of Fig. 11 2nd SCM Map of 16QAM)

Fig. 11 2nd SCM Map of 16QAM
(Labels mirror those of Fig. 10 1st SCM Map of 16QAM)

Fig. 12 3rd SCM Map of 16QAM
( 180° rotation of Fig. 10 1st SCM Map of 16QAM)

Fig. 13 4th SCM Map of 16QAM
(Labeled quadrants each diagonally twisted from a corresponding one of Fig. 12 3rd SCM Map of 16QAM)

Fig. 14 5th SCM Map of 16QAM
(180° rotation of Fig. 11 2nd SCM Map of 16QAM)

Fig. 15 6th SCM Map of 16QAM
(Labeled quadrants each diagonally twisted from a corresponding one of Fig. 14 5th SCM Map of 64QAM)

Fig. 16 5th Gray Map of 16QAM
(Labels mirror those of Fig. 17 6th Gray Map of 16QAM)

Fig. 17 6th Gray Map of 16QAM
(Labels mirror those of Fig. 16 5th Gray Map of 16QAM)

Fig. 18 7th Gray Map of 16QAM
(Constellation of Fig. 16 5th Gray Map of 16QAM flipped over by 180° rotation around 0010 to 0100 diagonal axis)

Fig. 19 8th Gray Map of 16QAM
(Labeled quadrants each diagonally twisted from a corresponding one of the Fig. 18 7th Gray map of 16QAM)

Fig. 20 9th Gray Map of 16QAM
(Constellation of Fig. 17 6th Gray Map of 16QAM flipped over by 180° rotation around 0100 to 0010 diagonal axis)

Fig. 21 10th Gray Map of 16QAM
(Labeled quadrants each diagonally twisted from a corresponding one of the Fig. 20 9th Gray map of 16QAM)

Fig. 22 11th Gray Map of 16QAM
(Labels mirror those of Fig. 23 12th Gray Map of 16QAM)

Fig. 23 12th Gray Map of 16QAM
(Labels mirror those of Fig. 22 11th Gray Map of 16QAM)

Fig. 24 13th Gray Map of 16QAM
(Constellation of Fig. 22 11th Gray Map of 16QAM flipped over by 180° rotation around 1000 to 0001 diagonal axis)

Fig. 25 14<sup>th</sup> Gray Map of 16QAM
(Labeled quadrants each diagonally twisted from a corresponding one of the Fig. 24 13th Gray map of 16QAM)

Fig. 26 15th Gray Map of 16QAM
(Constellation of Fig. 23 12th Gray Map of 16QAM flipped over by 180° rotation around 0001 to 1000 diagonal axis)

Fig. 27 16th Gray Map of 16QAM
(Labeled quadrants each diagonally twisted from a corresponding one of the Fig. 26 15h Gray map of 16QAM)

Fig. 28  1ˢᵗ Optimized 16QAM Map
(First of a 1st Pair of Maps of 16QAM with Maximum
Labeling Diversity, as disclosed by M. Krasicki)

Fig. 29 2nd Optimized 16QAM Map
(Second of a 1st Pair of Maps of 16QAM with Maximum Labeling Diversity, as disclosed by M. Krasicki)

Fig. 30 1st Gray Map of 64QAM
(Labels mirror those of Fig. 31 2nd Gray Map of 64QAM)

Fig. 31 2nd Gray Map of 64QAM
(Labels mirror those of Fig. 30 1st Gray Map of 64QAM)

Fig. 32   3rd Gray Map of 64QAM
(180° rotation of Fig. 30 1st Gray Map of 64QAM)

Fig. 33 4th Gray Map of 64QAM
(180° rotation of Fig. 31 2nd Gray Map of 64QAM)

Fig. 34 1st SCM Map of 64QAM
(Labels mirror those of Fig. 35 2nd SCM Map of 64QAM)

Fig. 35 2nd SCM Map of 64QAM
(Labels mirror those of Fig. 34 1st SCM Map of 64QAM)

Fig. 36 3rd SCM Map of 64QAM
(180° rotation of Fig. 34 1st SCM Map of 64QAM)

Fig. 37 4th SCM Map of 64QAM
(Labeled quadrants each diagonally twisted from a corresponding one in Fig. 36 3rd SCM Map of 64QAM)

Fig. 38 5th SCM Map of 64QAM
(180° rotation of Fig. 35 2nd SCM Map of 64QAM)

Fig. 39 6th SCM Map of 64QAM
(Labeled quadrants each diagonally twisted from a corresponding one in Fig. 38 5th SCM Map of 64QAM)

Fig. 40 5th Gray Map of 64QAM
(Labels mirror those of Fig. 41 6th Gray Map of 64QAM)

Fig. 41 6th Gray Map of 64QAM
(Labels mirror those of Fig. 40 5th Gray Map of 64QAM)

Fig. 42 7th Gray Map of 64QAM
(Constellation of Fig. 40 5th Gray Map of 64QAM flipped over by 180° rotation around 000001 to 100000 diagonal axis)

Fig. 43 8th Gray Map of 64QAM
(Labeled quadrants each diagonally twisted from a corresponding one in Fig. 42 7th Gray Map of 64QAM)

Fig. 44 9th Gray Map of 64QAM
(Constellation of Fig. 39 6th Gray Map of 64QAM flipped over by 180° rotation around 100000 to 000001 diagonal axis)

Fig. 45 10th Gray Map of 64QAM
(Labeled quadrants each diagonally twisted from a corresponding one in Fig. 44 9th Gray Map of 64QAM)

Fig. 46 11th Gray Map of 64QAM
(Labels mirror those of Fig. 47 12th Gray Map of 64QAM)

Fig. 47 12th Gray Map of 64QAM
(Labels mirror those of Fig. 46 11th Gray Map of 64QAM)

Fig. 48 13th Gray Map of 64QAM
(Constellation of Fig. 46 11th Gray Map of 64QAM flipped over by 180° rotation around 110010 to 010011 diagonal axis)

Fig. 49 14th Gray Map of 64QAM
(Labeled quadrants each diagonally twisted from a corresponding one in Fig. 48 13th Gray Map of 64QAM)

Fig. 50 15th Gray Map of 64QAM
(Constellation of Fig. 47 12th Gray Map of 64QAM flipped over by 180° rotation around 010011 to 110010 diagonal axis)

Fig. 51 16th Gray Map of 64QAM
(Labeled quadrants each diagonally twisted from a corresponding one in Fig. 50 15th Gray Map of 64QAM)

Fig. 52 17th Gray Map of 64QAM
(Labels mirror those of Fig. 53 18th Gray Map of 64QAM Fig. 53 18th Gray Map of 64QAM
(Labels mirror those of Fig. 52 17th Gray Map of 64QAM)

Fig. 54 19th Gray Map of 64QAM
(Constellation of Fig. 52 17th Gray Map of 64QAM flipped over by 180° rotation around 111011 to 110111 diagonal axis)

Fig. 55 20th Gray Map of 64QAM
(Labeled quadrants each diagonally twisted from a corresponding one in Fig. 54 19th Gray Map of 64QAM)

Fig. 56 21st Gray Map of 64QAM
(Constellation of Fig. 53 18th Gray Map of 64QAM flipped over by 180° rotation around 110111 to 1110110 diagonal axis)

Fig. 57 22nd Gray Map of 64QAM
(Labeled quadrants each diagonally twisted from a corresponding one in Fig. 56 21st Gray Map of 64QAM)

Fig. 58 1st Optimized Map of 64QAM
(As disclosed by K. Govindasamy, H.J. Xu & N. Pillay)

Fig. 59 2nd Optimized Map of 64QAM
(As derived from Fig. 58 1st Optimized Map of 64QAM )

Fig. 60 1st Gray Map of 16APSK
(Labels mirror those of Fig. 61 2nd Gray Map of 16APSK)

Fig. 61 2nd Gray Map of 16APSK
(Labels mirror those of Fig. 60 1st Gray Map of 16APSK)

Fig. 62 3rd Gray Map of 16ASPK
(180° rotation of Fig. 60 1st Gray Map of 16APSK)

Fig. 63 4th Gray Map of 16ASPK
(180° rotation of Fig. 61 2nd Gray Map of 16APSK)

COFDM DCM COMMUNICATIONS SYSTEMS WITH PREFERRED LABELING DIVERSITY FORMATS

This is a continuation-in-part of U.S. patent application Ser. No. 16/039,259 filed 18 Jul. 2018, now abandoned, which was a continuation-in-part of U.S. patent application Ser. No. 15/796,834 filed 29 Oct. 2017, now abandoned, and of U.S. patent application Ser. No. 15/960,681 filed 24 Apr. 2018, now abandoned.

FIELD OF THE INVENTION

The invention relates to communication systems, such as a digital television (DTV) broadcasting system, as can employ coded orthogonal frequency-division multiplexed (COFDM) dual-subcarrier-modulation (DCM). The invention relates more particularly to applying labeling diversity to such communication systems for facilitating better reception of COFDM DCM signals transmitted via a channel afflicted with additive white Gaussian noise (AWGN).

BACKGROUND OF THE INVENTION

First and second sets of quadrature-amplitude-modulation (QAM) symbols transmitted parallelly in time can differ in the respective patterns of labeling lattice points in the two sets of QAM symbol constellations, which constellation rearrangement approach provides "labeling diversity". Labeling diversity can lessen the error in reception of transmitted data accompanied by noise, as compared to that in which the same pattern is used to label lattice points of the first and second sets of QAM symbols transmitted parallel in time. First and second sets of amplitude and phase shift keying (ASPK) symbols transmitted parallel in time can use different patterns of labeling to secure labeling diversity.

In Gray mapping of QAM and APSK, the plural-bit labels of immediately adjacent lattice points differ in only a single one of their bits. With regard to Gray mapping, it has been shown that a constellation rearrangement approach improves the performance if two or more versions of the same word are transmitted. The constellation rearrangement scheme for Gray mapping is based on different levels of reliability for the bits, depending on the position of the selected 16-QAM symbols within the constellation. Consequently, the rearrangement rules focus on changing the location of the rearranged version of the 16-QAM symbol to achieve an averaging effect of the levels of reliability. First and second sets of 16 QAM symbols transmitted parallel in time are labeled such that the labeling of each set of 16 QAM symbols bits more likely to experience error in the labeling of each set of 16 QAM symbols is in accordance with the bits less likely to experience error in the labeling of the other set of 16 QAM symbols. For details on constellation rearrangement for 16-QAM Gray mapping, one is referred to U.S. Pat. No. 7,920,645 titled "Data transmissions in a mobile communication system employing diversity and constellation rearrangement of a 16 QAM scheme" granted 5 Apr. 2011 to Alexander Golitschek Edler Von Elbwart, Christian Wengerter and Isamu Yoshi. U.S. Pat. No. 7,957,482 titled "Bit-operated rearrangement diversity for AICO mapping" granted 7 Jun. 2011 to Alexander Golitschek Edler Von Elbwart, Christian Wengerter and Isamu Yoshi describes more extensively the use of labeling diversity for more than one set of 16 QAM symbols transmitted parallelly in time. (AICO is the acronym for "Antipodal Inverted Constellation".)

In June 2005 a paper "Symbol mapping diversity design for multiple packet transmissions" authored by Harvind Samra, Zhi Ding and Peter M. Hahn was published in *IEEE Transactions on Communications*, Vol. 53, No. 5, pp. 810 817. The Samra et al. paper presented a simple, but effective method of enhancing and exploiting diversity from multiple packet transmissions in systems that employ nonbinary linear modulations such as phase-shift keying (PSK) and quadrature amplitude modulation (QAM). This diversity improvement results from redesigning the symbol mapping for each packet transmission. Symbol mapping diversity (SMD) requires a small increase in receiver complexity, but provides very substantial reductions of bit error rate when applied to additive white Gaussian noise (AWGN) and flat-fading channels. The general SMD concept was later incorporated in multiple-input/multiple-output (MIMO) and multiple-input/single-output (MISO) communication systems, but was referred to as "labeling diversity".

Mappings that maximize labeling diversity in 16 QAM symbol constellations were disclosed specifically by Maciej Krasicki in his paper "The essence of 16-QAM labeling diversity" published 11 Apr. 2013 in *Electronics Letters*, Vol. 49, issue 8, pp. 567-569. Maps for such a mapping will be referred to as optimal-SMD maps in this specification, its accompanying claims, and FIGS. 27 and 28 of its drawings. Krasicki described his work in more detail in a 20 Feb. 2015 open-access on-line *Springerlink* publication titled "Algorithm for Generating All Optimal 16-QAM BI-STCM-ID Labelings". This publication focused on 16-QAM labelings of bit-interleaved space-time coded modulation with iterative decoding (BI-STCM-ID), describing an algorithm to generate (without need for random search) optimal labelings for BI-STCM-ID systems with any number of transmit and receive antennas, transmitting over a Rayleigh-fading channel.

Panasonic Corporation sent a paper titled "Enhanced HARQ Method with Signal Constellation Rearrangement" to the TSG-RAN Working Group 1 for discussion during its Meeting #19 held Feb. 27-Mar. 2, 2001 in Las Vegas, Nev., USA. Combining two 16 QAM transmissions with labeling diversity between the labeling of the lattice points in their respective square 16 QAM symbol constellations was reported to provide a 1.2 dB advantage over Chase combining two 16 QAM transmissions without labeling diversity. Combining two 64 QAM transmissions with labeling diversity between the labeling of the lattice points in their respective square 64 QAM symbol constellations was reported to provide a 1.8 dB advantage over Chase combining two 64 QAM transmissions without labeling diversity. Turbo coding rate was ¾ both for 16 QAM transmissions and for 64 QAM transmissions.

COFDM modulation of radio-frequency (RF) signals has been used several years for over-the-air broadcasting of DTV in accordance with the DVB-T and DVB-T2 Standards for Digital Video Broadcasting in several countries other than the United States of America and Canada. COFDM RF signals are being broadcast in the Republic of South Korea and in the United States of America in accordance with an ATSC 3.0 Standard developed by the Advanced Television Systems Committee, an industry-wide consortium of DTV broadcasters, manufacturers of DTV transmitter apparatus, and manufacturers of DTV receiver apparatus. Each of the plural subcarriers of these COFDM signals is amplitude-modulated using 16 QAM or 64 QAM. The COFDM modulation conveys coded data a single time, rather than conveying the same coded data in both lower and upper sidebands of an amplitude-modulation (AM) signal.

In a double-sideband COFDM (or DSB-COFDM) signal, the lower-frequency half and the upper-frequency half of the frequency spectrum convey the same coded data as each other and mirror each other in frequency. The lower-frequency half of the frequency spectrum is commonly referred to as the "lower sideband", and the upper-frequency half of the frequency spectrum is commonly referred to as the "upper sideband". Prior-art receivers for DSB-COFDM radio-frequency signals folded the frequency spectrum in half by synchrodyning those RF signals to baseband before applying discrete Fourier transform (DFT) and demapping the resultant quadrature amplitude-modulation (QAM) of COFDM signal subcarriers. The constructive combining of mirrored OFDM subcarriers transpires at QAM symbol level improves the signal-to-noise ratio (SNR) of reception from an additive-white-Gaussian-noise (AWGN) channel by 3 dB. Receivers that demodulate DSB-COFDM RF signals using either single-sideband (SSB) or asymmetric-sideband (ASB) techniques are described in U.S. Pat. No. 10,171,280 titled "Double-sideband COFDM signal receivers that demodulate unfolded frequency spectrum" issued 1 Jan. 2019 to Allen LeRoy Limberg. Limberg prescribed individual discrete Fourier transform (DFT) of the lower and upper halves of the frequency spectrum of the COFDM modulation signal and demapping the resulting sets of QAM symbols from those two halves of that frequency spectrum, then diversity combining their corresponding QAM-lattice-point labels. Maximal-ratio combining soft bits of corresponding QAM-lattice-point labels in accordance with the respective amplitudes of their QAM symbols prior to channel equalization improves SNR of reception over an AWGN channel by 5.5 dB, irrespective of shaping gain. This 2.5 dB better SNR than averaging corresponding QAM symbols is in line with observations concerning multiple-in/multiple-out (MIMO) reception of COFDM modulation signals from plural-antenna arrays, as reported in U.S. Pat. No. 7,236,548 titled "Bit level diversity combining for COFDM system" issued 26 Jun. 2007 to Monisha Ghosh, Joseph P. Meehan and Xuemei Ouyang.

There are other species of COFDM signal, which have asymmetric-sideband (ASB) structural characteristics wherein lower and upper sidebands do not mirror each other in frequency. Such other species can be referred to as asymmetric-sideband COFDM (or ASB-COFDM). The lower and upper halves of the frequency spectrum of ASB-COFDM convey different respective sets of coded data similarly mapped to QAM symbols or to APSK symbols, and these sets of coded data often relate to each other in some way.

COFDM signals that utilizes dual subcarrier modulation (DCM) are described in patent application US-20170104553-A1 published 13 Apr. 2017, titled "LDPC Tone Mapping Schemes for Dual-Sub-Carrier Modulation in WLAN" and claiming an original filing date of 11 Oct. 2016 for inventors Jian-Han Liu, Sheng-Quan Hu, Tian-Yu Wu and Thomas Edward Pare, Jr. DCM modulates the same information on successive pairs of subcarriers. The subcarriers in each successive pair can be similarly separated in frequency to form a split-spectrum COFDM signal with lower and upper sidebands that convey the same coded data. Such separation improves reliability of reception, especially when there are narrow-band interferences. US-20170104553-A1 describes respective mappings of the sets of 16 QAM symbols transmitted parallelly in time, which mappings are similar to each other.

Akram Bin Sediq and Halim Yanikomeroglu described a technique for soft combining soft-bit demodulation results in a paper titled "Performance Analysis of Soft-Bit Maximal Ratio Combining in Cooperative Relay Networks", which was published in *IEEE Transactions on Wireless Communications*, Volume 8, Issue 10, (October 2009), pp. 4934-4939. This paper referred to this soft combining technique by the name "soft-bit maximal-ratio combining" or by its abbreviation "SBMRC". U.S. patent application Ser. No. 15/796,834 filed 29 Oct. 2017 and titled "Communication systems using independent-sideband COFDM" does describe respective symbol constellation arrangements of QAM subcarriers in the lower and upper sidebands of a COFDM signal differing from each other. U.S. patent application Ser. No. 15/796,834 describes this being done in accordance with an SBMRC technique to provide "shaping" gain in addition to diversity gain, owing to bits more likely to experience error in the labeling of each of two sets of QAM symbols corresponding to the bits less likely to experience error in the labeling of the other set of QAM symbols. An SBMRC technique for obtaining signal shaping is described with regard to COFDM signal retransmission in U.S. Pat. No. 9,647,865 titled "Iterative-diversity COFDM broadcasting with improved shaping gain", granted to Allen LeRoy Limberg 9 May 2017, and claiming a 23 Mar. 2016 priority date. An SBMRC technique for obtaining signal shaping is described with regard to retransmission of PSK or QAM symbol packets in U.S. Pat. No. 7,362,733 titled "Transmitting/receiving apparatus and method for packet retransmission in a mobile communication system", granted to Noh-Sun Kim et alii 22 Apr. 2008, and claiming a 28 Oct. 2002 priority date.

Besides the SBMRC technique for obtaining shaping gain, there is an ensemble of various techniques to turn constellations with equidistant, equiprobable modulation symbols (like standard square 16 QAM or 64 QAM constellations) into more "Gaussian" constellations. There are two different types of such "constellation" shaping used to provide shaping gain: "geometric" and "probabilistic. "Geometric" amplitude shaping (GAS) employs a uniform distribution (i.e., equiprobable symbols) on non-equidistant constellation points. This entails a change from the standard square $2^m$QAM constellation. In a GAS constellation, the symbols are by definition not uniformly spaced across the constellation. The in-phase symbols depend on the quadrature symbols and there is no independent processing of in-phase and quadrature symbols. So, GAS usually results in more complex modulation and decoding schemes as compared to "probabilistic" amplitude shaping (PAS), which is based on a pragmatic square QAM modulation scheme. PAS imposes a non-uniform distribution (i.e., non-equiprobable symbols) on a set of equidistant constellation points. PAS relies on the use of a code (called distribution matcher) to gradually vary the probability distribution of the constellation points (from higher probability for the innermost constellation points, to lower probability for the outermost constellation points), resulting in probabilistic shaping of the constellation. PAS can be applied to any constellation type, including square $2^m$QAM constellations. A type of PAS is described in U.S. patent application Ser. No. 15/374,397 titled "Probabilistic signal shaping and codes therefor" filed 9 Dec. 2016 for Joon Ho Cho et alii, and published 22 Mar. 2018 as US-20180083716-A1. Both geometric and probabilistic shaping techniques offer an SNR gain for the additive white Gaussian noise (AWGN) channel that can closely approach the ultimate 1.53 dB limit posited by Shannon for constellation shaping.

U.S. patent application Ser. No. 15/796,834 also describes respective symbol constellation arrangements of QAM subcarriers in the lower and upper sidebands of a COFDM signal differing from each other, so as to reduce the peak-to-average-power ratio (PAPR) of that COFDM signal. In the past, broadcasters' primary concern with high PAPR of COFDM signal was its costing expensive power bills for linear power amplification in the transmitter. Newer designs of COFDM transmitters for broadcast television improve power amplifier efficiency using variants of the methods described in U.S. Pat. No. 6,625,430 titled "Method and apparatus for attaining higher amplifier efficiencies at lower power levels" granted 23 Sep. 2003 to Peter J. Doherty. Accordingly, PAPR reduction techniques have become less likely to be resorted to. However, the large PAPR of COFDM also causes problems in receiver apparatus that are not avoided and indeed may be exacerbated by using a Doherty method in the broadcast transmitter. These problems concern maintaining linearity in the radio-frequency (RF) amplifier, in the intermediate-frequency (IF) amplifier (if used) and in the analog-to-digital (A-to-D) converter.

A paper titled "Analysis of Coherent and Non-Coherent Symmetric Cancellation Coding for OFDM Over a Multipath Rayleigh Fading Channel" written by Abdullah S. Alaraimi and Takeshi Hashimoto was presented at the IEEE 64th Vehicular Technology Conference held 25-28 Sep. 2006 in Montreal, Quebec, Canada. Symmetric cancellation coding (SCC) was used principally for implementing inter-carrier interference (ICI) cancellation, rather than principally for PAPR reduction. However, Alaraimi and Hashimoto's simulations using 2-dimensional modulation of OFDM subcarriers found 0.5 dB lowering of the PAPR of COFDM when symmetric cancellation coding (SCC) was employed. The particular size of the COFDM modulation constellations employed in the simulations was not specified in this paper.

Superposition coded modulation (SCM) is described in detail by Li Peng, Jun Tong, Xiaojun Yuan and Qinghua Guo in their paper "Superposition Coded Modulation and Iterative Linear MMSE Detection", *IEEE Journal on Selected Areas in Communications*, Vol. 27, No. 6, August 2009, pp. 995-1004. In SCM the four quadrants of square QAM symbol constellations are each Gray mapped independently from the others and from the pair of bits in the map label specifying that quadrant. Peng et alii studied iterative linear minimum-mean-square-error (LMMSE) detection being used in the reception of SCM and found that SCM offers an attractive solution for highly complicated transmission environments with severe interference. Peng et alii analyzed the impact of signaling schemes on the performance of iterative LMMSE detection to prove that among all possible signaling methods, SCM maximizes the output signal-to-noise-interference ratio (SNIR) in the LMMSE estimates during iterative detection. Their paper describes measurements that were made to demonstrate that SCM outperforms other signaling methods when iterative LMMSE detection is applied to multi-user/multi-antenna/multipath channels.

Jun Tong and Li Peng in a subsequent paper "Performance analysis of superposition coded modulation", *Physical Communication*, Vol. 3, September 2010, pp. 147-155, separate superposition coded modulation (SCM) into two general classes: single-code superposition coded modulation (SC-SCM) and multi-code superposition coded modulation (MC-SCM). In SC-SCM the bits in the superposed code layers are generated using a single encoder. SC-SCM can be viewed as conveying a special BICM scheme over successive SCM constellations. In MC-SCM the bits in the superposed code layers are generated using a plurality of encoders supplying respective codewords. MC-SCM can be viewed as conveying special-case multi-level coding (MLC) scheme over successive SCM constellations. (Single carrier modulation is referred to as "SCM" in some texts other than this, but hereafter in this document the acronym "SCM" will be used exclusively to refer to superposition coded modulation.)

SUMMARY OF THE INVENTION

The invention in its various aspects is embodied in a communication system, such as a digital television (DTV) broadcasting system, that employs coded orthogonal frequency-division multiplexed (COFDM) dual-subcarrier-modulation (DCM). The same data are conveyed both by subcarriers in the lower-frequency half of a COFDM DCM signal and also by subcarriers in the upper-frequency half of that DCM signal. This halves the data rate compared to COFDM in which the coded data is transmitted a single time, but facilitates improvements in the reception of the coded data. The discrete Fourier transform (DFT) of the lower and upper halves of the frequency spectrum of the COFDM modulation signal, demapping the resulting sets of QAM symbols from those two halves of that frequency spectrum, and then maximal-ratio combining soft bits of corresponding QAM-lattice-point labels in accordance with the respective amplitudes of their QAM symbols prior to channel equalization improves SNR of reception over an AWGN channel by 8.5 dB. This increases the range of reception from a transmitter of given power by a factor of about 2.7 at least.

The halved data rate can be doubled by doubling the number of OFDM subcarriers that convey coded data, but the power of each of the increased number of subcarriers has to be halved in order to maintain the same average power of the complete COFDM signal. Such 6 dB reduction of the power of each of the increased number of subcarriers is 2.5 dB more than compensated for by maximal-ratio combining soft bits of corresponding QAM-lattice-point labels of subcarriers conveying the same coded data. This increases the range of reception from a transmitter of given power by a factor of about 4/3 at least.

Preferably, the pattern of mapping the QAM or APSK symbols in one half of the DCM signal differs from the pattern of mapping the QAM or APSK symbols in the other half, providing labeling diversity that improves reception of transmitted data in the presence of additive white Gaussian noise (AWGN) and increases reception range somewhat further. An important aspect of the invention is that the labeling bits identifying the pattern of mapping the QAM or APSK symbols in each half of the DCM signal that are more likely to experience error in the presence of AWGN correspond to the labeling bits identifying the pattern of mapping the QAM or APSK symbols in the other half of the DCM signal that are more likely to experience error in the presence of AWGN.

A further aspect of the invention concerns labeling diversity in which, not only do labeling bits identifying the pattern of mapping the QAM or APSK symbols in each half of a COFDM DCM signal that are more likely to experience error in the presence of AWGN correspond to the labeling bits identifying the pattern of mapping the QAM or APSK symbols in the other half of the COFDM DCM signal that are more likely to experience error in the presence of AWGN, but furthermore the respective patterns of mapping the QAM or APSK symbols in each half of the COFDM DCM signal are chosen to lower its peak-to-average-power ratio (PAPR).

Preferably, the ordering of subcarriers modulated by given coded data is the same in both the lower-frequency and upper-frequency halves of the COFDM DCM signal, so a receiver thereof can be better able to overcome narrow-band interference and frequency-selective fading that may occur in mid-channel.

Receivers for COFDM DCM signals that demodulate the asymmetric lower- and upper-frequency halves of the DCM signal separately and subsequently diversity combine soft-bit results of the two demodulation procedures to recover coded data are improved to take advantage of the foregoing improvements in COFDM signal design. These improved receivers provide further increased reception range from a transmitter of COFDM DCM signal of a given power. Such receivers for COFDM DCM signals are another important aspect of the invention.

Transmitters for COFDM DCM signals with the preferred types of labeling diversity are also another important aspect of the invention.

BRIEF DESCRIPTION OF THE DRAWINGS

FIG. 4 is a detailed schematic diagram of any of a number of cascade connections as can be used in respective physical layer pipes of the FIG. 2 portion of the transmitter apparatus for COFDM DCM signal, each of which cascade connections comprises a parallel pair of mappers to QAM symbol constellations and a subsequent frequency interleaver.

FIG. 5 is an illustration of the preferred response of the frequency interleaver depicted in FIG. 4.

FIGS. 74 and 65 together form a schematic diagram of the general structure of receiver apparatus for COFDM DCM signals using respective phase-shift methods to respond separately to the concurrent lower-frequency and upper-frequency sidebands of those signals, which receiver apparatus embodies aspects of the invention.

FIGS. 77 and 65 together form a schematic diagram of a variant of the receiver apparatus for demodulation of COFDM DCM signal that is depicted in FIGS. 74 and 65, digital circuitry depicted in FIG. 77 replacing some of the analog circuitry depicted in FIG. 74.

FIGS. 78 and 65 together form a schematic diagram of the general structure of novel receiver apparatus for demodulation of COFDM DCM signals using phase-shift methods modified in a first manner, which receiver apparatus embodies aspects of the invention.

FIGS. 79 and 65 together form a schematic diagram of a variant of the receiver apparatus for demodulation of COFDM DCM signals depicted in FIGS. 78 and 65, digital circuitry depicted in FIG. 79 replacing some of the analog circuitry depicted in FIG. 78.

FIGS. 81 and 65 together form a schematic diagram of the general structure of receiver apparatus for COFDM DCM signals using Weaver methods, which receiver apparatus embodies aspects of the invention.

FIGS. 82 and 65 together form a schematic diagram of receiver apparatus for demodulation of COFDM DCM signals using modified phase-shift methods to respond separately to the concurrent lower-frequency and upper-frequency sidebands of those signals after discrete Fourier transforms of those sidebands are computed, which receiver apparatus embodies aspects of the invention.

DETAILED DESCRIPTION

Figure 1:
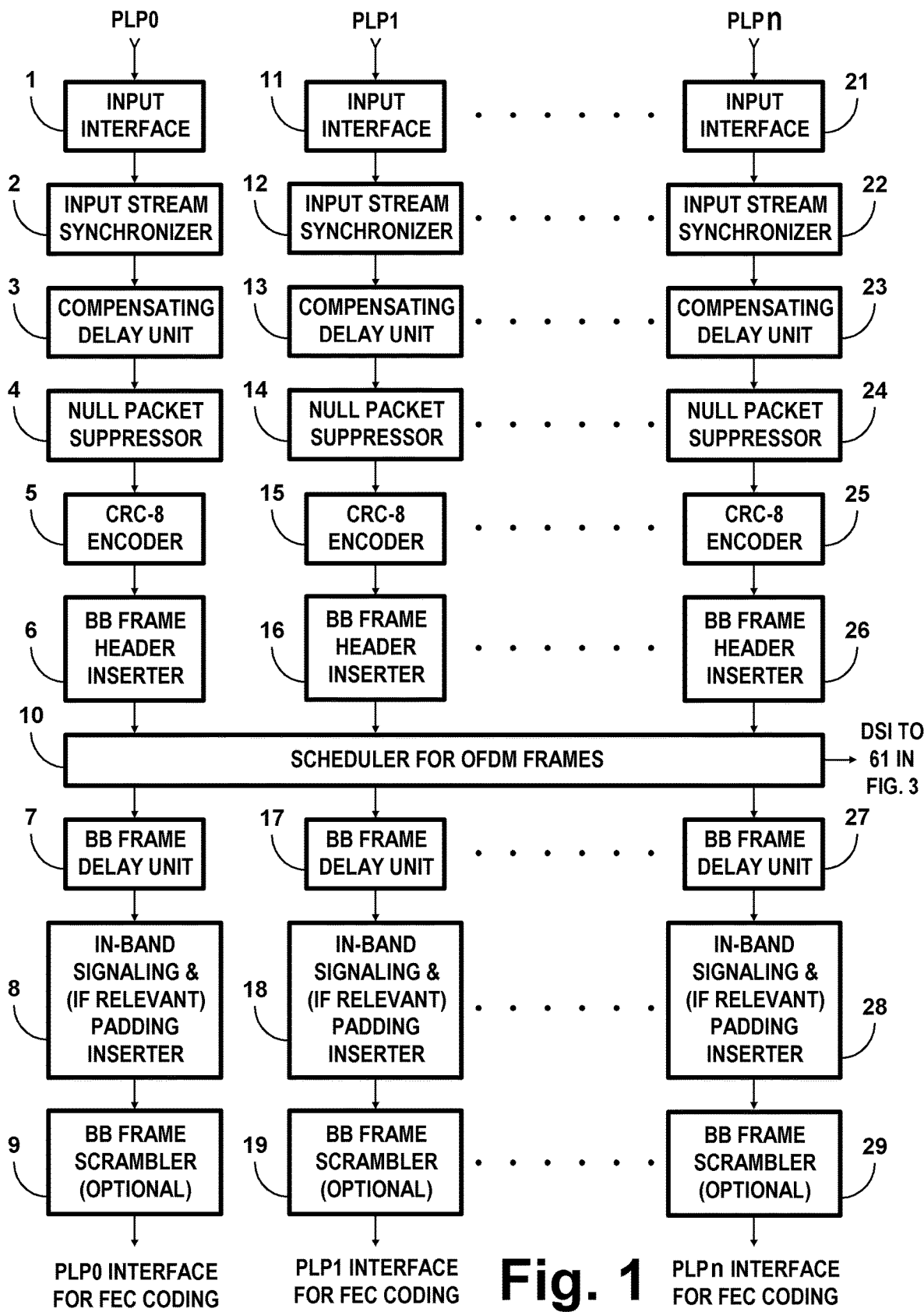
FIGS. 1, 2 and 3 together form a schematic diagram of transmitter apparatus for COFDM DCM signal, the FIG. 2 portion of which transmitter apparatus departs from prior art and embodies aspects of the invention.
Figure 2:
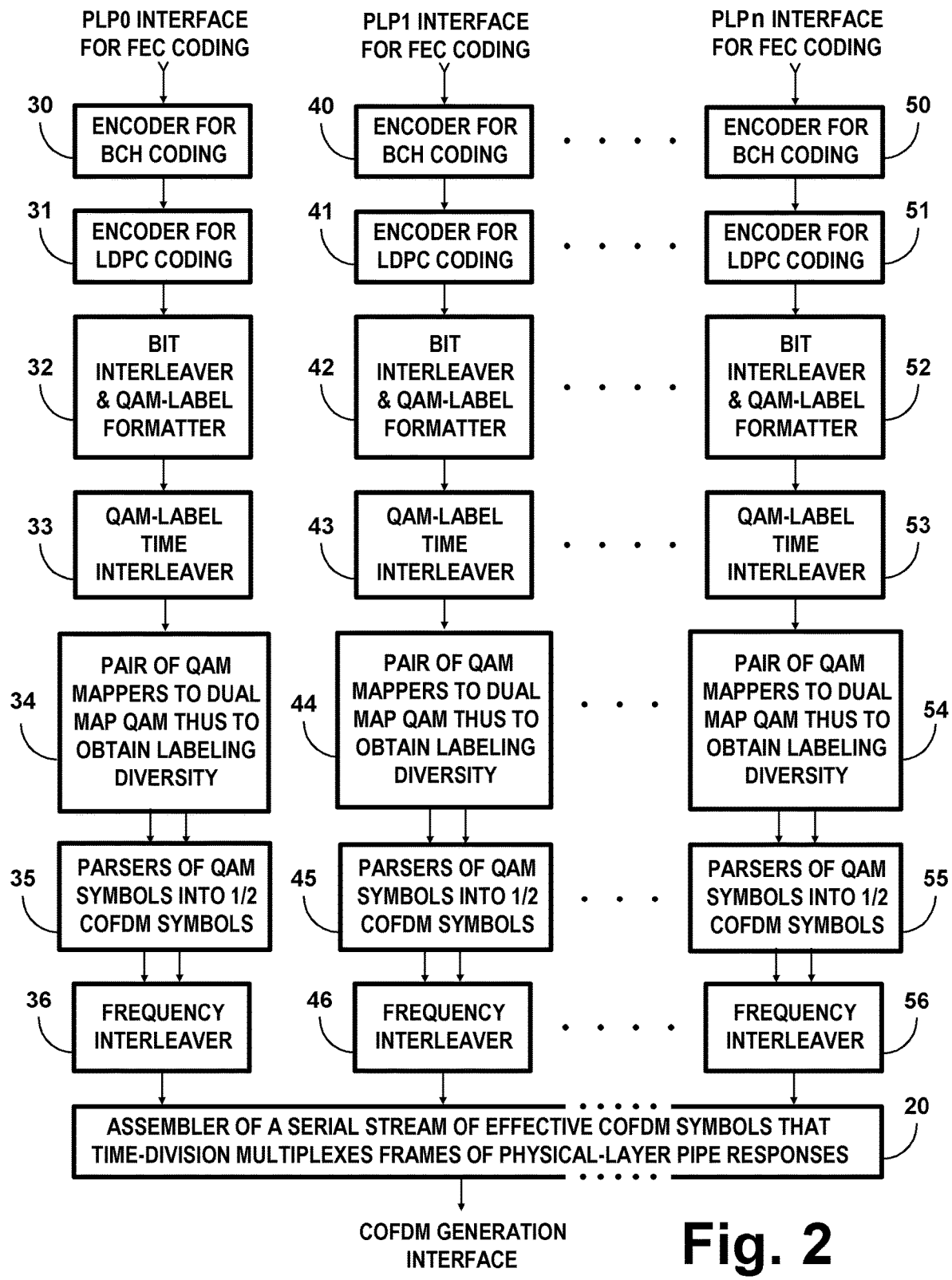
Figure 3:
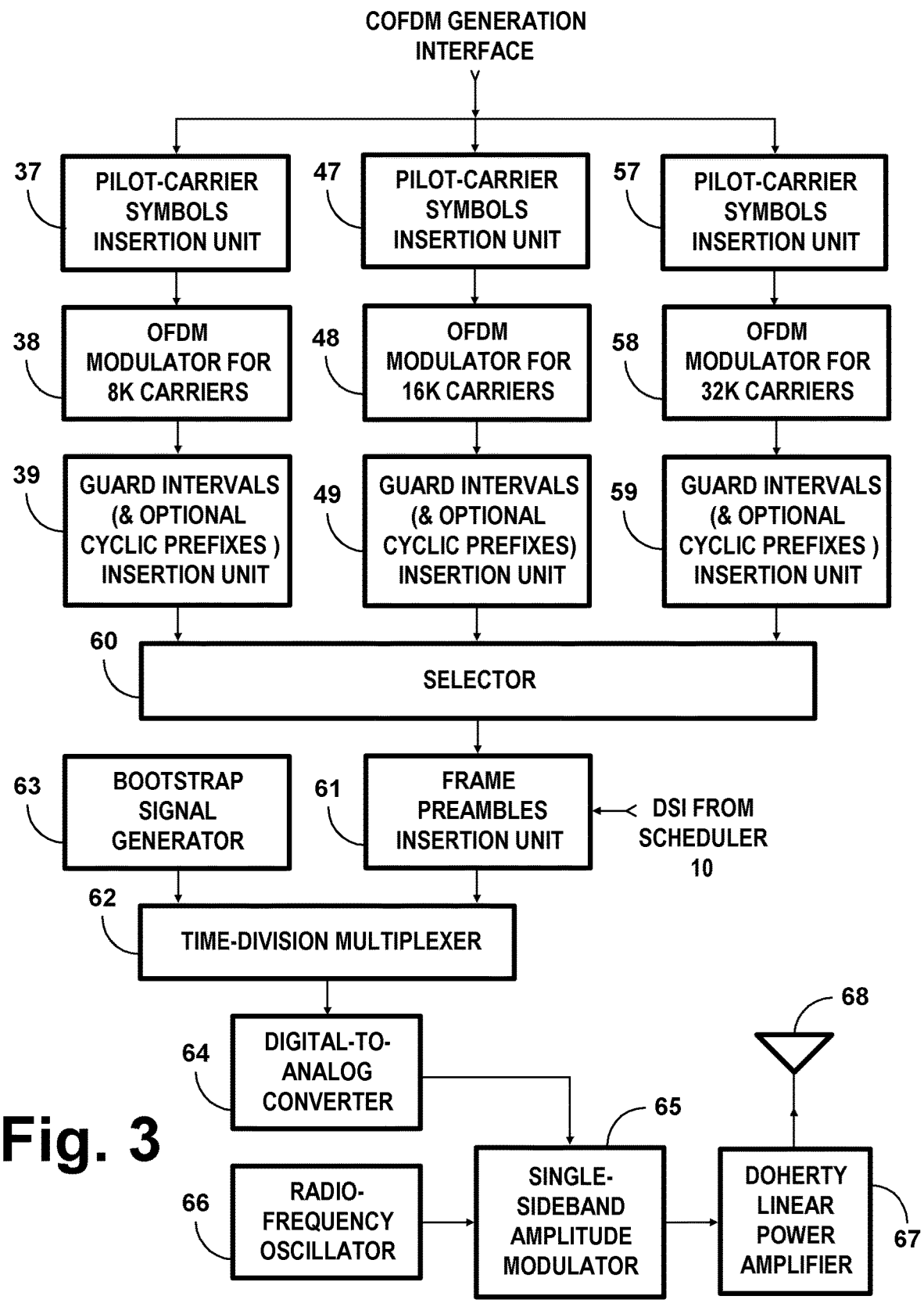

FIGS. 1, 2 and 3 depict a DTV transmitter apparatus generating COFDM signals designed for reception by DTV receivers. FIG. 1 depicts apparatus for generating baseband frames (BBFRAMES) at physical-layer-pipe (PLP) interfaces. FIG. 2 depicts apparatus for generating bit-wise forward-error-correction (FEC) coding and subsequent COFDM symbol blocks responsive to the BBFRAMEs supplied at the PLP interfaces. FIG. 3 depicts apparatus for generating and transmitting radio-frequency COFDM signals. Much of the DTV transmitter apparatus depicted in FIGS. 1, 2 and 3 is similar to that specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference. An important difference is that the COFDM signal uses dual-carrier modulation (DCM) with the OFDM subcarriers.

A scheduler 10 for interleaving time-slices of services to be broadcast to DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each OFDM frame following the P1 and P2 symbols, but before the data PLP or PLPs. A data PLP may be of a first type transmitted as a single slice per OFDM frame, or a data PLP may be of a second type transmitted as a plurality of sub-slices disposed in non-contiguous portions of each OFDM frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 interface for forward-error-correction (FEC) coding. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is insufficient to fill a BBFRAME completely, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 interface for FEC coding. In practice the delay unit 7, the inserter 8 and the BBFRAME scrambler 9 are realized by suitable configuration of a multi-port random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 interface for forward-error-correction (FEC) coding. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data-randomizes bits of the BBFRAME supplied from the output port of the BBFRAME scrambler 19 as the PLP1 interface for FEC coding. In practice the delay unit 17, the inserter 18 and the BBFRAME scrambler 19 are realized by suitable operation of a multi-port random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn interface for forward-error-correction (FEC) coding. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn interface for FEC coding. In practice the delay unit 27, the inserter 28 and the BBFRAME scrambler 29 are apt to be realized by appropriate operation of a multi-port random-access memory.

The input stream synchronizers 2, 12, 22 etc. are operable to guarantee Constant Bit Rate (CBR) and constant end-toend transmission delay for any input data format when there is more than one input data format. Some transmitters may omit ones of the input stream synchronizers 2, 12, 22 etc. or ones of the compensating delay units 3, 13, 23 etc. For some Transport-Stream (TS) input signals, a large percentage of null-packets may be present in order to accommodate various bit-rate services in a constant bit-rate TS. In such case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Program Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 specifically indicates FEC coding to be concatenated BCH/LDPC coding composed of Bose-Chaudhuri-Hocquenghem (BCH) outer block coding and low-density parity-check (LDPC) inner block coding, which FEC coding is currently favored in the DVB-T2 broadcasting art. Alternatively, the FEC coding can take any one of a variety of other forms, including concatenated Reed-Solomon (RS) outer coding and turbo inner coding—e.g., as specified by the earlier DVB-T broadcast standard.

FIG. 2 depicts the (n+1)th physical layer pipe PLP0 further comprising elements 30-38 in cascade connection after the PLP0 interface for FEC coding, but before a respective input port of an assembler 20 for assembling a serial stream of effective COFDM symbols. More specifically, FIG. 2 depicts an encoder 30 for BCH coding with its input port connected to receive the PLP0 FEC-coding interface signal from the output port of the BBFRAME scrambler 9 and with its output port connected to the input port of an encoder 31 for LDPC coding. The output port of the encoder 31 connects to the input port of a bit interleaver and QAM-label formatter 32. FIG. 2 depicts the output port of the bit interleaver and QAM-label formatter 32 connected to the input port of a time interleaver 33 for successive QAM labels. The time interleaver 33 shuffles the order of the QAM symbols in each successive FEC block. This shuffling implements cyclic delay diversity (CDD) that helps the FEC coding to overcome fading. The output port of the QAM-label time interleaver 33 connects to the respective input ports of a pair 34 of QAM mappers for dual mapping successive QAM labels to the complex coordinates of respective successions of QAM symbol constellations. The two QAM mappers in the pair 34 of them map same coded data to QAM of their respective OFDM carriers according to respective patterns that differ from each other, thereby to implement labeling diversity. In the case of transmissions broadcast for reception by mobile DTV receivers, these QAM symbol constellations be square 16 QAM symbol constellations, square 64 QAM symbol constellations or 16APSK symbol constellations, by way of specific examples. ATSC 3.0 Digital Standards In the case of transmissions broadcast for reception by stationary DTV receivers, these QAM symbol constellations are most likely to be square 64 QAM symbol constellations, although square 256 QAM symbol constellations or even square 1024 QAM symbol constellations could be used. The ATSC 3.0 Digital Television Standards prescribe square QAM symbol constellations with non-uniform spacing between neighboring lattice points, which sort of QAM is referred to as NuQAM. Going from 16 QAM to 64 QAM symbol constellations increases the number of bits in lattice-point labels from four to six, increasing channel capacity 50%. Going from 16 QAM to 256 QAM symbol constellations increases the number of bits in lattice-point labels from four to eight, doubling channel capacity, but the increase of channel capacity over that for 64 QAM symbol constellations is only 33%. Going from 256 QAM to 1024 QAM symbol constellations increases the number of bits in lattice-point labels from eight to ten, for a 25% increase in channel capacity. The diminishing increases in channel capacity for larger than 64 QAM symbol constellations probably do not justify the extra risk of error caused by noise. Stronger FEC coding necessary to overcome these errors will decrease channel capacity, offsetting increase in channel capacity owing to a larger QAM symbol constellation.

The respective output ports of the pair 34 of QAM mappers are connected for supplying first and second sets of successive QAM symbol constellations to respective input ports of parsers 35 of the first and second sets of successive of QAM symbols into respective successions of half COFDM symbols. These successions of half COFDM symbols are supplied to first and second input ports of a frequency interleaver 36, which responds to their half COFDM symbols alternately to generate complete COFDM symbols. The output port of the frequency interleaver 36 is connected to a respective input port of an assembler 20 of a serial stream of effective COFDM symbols, in which frames of PLP responses from the various physical layer pipes are time-division multiplexed. Together the parsers 35 and the frequency interleaver 36 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the first physical layer pipe PLP1 further comprising elements 40-46 in cascade connection after the PLP1 interface for FEC coding, but before a respective input port of an assembler 20 for assembling a serial stream of effective COFDM symbols. More specifically, FIG. 2 depicts an encoder 40 for BCH coding with its input port connected to receive the PLP1 FEC-coding interface signal from the output port of the BBFRAME scrambler 19 and with its output port connected to the input port of an encoder 41 for LDPC coding. The output port of the encoder 41 is connected to the input port of a bit interleaver and QAM-label formatter 42. FIG. 2 depicts the output port of the bit interleaver and QAM-label formatter 42 connected to the input port of a time interleaver 43 for successive QAM labels. The time interleaver 43 shuffles the order of the QAM symbols in each successive FEC block. This shuffling implements cyclic delay diversity that helps the FEC coding to overcome fading. The output port of the QAM-label time interleaver 43 connects to the respective input ports of pair 44 of QAM mappers for dual mapping successive QAM labels to the complex coordinates of respective successions of QAM symbol constellations. The two QAM mappers in the pair 44 of them map same coded data to QAM of their respective OFDM carriers according to respective patterns that differ from each other, thereby to implement labeling diversity.

The respective output ports of the pair 44 of QAM mappers are connected for supplying first and second sets of successive QAM symbol constellations to respective input ports of parsers 45 of the first and second sets of successive of QAM symbols into respective successions of half COFDM symbols. These successions of half COFDM symbols are supplied to first and second input ports of a frequency interleaver 46, which responds to their half COFDM symbols alternately to generate complete COFDM symbols. The output port of the frequency interleaver 46 is connected to a respective input port of an assembler 20 of a serial stream of effective COFDM symbols, in which frames of PLP responses from the various physical layer pipes are time-division multiplexed. Together the parsers 45 and the frequency interleaver 46 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the (n)th physical layer pipe PLPn further comprising elements 50-55 in cascade connection after the PLP0 interface for FEC coding, but before a respective input port of the assembler 20 for assembling a serial stream of effective COFDM symbols. More specifically, FIG. 2 depicts an encoder 50 for BCH coding with its input port connected to receive the PLPn FEC-coding interface signal from the output port of the BBFRAME scrambler 29 and with its output port connected to the input port of an encoder 51 for LDPC coding. The output port of the encoder 51 is connected to the input port of bit interleaver and QAM-label formatter 52. FIG. 2 depicts the output port of the bit interleaver and QAM-label formatter 52 connected to the input port of a time interleaver 53 for successive QAM labels. The time interleaver 53 shuffles the order of the QAM symbols in each successive FEC block. This shuffling implements cyclic delay diversity (CDD) that helps the FEC coding to overcome fading. The output port of the QAM-label time interleaver 53 connects to the respective input ports of a pair 54 of QAM mappers for dual mapping successive QAM labels to the complex coordinates of respective successions of QAM symbol constellations. The two QAM mappers in the pair 54 of them map same coded data to QAM of their respective OFDM carriers according to respective patterns that differ from each other, thereby to implement labeling diversity.

The respective output ports of the pair 54 of QAM mappers are connected for supplying first and second sets of successive QAM symbol constellations to respective input ports of parsers 55 of the first and second sets of successive of QAM symbols into respective successions of half COFDM symbols. These successions of half COFDM symbols are supplied to first and second input ports of a frequency interleaver 56, which responds to their half COFDM symbols alternately to generate complete COFDM symbols. The output port of the frequency interleaver 56 is connected to a respective input port of an assembler 20 of a serial stream of effective COFDM symbols, in which frames of PLP responses from the various physical layer pipes are time-division multiplexed. Together the parsers 55 and the frequency interleaver 56 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

Customarily there is a number of other physical layer pipes besides PLP0, PLP1 and PLPn, which other physical layer pipes are identified by the prefix PLP followed by respective ones of consecutive numbers two through (n−1).

Each of the PLPs, n+1 in number, may differ from the others in at least one aspect. One possible difference between these n+1 PLPs concerns the natures of the FEC coding these PLPs respectively employ. The current trend is to use concatenated BCH coding and LDPC block coding for the FEC coding, but concatenated Reed-Solomon coding and convolutional coding have been used in the past. EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

FIG. 2 indicates that the output port of the assembler 20 of a serial stream of effective COFDM symbols, in which frames of PLP responses from the various physical layer pipes are time-division multiplexed, connects to subsequent elements via a COFDM generation interface depicted in both FIGS. 2 and 3. These subsequent elements are depicted in FIG. 3, which indicates where pilot carrier symbols are inserted into the effective COFDM symbols to generate complete COFDM symbols to be supplied to each at least one COFDM modulator. Pilot-carrier symbols can be similar to those used in the ATSC 3.0 Digital Television Standards, being inserted in conventional spectral order among the QAM symbols in COFDM symbols.

FIG. 3 depicts a pilot-carrier symbols insertion unit 37 having an input port connected for receiving the serial stream of effective COFDM symbols supplied from the FIG. 2 assembler 20 thereof via the COFDM generation interface. The pilot-carrier symbols insertion unit 37 inserts pilot carrier symbols into the effective COFDM symbols to generate complete COFDM symbols suitable for a subsequent 8K inverse fast Fourier transform (I-FFT). The output port of the pilot-carrier symbols insertion unit 37 is connected for supplying complete COFDM symbols to the input port of an OFDM modulator 38 which performs that subsequent 8K I-FFT. I.e., the pilot-carrier symbols insertion unit 37 cooperates with the assembler 20 of a serial stream of effective COFDM symbols to form a COFDM symbol generator for supplying complete COFDM symbols to the OFDM modulator 38, which is the initial element of a subsequent generator of COFDM DCM radio-frequency signal. FIG. 3 shows the output port of the OFDM modulator 38 connected for supplying 8K I-FFT results directly to the input port of a guard intervals insertion unit 39. The guard intervals insertion unit 39 inserts a respective cyclic prefix within each guard interval.

FIG. 3 depicts a pilot-carrier symbols insertion unit 47 having an input port connected for receiving the serial stream of effective COFDM symbols supplied from the FIG. 2 assembler 20 thereof via the COFDM generation interface. The pilot-carrier symbols insertion unit 47 inserts pilot carrier symbols into the effective COFDM symbols to generate complete COFDM symbols suitable for a subsequent 16K I-FFT. The output port of the pilot-carrier symbols insertion unit 47 is connected for supplying complete COFDM symbols to the input port of an OFDM modulator 48 which performs that subsequent 16K I-FFT. I.e., the pilot-carrier symbols insertion unit 47 cooperates with the assembler 20 of a serial stream of effective COFDM symbols to form a COFDM symbol generator for supplying complete COFDM symbols to the OFDM modulator 48, which is the initial element of a subsequent generator of COFDM DCM radio-frequency signal. FIG. 3 shows the output port of the OFDM modulator 48 connected for supplying 16K I-FFT results directly to the input port of a guard intervals insertion unit 49. The guard intervals insertion unit 49 inserts a respective cyclic prefix within each guard interval.

FIG. 3 depicts a pilot-carrier symbols insertion unit 57 having an input port connected for receiving the serial stream of effective COFDM symbols supplied from the FIG. 2 assembler 20 thereof via the COFDM generation interface. The pilot-carrier symbols insertion unit 57 inserts pilot carrier symbols into the effective COFDM symbols to generate complete COFDM symbols suitable for a subsequent 32K I-FFT. The output port of the pilot-carrier symbols insertion unit 57 is connected for supplying complete COFDM symbols to the input port of an OFDM modulator 58 which performs that subsequent 32K I-FFT. I.e., the pilot-carrier symbols insertion unit 57 cooperates with the assembler 20 of a serial stream of effective COFDM symbols to form a COFDM symbol generator for supplying complete COFDM symbols to the OFDM modulator 58, which is the initial element of a subsequent generator of COFDM DCM radio-frequency signal. FIG. 3 shows the output port of the OFDM modulator 58 is connected for supplying 32K I-FFT results directly to the input port of a guard intervals insertion unit 59. The guard intervals insertion unit 59 inserts a respective cyclic prefix within each guard interval.

Clipping methods of PAPR reduction necessarily involve distortion that tends to increase bit errors and thus tax iterative soft decoding of error-correction coding more. Furthermore, the PAPR reduction method using a complementary-power pair of QAM mappers suppresses occasional power peaks, which the various clipping methods of PAPR reduction rely upon to be markedly effective. Even so, most COFDM transmitter apparatus permits some clipping of power peaks that tend to occur infrequently, even where the power amplifier is of Doherty type. This is permitted in recognition of practical limitations on linearity in COFDM receiver apparatuses. However, band-limit filtering designed to suppress widening of the frequency spectrum caused by such clipping should follow the power amplifier for final-radio-frequency COFDM signal.

FIG. 3 further depicts a selector 60 having respective input ports to which the output ports of the guard intervals insertion units 39, 49 and 65 respectively connect. FIG. 3 depicts the output port of the selector 60 connected to the input port of a frame preambles insertion unit 61. The pilot-carrier symbols insertion unit 37, the OFDM modulator 38, any subsequent supplemental PAPR reduction unit and the guard intervals insertion unit 39 may be selectively powered, being powered only when transmissions using close to 8K OFDM carriers are made. Elements 37, 38 and 39 may all be omitted in some transmitters. The pilot-carrier symbols insertion unit 47, the OFDM modulator 48, any subsequent supplemental PAPR reduction unit and the guard intervals insertion unit 49 may be selectively powered, being powered only when transmissions using close to 16K OFDM carriers are made. Elements 47, 48 and 49 may all be omitted in some transmitters. The pilot-carrier symbols insertion unit 57, the OFDM modulator 58, any subsequent supplemental PAPR reduction unit and the guard intervals insertion unit 59 may be selectively powered, being powered only when transmissions using close to 32K OFDM carriers are made. All the elements 57, 58 and 59 may be omitted in some transmitters.

FIG. 3 shows the output port of the frame preambles insertion unit 61 connected to one of the two input ports of a time-division multiplexer 62. The other of the two input ports of the time-division multiplexer 62 is connected for receiving a bootstrap signal that a bootstrap signal generator 63 supplies from its output port. The bootstrap signal is an innovation introduced by developers of the ATSC 3.0 Digital Television Standards. The bootstrap signal conveys metadata descriptive of the transmission standard used for DTV broadcasting and critical information concerning the configuration of receivers for receiving DTV broadcasts made in accordance with that standard. The bootstrap signal is conveyed by an OFDM signal using a set of carriers that are apt to differ in frequencies in a defined way from the set of carriers used for COFDM transmission of DTV signal. The OFDM signal conveying the bootstrap is of narrower bandwidth (typically 4.5 MHz) than the 6 MHz, 7 MHz or 8 MHZ signals currently used for DTV in various countries around the world. The baseband bootstrap signal developed for the ATSC 3.0 Digital Television Standards comprises a Zadoff-Chu sequence, which identifies the basic standard governing the DTV broadcasting, and a set of repetitive pseudo-random-noise sequences that convey further metadata. This is described more fully in ATSC Standard A/321, System Discovery and Signaling (Doc. A/321:2016, approved 23 Mar. 2016).

FIG. 3 shows the output port of the time-division multiplexer 62 connected to the input port of a digital-to-analog converter 64, the output port of which is connected for supplying analog COFDM carriers as modulating input signal to a first input port of an amplitude modulator 65. FIG. 3 shows the output port of a radio-frequency oscillator 66 connected for supplying radio-frequency (RF) carrier wave to a second input port of the amplitude modulator 65. The amplitude modulator 65 is of a type that generates a single-sideband (SSB) amplitude-modulation (AM) signal with a principal carrier that is suppressed at least to some degree. The amplitude modulator 65 supplies RF analog COFDM signal from an output port thereof to the input port of a linear power amplifier 67, which is preferably of Doherty type to reduce the likelihood of clipping on peaks of RF signal amplitude.

FIG. 3 shows the output port of the linear power amplifier 67 connected for driving amplified RF analog COFDM signal power to a transmission antenna 68. FIG. 3 omits showing some DTV transmitter details, such as band-shaping filters for the RF signals. In some designs for the DTV transmitter, the DAC 64 is designed to compensate for non-linear transfer functions of the SSB amplitude modulator 65, of any up-converter that may be used, and of the linear power amplifier 67.

The frame preambles inserted by the frame preambles insertion unit 61 convey the conformation of each OFDM frame structure and also convey the dynamic scheduling information (DSI) produced by the scheduler 10. This information is conveyed using at least some of OFDM carriers also used for conveying the baseband OFDM information in the input signals to the frame preambles insertion unit 61. The OFDM carriers supplied by the bootstrap signal generator 63 are apt to have different frequencies than OFDM carriers used for conveying the baseband OFDM information in the input signals to the frame preambles insertion unit 61. The OFDM carriers supplied by the bootstrap signal generator 63 are constrained to a narrower bandwidth than the OFDM carriers used for conveying the baseband OFDM information in the input signals to the frame preambles insertion unit 61. The bootstrap signal conveys basic information as to the standard to which OFDM broadcasts conform, the bandwidth of the RF channel, and the size of the I-FFT used in the broadcasting of groups of OFDM frames, for example. If bootstrap signals are not used in the standard used for COFDM broadcasting, the elements 62 and 65 will be omitted, and the output port of the frame preambles insertion unit 61 will connect directly to the input port of the digital-to-analog converter 64.

FIG. 4 is a detailed schematic diagram of representative structure 70 for any one of a number of cascade connections in respective physical layer pipes of the FIG. 2 portion of COFDM transmitter apparatus, which structure 70 is configured so as to generate separate half COFDM symbols to be transmitted in lower and upper sidebands respectively of the COFDM signal. Each of these cascade connections comprises a respective pair of QAM mappers to QAM symbol constellations, followed by a respective frequency interleaver. One of these cascade connections comprises the elements 34, 35 and 36 in PLP0. Another of these cascade connections comprises the elements 44, 45 and 46 in PLP1. Still another of these cascade connections comprises the elements 54, 55 and 56 in PLPn.

FIG. 4 shows any one of the respective pairs 34, 44, 54 etc. of mappers to QAM symbol constellations in the physical layer pipes PLP0, PLP1, PLPn etc. as consisting of a respective first QAM mapper 71 and a respective second QAM mapper 72. The respective input ports of the QAM mappers 71 and 72 are each connected for receiving the same succession of QAM lattice-point labels from a foregoing element, such as one of the QAM-label time interleavers 33, 43, 53 etc. Serial-input/parallel-output registers 73 and 74 correspond to the subsequent one of the pairs of parsers 35, 45, 55 etc. A parallel-input/serial-output (PISO) register 75 is configured as a frequency interleaver of a type that is preferred for the respective frequency interleavers 36, 46, 56 etc. in the physical layer pipes PLP0, PLP1, PLPn etc.

The output port of the first QAM mapper 71 is connected for serially supplying the complex coordinates of a first set of QAM symbols to the input port of the serial-input/parallel-output register 73, which is capable of storing the complex coordinates of QAM symbols for inclusion in the lower-sideband half of each COFDM symbol. The output port of the second QAM mapper 72 is connected for serially supplying the complex coordinates of a second set of QAM symbols to the input port of the serial-input/parallel-output register 74, which is capable of storing the complex coordinates of QAM symbols for inclusion in the upper-sideband half of each COFDM symbol. The parallel output ports of the serial-input/parallel-output registers 73 and 74 are connected for delivering complex coordinates of respective first and second sets of QAM symbols as half COFDM symbols to the parallel input ports of the parallel-input/serial-output register 75, the output port of which connects to a respective input port of the assembler 20 in FIG. 2.

FIG. 5 illustrates the serial response that the parallel-input/serial-output register 75 is designed to supply from its serial output port to that one of the input ports of the assembler 20. Such response is obtained by appropriately connecting ones of the parallel output ports of the serial-input/parallel-output registers 73 and 74 to appropriate ones of the parallel input ports of the parallel-input/serial-output register 75. In the serial-output signal from the PISO register 75 the complete first set of QAM symbols as generated by the first QAM mapper 71 for inclusion in a COFDM symbol interval is followed by the complete second set of QAM symbols as generated by the second QAM mapper 71 for inclusion in that COFDM symbol interval. Ultimately, this causes the SSB amplitude modulator 65 depicted in FIG. 3 to generate asymmetric-sideband amplitude modulation. The FIG. 5 frequency interleaving format spreads all the QAM symbols conveying the same information the maximum possible uniform distance in the frequency domain.

FIGS. 6, 7, 8 and 9 are first, second, third and fourth Gray mappings of 16 QAM symbol constellations. The first Gray mapping of 16 QAM symbol constellations is as prescribed in European standard ETSI EN 300 744 V1.5.1 published in June 2004 and titled Digital Video Broadcasting (DVB); Framing structure, channel coding and modulation for digital terrestrial television. The first and third Gray mappings of 16 QAM symbol constellations have an antiphase-energy relationship with each other, so they could be used together in the FIG. 5 frequency interleaving format to implement symmetric cancellation coding (SCC). The second and fourth Gray mappings of 16 QAM symbol constellations have an antiphase-energy relationship with each other, so they also could be used together in the FIG. 5 frequency interleaving format to implement SCC.

Figure 6:
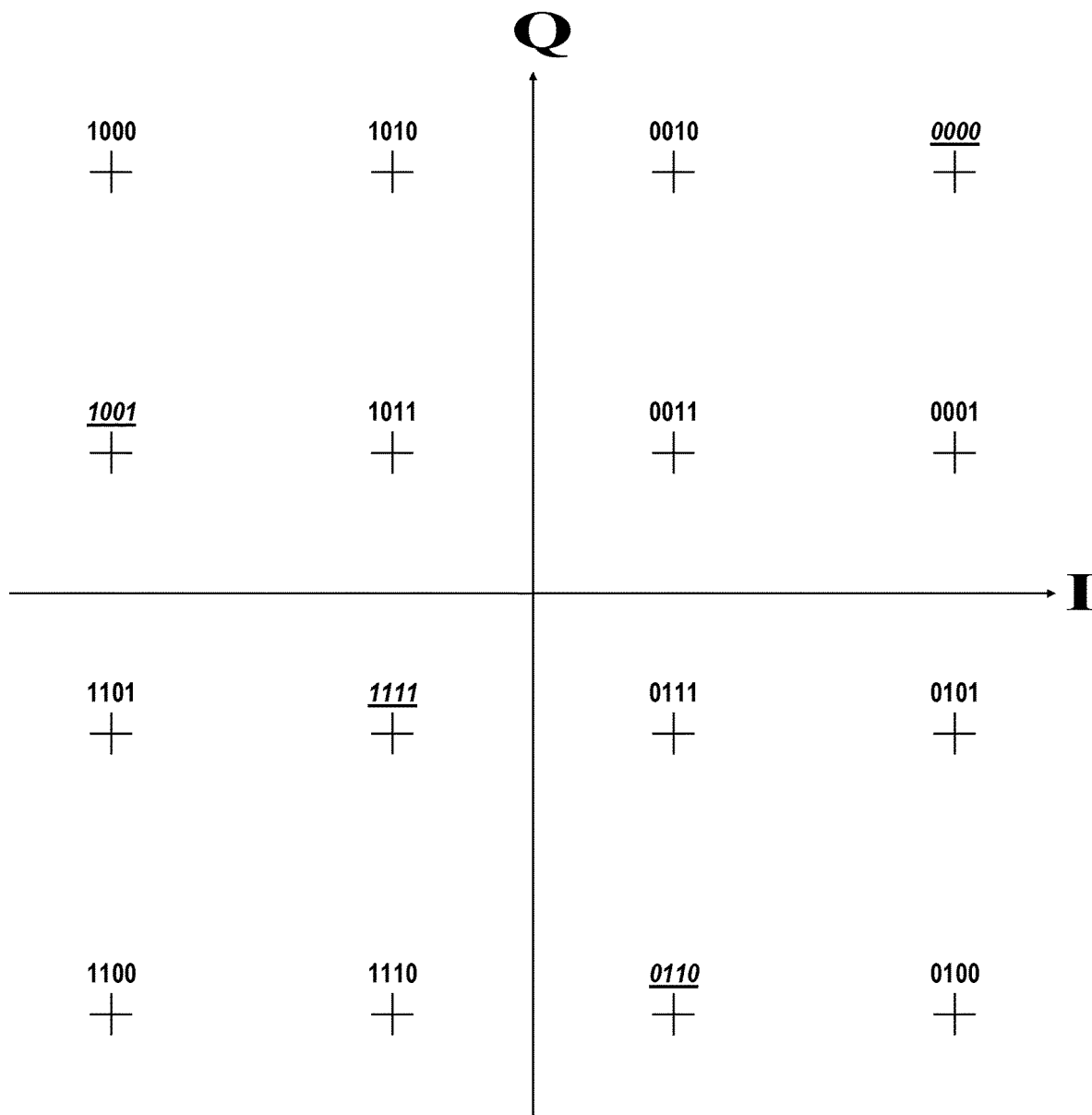
FIGS. 6, 7, 8 and 9 are first, second, third and fourth different Gray mappings of square 16 QAM symbol constellations (based upon the Gray mapping of 16 QAM symbol constellations as prescribed originally in the DVB-T standard for COFDM digital television broadcasting), which first and third Gray mappings of 16 QAM symbol constellations have an antiphase-energy relationship with each other, and which second and fourth Gray mappings of 16 QAM symbol constellations have an antiphase-energy relationship with each other.
Figure 7:
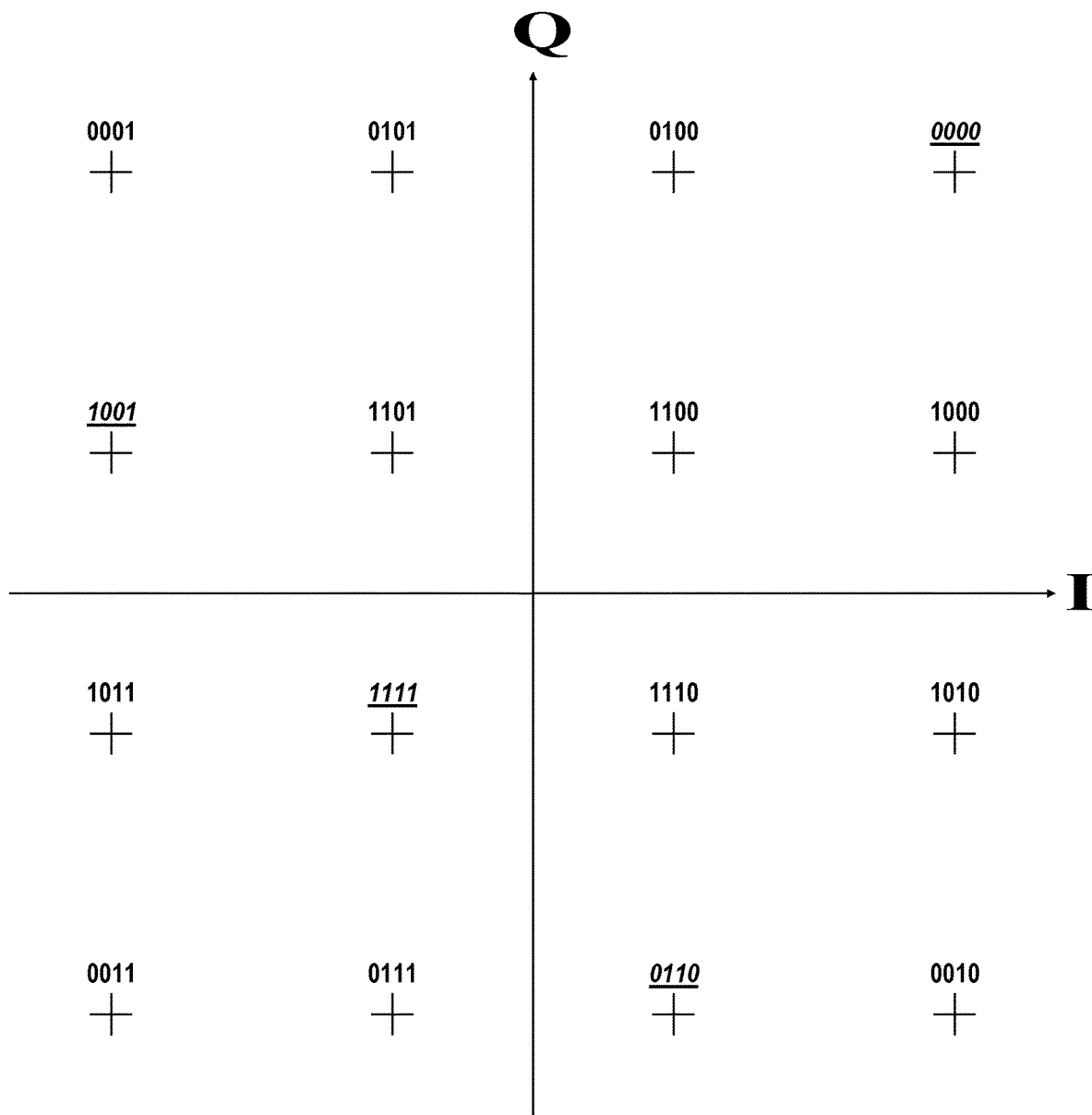

FIGS. 6 and 7 respectively depict first and second Gray maps of lattice points in 16 QAM symbol constellations that the QAM mappers 71 and 72 respectively provide in a physical layer pipe in some COFDM DCM transmitter apparatuses embodying aspects of the invention. The FIG. 6 first Gray map implements transmission of coded data in one of the sidebands of an ASB-COFDM signal, and the FIG. 7 second Gray map implements transmission of the same coded data in the other sideband of that ASB-COFDM signal. The FIG. 6 and FIG. 7 Gray maps govern quadrature amplitude modulation of their respective sets of OFDM carriers according to first and second 16 QAM patterns, respectively, to support bit reliability averaging (BRA) to provide shaping gain. Bits of the lattice-point labels for the FIG. 6 Gray map of 16 QAM symbol constellations more likely to experience error correspond to bits of the lattice-point labels for the FIG. 7 Gray map of 16 QAM symbol constellations less likely to experience error. Bits of the lattice-point labels for the FIG. 7 Gray map of 16 QAM symbol constellations more likely to experience error correspond to bits of the lattice-point labels for the FIG. 6 Gray map of 16 QAM symbol constellations less likely to experience error. These characteristics are achieved simply by reversing the order of bits in the labeling of each pair of lattice points similarly located in respective ones of the FIG. 6 and FIG. 7 Gray maps.

Simply reversing the order of bits in the labeling of positions in the complex plane used for a first two-dimensional mapping of modulation symbol constellations to generate the labeling of positions in the complex plane used for a second two-dimensional mapping of modulation symbol constellations is a powerful technique that lends itself to sorts of COFDM DCM that employ Gray mapping. This technique guarantees that the bits of the labeling of positions in the first two-dimensional Gray mapping of modulation symbol constellations more likely to experience error passing through an AWGN channel correspond to bits of the labeling of positions in the second two-dimensional Gray mapping of modulation symbol constellations less likely to experience error passing through that AWGN channel. This technique guarantees that the bits of the labeling of positions in the second two-dimensional Gray mapping of modulation symbol constellations more likely to experience error passing through an AWGN channel correspond to bits of the labeling of positions in the first two-dimensional Gray mapping of modulation symbol constellations less likely to experience error passing through that AWGN channel. This supports BRA to provide shaping gain.

Note that each of certain pairs of lattice points similarly located in respective ones of the FIG. 6 and FIG. 7 Gray maps have like labeling, owing to mirror symmetry of their bits. Such palindromic labels are italicized and underlined in FIGS. 6-63. In 16 QAM there are four palindromic lattice-point labels—i.e. 0000, 0110, 1001, and 1111. One of these palindromic lattice-point labels, 0000, is located at similar corner lattice points in both of the FIG. 6 and FIG. 7 Gray maps.

Therefore, if QAM mappers 71 and 72 use respective ones of the FIG. 6 first Gray map and the FIG. 7 second Gray map of 16 QAM symbol constellations, there is no reduction of peak-to-average-power ratio (PAPR) compared with conventional COFDM. This is because peak power is as large as in conventional COFDM when both lattice-point labels are 0000 throughout an entire OFDM symbol. Average power is the same as for conventional COFDM.

Figure 8:
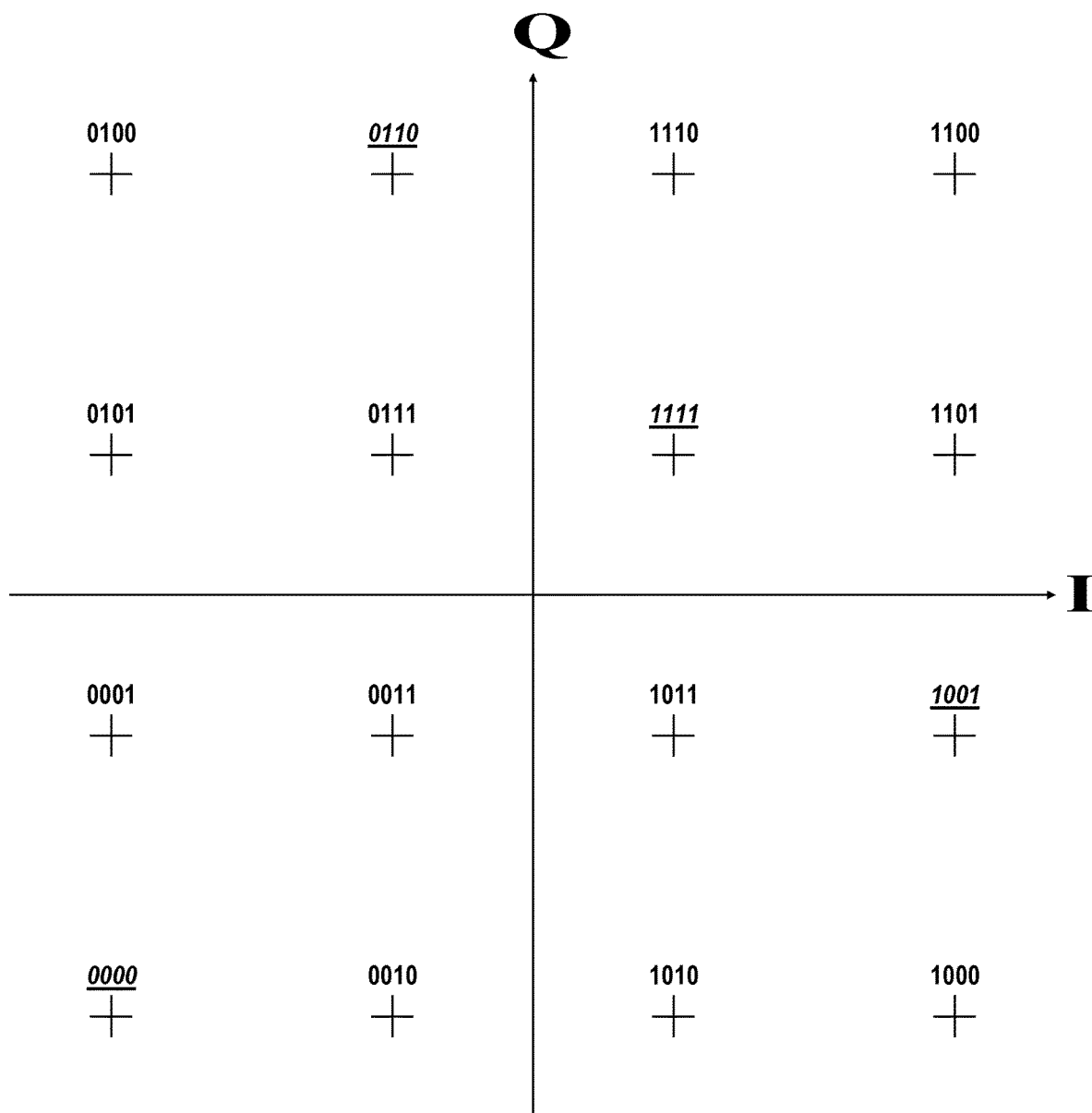

The labeling of lattice points in the FIG. 8 third Gray map corresponds to the labeling of lattice points in the FIG. 6 first Gray map were that first Gray map rotated by $\pi$ radians or 180°. QAM mappers 71 and 72 using respective ones of the FIG. 6 first Gray map and the FIG. 8 third Gray map of 16 QAM symbol constellations implement symmetric cancellation coding (SCC) that reduces PAPR of the COFDM DCM compared to conventional COFDM.

QAM mappers 71 and 72 using respective ones of the FIG. 7 second Gray map and the FIG. 8 third Gray map of 16 QAM symbol constellations support BRA to provide the same shaping gain as associated with QAM mappers 71 and 72 using respective ones of the FIG. 6 first Gray map and the FIG. 7 second Gray map of 16 QAM symbol constellations. When the lattice-point labels of the FIG. 7 second Gray map and the FIG. 8 third Gray map of 16 QAM symbol constellations are both 0000 throughout an entire OFDM symbol, their OFDM subcarriers are modulated antipodally, to curtail their combined peak power in a way similar to that of SCC. So, when the QAM mappers 71 and 72 use respective ones of the FIG. 7 second Gray map and the FIG. 8 third Gray map of 16 QAM symbol constellations, PAPR is somewhat lower than when the QAM mappers 71 and 72 use respective ones of the FIG. 6 first Gray map and the FIG. 7 second Gray map of 16 QAM symbol constellations.

Figure 9:
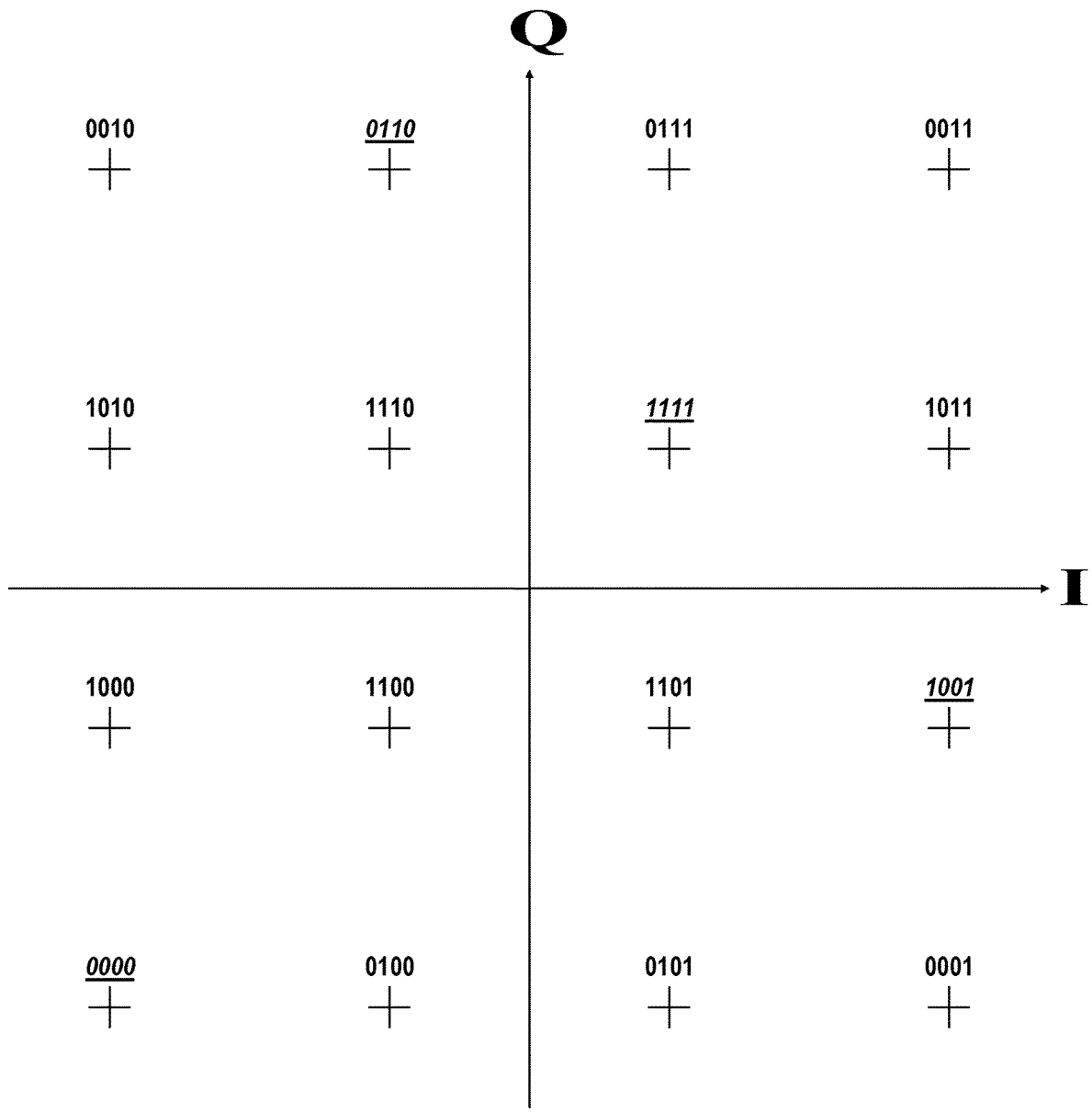

The labeling of lattice points in the FIG. 9 fourth Gray map corresponds to the labeling of lattice points in the FIG. 7 second Gray map were that second Gray map rotated by $\pi$ radians or 180°. QAM mappers 71 and 72 using respective ones of the FIG. 7 second Gray map and the FIG. 9 fourth Gray map of 16 QAM symbol constellations implement symmetric cancellation coding (SCC) that reduces PAPR of the COFDM DCM compared to conventional COFDM.

QAM mappers 71 and 72 using respective ones of the FIG. 6 first Gray map and the FIG. 9 fourth Gray map of 16 QAM symbol constellations support BRA to provide the same shaping gain as associated with QAM mappers 71 and 72 using respective ones of the FIG. 6 first Gray map and the FIG. 7 second Gray map of 16 QAM symbol constellations. When the lattice-point labels of the FIG. 6 first Gray map and the FIG. 9 fourth Gray map of 16 QAM symbol constellations are both 0000 throughout an entire OFDM symbol, their OFDM subcarriers are modulated antipodally, to curtail their combined peak power in a way similar to that of SCC. So, when the QAM mappers 71 and 72 use respective ones of the FIG. 6 first Gray map and the FIG. 9 fourth Gray map of 16 QAM symbol constellations, PAPR is somewhat lower than when the QAM mappers 71 and 72 use respective ones of FIG. 6 first Gray map and the FIG. 7 second Gray map of 16 QAM symbol constellations.

Superposition-coded-modulation (SCM) mappings of square QAM symbol constellations have some advantages over many Gray mappings of such constellations, besides those referred to supra in the "Background of the Invention". Pairs of SCM mappings of 16 QAM symbol constellations can be developed in which the four palindromic lattice-point labels (i. e., 0000, 0110, 1001, and 1111) are located in the four corner positions of each symbol constellation, but arranged for antipodal modulation in the two 16 QAM symbol constellations so as to reduce PAPR of the COFDM DCM signal. Pairs of SCM mappings of 16 QAM symbol constellations can be developed in which the four palindromic lattice-point labels (i. e., 0000, 0110, 1001, and 1111) are positioned at the four corner positions of one of the symbol constellations, but are positioned centrally in the other of the symbol constellations to reduce PAPR of the COFDM DCM signal to a degree. There are eight palindromic lattice-point labels (i. e., 000000, 001100, 010010, 011110, 100001, 101101, 110011 and 111111) in the mapping of each square 64 QAM symbol constellation. Pairs of SCM mappings of 64 QAM symbol constellations can be developed in which four of the eight palindromic lattice-point labels are located in the four corner positions of each symbol constellation, but arranged for antipodal modulation in the two 64 QAM symbol constellations so as to reduce PAPR of the COFDM DCM signal. Pairs of SCM mappings of 64 QAM symbol constellations can be developed in which a completely different set of four of the eight palindromic lattice-point labels are located in the four corner positions of each symbol constellation. A group of four of the eight palindromic lattice-point labels are respectively located in the four corner positions of each of a first set of 64 QAM symbol constellations is centrally located in each of a second set of 64 QAM symbol constellation, thus to reduce to a degree the PAPR of the COFDM DCM signal. This particular sort of PAPR reduction is inapplicable to most, if not all, purely Gray mapping formats.

Figure 10:
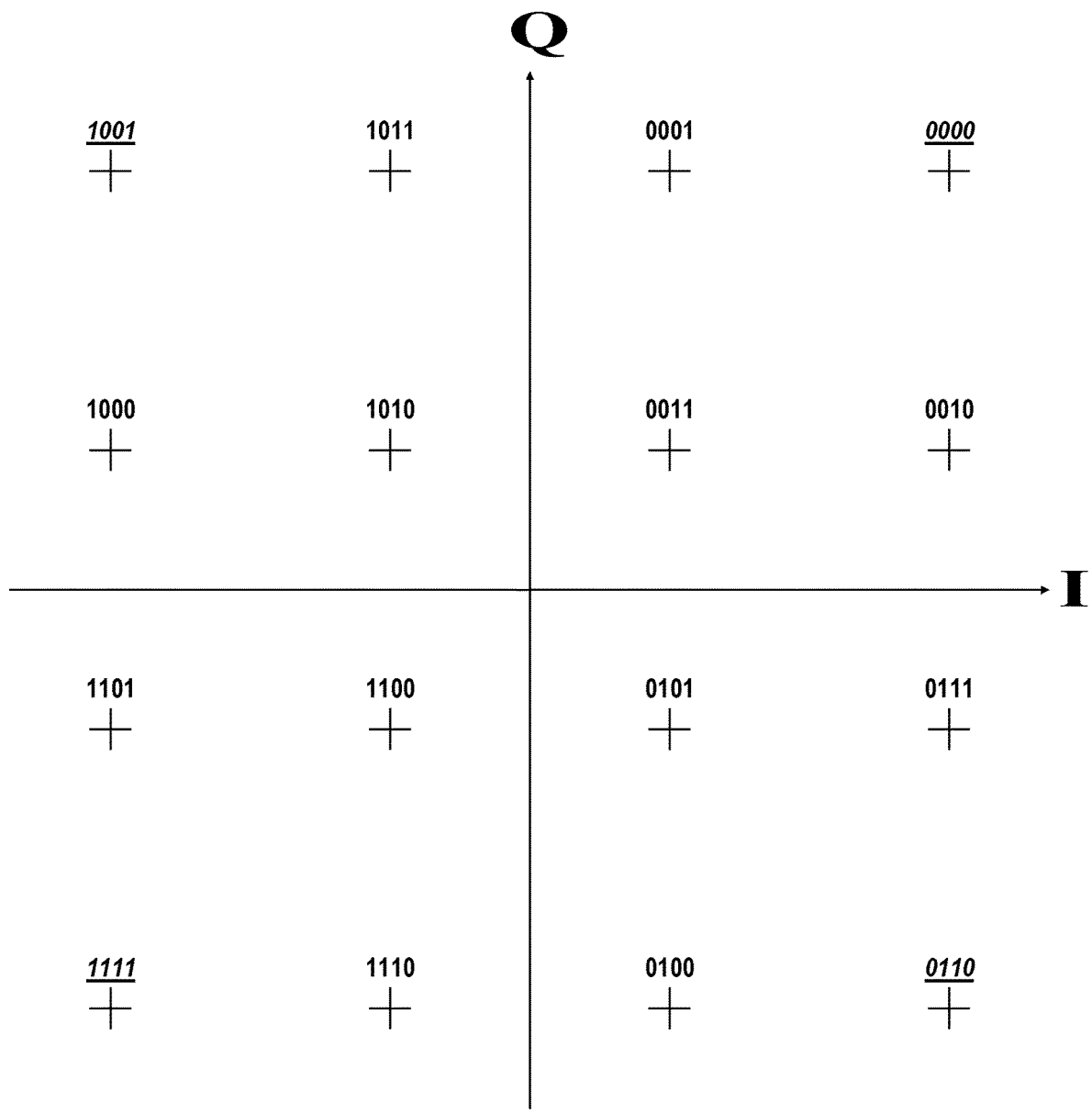
FIGS. 10 and 11 are first and second superposition-coded-modulation (SCM) mappings of square 16 QAM symbol constellations for conveying the same coded data in respective half spectra of COFDM DCM signal, wherein (a) the bits of the labels in the first SCM mapping more likely to experience error owing to AWGN correspond to the bits of the labels in the second SCM mapping less likely to experience error owing to AWGN of similar strength, and (b) the bits of the labels in the second SCM mapping more likely to experience error owing to AWGN correspond to the bits of the labels in the first SCM mapping less likely to experience error owing to AWGN of similar strength.
Figure 11:
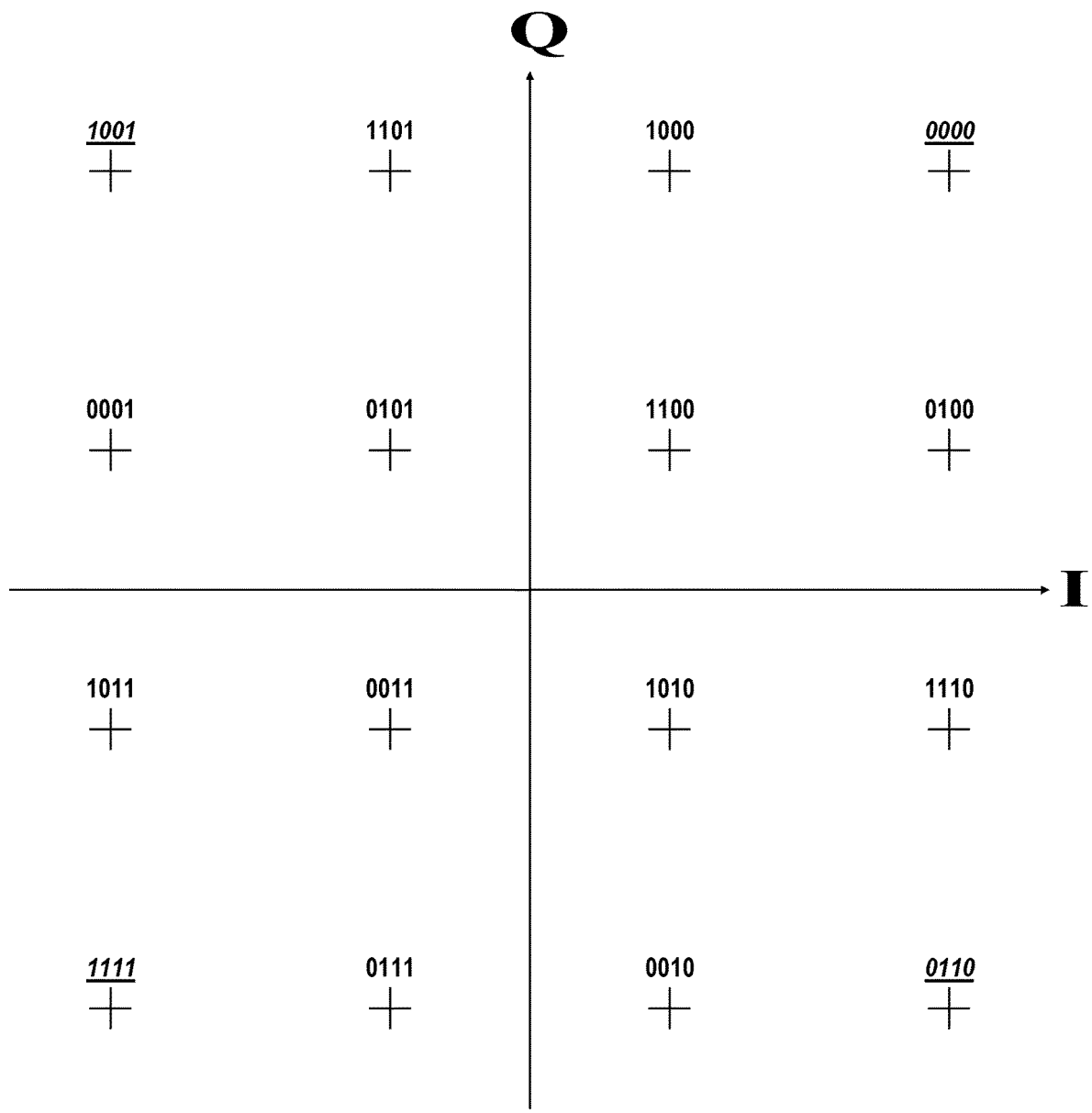

FIGS. 10 and 11 respectively depict first and second SCM maps of lattice points in 16 QAM symbol constellations that the QAM mappers 71 and 72 respectively provide in a physical layer pipe in some COFDM DCM transmitter apparatuses embodying aspects of the invention. The FIG. 10 first SCM map is used throughout a first serial set of 16 QAM symbols that convey coded data in one of the sidebands of a COFDM DCM signal, and the FIG. 11 second SCM map is used throughout a second serial set of 16 QAM symbols that convey the same coded data in the other sideband of that COFDM DCM signal.

The FIG. 10 and FIG. 11 SCM maps govern quadrature amplitude modulation of their respective sets of OFDM carriers according to first and second 16 QAM patterns, respectively, to support BRA to provide shaping gain. Bits of the lattice-point labels for the FIG. 10 SCM map of 16 QAM symbol constellations more likely to experience error passing through an AWGN channel correspond to bits of the lattice-point labels for the FIG. 11 SCM map of 16 QAM symbol constellations less likely to experience error passing through that AWGN channel. Bits of the lattice-point labels for the FIG. 11 SCM map of 16 QAM symbol constellations more likely to experience error passing through that AWGN channel correspond to bits of the lattice-point labels for the FIG. 10 SCM map of 16 QAM symbol constellations less likely to experience error passing through that AWGN channel. These characteristics are achieved simply by reversing the order of bits in the labeling of each pair of lattice points similarly located in respective ones of the FIG. 10 and FIG. 11 SCM maps.

Note that each of certain pairs of lattice points similarly located in respective ones of the FIG. 10 and FIG. 11 SCM maps have like labeling, owing to mirror symmetry of their bits. In 16 QAM there are four palindromic lattice-point labels—i. e. 0000, 0110, 1001, and 1111. Each of these palindromic lattice-point labels is located at similar corner lattice points in both of the FIG. 10 and FIG. 11 SCM maps. Therefore, there is no reduction of PAPR compared with conventional COFDM when QAM mappers 71 and 72 use respective ones of the FIG. 10 first SCM map and the FIG. 11 second SCM map of 16 QAM symbol constellations. This is because peak power is as large as in conventional COFDM when lattice-point labels in both sets of QAM symbol constellations have the same mirror-symmetric lattice-point label throughout an entire OFDM symbol. Average power over a series of COFDM symbols conveying random coded data is similar to that for conventional COFDM.

Figure 12:
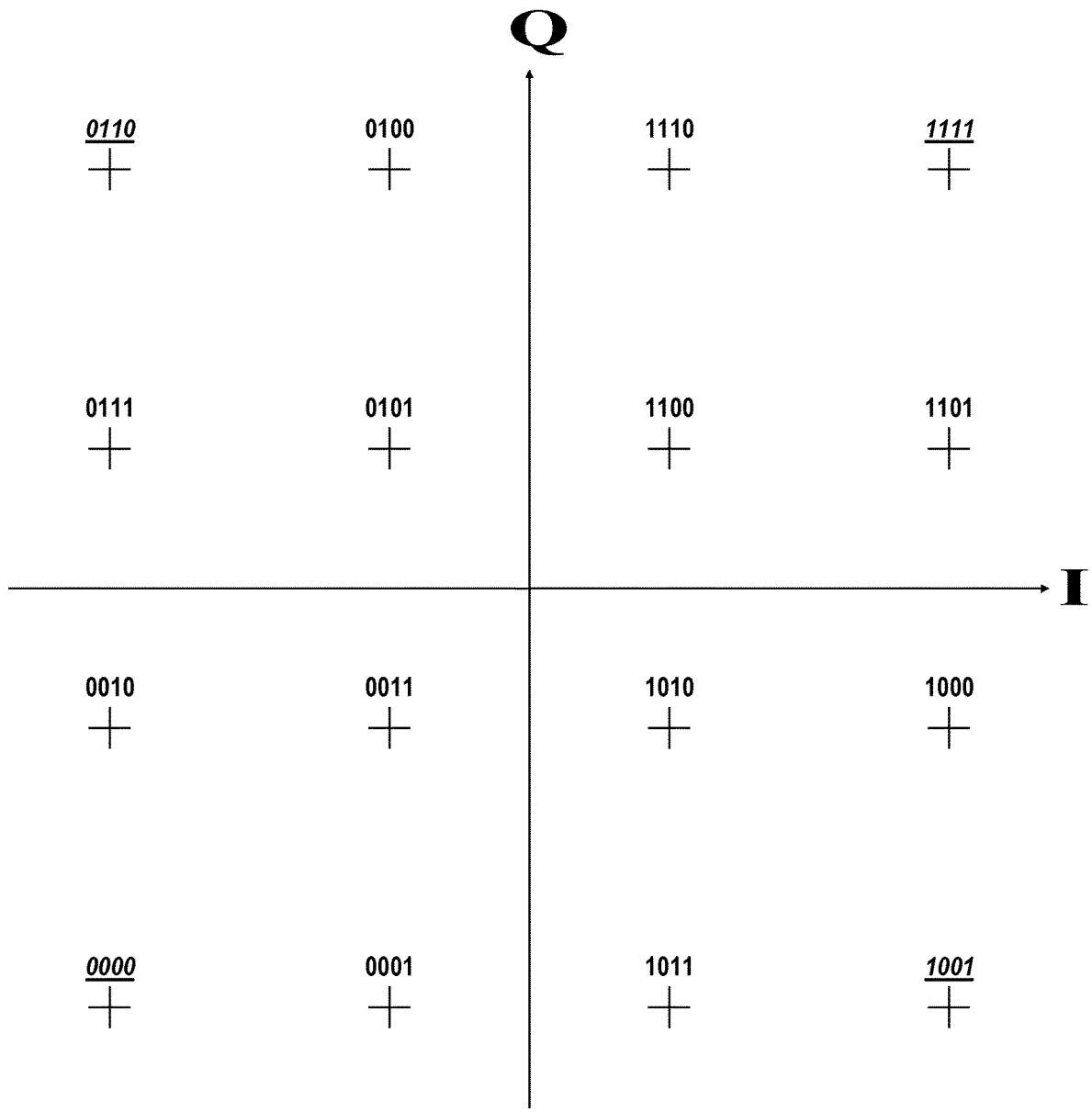
FIG. 12 is a third SCM mapping of 16 QAM symbol constellations that modifies the first SCM mapping by 180° rotation around its center, the third and second SCM mappings of 16 QAM symbol constellations conveying the same coded data in respective half spectra of a COFDM DCM signal with reduced peak-to-average power ratio compared with the first and second SCM mappings of 16 QAM symbol constellations conveying the same coded data.

FIG. 12 is a third SCM mapping of 16 QAM symbol constellations, the labeling of lattice points of which corresponds to the labeling of lattice points in the FIG. 10 first SCM map were either SCM map rotated by $\pi$ radians or 180° around its center. The first and third SCM mappings of 16 QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM. However, this implementation of SCC does not support BRA to provide the shaping gain of the sort taught in U.S. Pat. No. 9,647,865.

QAM mappers 71 and 72 using respective ones of the FIG. 11 second SCM map and the FIG. 12 third SCM map of 16 QAM symbol constellations support BRA to provide the same shaping gain as associated with QAM mappers 71 and 72 using respective ones of the FIG. 11 first SCM map and the FIG. 12 second SCM map of 16 QAM symbol constellations. When the lattice-point labels of the FIG. 11 second SCM map and the FIG. 12 third SCM map of 16 QAM symbol constellations are both 0000, 0110, 1001 or 1111 throughout an entire OFDM symbol, their OFDM subcarriers are modulated antipodally, to curtail their combined peak power in a way similar to that of SCC. So, when the QAM mappers 71 and 72 use respective ones of the FIG. 11 second SCM map and the FIG. 12 third SCM map of 16 QAM symbol constellations, PAPR is substantially lower than when the QAM mappers 71 and 72 use respective ones of FIG. 10 first SCM map and the FIG. 11 second SCM map of 16 QAM symbol constellations.

Figure 13:
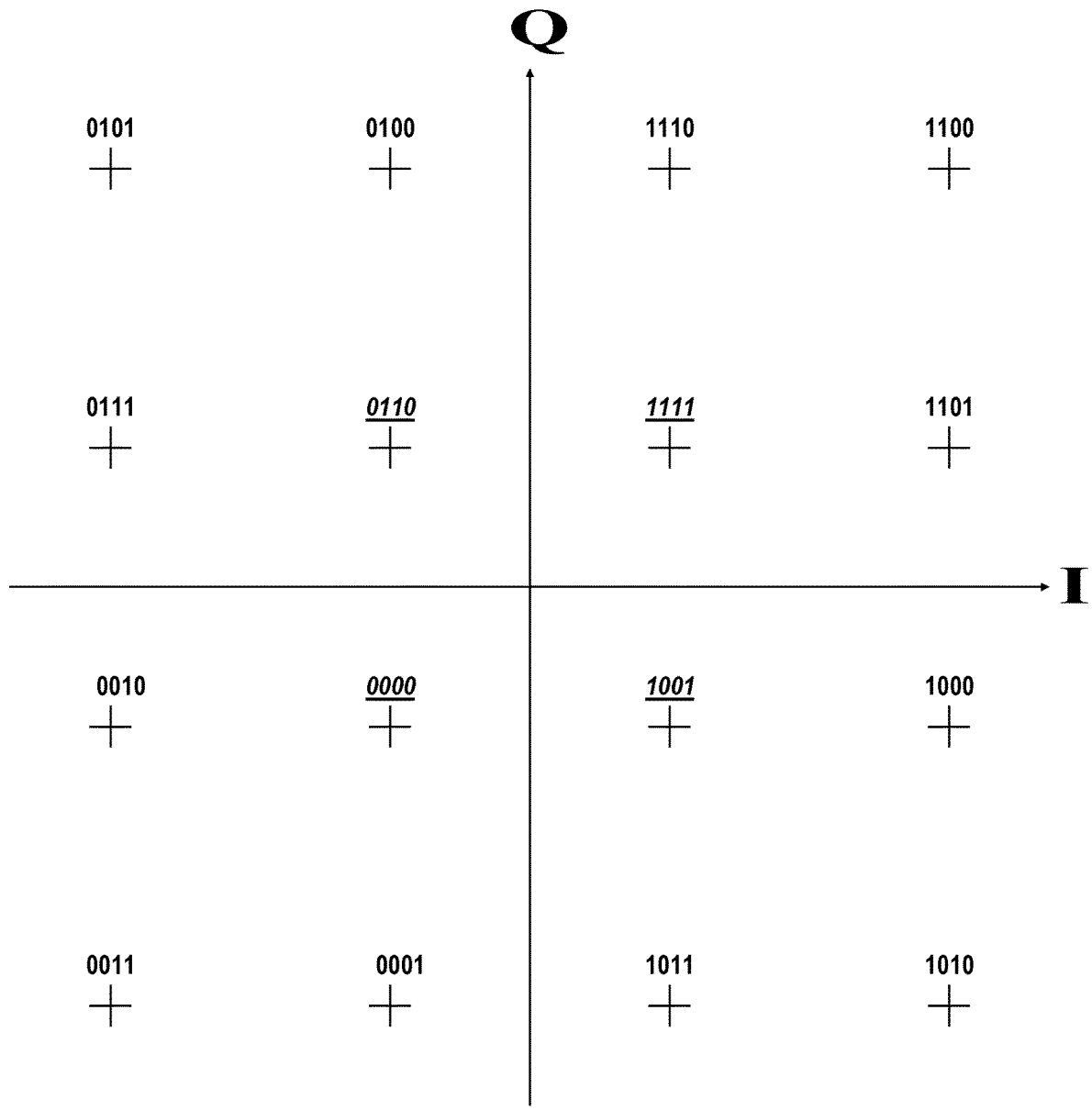
FIG. 13 is a fourth SCM mapping of 16 QAM symbol constellations that modifies the FIG. 12 third SCM mapping by twisting the pattern of map labels in each quadrant.

FIG. 13 is a fourth SCM mapping of 16 QAM symbol constellations that modifies the FIG. 12 third SCM mapping by twisting the pattern of map labels in each quadrant, thereby exchanging the positions of innermost and outermost lattice-point labels in each quadrant. This reduces the maximum peak power associated with each of the 0000, 0110, 1001 and 1111 lattice-point labels being associated with the respective QAM modulation of all OFDM carriers during a COFDM symbol. This should improve PAPR when the QAM mappers 71 and 72 use respective ones of the FIG. 11 second SCM map and the FIG. 13 fourth SCM map of 16 QAM symbol constellations.

Figure 14:
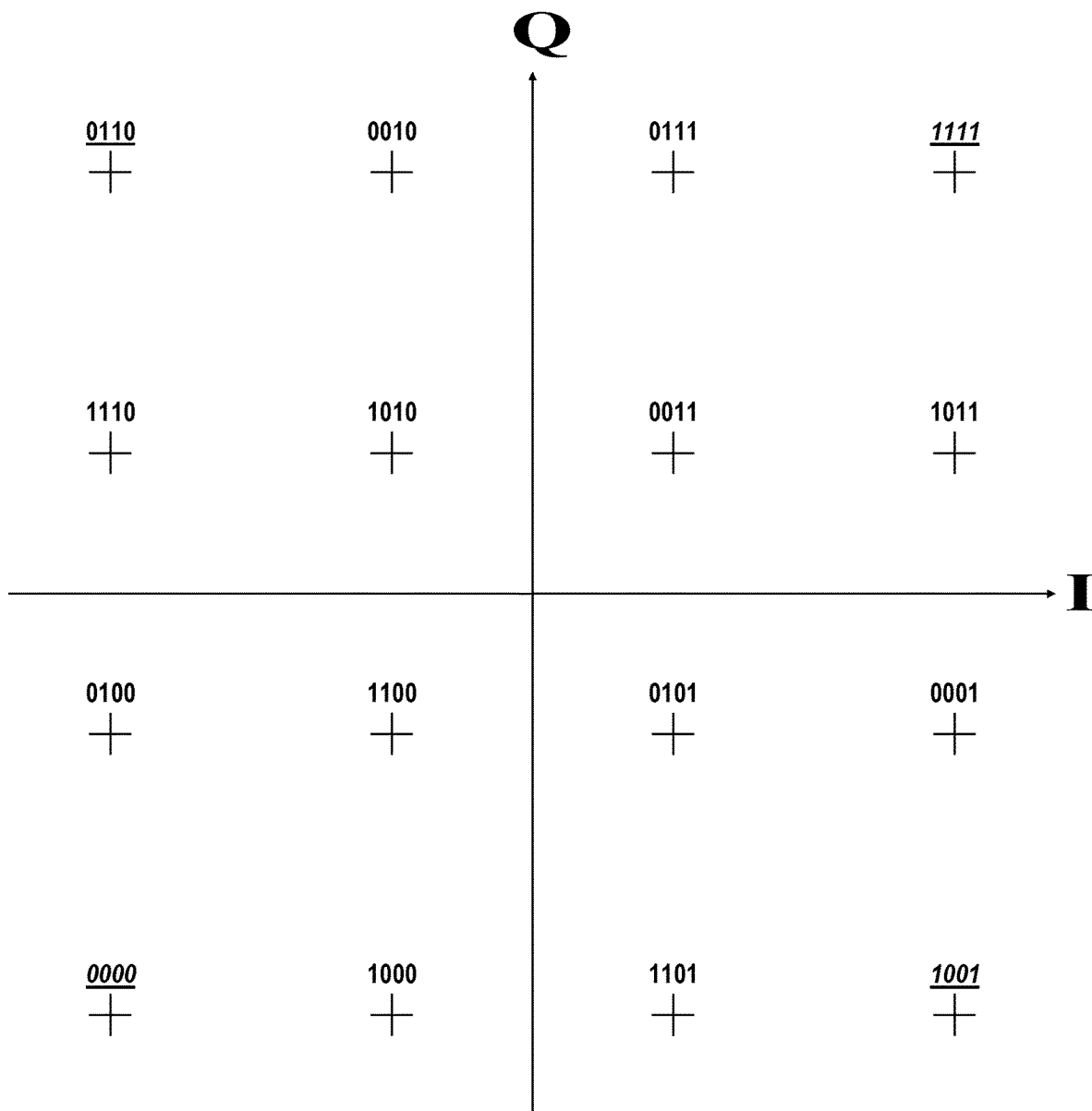
FIG. 14 is a fifth SCM mapping of 16 QAM symbol constellations that modifies the second SCM mapping by 180° rotation around its center, the first and fifth SCM mappings of 16 QAM symbol constellations conveying the same coded data in respective half spectra of a COFDM DCM signal with reduced peak-to-average power ratio compared with the first and second SCM mappings of 16 QAM symbol constellations conveying the same coded data.

FIG. 14 is a fifth SCM mapping of 16 QAM symbol constellations, the labeling of lattice points in which corresponds to the labeling of lattice points in the FIG. 11 second SCM map were either SCM map rotated by $\pi$ radians or 180° around its center. The second and sixth SCM mappings of 16 QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM. However, this implementation of SCC does not support BRA to provide the shaping gain of the sort taught in U.S. Pat. No. 9,647,865.

QAM mappers 71 and 72 using respective ones of the FIG. 10 first SCM map and the FIG. 14 fifth SCM map of 16 QAM symbol constellations support BRA to provide the same shaping gain as associated with QAM mappers 71 and 72 using respective ones of the FIG. 10 first SCM map and the FIG. 11 second SCM map of 16 QAM symbol constellations. When the lattice-point labels of the FIG. 10 first SCM map and the FIG. 14 fifth SCM map of 16 QAM symbol constellations are both 0000, 0110, 1001 or 1111 throughout an entire OFDM symbol, their OFDM subcarriers are modulated antipodally, to curtail their combined peak power in a way similar to that of SCC. So, when the QAM mappers 71 and 72 use respective ones of the FIG. 10 first SCM map and the FIG. 14 fifth SCM map of 16 QAM symbol constellations, PAPR is substantially lower than when the QAM mappers 71 and 72 use respective ones of FIG. 10 first SCM map and the FIG. 11 second SCM map of 16 QAM symbol constellations.

Figure 15:
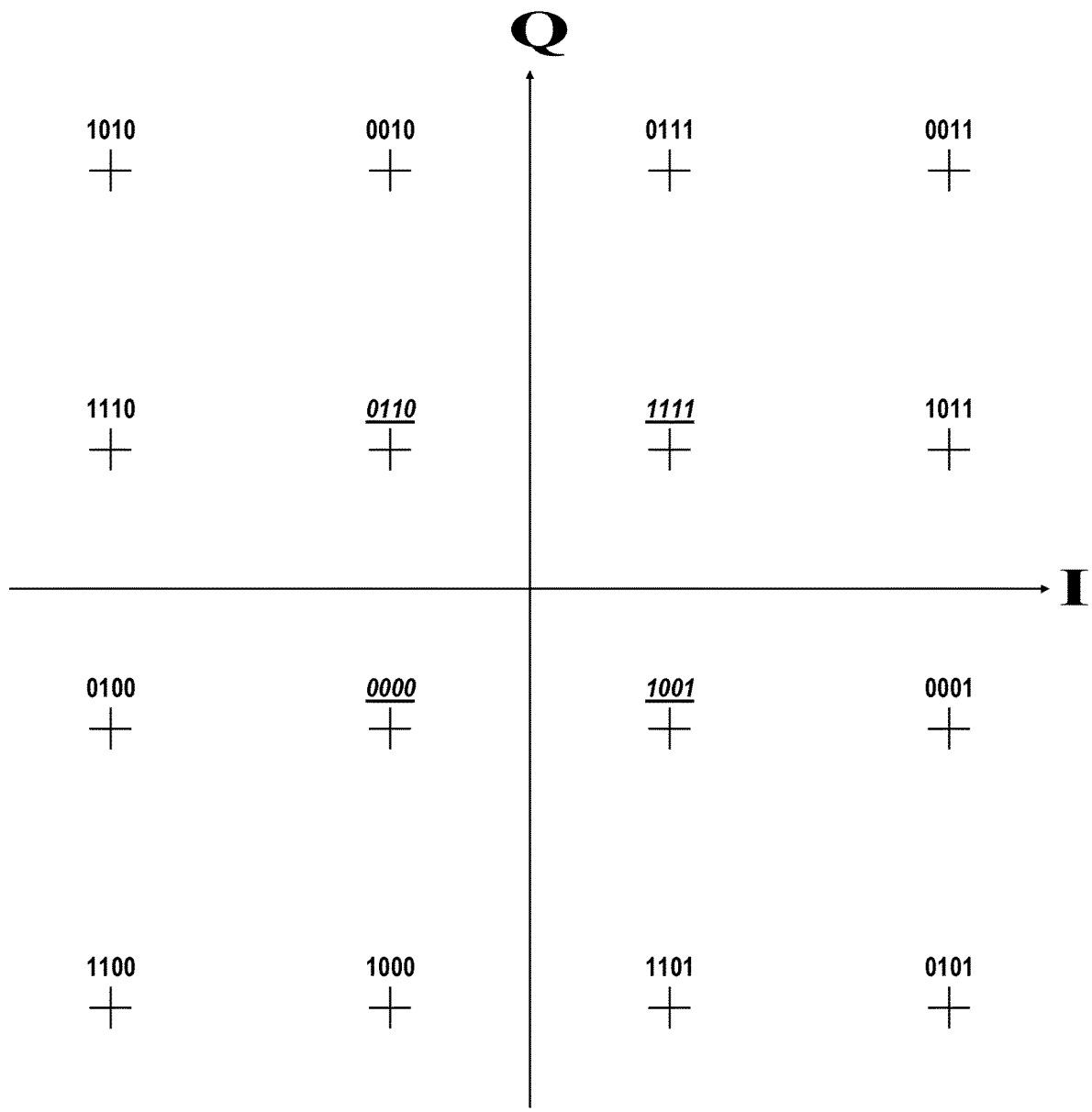
FIG. 15 is a sixth SCM mapping of 16 QAM symbol constellations that modifies the FIG. 15 fifth SCM mapping by twisting the pattern of map labels in each quadrant.

FIG. 15 is a sixth SCM mapping of 16 QAM symbol constellations that modifies the FIG. 14 fifth SCM mapping by twisting the pattern of map labels in each quadrant, thereby exchanging the positions of innermost and outermost lattice-point labels in each quadrant. This reduces the maximum peak power associated with each of the 0000, 0110, 1001 and 1111 lattice-point labels being associated with the respective QAM modulation of all OFDM carriers during a COFDM symbol. This should improve PAPR when the QAM mappers 71 and 72 use respective ones of the FIG. 10 first SCM map and the FIG. 15 sixth SCM map of 16 QAM symbol constellations.

FIGS. 16, 17, 18, 19, 20 and 21 depict fifth, sixth, seventh, eighth, ninth and tenth different Gray mappings of 16 QAM symbol constellations, which Gray mappings each arrange along a diagonal of its lattice those lattice-point labels having mirror symmetry regarding the order of ONE and ZERO bits therein. The diagonal extends through the −I, −Q and +I, +Q quadrants of each of these mappings. Each of these diagonals extends from 0000, through 1001, through 1111, to 0110.

Figure 16:
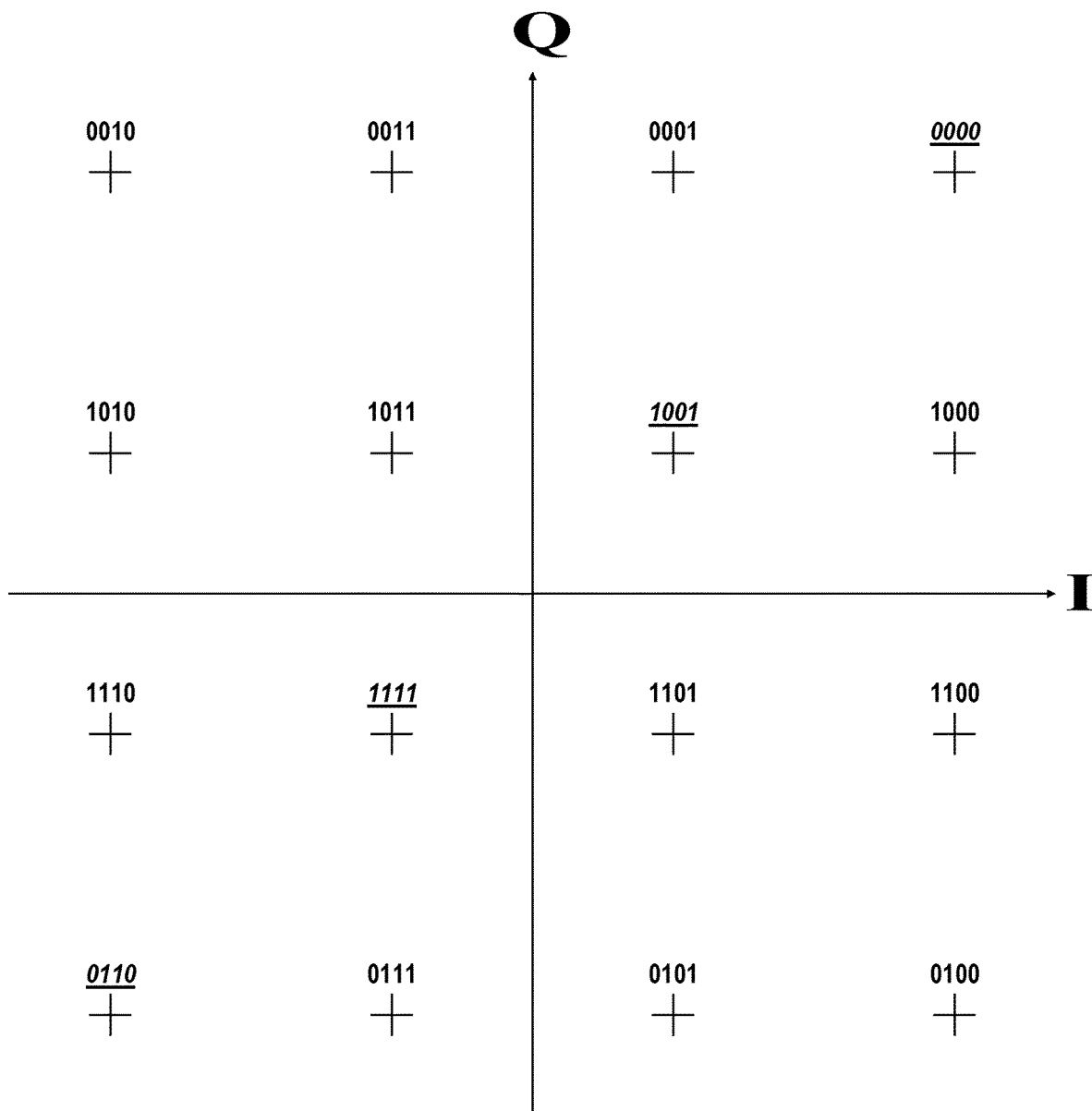
FIGS. 16, 17, 18, 19, 20 and 21 are fifth, sixth, seventh, eighth, ninth and tenth different Gray mappings of 16 QAM symbol constellations, which Gray mappings each arrange palindromic lattice-point labels along a diagonal of its lattice.
Figure 17:
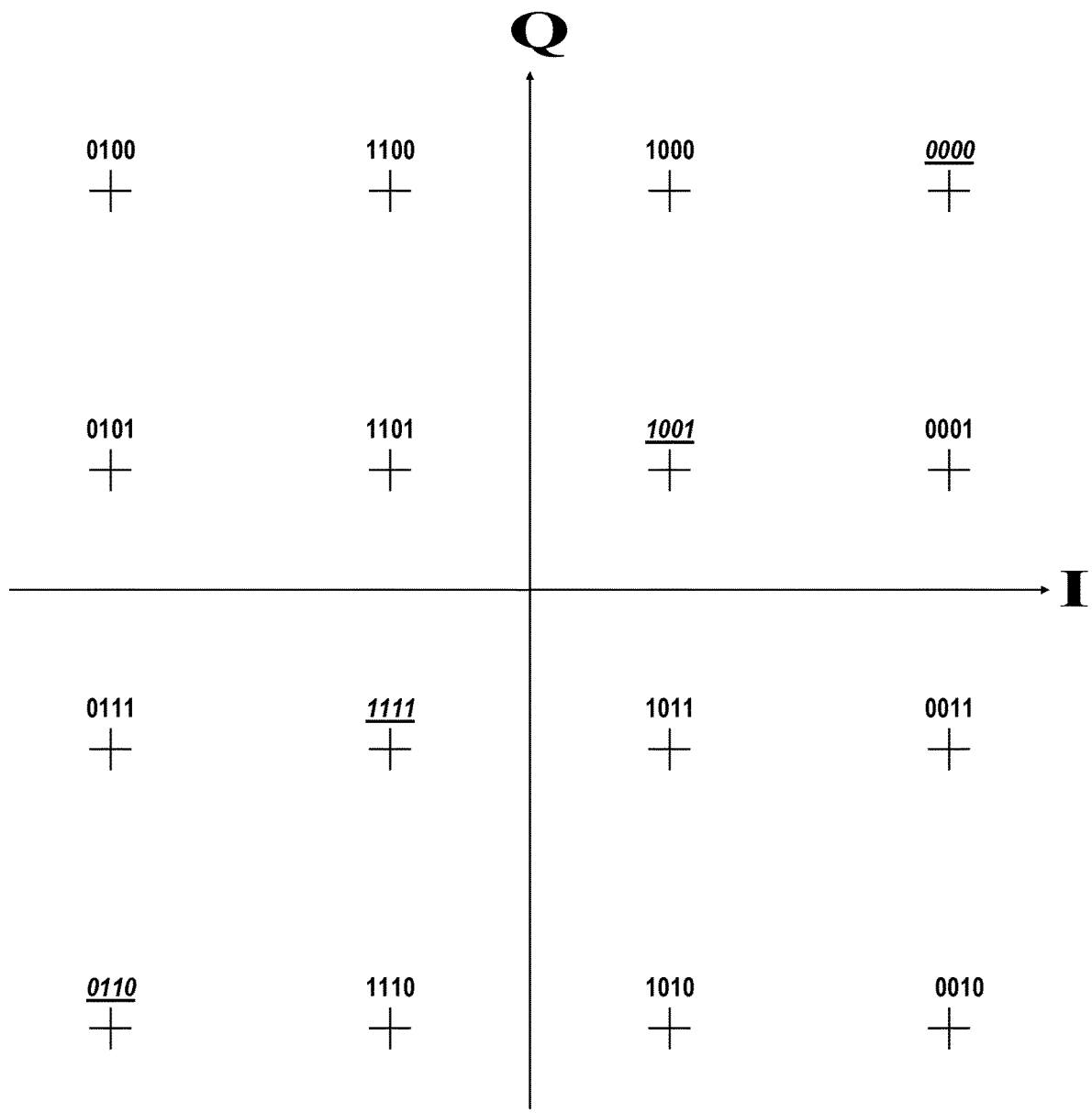

FIGS. 16 and 17 respectively depict fifth and sixth Gray maps of lattice points in 16 QAM symbol constellations that the QAM mappers 71 and 72 respectively provide in a physical layer pipe in some COFDM DCM transmitter apparatuses embodying aspects of the invention. The FIG. 16 fifth Gray map implements transmission of coded data in one of the sidebands of a COFDM DCM signal, and the FIG. 17 sixth Gray map implements transmission of the same coded data in the other sideband of that COFDM DCM signal. The FIG. 16 and FIG. 17 Gray maps govern quadrature amplitude modulation of their respective sets of OFDM carriers according to fifth and sixth 16 QAM Gray mapping patterns, respectively, to support BRA to provide shaping gain. Bits of the lattice-point labels for the FIG. 16 Gray map of 16 QAM symbol constellations more likely to experience error correspond to bits of the lattice-point labels for the FIG. 17 Gray map of 16 QAM symbol constellations less likely to experience error. Bits of the lattice-point labels for the FIG. 17 Gray map of 16 QAM symbol constellations more likely to experience error correspond to bits of the lattice-point labels for the FIG. 16 Gray map of 16 QAM symbol constellations less likely to experience error. These characteristics are achieved simply by reversing the order of bits in the labeling of each pair of lattice points similarly located in respective ones of the FIG. 16 and FIG. 17 Gray maps.

The 0000 and 0110 palindromic lattice-point labels are located at similar corner lattice points in both of the FIG. 16 and FIG. 17 Gray maps. Therefore, there is no reduction of PAPR compared with conventional COFDM when QAM mappers 71 and 72 use respective ones of the FIG. 16 fifth Gray map and the FIG. 17 sixth Gray map of 16 QAM symbol constellations. This is because peak power is as large as in conventional COFDM when lattice-point labels in both sets of QAM symbol constellations have the same 0000 or 0110 lattice-point label throughout an entire OFDM symbol. Average power over a series of COFDM symbols conveying random coded data is similar to that for conventional COFDM.

Rotation of one of FIG. 16 and FIG. 17 Gray maps by π radians or 180° does not result in a pair of mappings for COFDM DCM with reduced PAPR compared to that of conventional COFDM. Such rotation causes the 0010 and 0100 lattice-point labels at the corners of the QAM constellations to be similarly positioned. Peak power is as large as in conventional COFDM when lattice-point labels in both sets of QAM symbol constellations have the same 0010 or 0100 lattice-point label throughout an entire OFDM symbol.

Figure 18:
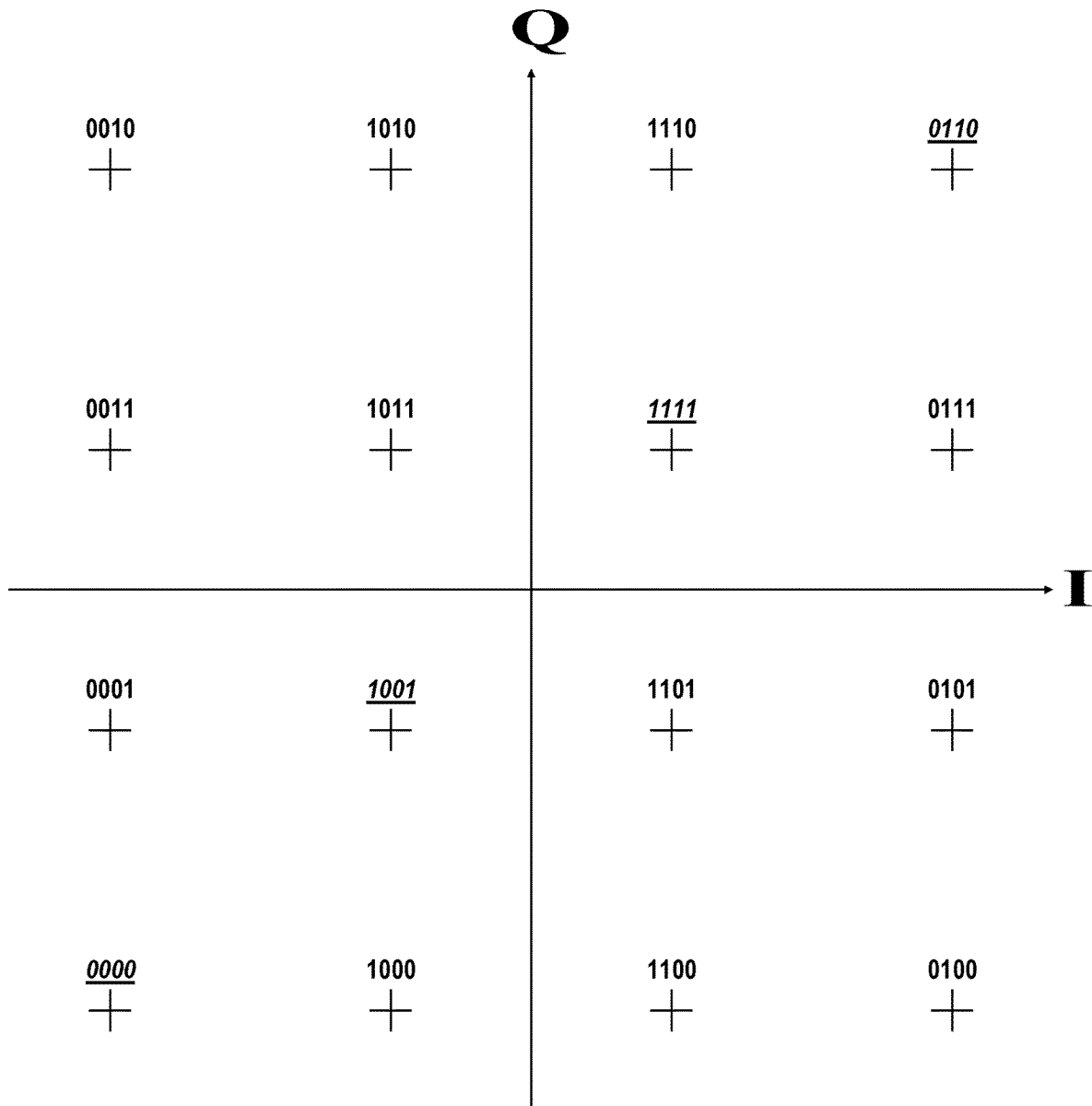

FIG. 18 depicts a seventh Gray mapping of 16 QAM symbol constellations that flips the fifth Gray mapping over by rotating the FIG. 16 fifth Gray map 180° around its 0010-to-0100 diagonal axis. QAM mappers 71 and 72 using respective ones of the FIG. 18 seventh Gray map and the FIG. 17 sixth Gray map of 16 QAM symbol constellations support BRA to provide the same shaping gain as associated with QAM mappers 71 and 72 using respective ones of the FIG. 16 fifth Gray map and the FIG. 17 sixth Gray map of 16 QAM symbol constellations. Whenever the lattice-point labels of the FIG. 17 sixth Gray map and the FIG. 18 seventh Gray map of 16 QAM symbol constellations are both 0000 or 0110 throughout an entire OFDM symbol, their OFDM subcarriers are modulated antipodally, to curtail their combined peak power in a way similar to that of SCC. So, when the QAM mappers 71 and 72 use respective ones of the sixth and the seventh Gray maps of 16 QAM symbol constellations, PAPR is substantially lower than when the QAM mappers 71 and 72 use respective ones of the fifth and sixth Gray maps of 16 QAM symbol constellations.

Figure 19:
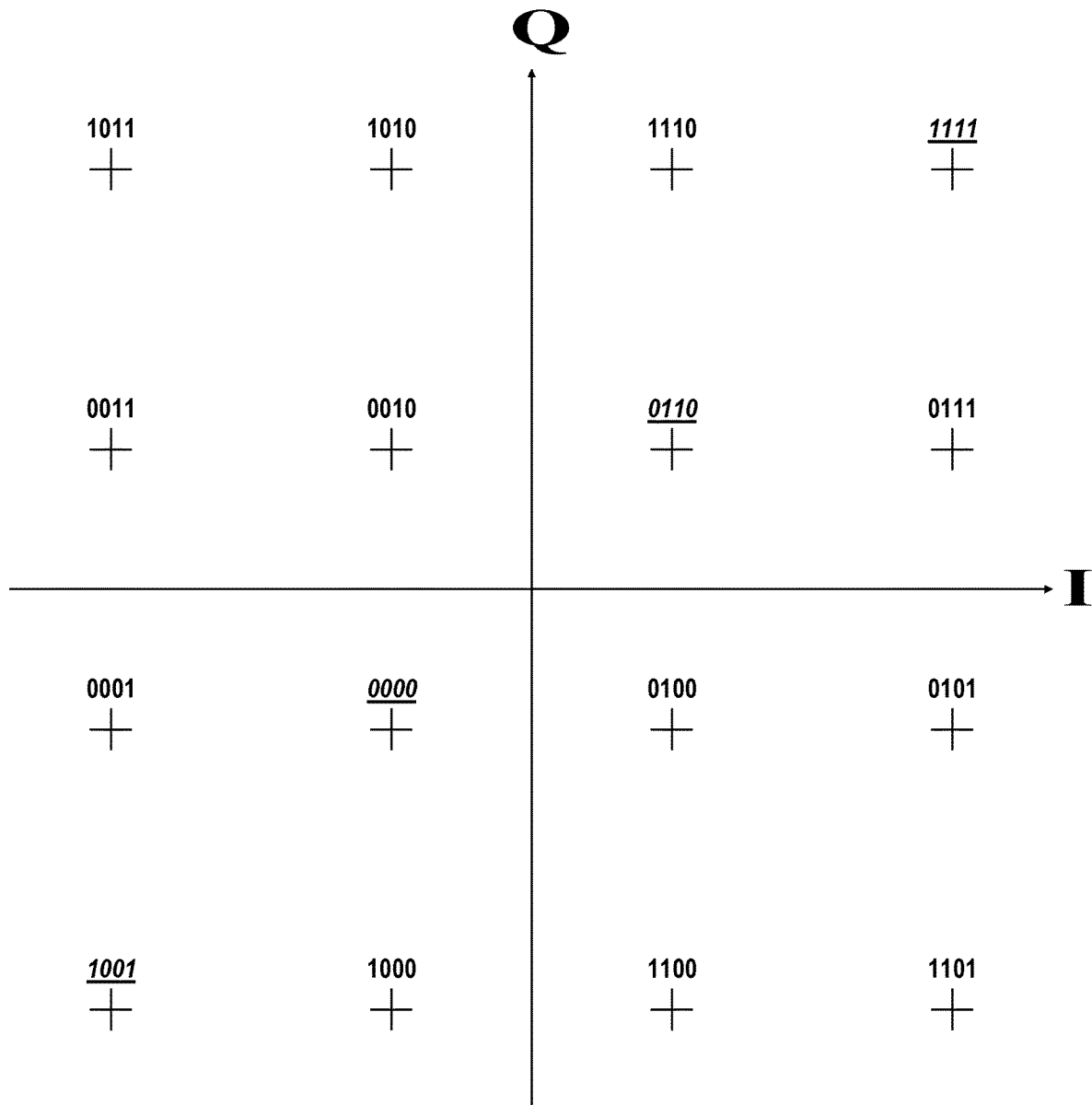

FIG. 19 is an eighth Gray mapping of 16 QAM symbol constellations that modifies the FIG. 18 seventh Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 0110 lattice-point labels being associated with the respective QAM modulation of all OFDM carriers during a COFDM symbol. This should improve PAPR somewhat further when the QAM mappers 71 and 72 use respective ones of the sixth and eighth Gray maps of 16 QAM symbol constellations, rather than respective ones of the sixth and seventh Gray maps of 16 QAM symbol constellations.

Figure 20:
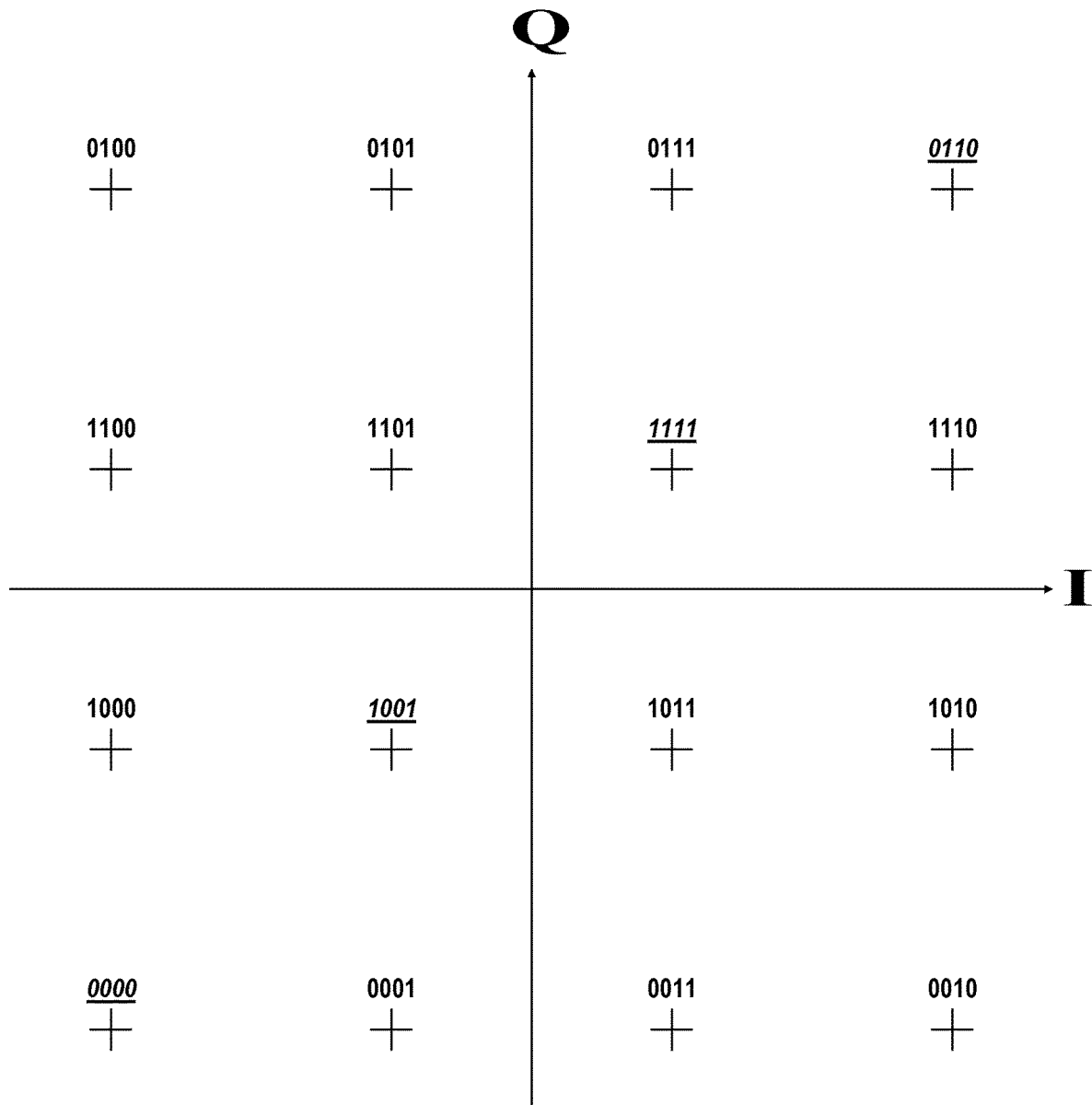

FIG. 20 is a ninth Gray mapping of 16 QAM symbol constellations that that flips the sixth Gray mapping over by rotating the FIG. 17 sixth Gray map 180° around its 0100-to-0010 diagonal axis. QAM mappers 71 and 72 using respective ones of the FIG. 16 fifth Gray map and the FIG. 20 ninth Gray map of 16 QAM symbol constellations support BRA to provide the same shaping gain as associated with QAM mappers 71 and 72 using respective ones of the FIG. 16 fifth Gray map and the FIG. 17 sixth Gray map of 16 QAM symbol constellations. Whenever the lattice-point labels of the FIG. 16 fifth Gray map and the FIG. 20 ninth Gray map of 64 QAM symbol constellations are both 0010 or 0100 throughout an entire OFDM symbol, their OFDM subcarriers are modulated antipodally, to curtail their combined peak power in a way similar to that of SCC. So, when the QAM mappers 71 and 72 use respective ones of the fifth and the ninth Gray maps of 16 QAM symbol constellations, PAPR is substantially lower than when the QAM mappers 71 and 72 use respective ones of the fifth and sixth Gray maps of 16 QAM symbol constellations.

Figure 21:
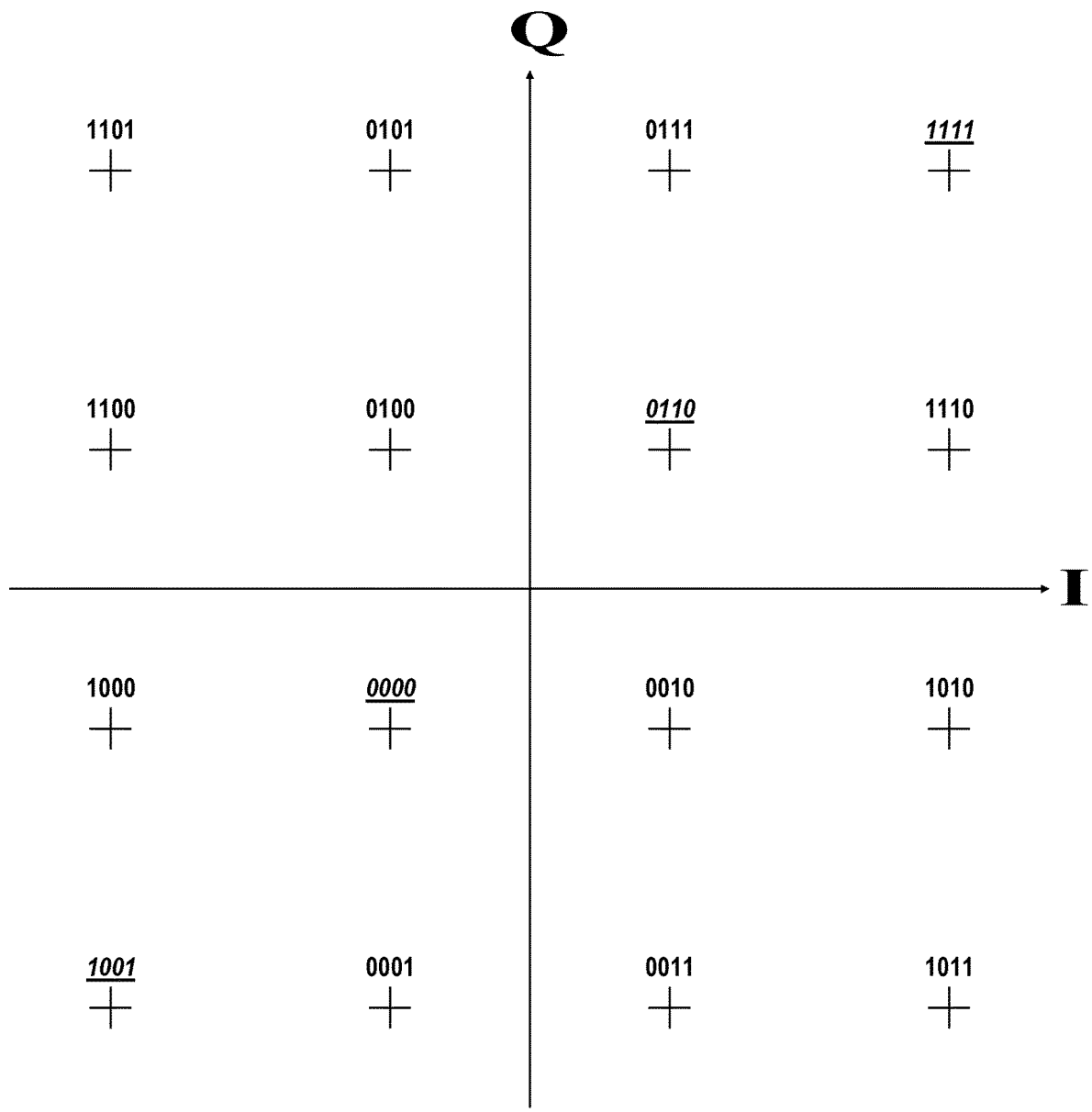

FIG. 21 is a tenth Gray mapping of 16 QAM symbol constellations that modifies the FIG. 20 ninth Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 0110 lattice-point labels being associated with the respective QAM modulation of all OFDM carriers during a COFDM symbol. This should improve PAPR somewhat further when the QAM mappers 71 and 72 use respective ones of the fifth and tenth Gray maps of 16 QAM symbol constellations, rather than respective ones of the fifth and ninth Gray maps of 16 QAM symbol constellations.

FIGS. 22, 23, 24, 25, 26 and 27 depict eleventh, twelfth, thirteenth, fourteenth, fifteenth and sixteenth different Gray mappings of 16 QAM symbol constellations, which Gray mappings each arrange along a diagonal of its lattice those lattice-point labels having mirror symmetry regarding the order of ONE and ZERO bits therein. The diagonal extends through the −I, +Q and +I, −Q quadrants of each of these mappings. Each of these diagonals extends from 0000, through 0110, through 1111, to 1001.

Figure 22:
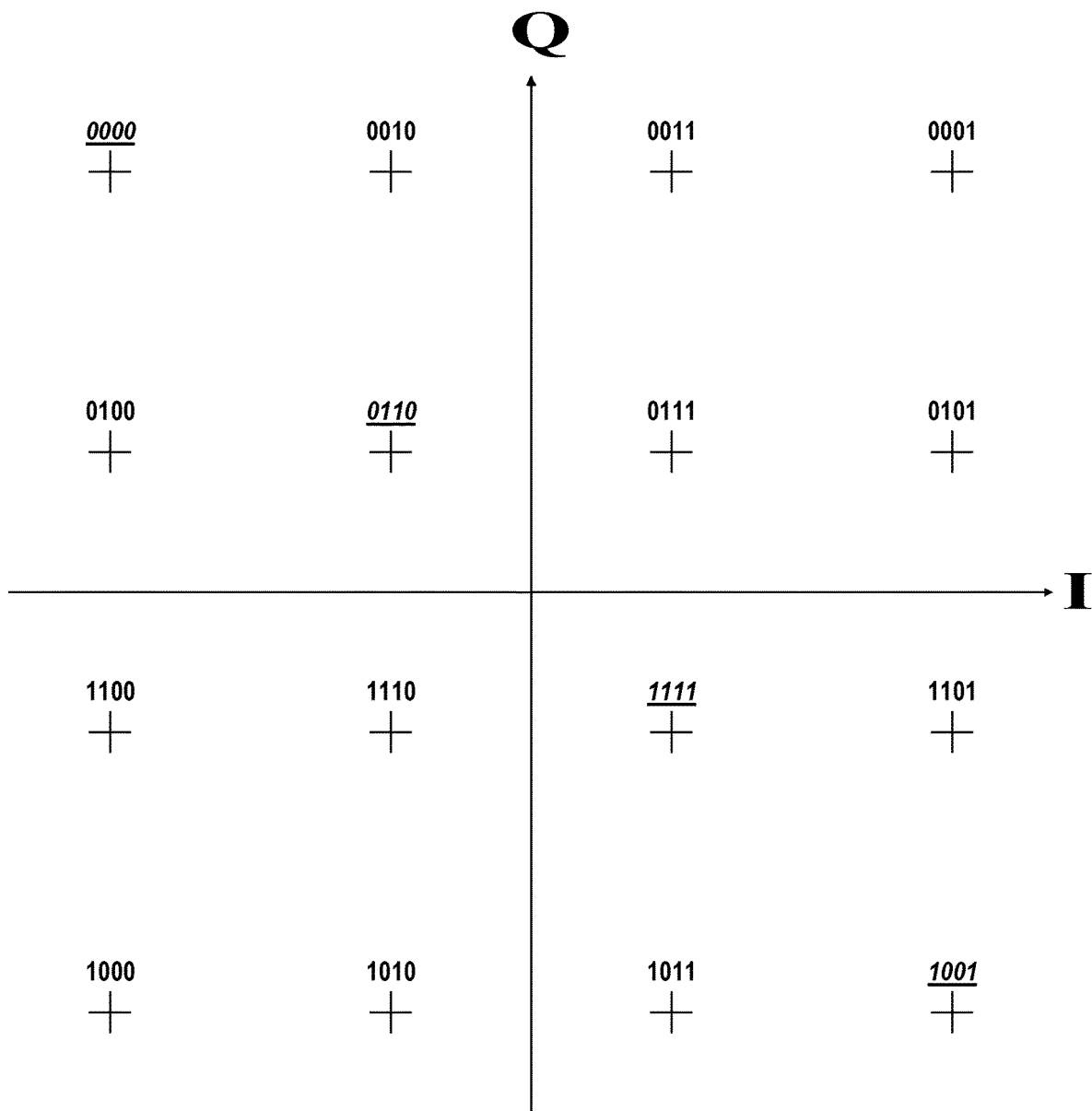
FIGS. 22, 23, 24, 25, 26 and 27 are alternative eleventh, twelfth, thirteenth, fourteenth, fifteenth and sixteenth different Gray mappings of 16 QAM symbol constellations, which Gray mappings each arrange palindromic lattice-point labels along a diagonal of its lattice.
Figure 23:
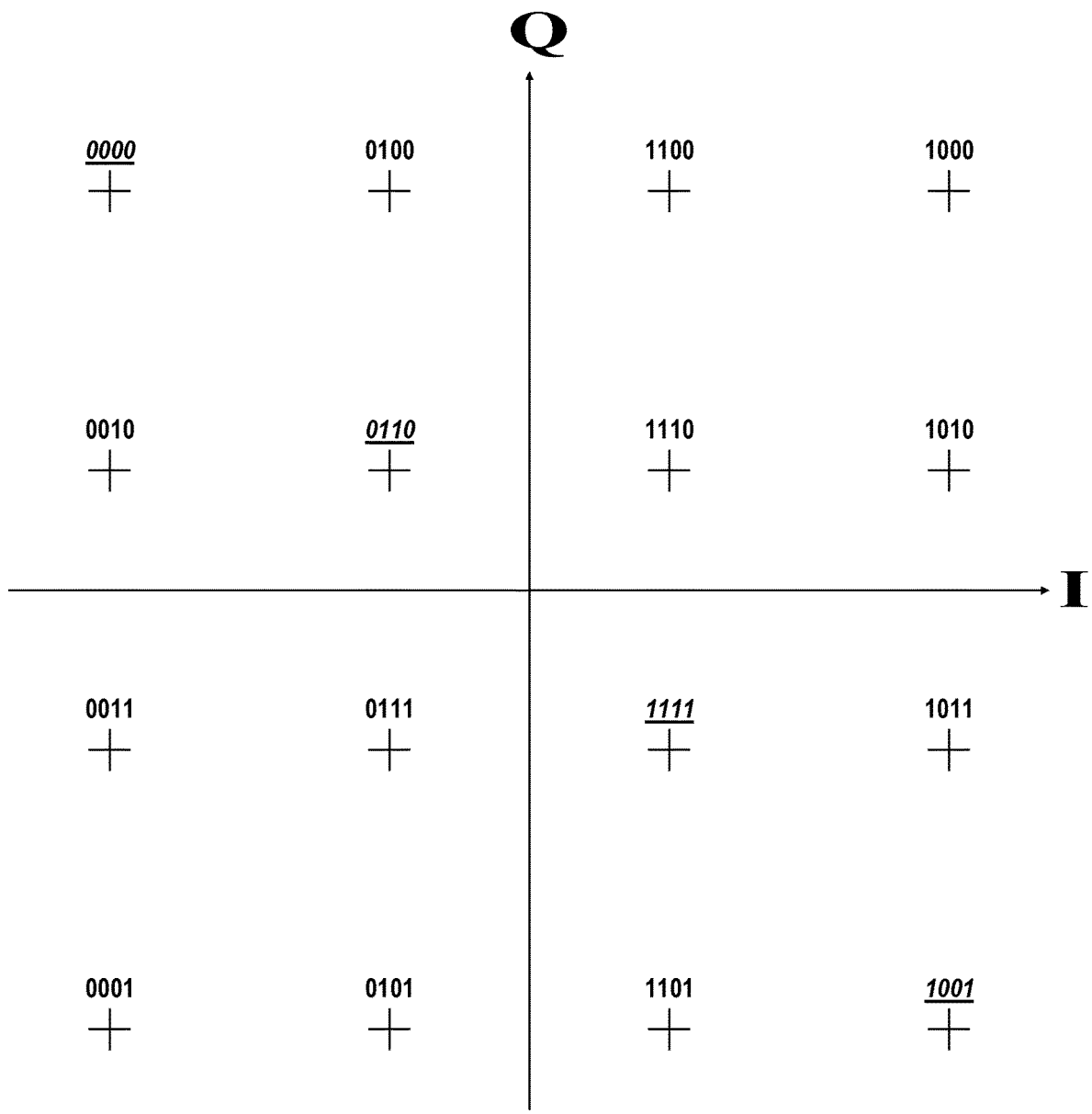

FIGS. 22 and 23 respectively depict eleventh and twelfth Gray maps of lattice points in 16 QAM symbol constellations that the QAM mappers 71 and 72 respectively provide in a physical layer pipe in some COFDM DCM transmitter apparatuses embodying aspects of the invention. The FIG. 22 eleventh Gray map implements transmission of coded data in one of the sidebands of a COFDM DCM signal, and the FIG. 23 twelfth Gray map implements transmission of the same coded data in the other sideband of that COFDM DCM signal. The FIG. 22 and FIG. 23 Gray maps govern quadrature amplitude modulation of their respective sets of OFDM carriers according to eleventh and twelfth 16 QAM Gray mapping patterns, respectively, to support BRA to provide shaping gain. Bits of the lattice-point labels for the FIG. 22 Gray map of 16 QAM symbol constellations more likely to experience error correspond to bits of the lattice-point labels for the FIG. 23 Gray map of 16 QAM symbol constellations less likely to experience error. Bits of the lattice-point labels for the FIG. 23 Gray map of 16 QAM symbol constellations more likely to experience error correspond to bits of the lattice-point labels for the FIG. 22 Gray map of 16 QAM symbol constellations less likely to experience error. These characteristics are achieved simply by reversing the order of bits in the labeling of each pair of lattice points similarly located in respective ones of the FIG. 22 and FIG. 23 Gray maps.

The 0000 and 1001 palindromic lattice-point labels are located at similar corner lattice points in both of the FIG. 22 and FIG. 23 Gray maps. Therefore, there is no reduction of PAPR compared with conventional COFDM when QAM mappers 71 and 72 use respective ones of the FIG. 22 eleventh Gray map and the FIG. 23 twelfth Gray map of 16 QAM symbol constellations. This is because peak power is as large as in conventional COFDM when lattice-point labels in both sets of QAM symbol constellations have the same 0000 or 1001 lattice-point label throughout an entire OFDM symbol. Average power over a series of COFDM symbols conveying random coded data is similar to that for conventional COFDM.

Rotation of one of FIG. 22 and FIG. 23 Gray maps by π radians or 180° does not result in a pair of mappings for COFDM DCM with reduced PAPR compared to that of conventional COFDM. Such rotation causes the 0001 and 1000 lattice-point labels at the corners of the QAM constellations to be similarly positioned. Peak power is as large as in conventional COFDM when lattice-point labels in both sets of QAM symbol constellations have the same 0001 or 1000 lattice-point label throughout an entire OFDM symbol.

Figure 24:
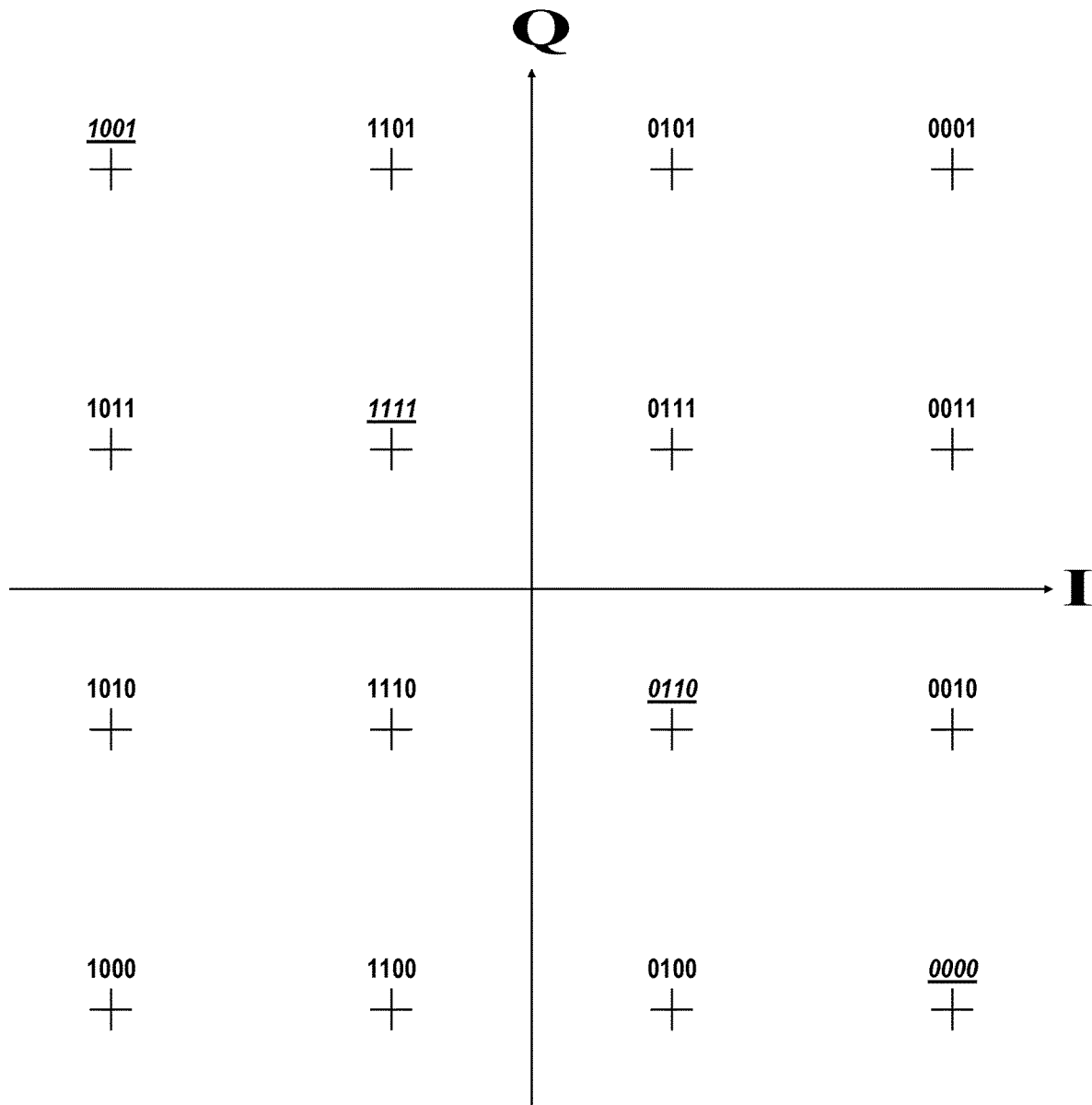

FIG. 24 depicts a thirteenth Gray mapping of 16 QAM symbol constellations that flips the eleventh Gray mapping over by rotating the FIG. 22 eleventh Gray map 180° around its 0001-to-1000 diagonal axis. QAM mappers 71 and 72 using respective ones of the FIG. 24 thirteenth Gray map and the FIG. 23 twelfth Gray map of 16 QAM symbol constellations support BRA to provide the same shaping gain as associated with QAM mappers 71 and 72 using respective ones of the FIG. 22 eleventh Gray map and the FIG. 23 twelfth Gray map of 16 QAM symbol constellations. Whenever the lattice-point labels of the FIG. 23 twelfth Gray map and the FIG. 24 thirteenth Gray map of 64 QAM symbol constellations are both 0000 or 1001 throughout an entire OFDM symbol, their OFDM subcarriers are modulated antipodally, to curtail their combined peak power in a way similar to that of SCC. So, when the QAM mappers 71 and 72 use respective ones of the twelfth and the thirteenth Gray maps of 16 QAM symbol constellations, PAPR is substantially lower than when the QAM mappers 71 and 72 use respective ones of the eleventh and twelfth Gray maps of 16 QAM symbol constellations.

Figure 25:
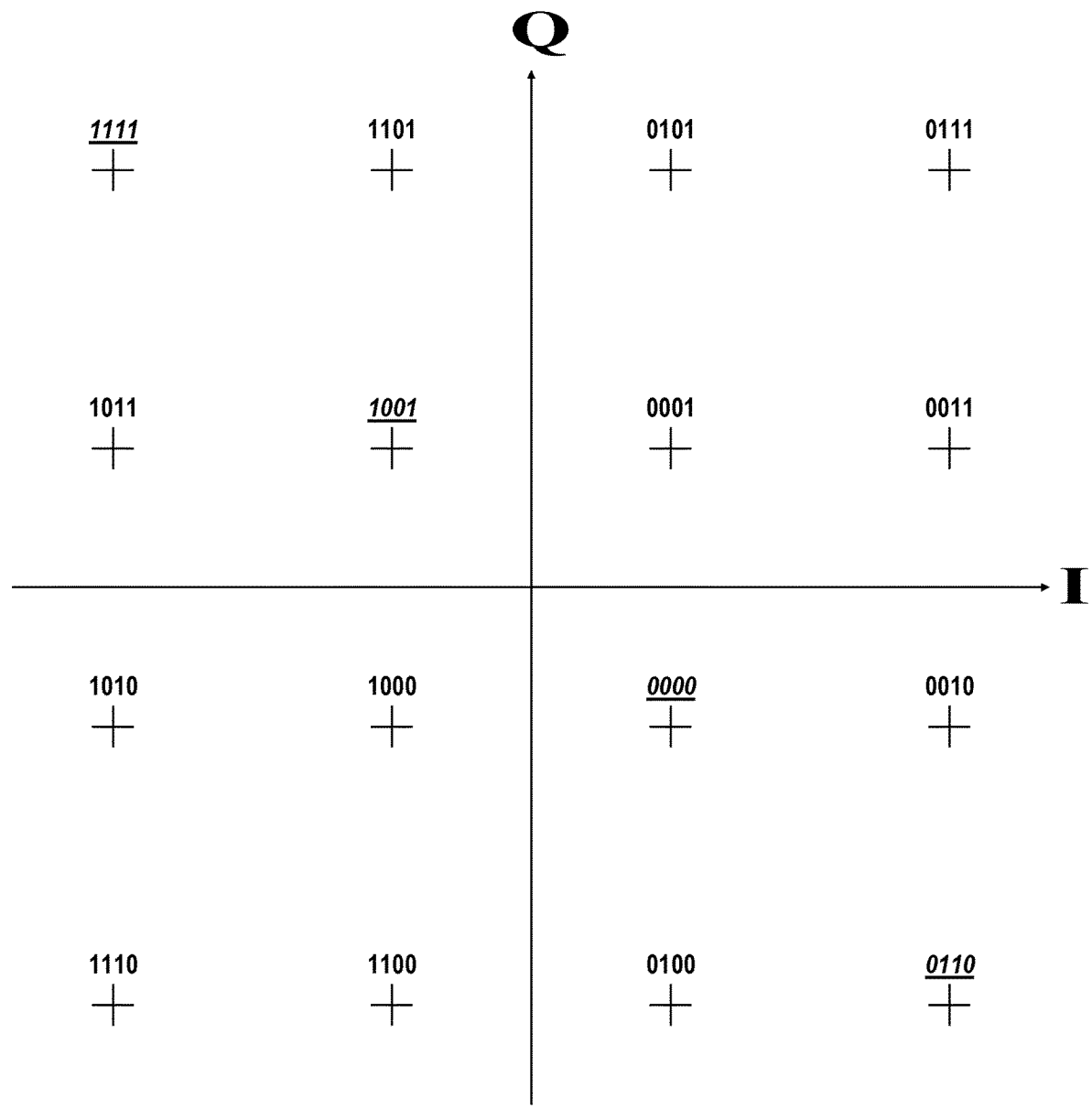

FIG. 25 is an fourteenth Gray mapping of 16 QAM symbol constellations that modifies the FIG. 24 thirteenth Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 1001 lattice-point labels being associated with the respective QAM modulation of all OFDM carriers during a COFDM symbol. This should improve PAPR somewhat further when the QAM mappers 71 and 72 use respective ones of the twelfth and fourteenth Gray maps of 16 QAM symbol constellations, rather than respective ones of the twelfth and thirteenth Gray maps of 16 QAM symbol constellations.

Figure 26:
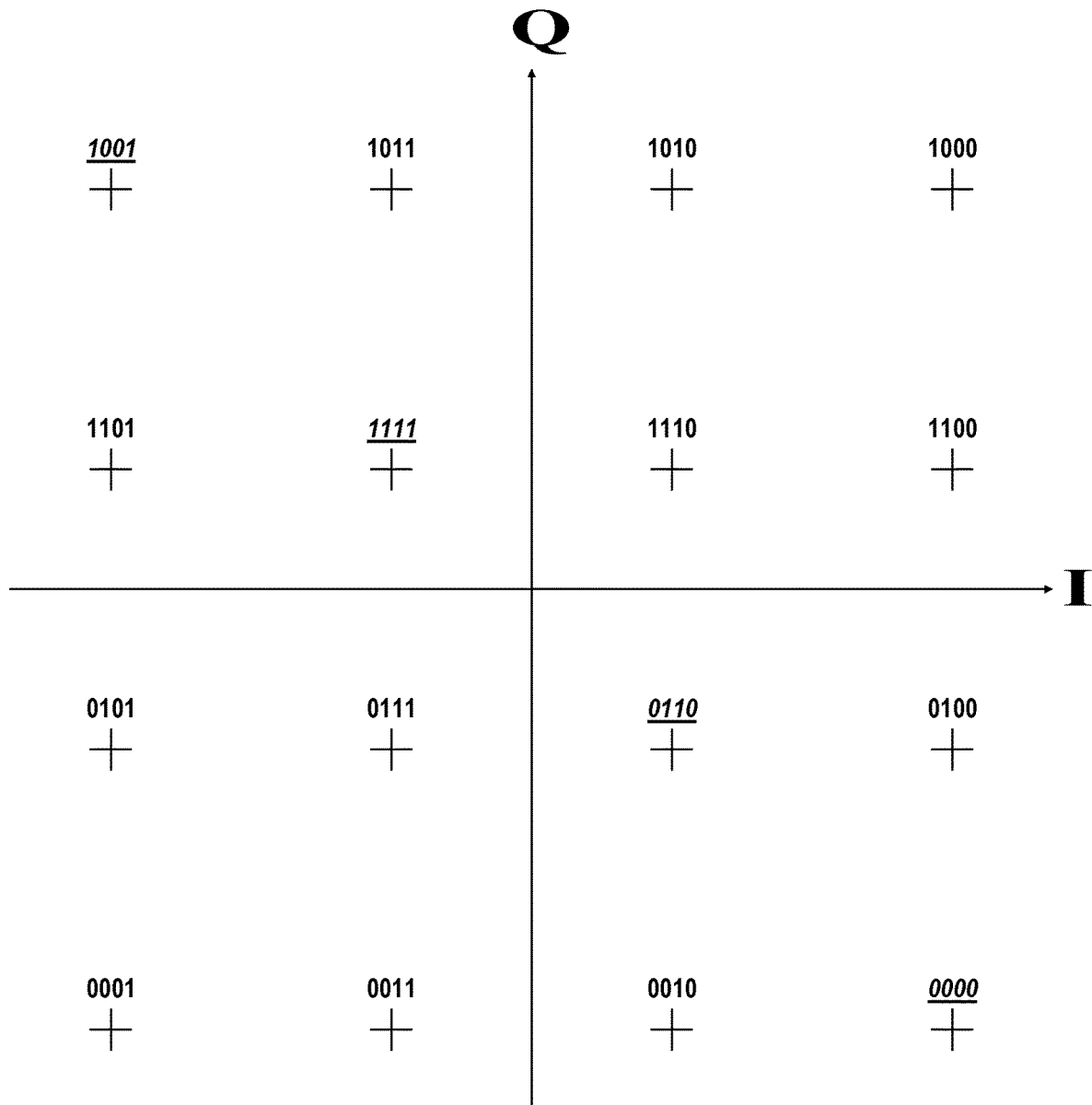

FIG. 26 is a fifteenth Gray mapping of 16 QAM symbol constellations that that flips the twelfth Gray mapping over by rotating the FIG. 23 twelfth Gray map 180° around its 0001-to-1000 diagonal axis. QAM mappers 71 and 72 using respective ones of the FIG. 22 eleventh Gray map and the FIG. 26 fifteenth Gray map of 16 QAM symbol constellations support BRA to provide the same shaping gain as associated with QAM mappers 71 and 72 using respective ones of the FIG. 22 eleventh Gray map and the FIG. 23 twelfth Gray map of 16 QAM symbol constellations. Whenever the lattice-point labels of the FIG. 22 eleventh Gray map and the FIG. 26 fifteenth Gray map of 64 QAM symbol constellations are both 0010 or 1000 throughout an entire OFDM symbol, their OFDM subcarriers are modulated antipodally, to curtail their combined peak power in a way similar to that of SCC. So, when the QAM mappers 71 and 72 use respective ones of the eleventh and the ninth Gray maps of 16 QAM symbol constellations, PAPR is substantially lower than when the QAM mappers 71 and 72 use respective ones of the eleventh and twelfth Gray maps of 16 QAM symbol constellations.

Figure 27:
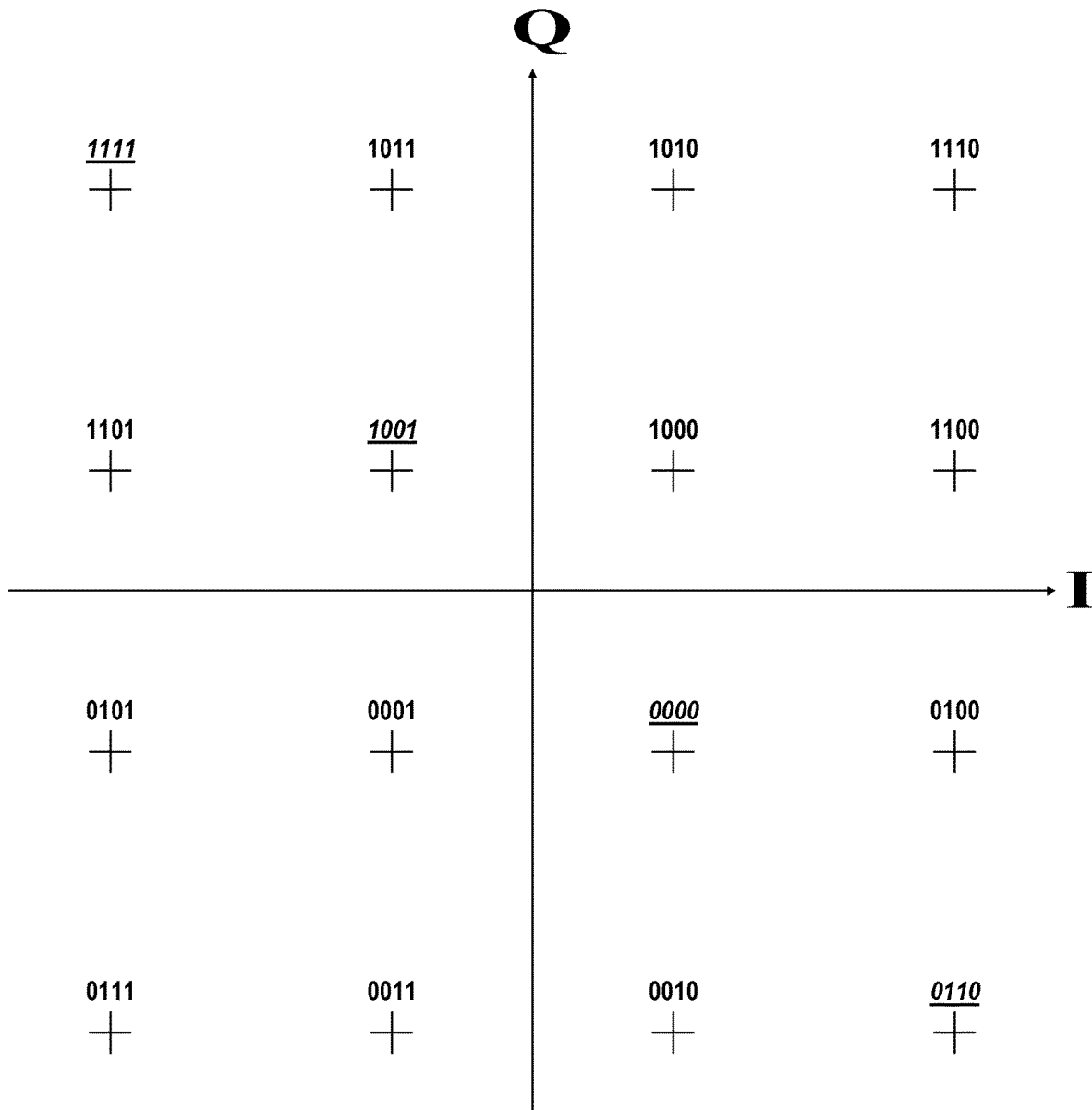

FIG. 27 is a sixteenth Gray mapping of 16 QAM symbol constellations that modifies the FIG. 26 fifteenth Gray mapping by twisting the pattern of map labels in each quadrant about one of its diagonal axes, thereby exchanging the positions of innermost and outermost lattice-point labels in each quadrant. This reduces the maximum peak power associated with either of the 0001 or 1000 lattice-point labels being associated with the respective QAM modulation of all OFDM carriers during a COFDM symbol. This should improve PAPR somewhat further when the QAM mappers 71 and 72 use respective ones of the eleventh and sixteenth Gray maps of 16 QAM symbol constellations, rather than respective ones of the eleventh and fifteenth Gray maps of 16 QAM symbol constellations.

There are still other groups of different Gray mappings of 16 QAM symbol constellations, each of which Gray mappings in a group arranges the four palindromic lattice-point labels along a diagonal of its lattice. The group of fifth, sixth, seventh, eighth, ninth and tenth different Gray mappings of 16 QAM symbol constellations sequentially depicted in FIGS. 16, 17, 18, 19, 20 and 21 can be rotated π/2 radians or 90° in either direction, so the diagonal containing successive 0000, 1001, 1111 and 0110 map labels extends through the −I, +Q and +I, −Q quadrants of each of the resulting mappings. The group of eleventh, twelfth, thirteenth, fourteenth, fifteenth and sixteenth different Gray mappings of 16 QAM symbol constellations sequentially depicted in FIGS. 22, 23, 24, 25, 26 and 27 can be rotated π/2 radians or 90° in either direction, so the diagonal containing successive 0000, 0110, 1111 and 1001 map labels extends through the +I, +Q and −I, −Q quadrants of each of the resulting mappings.

The order of successive lattice-point labels along either of the diagonals of a 16 QAM symbol constellation can be selected in any of four sequences from the loop of successive 0000, 1001, 1111 and 0110 map labels. The order of successive lattice-point labels along either of the diagonals of a 16 QAM symbol constellation can be selected in any of four sequences from the (reverse) loop of successive 0000, 0110, 1111 and 1001 map labels. In all there are sixteen groups of different Gray mappings of 16 QAM symbol constellations, each of which Gray mappings in a group arranges along a diagonal of its lattice those lattice-point labels having mirror symmetry regarding the order of ONE and ZERO bits therein.

There is an interesting aspect to a pair of different Gray mappings of square QAM symbol constellations each arranging in similar order along a diagonal of its lattice those lattice-point labels having mirror symmetry regarding the order of ONE and ZERO bits therein. Perforce, flipping either of the maps over by 180° rotation around such diagonal axis results in a map like the other one of that pair.

Figure 28:
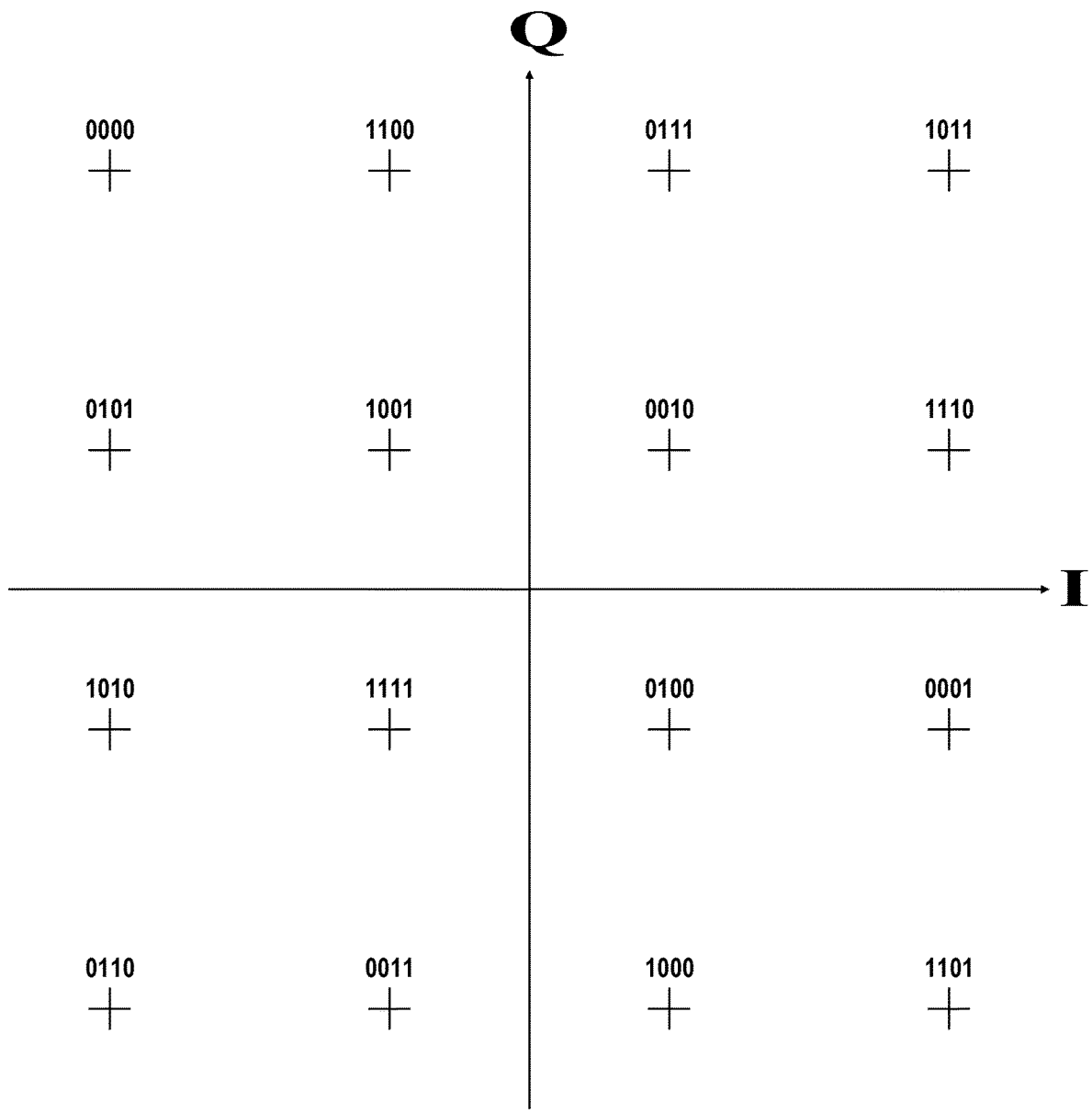
FIGS. 28 and 29 are respective optimized mappings of 16 QAM symbol constellations, with labeling diversity between them.
Figure 29:
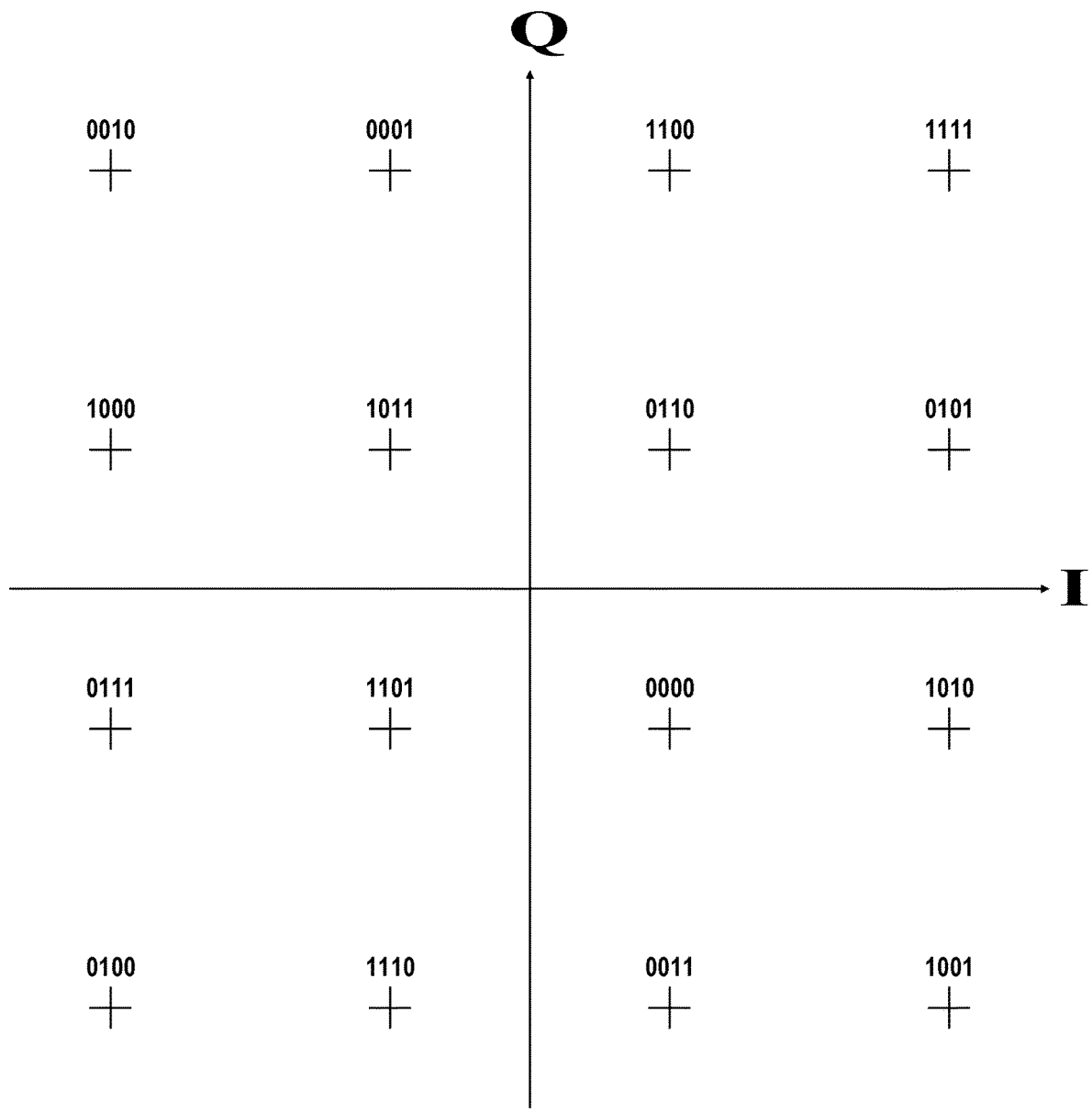

FIGS. 28 and 29 depict first and second optimized maps of lattice points in 16 QAM symbol constellations that the QAM mappers 71 and 72 respectively provide in a physical layer pipe in some COFDM DCM transmitter apparatuses embodying aspects of the invention. The respective 4-bit labels of adjacent points in the lattice of an optimized mapping of 16 QAM differ in two or three of their bits, rather than differing in only one or two of their bits. This benefits receiver apparatus employing iterative de-mapping and decoding procedures when reception is via a Rayleigh channel, without impairing reception via an AWGN channel too much. Reception via an AWGN channel is not as good as with full Gray mapping of QAM subcarriers, and reception via a Rayleigh channel is not as good as with full anti-Gray mapping of QAM subcarriers. This pair of optimized maps is one of seven pairs of optimized maps disclosed by M. Krasicki in his paper titled "The essence of QAM labelling diversity" published April 2013 in *Electronics Letters* 49(8), pp. 567-569. The optimized maps in each of those seven pairs are arranged to have maximum labeling diversity between them. So, any one of these pairs of optimized maps is suited for use in COFDM DCM signals.

Figure 30:
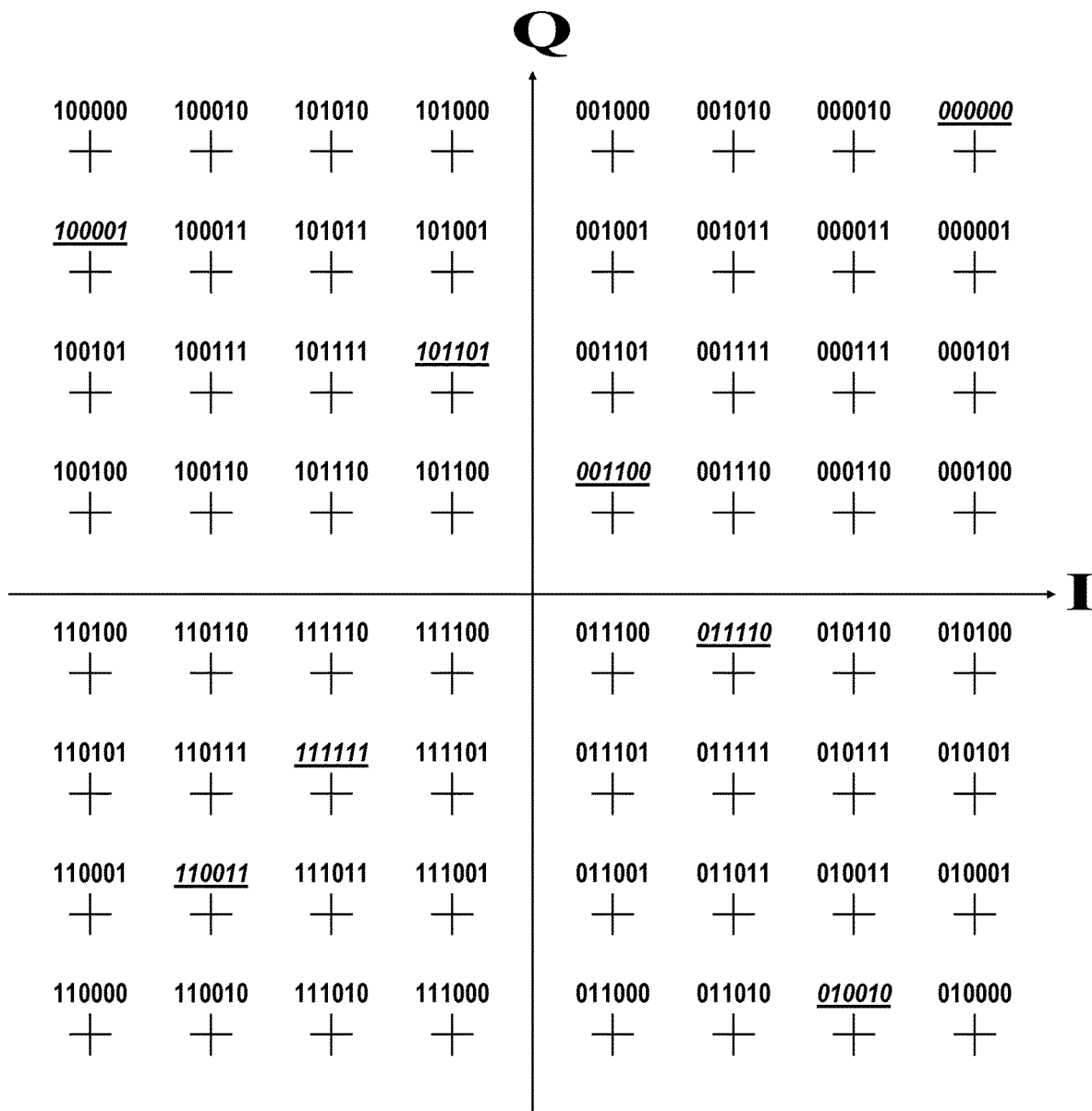
FIGS. 30, 31, 32 and 33 are first, second, third and fourth different Gray mappings of 64 QAM symbol constellations (based upon the Gray mapping of 64 QAM symbol constellations as prescribed originally in the DVB-T standards for COFDM digital television broadcasting), which first and third Gray mappings of 64 QAM symbol constellations have an antiphase-energy relationship with each other, and which second and fourth Gray mappings of 64 QAM symbol constellations have an antiphase-energy relationship with each other.
Figure 31:
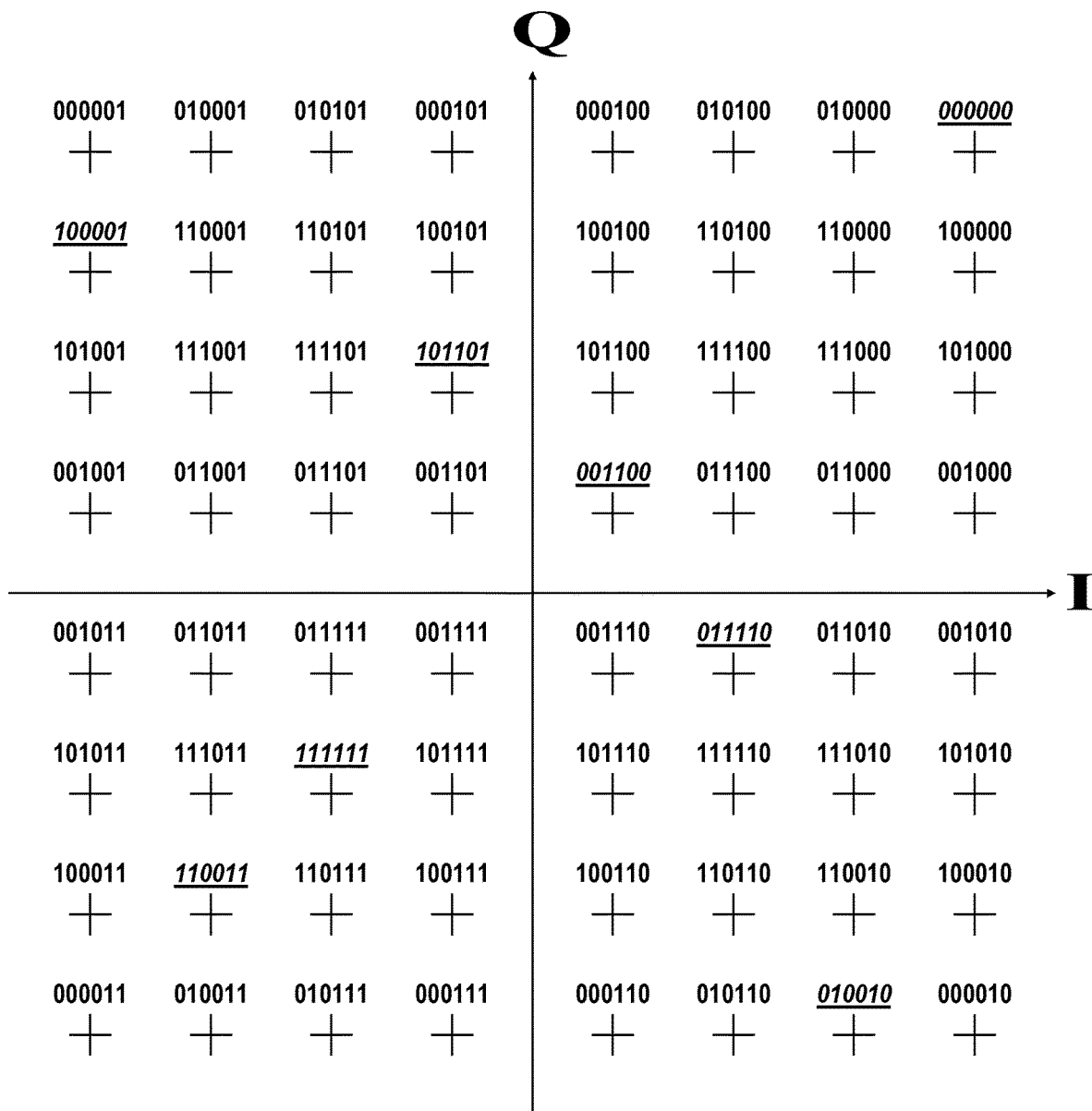

FIGS. 30 and 31 respectively depict first and second Gray maps of lattice points in 64 QAM symbol constellations that the QAM mappers 71 and 72 respectively provide in a physical layer pipe in some transmitter apparatuses for COFDM DCM signals. The FIG. 30 first 64 QAM Gray map implements transmission of coded data in one of the sidebands of a COFDM DCM signal, and the FIG. 31 second 64 QAM Gray map implements transmission of the same coded data in the other sideband of that COFDM DCM signal. The FIG. 30 and FIG. 31 Gray maps govern quadrature amplitude modulation of their respective sets of OFDM carriers according to first and second 64 QAM patterns, respectively, to support BRA to provide shaping gain. Bits of the lattice-point labels for the FIG. 30 Gray map of 64 QAM symbol constellations more likely to experience error correspond to bits of the lattice-point labels for the FIG. 31 Gray map of 64 QAM symbol constellations less likely to experience error. Bits of the lattice-point labels for the FIG. 31 Gray map of 64 QAM symbol constellations more likely to experience error correspond to bits of the lattice-point labels for the FIG. 30 Gray map of 64 QAM symbol constellations less likely to experience error. These characteristics are achieved simply by reversing the order of bits in the labeling of each pair of lattice points similarly located in respective ones of the FIG. 30 and FIG. 31 Gray maps.

Note that each of certain pairs of lattice points similarly located in respective ones of the FIG. 30 and FIG. 31 Gray maps have like labeling, owing to mirror symmetry of their bits. In 64 QAM maps there are eight palindromic lattice-point labels—i. e. 000000, 001100, 010010, 011110, 100001, 101101, 110011 and 111111. One of these palindromic lattice-point labels, 000000, is located at similar corner lattice points in both of the FIG. 30 and FIG. 31 Gray maps. So, there is no reduction of PAPR compared with conventional COFDM if QAM mappers 71 and 72 use respective ones of the FIG. 30 first Gray map and the FIG. 31 second Gray map of 64 QAM symbol constellations. This is because peak power is as large as in conventional COFDM when both lattice-point labels are 000000 throughout an entire OFDM symbol. Average power is the same as for conventional COFDM.

Figure 32:
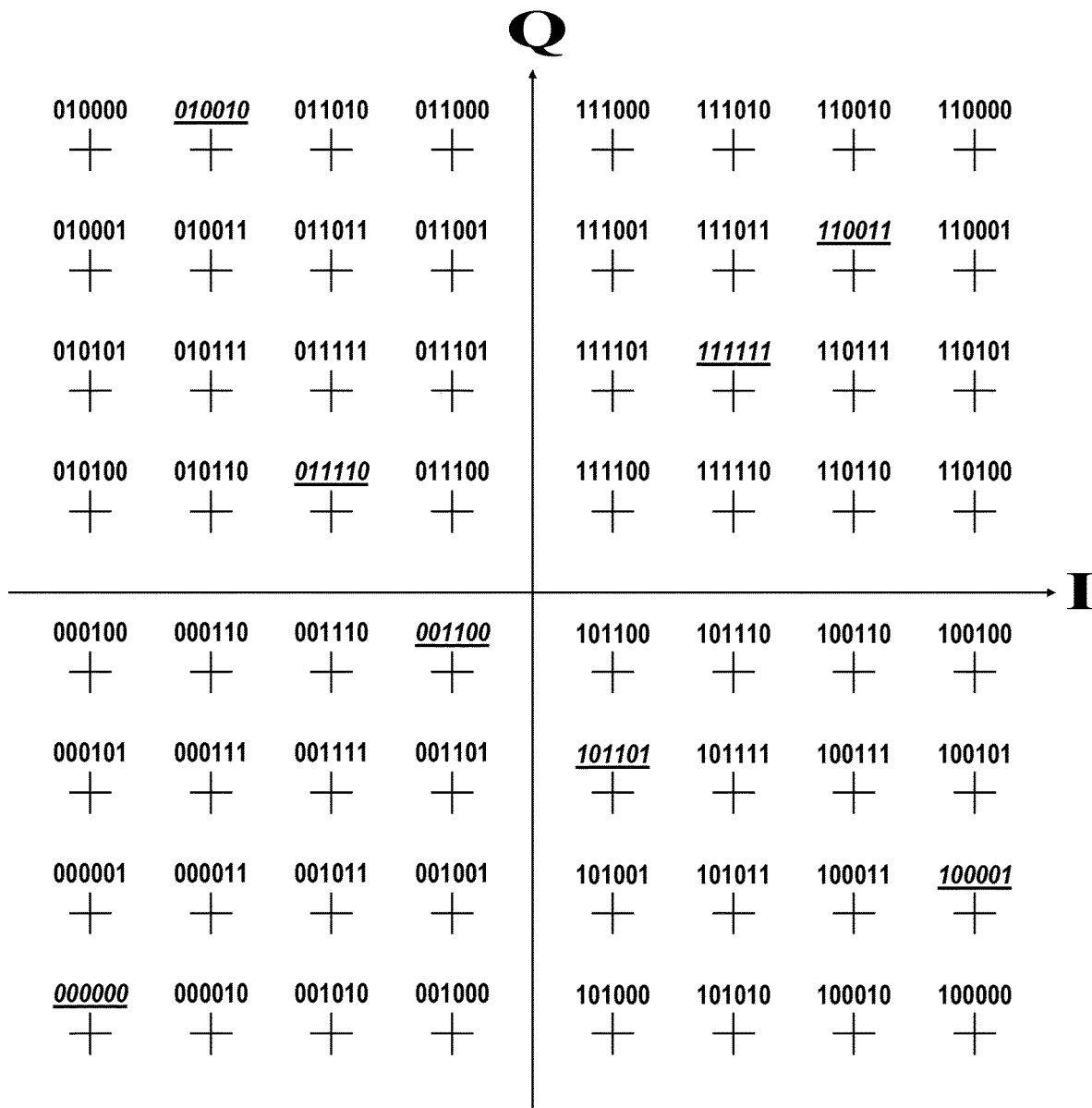

FIG. 32 is a third Gray mapping of 64 QAM symbol constellations that rotates the FIG. 30 first Gray mapping 180° around its center. QAM mappers 71 and 72 using respective ones of the FIG. 31 second Gray map and the FIG. 32 third Gray map of 64 QAM symbol constellations support BRA to provide the same shaping gain as associated with QAM mappers 71 and 72 using respective ones of the FIG. 30 first Gray map and the FIG. 31 second Gray map of 64 QAM symbol constellations. However, PAPR is lowered. Whenever the lattice-point labels of the FIG. 31 second Gray map and the FIG. 32 third Gray map of 64 QAM symbol constellations are both 000000 throughout an entire OFDM symbol, their OFDM subcarriers are modulated antipodally, to curtail their combined peak power in a way similar to that of SCC.

Furthermore, whenever the lattice-point labels of the FIG. 31 second Gray map and the FIG. 32 third Gray map of 64 QAM symbol constellations are both 001100, 010010, 011110, 100001, 101101, 110011 or 111111, their OFDM subcarriers are modulated antipodally. Whenever any one of these lattice-point labels occurs throughout an entire OFDM symbol or most of one, their OFDM subcarriers are modulated antipodally, to curtail their combined peak power in a way similar to that of SCC.

Figure 33:
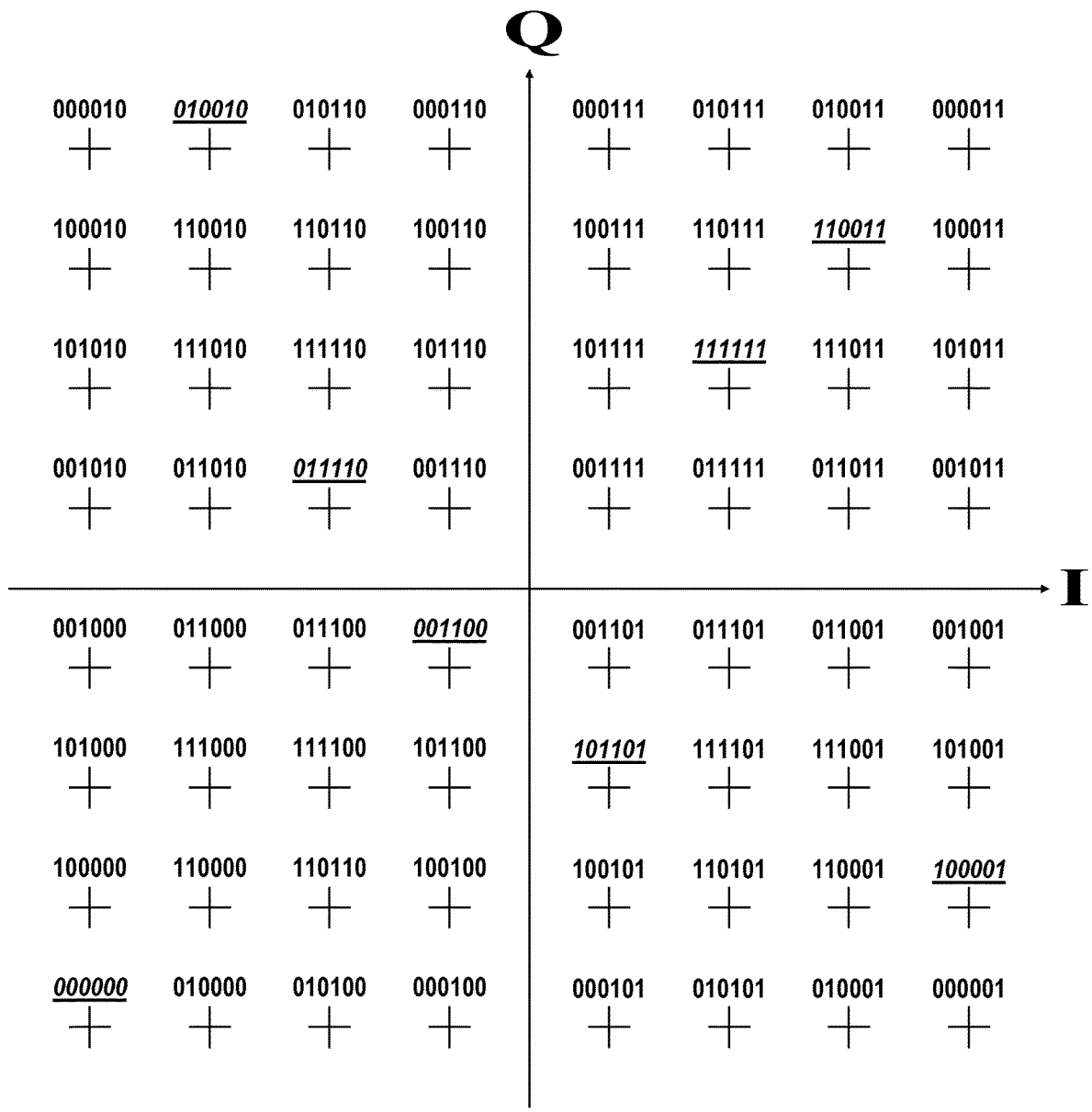

FIG. 33 is an fourth Gray mapping of 64 QAM symbol constellations that rotates the FIG. 31 second Gray mapping 180° around its center. QAM mappers 71 and 72 using respective ones of the FIG. 30 first Gray map and the FIG. 33 fourth Gray map of 64 QAM symbol constellations support BRA to provide the same shaping gain as associated with QAM mappers 71 and 72 using respective ones of the FIG. 30 first Gray map and the FIG. 31 second Gray map of 64 QAM symbol constellations. However, PAPR is lowered. Whenever the lattice-point labels of the FIG. 30 first Gray map and the FIG. 33 fourth Gray map of 64 QAM symbol constellations are both 000000 throughout an entire OFDM symbol, their OFDM subcarriers are modulated antipodally, to curtail their combined peak power in away similar to that of SCC.

Furthermore, whenever the lattice-point labels of the FIG. 30 first Gray map and the FIG. 33 fourth Gray map of 64 QAM symbol constellations are both 001100, 010010, 011110, 100001, 101101, 110011 or 111111, their OFDM subcarriers are modulated antipodally. Furthermore, whenever the lattice-point labels of the FIG. 31 second Gray map and the FIG. 32 third Gray map of 64 QAM symbol constellations are both 001100, 010010, 011110, 100001, 101101, 110011 or 111111, their OFDM subcarriers are modulated antipodally. Whenever any one of these lattice-point labels occurs throughout an entire OFDM symbol or most of one, their OFDM subcarriers are modulated antipodally, to curtail their combined peak power in a way similar to that of SCC.

Figure 34:
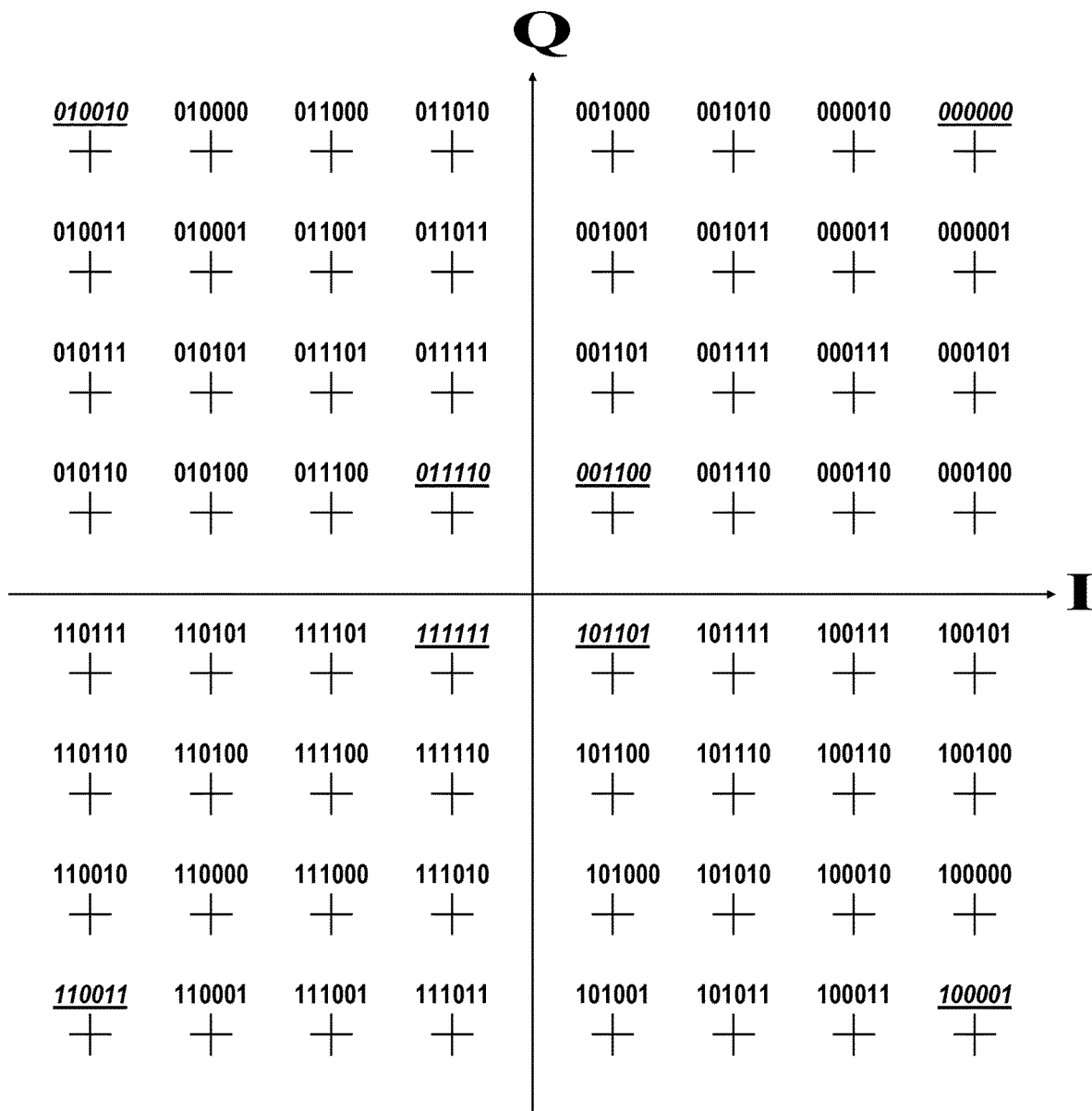
FIGS. 34 and 35 are first and second SCM mappings of 64 QAM symbol constellations for conveying the same coded data in respective half spectra of a COFDM DCM signal, wherein (a) the bits of the labels in the first SCM mapping more likely to experience error owing to AWGN correspond to the bits of the labels in the second SCM mapping less likely to experience error owing to AWGN of similar strength, and (b) the bits of the labels in the second SCM mapping more likely to experience error owing to AWGN correspond to the bits of the labels in the first SCM mapping less likely to experience error owing to AWGN of similar strength.
Figure 35:
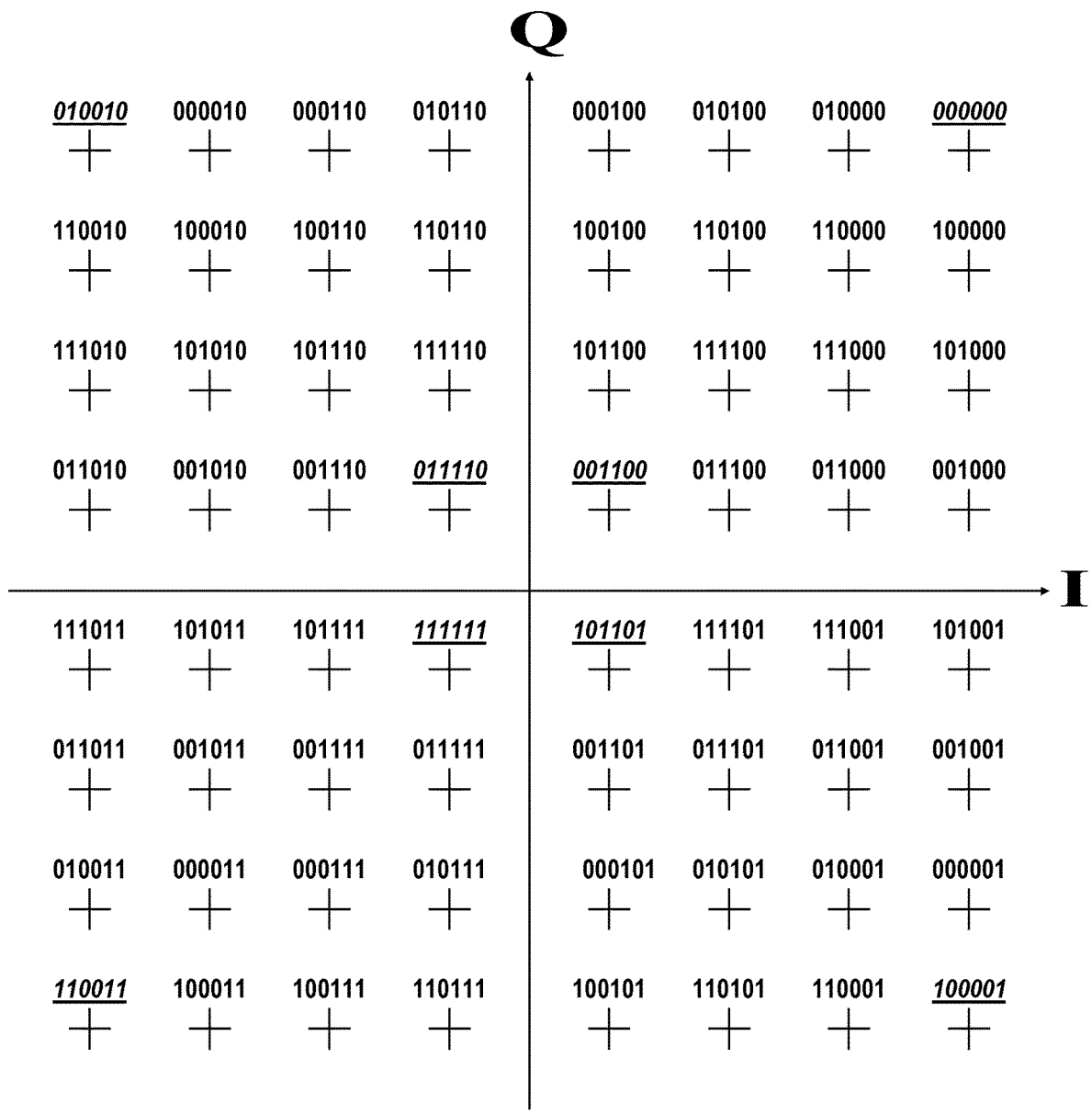

As noted supra, superposition-coded-modulation (SCM) mappings of square 64 QAM symbol constellations have some advantages over many Gray mappings of such constellations. FIGS. 34 and 35 respectively depict first and second SCM maps of lattice points in 64 QAM symbol constellations that the QAM mappers 71 and 72 respectively provide in a physical layer pipe in some COFDM DCM transmitter apparatuses embodying aspects of the invention. The FIG. 34 first SCM map is used throughout a first serial set of 64 QAM symbols that convey coded data in one of the sidebands of a COFDM DCM signal, and the FIG. 35 second SCM map is used throughout a second serial set of 64 QAM symbols that convey the same coded data in the other sideband of that COFDM DCM signal.

The FIG. 34 and FIG. 35 SCM maps govern quadrature amplitude modulation of their respective sets of OFDM carriers according to first and second 64 QAM patterns, respectively, to support BRA to provide the same shaping gain. Bits of the lattice-point labels for the FIG. 34 SCM map of 64 QAM symbol constellations more likely to experience error passing through an AWGN channel correspond to bits of the lattice-point labels for the FIG. 35 SCM map of 64 QAM symbol constellations less likely to experience error passing through that AWGN channel. Bits of the lattice-point labels for the FIG. 35 SCM map of 64 QAM symbol constellations more likely to experience error passing through that AWGN channel correspond to bits of the lattice-point labels for the FIG. 34 SCM map of 64 QAM symbol constellations less likely to experience error passing through that AWGN channel. These characteristics are achieved simply by reversing the order of bits in the labeling of each pair of lattice points similarly located in respective ones of the FIG. 34 and FIG. 35 SCM maps.

Note that each of eight pairs of lattice points similarly located in respective ones of the FIG. 34 and FIG. 35 SCM maps have like labeling, owing to mirror symmetry of their bits. The four palindromic lattice-point labels 001100, 011110, 101101 and 111111 are located at similar close-to-center lattice points in both of the FIG. 34 and FIG. 35 SCM maps.

The other four palindromic lattice-point labels 000000, 010010, 100001 and 110011 are located at similar outside-corner lattice points in both of the FIG. 34 and FIG. 35 SCM maps. So, there is no reduction of PAPR compared with conventional COFDM when QAM mappers 71 and 72 use respective ones of the FIG. 34 first SCM map and the FIG. 35 second SCM map of 64 QAM symbol constellations. This is because peak power is as large as in conventional COFDM when lattice-point labels in both sets of QAM symbol constellations have the same lattice-point label 000000, 010010, 100001 or 110011 throughout an entire OFDM symbol. Average power over a series of COFDM symbols conveying random coded data is similar to that for conventional COFDM.

Figure 36:
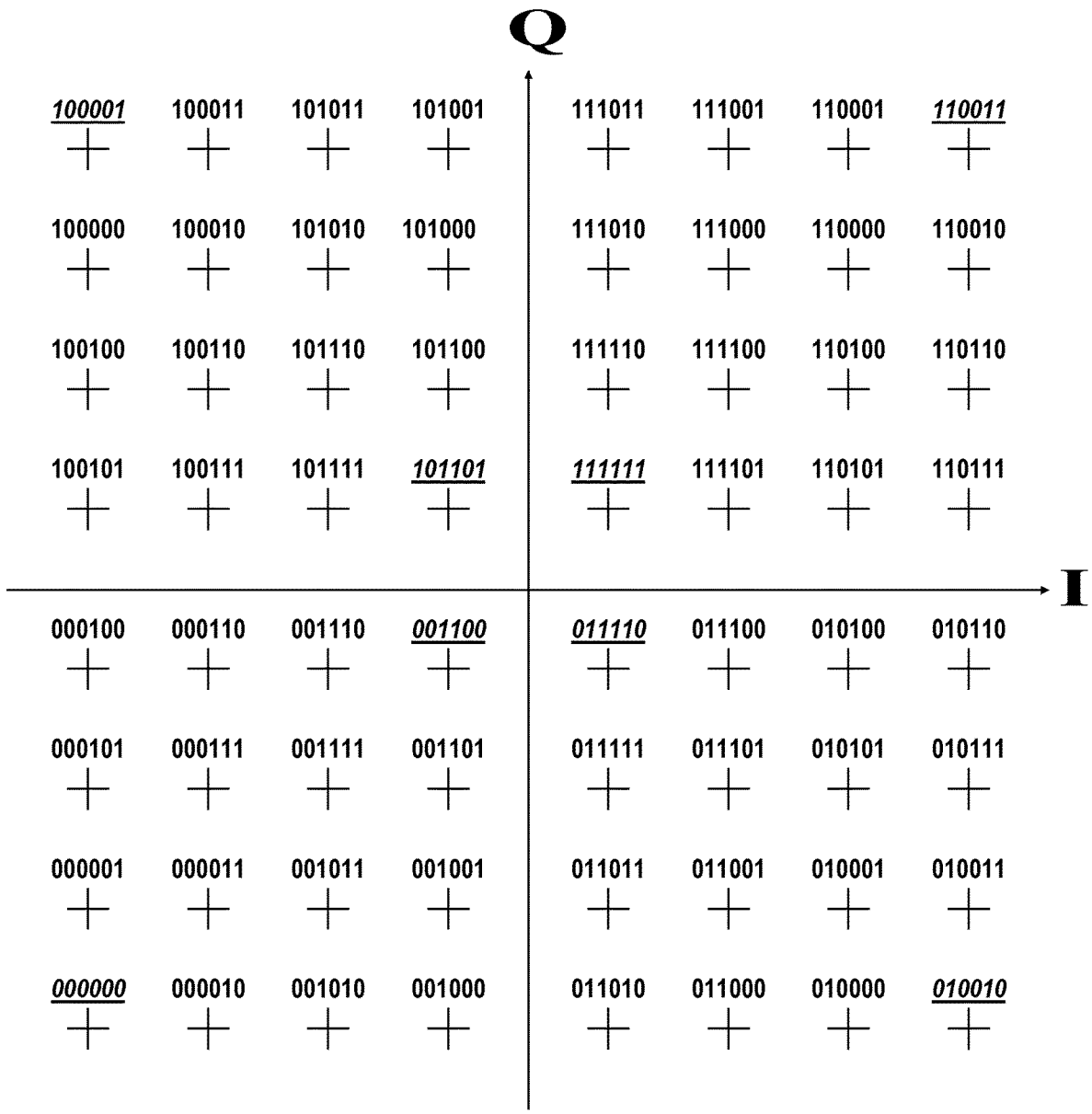
FIG. 36 is a third SCM mapping of 64 QAM symbol constellations that modifies the FIG. 34 first SCM mapping by 180° rotation around its center, the third and second SCM mappings of 64 QAM symbol constellations conveying the same coded data in respective half spectra of a COFDM DCM signal with reduced peak-to-average power ratio compared with the first and second SCM mappings of 64 QAM symbol constellations conveying the same coded data.

FIG. 36 is a third SCM mapping of 64 QAM symbol constellations, the labeling of lattice points of which corresponds to the labeling of lattice points in the FIG. 34 first SCM map were either SCM map rotated by $\pi$ radians or 180° around its center. The first and third SCM mappings of 64 QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM, but this implementation of SCC does not provide shaping gain of the BRA type taught in U.S. Pat. No. 9,647,865.

QAM mappers 71 and 72 using respective ones of the FIG. 35 second SCM map and the FIG. 36 third SCM map of 64 QAM symbol constellations support BRA to provide the same shaping gain as associated with QAM mappers 71 and 72 using respective ones of the FIG. 34 first SCM map and the FIG. 35 second SCM map of 64 QAM symbol constellations. When the lattice-point labels of the FIG. 35 second SCM map and the FIG. 36 third SCM map of 64 QAM symbol constellations are both 000000, 010010, 100001 or 110011 throughout an entire OFDM symbol, their OFDM subcarriers are modulated antipodally, to curtail their combined peak power in a way similar to that of SCC. So, when the QAM mappers 71 and 72 use respective ones of the FIG. 35 second SCM map and the FIG. 36 third SCM map of 64 QAM symbol constellations, PAPR is substantially lower than when the QAM mappers 71 and 72 use respective ones of FIG. 34 first SCM map and the FIG. 35 second SCM map of 64 QAM symbol constellations.

Figure 37:
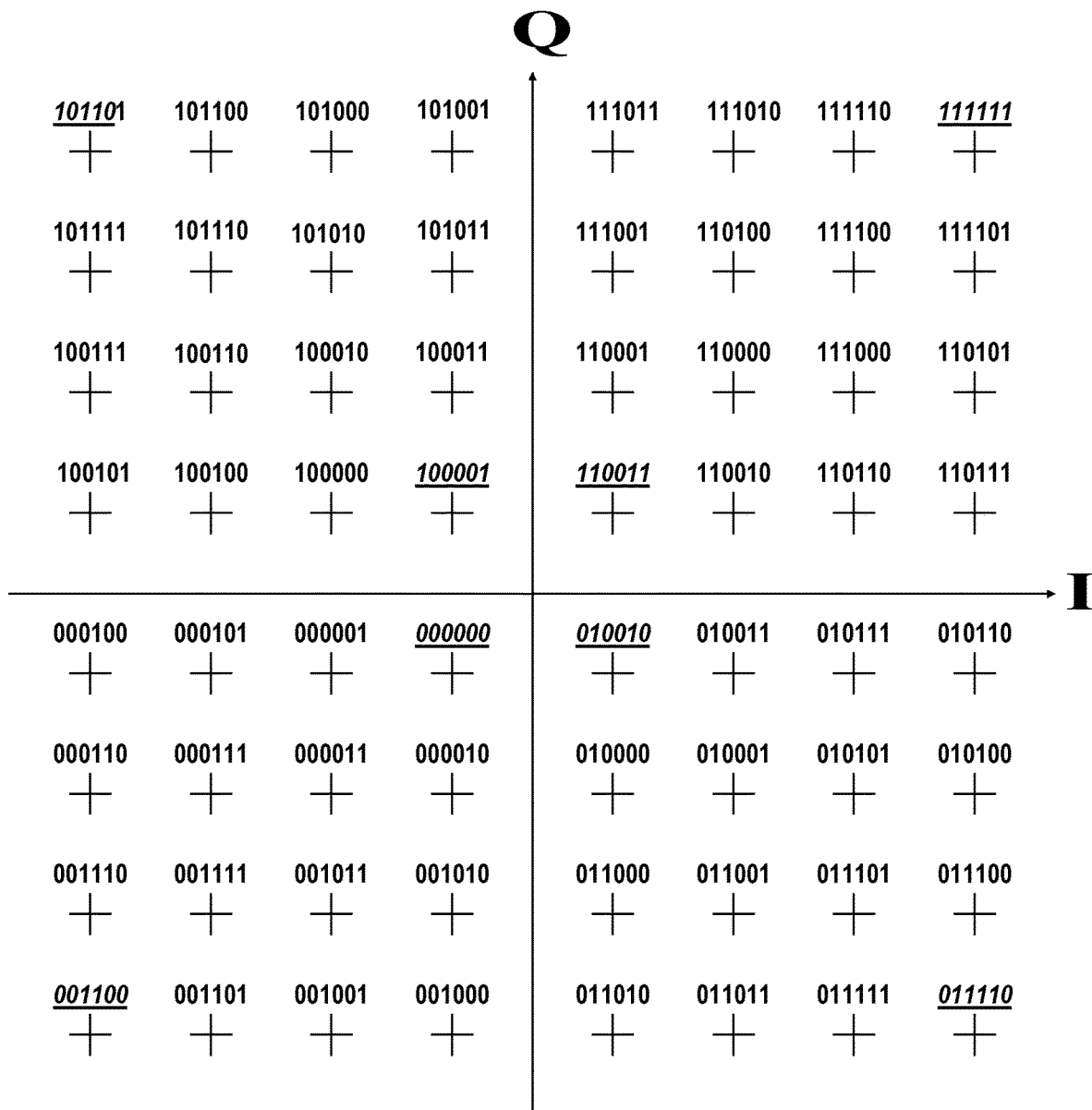
FIG. 37 is a fourth SCM mapping of 64 QAM symbol constellations that modifies the FIG. 36 third SCM mapping by twisting the pattern of map labels in each quadrant.

FIG. 37 is a fourth SCM mapping of 64 QAM symbol constellations that modifies the FIG. 36 third SCM mapping by twisting the pattern of map labels in each quadrant, thereby exchanging the positions of innermost and outermost lattice-point labels in each quadrant. This reduces the maximum peak power associated with each of the 000000, 010010, 100001 and 110011 lattice-point labels being associated with the respective QAM modulation of all OFDM carriers during a COFDM symbol. This should improve PAPR when the QAM mappers 71 and 72 use respective ones of the FIG. 35 second SCM map and the FIG. 37 fourth SCM map of 64 QAM symbol constellations.

Figure 38:
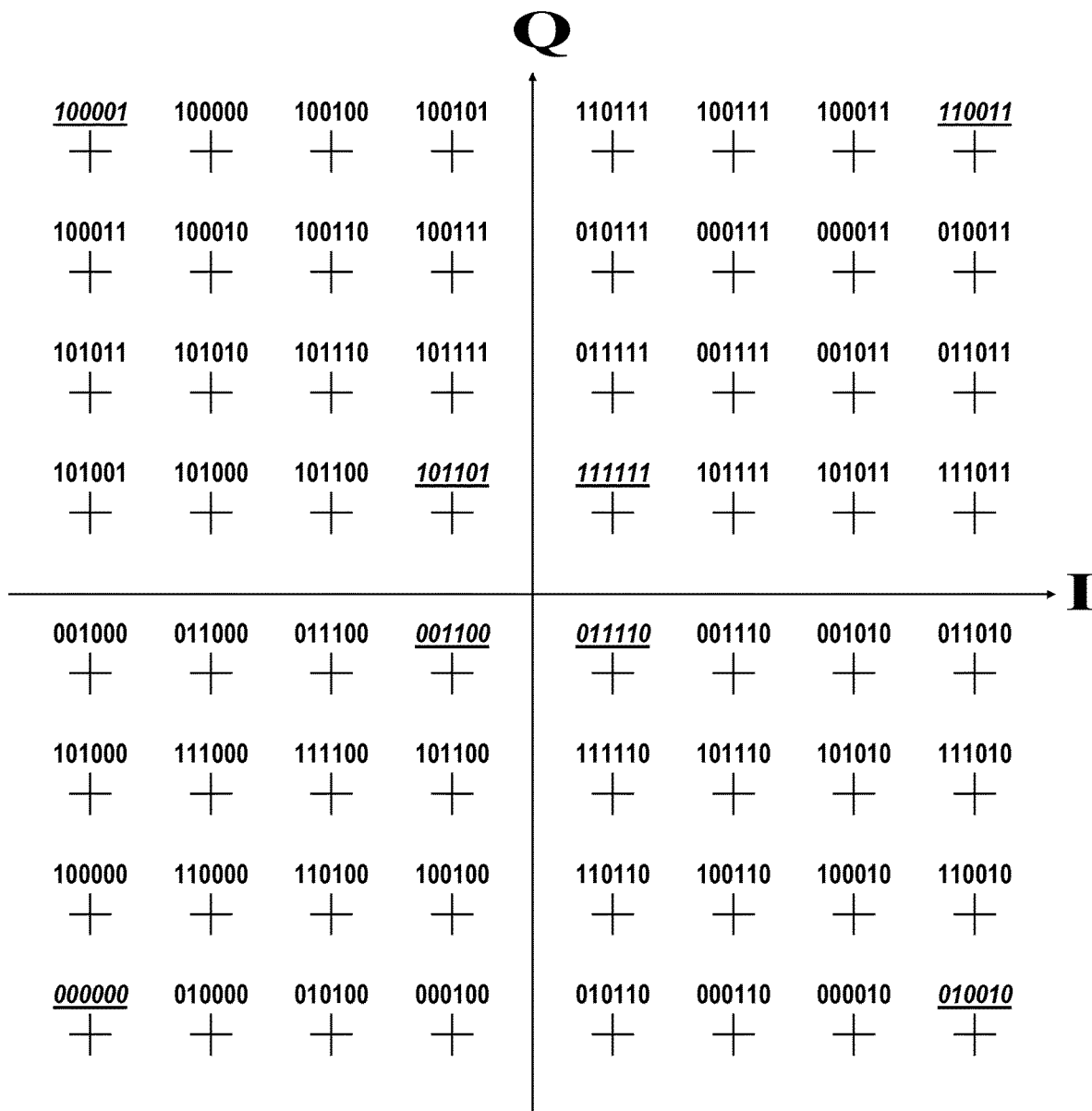
FIG. 38 is a fifth SCM mapping of 64 QAM symbol constellations that modifies the FIG. 15 second SCM mapping by 180° rotation around its center, the first and fifth SCM mappings of 64 QAM symbol constellations conveying the same coded data in respective half spectra of a COFDM DCM signal with reduced peak-to-average power ratio compared with the first and second SCM mappings of 64 QAM symbol constellations conveying the same coded data.

FIG. 38 is a fifth SCM mapping of 64 QAM symbol constellations, the labeling of lattice points of which corresponds to the labeling of lattice points in the FIG. 35 second SCM map were either SCM map rotated by $\pi$ radians or 180° around its center. The second and fifth SCM mappings of 64 QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM, but this implementation of SCC does not provide shaping gain of the BRA type taught in U.S. Pat. No. 9,647,865, however.

QAM mappers 71 and 72 using respective ones of the FIG. 34 first SCM map and the FIG. 38 fifth SCM map of 64 QAM symbol constellations support BRA to provide the same shaping gain as associated with QAM mappers 71 and 72 using respective ones of the FIG. 34 first SCM map and the FIG. 35 second SCM map of 64 QAM symbol constellations. When the lattice-point labels of the FIG. 34 first SCM map and the FIG. 39 fifth SCM map of 64 QAM symbol constellations are both 000000, 010010, 100001 or 110011 throughout an entire OFDM symbol, their OFDM subcarriers are modulated antipodally, to curtail their combined peak power in a way similar to that of SCC. So, when the QAM mappers 71 and 72 use respective ones of the FIG. 34 first SCM map and the FIG. 39 fifth SCM map of 64 QAM symbol constellations, PAPR is substantially lower than when the QAM mappers 71 and 72 use respective ones of FIG. 34 first SCM map and the FIG. 35 second SCM map of 64 QAM symbol constellations.

Figure 39:
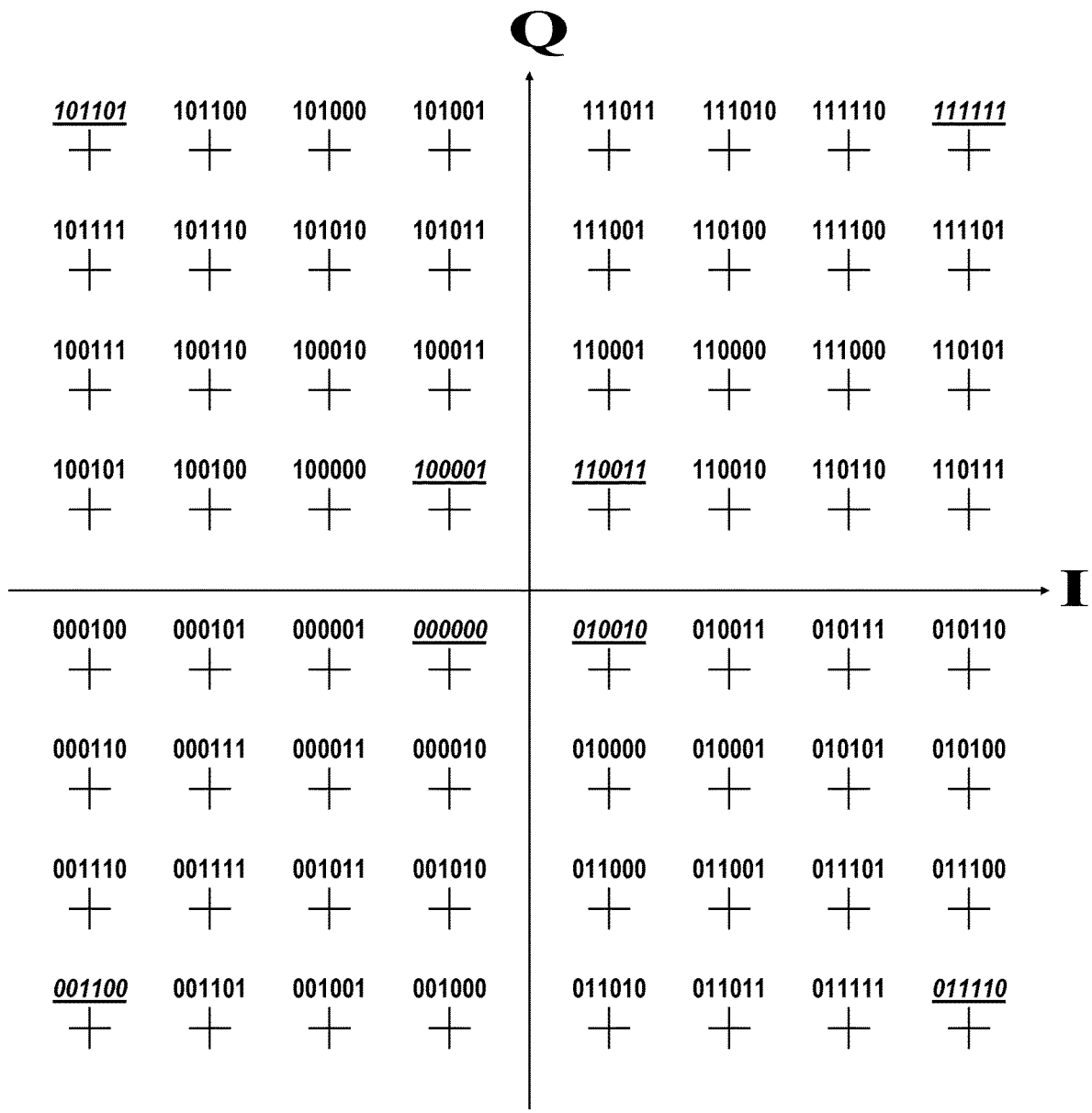
FIG. 39 is a sixth SCM mapping of 64 QAM symbol constellations that modifies the FIG. 38 fifth SCM mapping by twisting the pattern of map labels in each quadrant.

FIG. 39 is a sixth SCM mapping of 64 QAM symbol constellations that modifies the FIG. 38 fifth SCM mapping by twisting the pattern of map labels in each quadrant, thereby exchanging the positions of innermost and outermost lattice-point labels in each quadrant. This reduces the maximum peak power associated with each of the 000000, 010010, 100001 and 110011 lattice-point labels being associated with the respective QAM modulation of all OFDM carriers during a COFDM symbol. This should improve PAPR when the QAM mappers 71 and 72 use respective ones of the FIG. 34 first SCM map and the FIG. 39 sixth SCM map of 64 QAM symbol constellations.

Gray mappings of square 64 QAM symbol constellations preferred for reducing PAPR of COFDM DCM besides concurrently providing shaping gain differ from the specified standard for DVB-T and DVB-T2 digital terrestrial television broadcasting systems. Preferred Gray mappings of 64 QAM are characterized in that all eight of the palindromic lattice-point labels 000000, 001100, 010010, 011110, 100001, 101101, 110011 and 111111 are positioned along one of the two diagonals of the square lattice in the mapping. The sequence of eight palindromic lattice-point labels successively positioned along that diagonal can be selected from any of six different loops of the eight palindromic lattice-point labels, respective sequences from which are listed following.

1) 000000, 001100, 011110, 010010, 110011, 111111, 101101, 100001

2) 000000, 001100, 101101, 100001, 110011, 111111, 011110, 010010
3) 000000, 001100, 101101, 111111, 011110, 010010, 110011, 100001
4) 000000, 010010, 011110, 001100, 101101, 111111, 110011, 100001
5) 000000, 010010, 110011, 111111, 011110, 001100, 101101, 100001
6) 000000, 010010, 110011, 100001, 101101, 111111, 011110, 001100

These six loops scanned forward can be scanned in reverse direction to generate six more sequences, each oppositely ordered to one of the above-listed six sequences. Each of the twelve sequences can be rotated in loop by one label at a time through eight phasings. So, there are 96 possible arrangements of the eight palindromic lattice-point labels along either of the two diagonals of the 64 QAM lattice. It is possible that a few of these arrangements will not support a Gray-mapped square 64 QAM symbol constellation, however.

FIGS. 44, 45, 46, 47, 48 and 49 depict ninth, tenth, eleventh, twelfth, thirteenth and fourteenth different Gray mappings of 64 QAM symbol constellations, which Gray mappings each arrange the eight palindromic lattice-point labels along a diagonal of its lattice. The diagonal extends through the +I, −Q and −I, +Q quadrants of each of these mappings.

Figure 40:
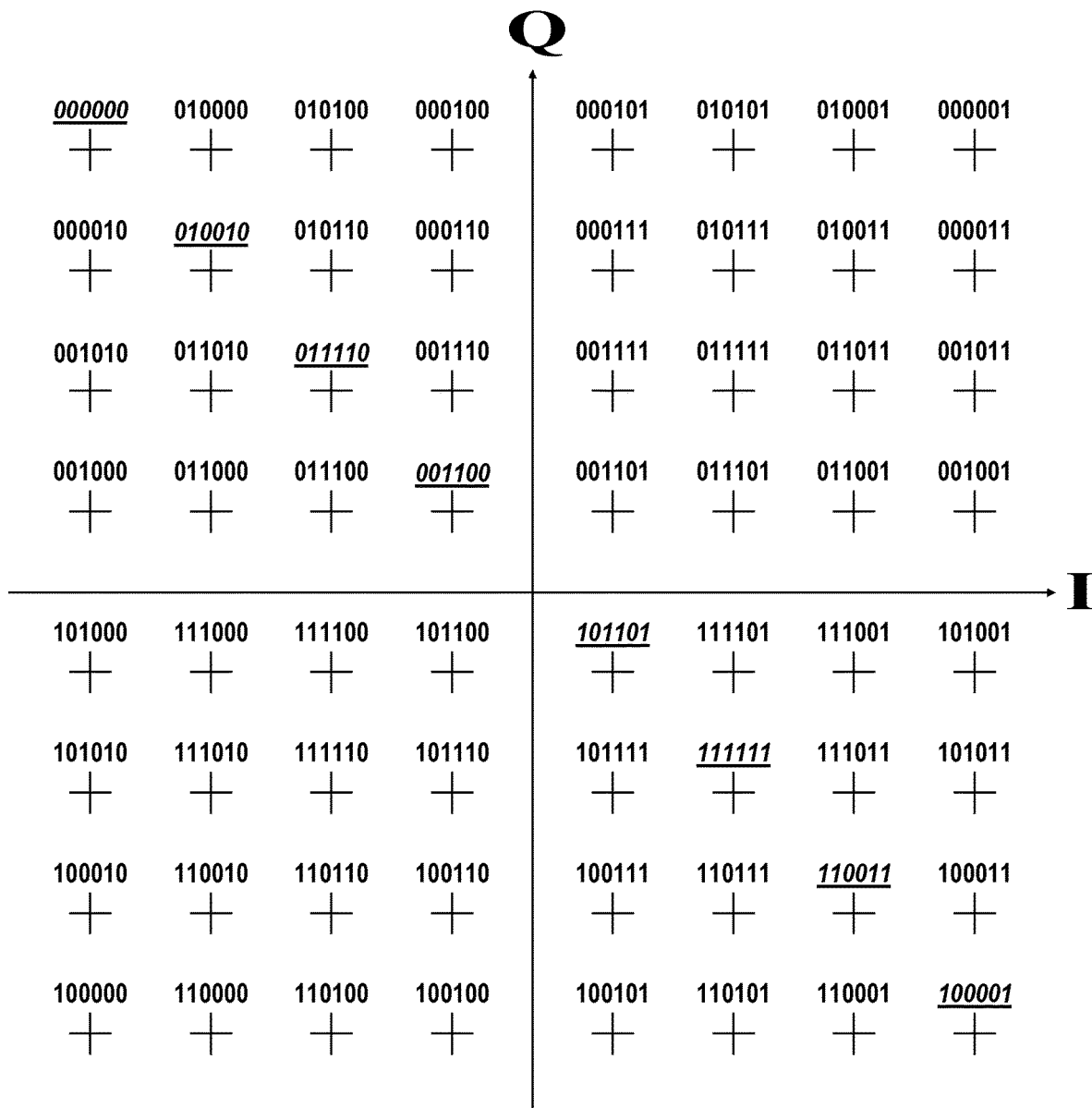
FIGS. 40, 41, 42, 43, 44 and 45 are fifth, sixth, seventh, eighth, ninth and tenth different Gray mappings of 64 QAM symbol constellations in a first group for consideration, which Gray mappings each arrange along a diagonal of its lattice those lattice-point labels having mirror symmetry regarding the order of ONE and ZERO bits therein.
Figure 41:
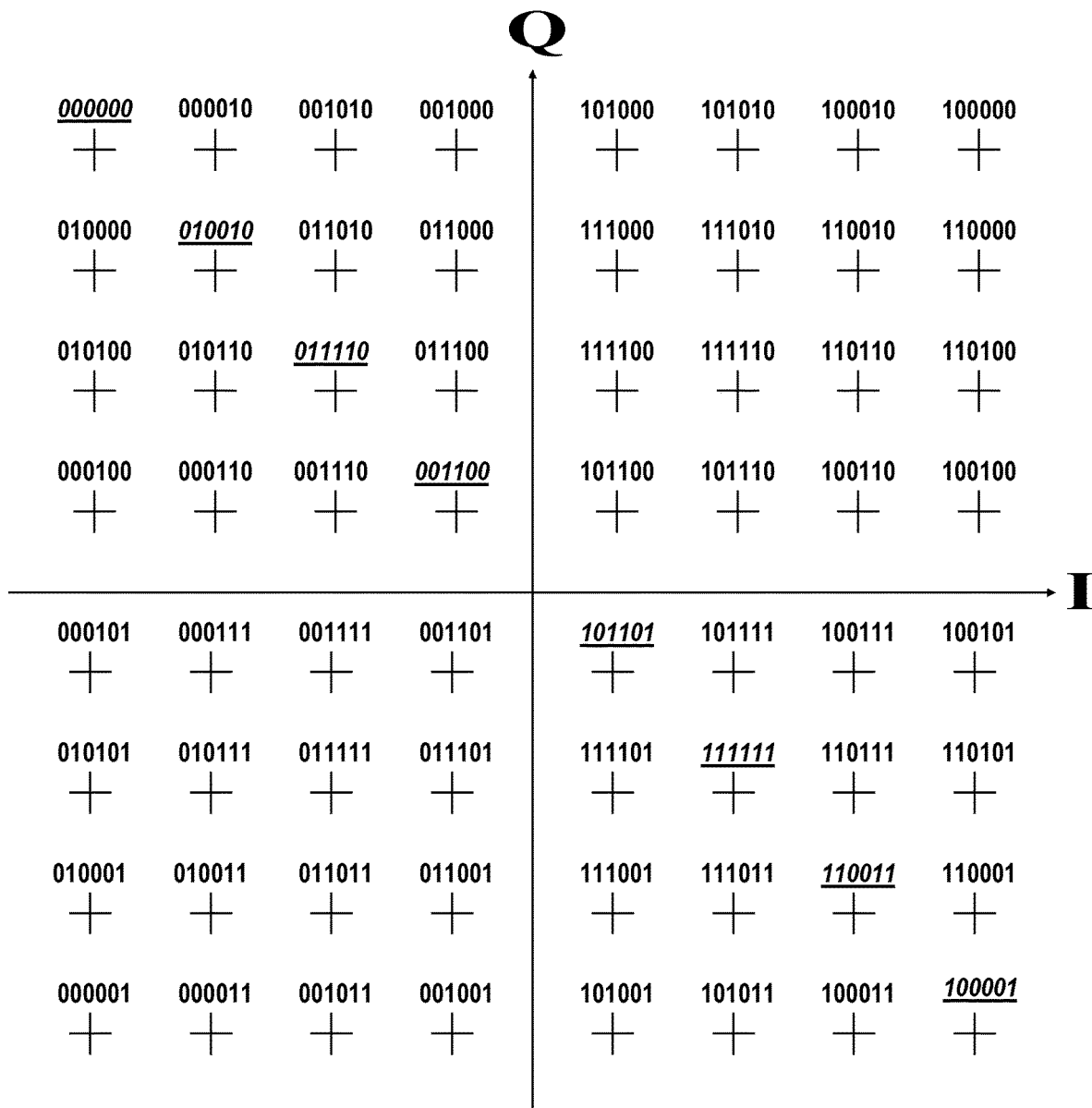

FIGS. 40 and 41 respectively depict fifth and sixth Gray maps of lattice points in 64 QAM symbol constellations that the QAM mappers 71 and 72 respectively provide in a physical layer pipe in some COFDM DCM transmitter apparatuses embodying aspects of the invention. The FIG. 40 fifth Gray map implements transmission of coded data in one of the sidebands of a COFDM DCM signal, and the FIG. 41 sixth Gray map implements transmission of the same coded data in the other sideband of that COFDM DCM signal. The FIG. 40 and FIG. 41 Gray maps govern quadrature amplitude modulation of their respective sets of OFDM carriers according to fifth and sixth 64 QAM Gray mapping patterns, respectively. A sequence of successive map labels 000000, 010010, 011110, 001100, 101101, 111111, 110011, 100001 extends along a diagonal from the top left corner of each of the FIG. 40 and FIG. 41 Gray maps to its bottom right corner.

The 000000 and 100001 palindromic lattice-point labels are located at similar corner lattice points in both of the FIG. 40 and FIG. 41 Gray maps. Therefore, there is no reduction of PAPR compared with conventional COFDM when QAM mappers 71 and 72 use respective ones of the FIG. 40 fifth Gray map and the FIG. 41 sixth Gray map of 64 QAM symbol constellations. This is because peak power is as large as in conventional COFDM when lattice-point labels in both sets of QAM symbol constellations have the same 000000 or 100001 lattice-point label throughout an entire OFDM symbol. Average power over a series of COFDM symbols conveying random coded data is similar to that for conventional COFDM.

Rotation of one of FIG. 40 and FIG. 41 Gray maps by π radians or 180° does not result in a pair of mappings for COFDM DCM with reduced PAPR compared to that of conventional COFDM. Such rotation causes the 000001 and 100000 lattice-point labels at the corners of the QAM constellations to be similarly positioned. Peak power is as large as in conventional COFDM when lattice-point labels in both sets of QAM symbol constellations have the same 000001 or 100000 lattice-point label throughout an entire OFDM symbol.

Figure 42:
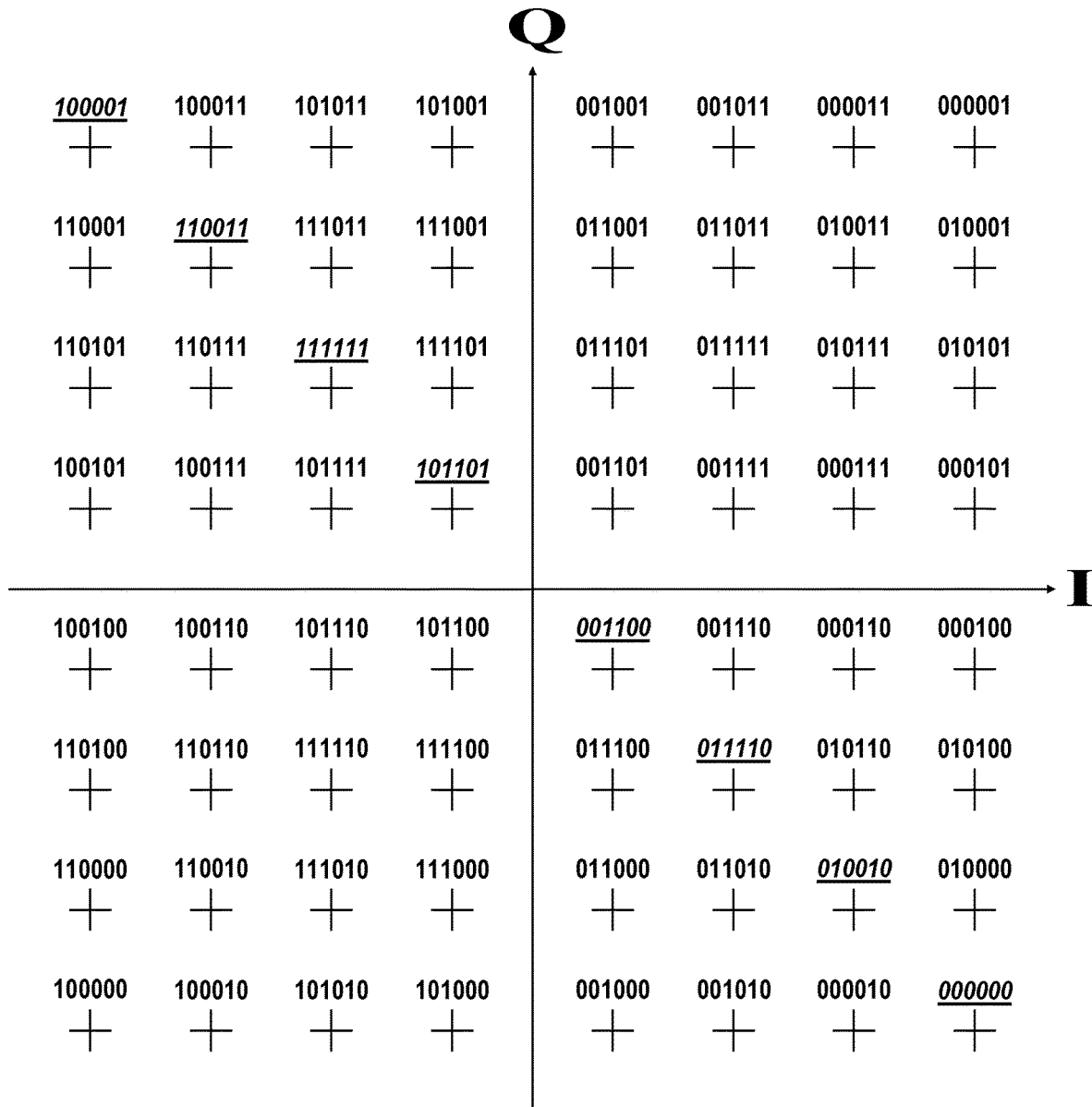

FIG. 42 depicts a seventh Gray mapping of 64 QAM symbol constellations that flips the fifth Gray mapping over by rotating the FIG. 40 ninth Gray map 180° around its 000001-to-100000 diagonal axis. QAM mappers 71 and 72 using respective ones of the FIG. 42 seventh Gray map and the FIG. 41 sixth Gray map of 64 QAM symbol constellations secure coding gain, which should be superior to that associated with QAM mappers 71 and 72 using respective ones of the FIG. 40 fifth Gray map and the FIG. 41 sixth Gray map of 64 QAM symbol constellations. This is because the sixth and seventh Gray maps of 64 QAM have significantly greater labeling diversity than the fifth and sixth Gray maps of 64 QAM do. Whenever the lattice-point labels of the FIG. 41 sixth Gray map and the FIG. 42 seventh Gray map of 64 QAM symbol constellations are both 000000, 000001, 100000 or 100001 throughout an entire OFDM symbol, their OFDM subcarriers are modulated antipodally, to curtail their combined peak power in a way similar to that of SCC. So, when the QAM mappers 71 and 72 use respective ones of the sixth and the seventh Gray maps of 64 QAM symbol constellations, PAPR is substantially lower than when the QAM mappers 71 and 72 use respective ones of the fifth and sixth Gray maps of 64 QAM symbol constellations.

Figure 43:
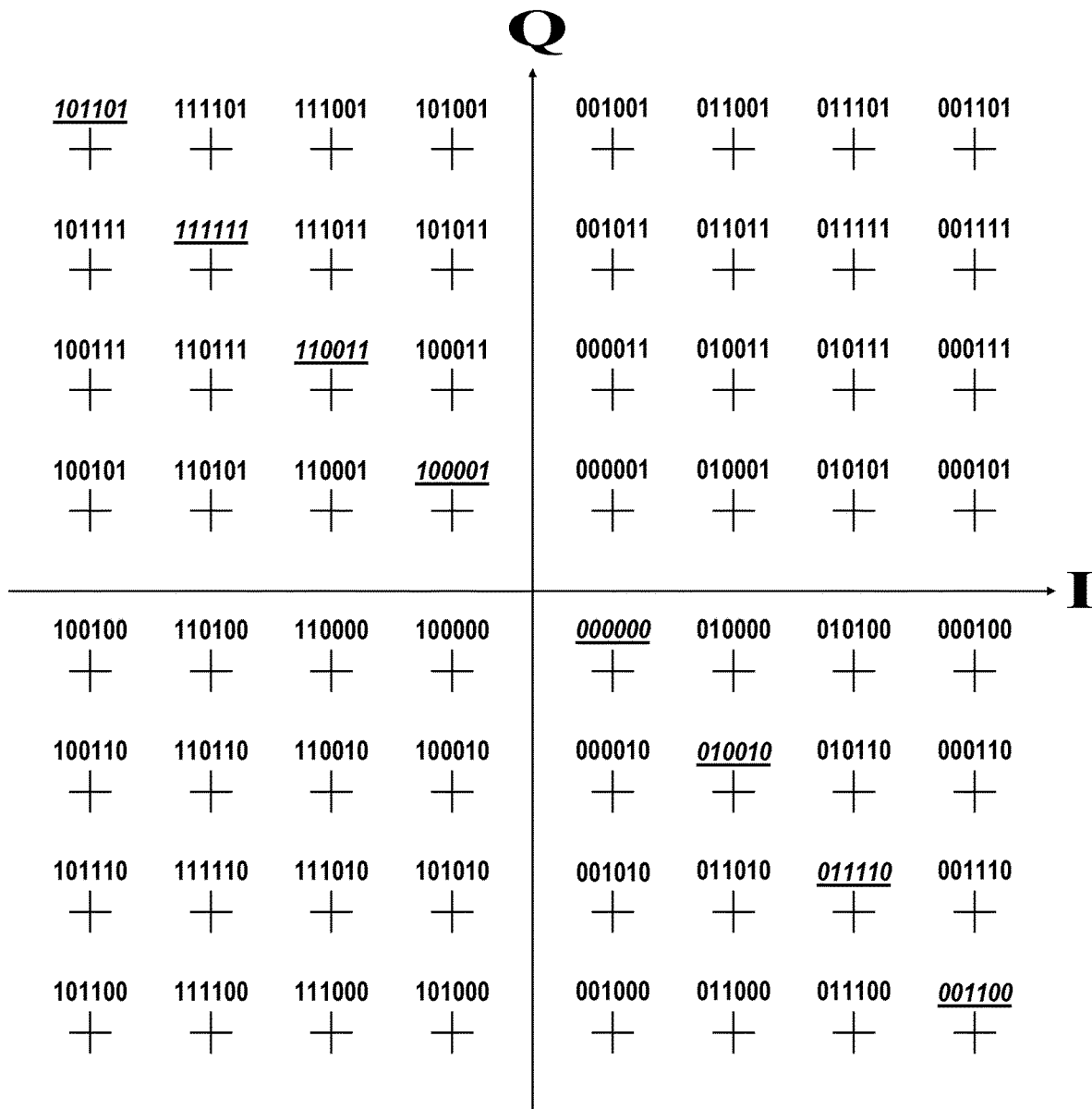

FIG. 43 is an eighth Gray mapping of 64 QAM symbol constellations that modifies the FIG. 42 seventh Gray mapping by twisting the pattern of map labels in each quadrant about one of its diagonal axes, thereby exchanging the positions of innermost and outermost lattice-point labels in each quadrant. This reduces the maximum peak power associated with either of the 000000 or 100001 lattice-point labels being associated with the respective QAM modulation of all OFDM carriers during a COFDM symbol. This should improve PAPR somewhat further when the QAM mappers 71 and 72 use respective ones of the sixth and eighth Gray maps of 64 QAM symbol constellations, rather than respective ones of the sixth and seventh Gray maps of 64 QAM symbol constellations.

Figure 44:
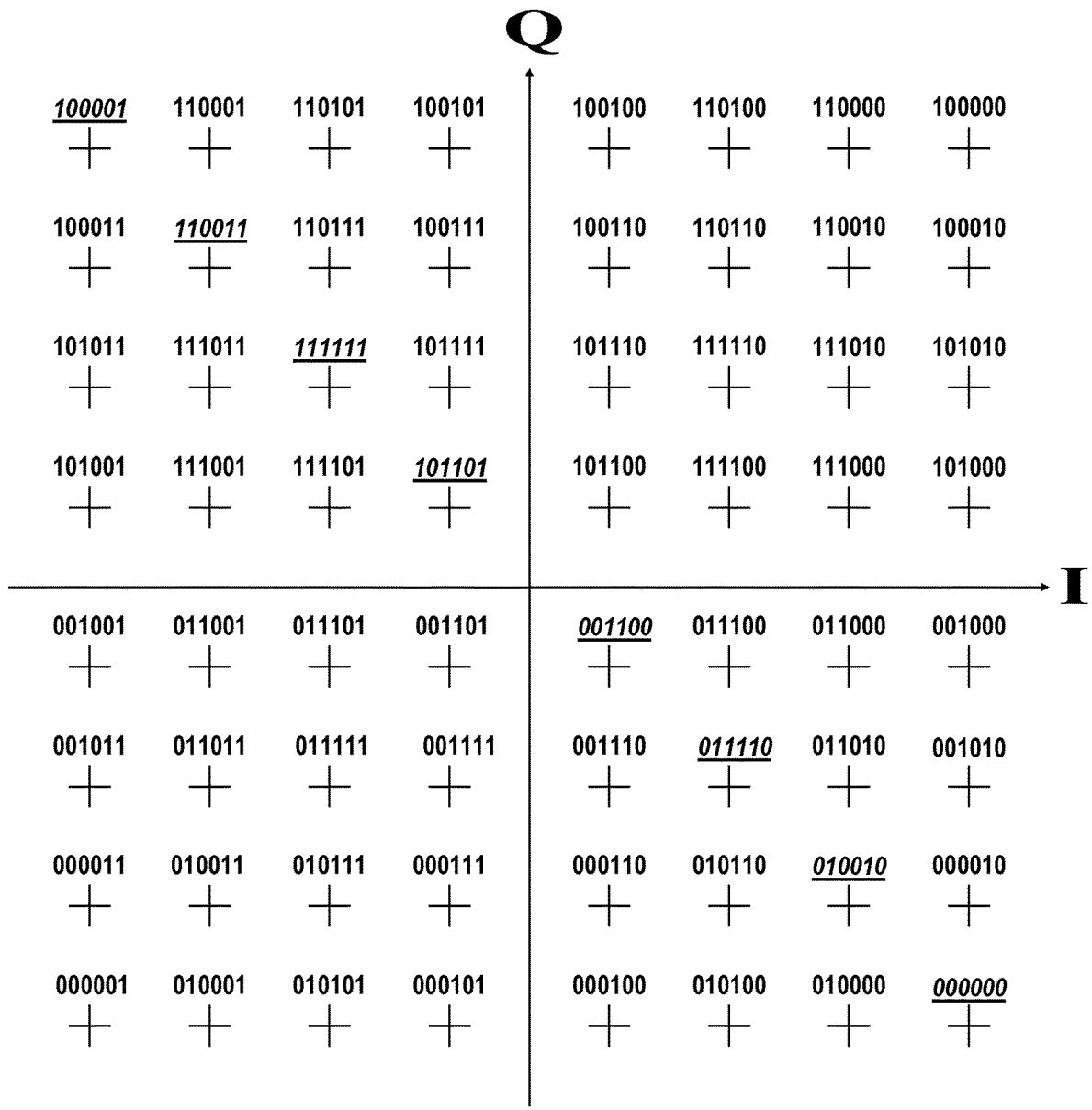

FIG. 44 is a ninth Gray mapping of 64 QAM symbol constellations that that flips the sixth Gray mapping over by rotating the FIG. 41 sixth Gray map 180° around its 000001-to-100000 diagonal axis. QAM mappers 71 and 72 using respective ones of the FIG. 40 fifth Gray map and the FIG. 44 ninth Gray map of 64 QAM symbol constellations support BRA to provide the same shaping gain, as associated with QAM mappers 71 and 72 using respective ones of the FIG. 40 fifth Gray map and the FIG. 41 sixth Gray map of 64 QAM symbol constellations. Whenever the lattice-point labels of the FIG. 40 fifth Gray map and the FIG. 44 ninth Gray map of 64 QAM symbol constellations are both 000000, 000001, 100000 or 100001 throughout an entire OFDM symbol, their OFDM subcarriers are modulated antipodally, to curtail their combined peak power in a way similar to that of SCC. So, when the QAM mappers 71 and 72 use respective ones of the fifth and the ninth Gray maps of 64 QAM symbol constellations, PAPR is substantially lower than when the QAM mappers 71 and 72 use respective ones of the fifth and sixth Gray maps of 64 QAM symbol constellations.

Figure 45:
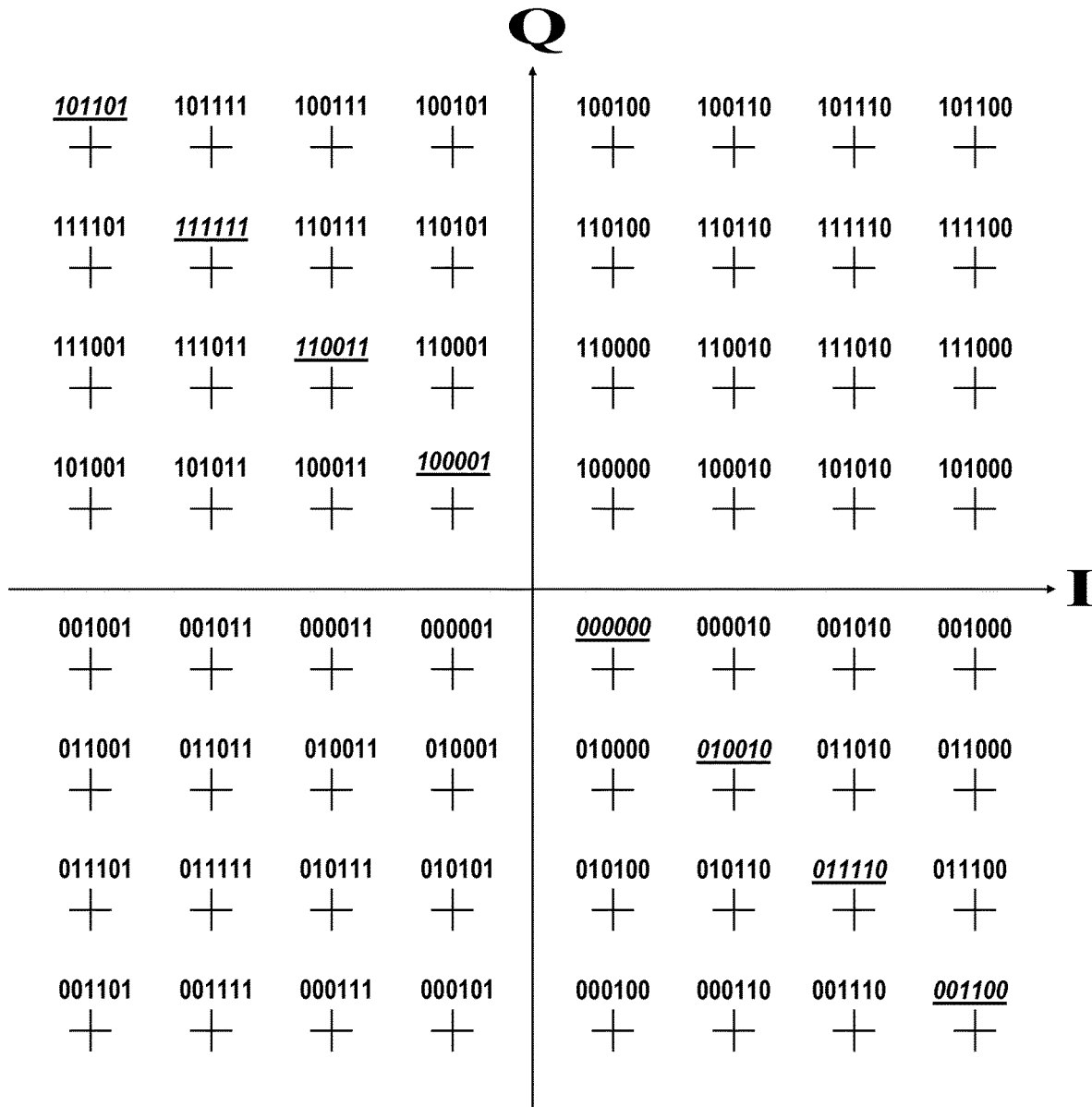

FIG. 45 is a tenth Gray mapping of 64 QAM symbol constellations that modifies the FIG. 44 ninth Gray mapping by twisting the pattern of map labels in each quadrant about one of its diagonal axes, thereby exchanging the positions of innermost and outermost lattice-point labels in each quadrant. This reduces the maximum peak power associated with any of the 000000, 000001, 100000 and 100001 lattice-point labels being associated with the respective QAM modulation of all OFDM carriers during a COFDM symbol. This should improve PAPR somewhat further when the QAM mappers 71 and 72 use respective ones of the fifth and tenth Gray maps of 64 QAM symbol constellations, rather than respective ones of the fifth and sixth Gray maps of 64 QAM symbol constellations.

FIGS. 46, 47, 48, 49, 50 and 51 depict eleventh, twelfth, thirteenth, fourteenth, fifteenth and sixteenth different Gray mappings of 64 QAM symbol constellations, which Gray mappings each arrange the eight palindromic lattice-point labels along a diagonal of its lattice. The diagonal extends through the +I, +Q and −I, −Q quadrants of each of these mappings.

Figure 46:
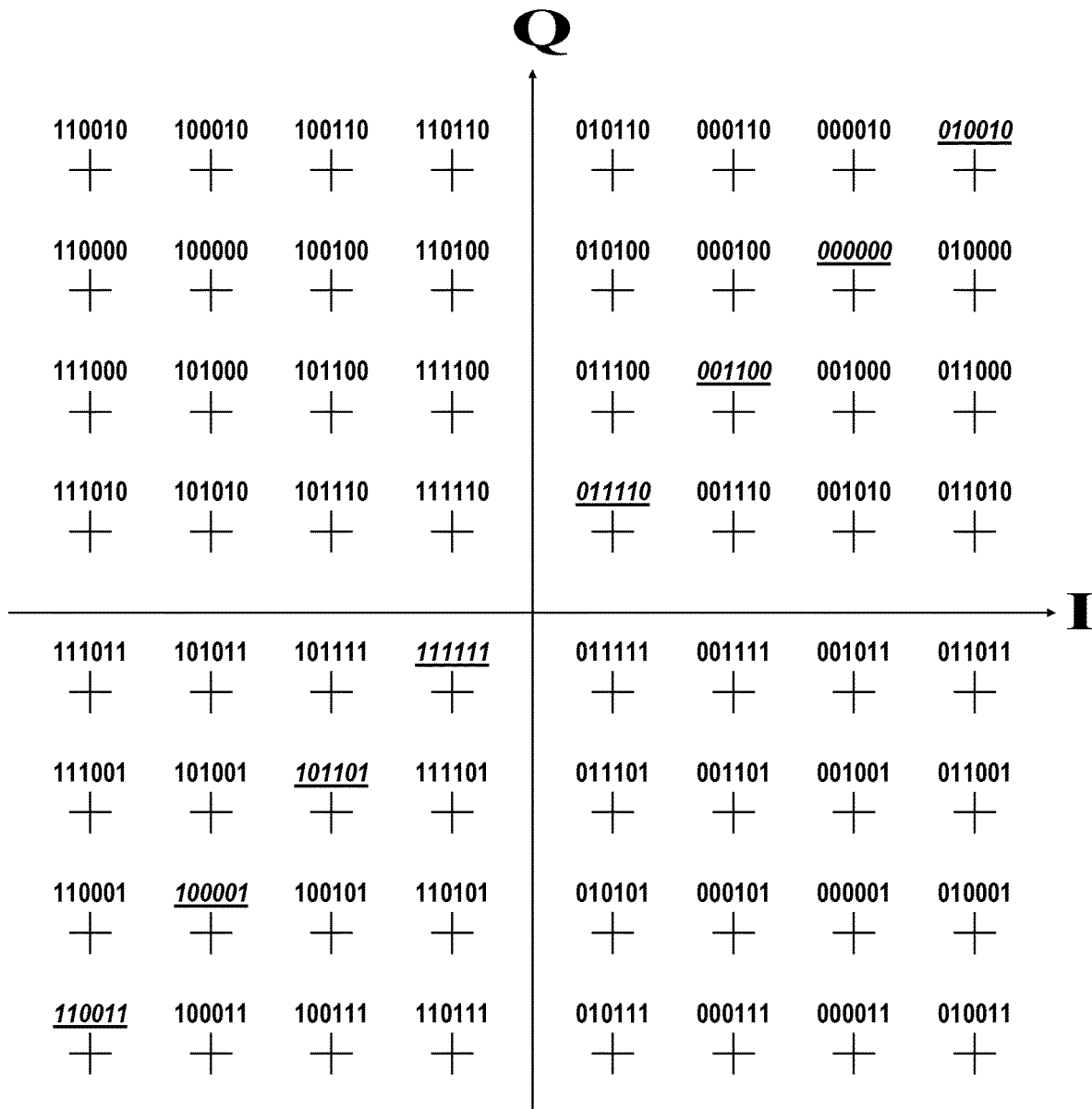
FIGS. 46, 47, 48, 49, 50 and 51 are eleventh, twelfth, thirteenth, fourteenth, fifteenth and sixteenth different Gray mappings of 64 QAM symbol constellations in a second group for consideration, which Gray mappings each arrange along a diagonal of its lattice those lattice-point labels each having mirror symmetry regarding the order of ONE and ZERO bits therein.
Figure 47:
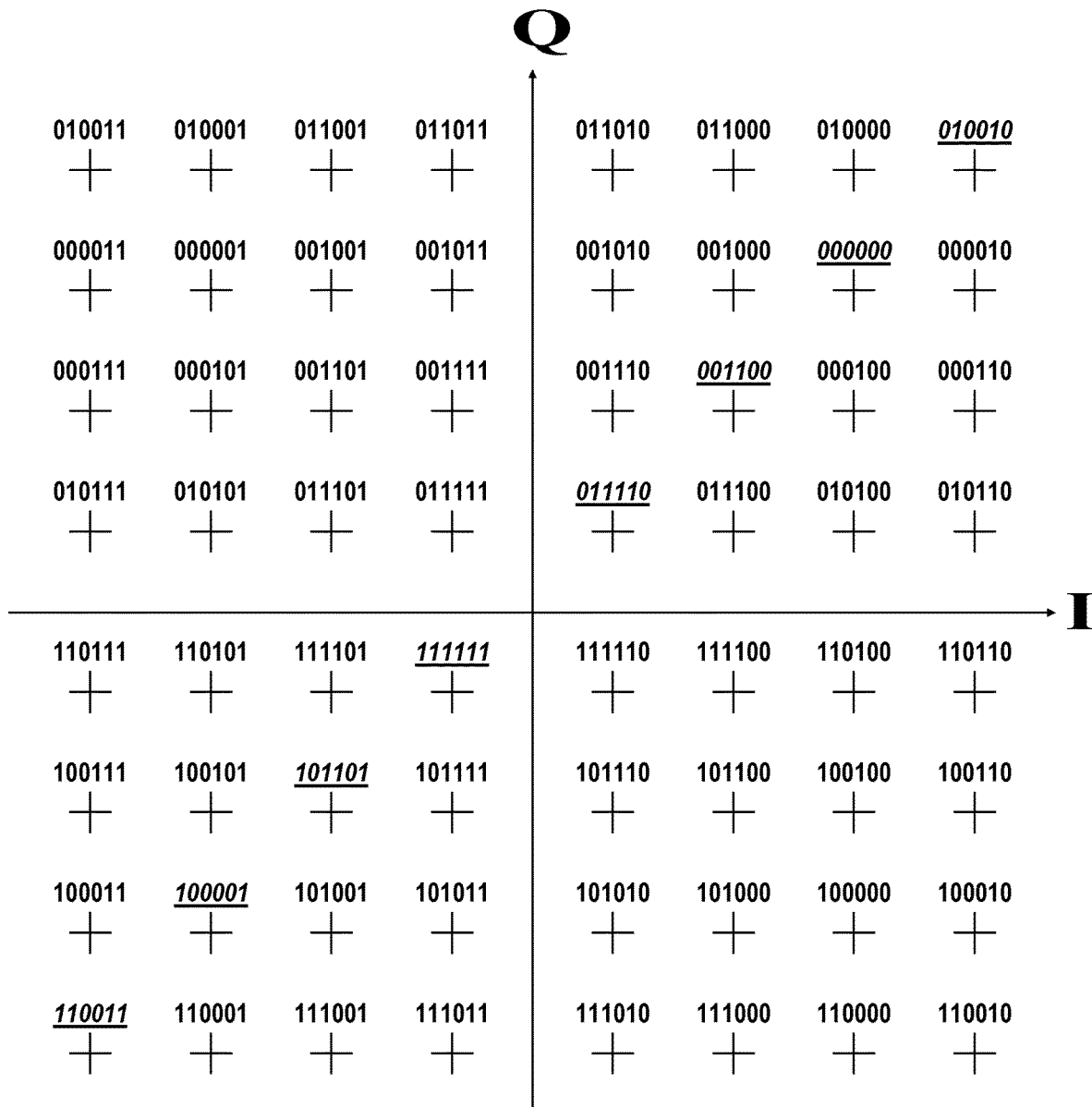

FIGS. 46 and 47 respectively depict eleventh and twelfth Gray maps of lattice points in 64QAM symbol constellations that the QAM mappers 71 and 72 respectively provide in a physical layer pipe in some COFDM DCM transmitter apparatuses embodying aspects of the invention. The FIG. 46 eleventh Gray map implements transmission of coded data in one of the sidebands of a COFDM DCM signal, and the FIG. 47 twelfth Gray map implements transmission of the same coded data in the other sideband of that COFDM DCM signal. The FIG. 46 and FIG. 47 Gray maps govern quadrature amplitude modulation of their respective sets of OFDM carriers according to eleventh and twelfth 64 QAM Gray mapping patterns, respectively. A sequence of map labels 010010, 000000, 001100, 011110, 111111, 101101, 100001, 110011 extends along a diagonal from the top right corner of each of the FIG. 46 and FIG. 47 Gray maps to its bottom left corner.

The 010010 and 1100011 palindromic lattice-point labels are located at similar corner lattice points in both of the FIG. 46 and FIG. 47 Gray maps. Therefore, there is no reduction of PAPR compared with conventional COFDM when QAM mappers 71 and 72 use respective ones of the FIG. 46 eleventh Gray map and the FIG. 47 twelfth Gray map of 64 QAM symbol constellations. This is because peak power is as large as in conventional COFDM when lattice-point labels in both sets of QAM symbol constellations have the same 110010 or 010011 lattice-point label throughout an entire OFDM symbol. Average power over a series of COFDM symbols conveying random coded data is similar to that for conventional COFDM.

Rotation of one of FIG. 46 and FIG. 47 Gray maps by π radians or 180° does not result in a pair of mappings for COFDM DCM with reduced PAPR compared to that of conventional COFDM. Such rotation causes the 110010 and 010011 lattice-point labels at the corners of the QAM constellations to be similarly positioned. Peak power is as large as in conventional COFDM when lattice-point labels in both sets of QAM symbol constellations have the same 000001 or 100000 lattice-point label throughout an entire OFDM symbol.

Figure 48:
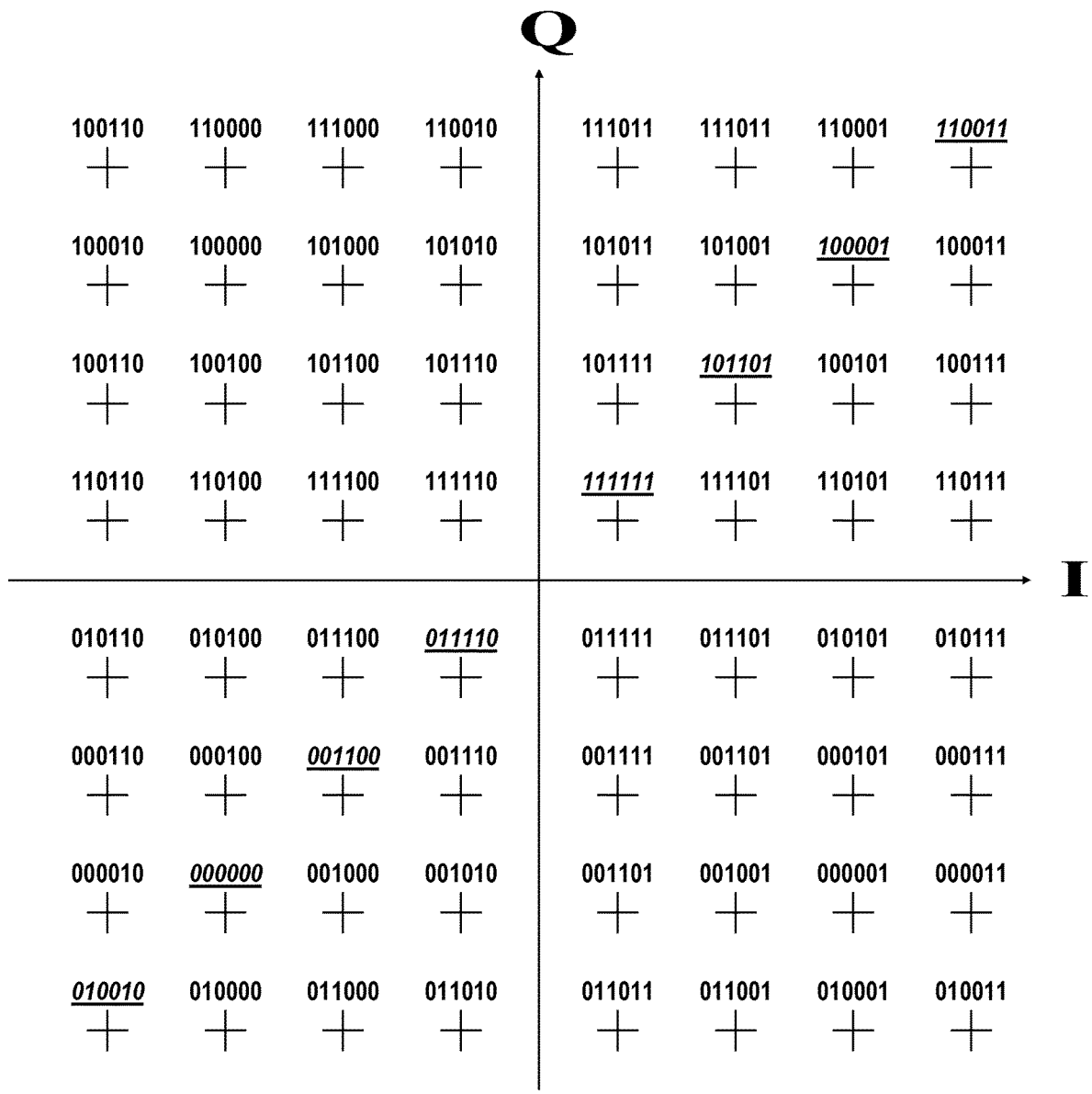

FIG. 48 depicts a thirteenth Gray mapping of 64 QAM symbol constellations that flips the eleventh Gray mapping over by rotating the FIG. 46 eleventh Gray map 180° around its 110010-to-010011 diagonal axis. QAM mappers 71 and 72 using respective ones of the FIG. 47 twelfth Gray map and the FIG. 48 thirteenth Gray map of 64 QAM symbol constellations support BRA to provide the same shaping gain, as associated with QAM mappers 71 and 72 using respective ones of the FIG. 46 eleventh Gray map and the FIG. 47 twelfth Gray map of 64 QAM symbol constellations. This is because the twelfth and thirteenth Gray maps of 64 QAM have significantly greater labeling diversity than the eleventh and twelfth Gray maps of 64 QAM do. Whenever the lattice-point labels of the FIG. 47 twelfth Gray map and the FIG. 48 thirteenth Gray map of 64 QAM symbol constellations are both 010010, 010011, 110010 and 110011 throughout an entire OFDM symbol, their OFDM subcarriers are modulated antipodally, to curtail their combined peak power in a way similar to that of SCC. So, when the QAM mappers 71 and 72 use respective ones of the twelfth and the thirteenth Gray maps of 64 QAM symbol constellations, PAPR is substantially lower than when the QAM mappers 71 and 72 use respective ones of the eleventh and twelfth Gray maps of 64 QAM symbol constellations.

Figure 49:
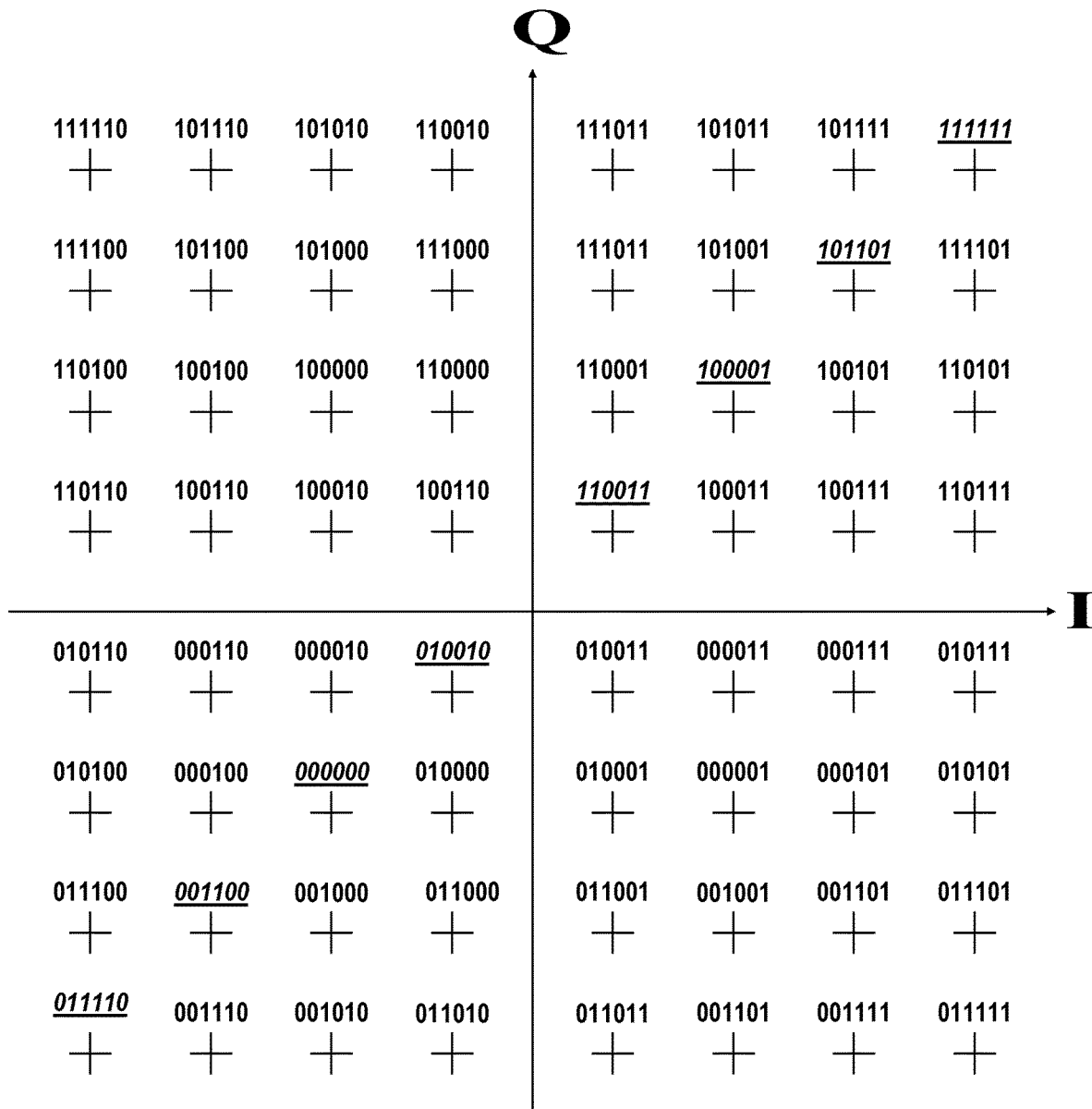

FIG. 49 is a fourteenth Gray mapping of 64 QAM symbol constellations that modifies the FIG. 48 thirteenth Gray mapping by twisting the pattern of map labels in each quadrant about one of its diagonal axes, thereby exchanging the positions of innermost and outermost lattice-point labels in each quadrant. This reduces the maximum peak power associated with any of the 010010, 010011, 110010 and 110011 lattice-point labels being associated with the respective QAM modulation of all OFDM carriers during a COFDM symbol. This should improve PAPR somewhat further when the QAM mappers 71 and 72 use respective ones of the twelfth and fourteenth Gray maps of 64 QAM symbol constellations, rather than respective ones of the twelfth and thirteenth Gray maps of 64 QAM symbol constellations.

Figure 50:
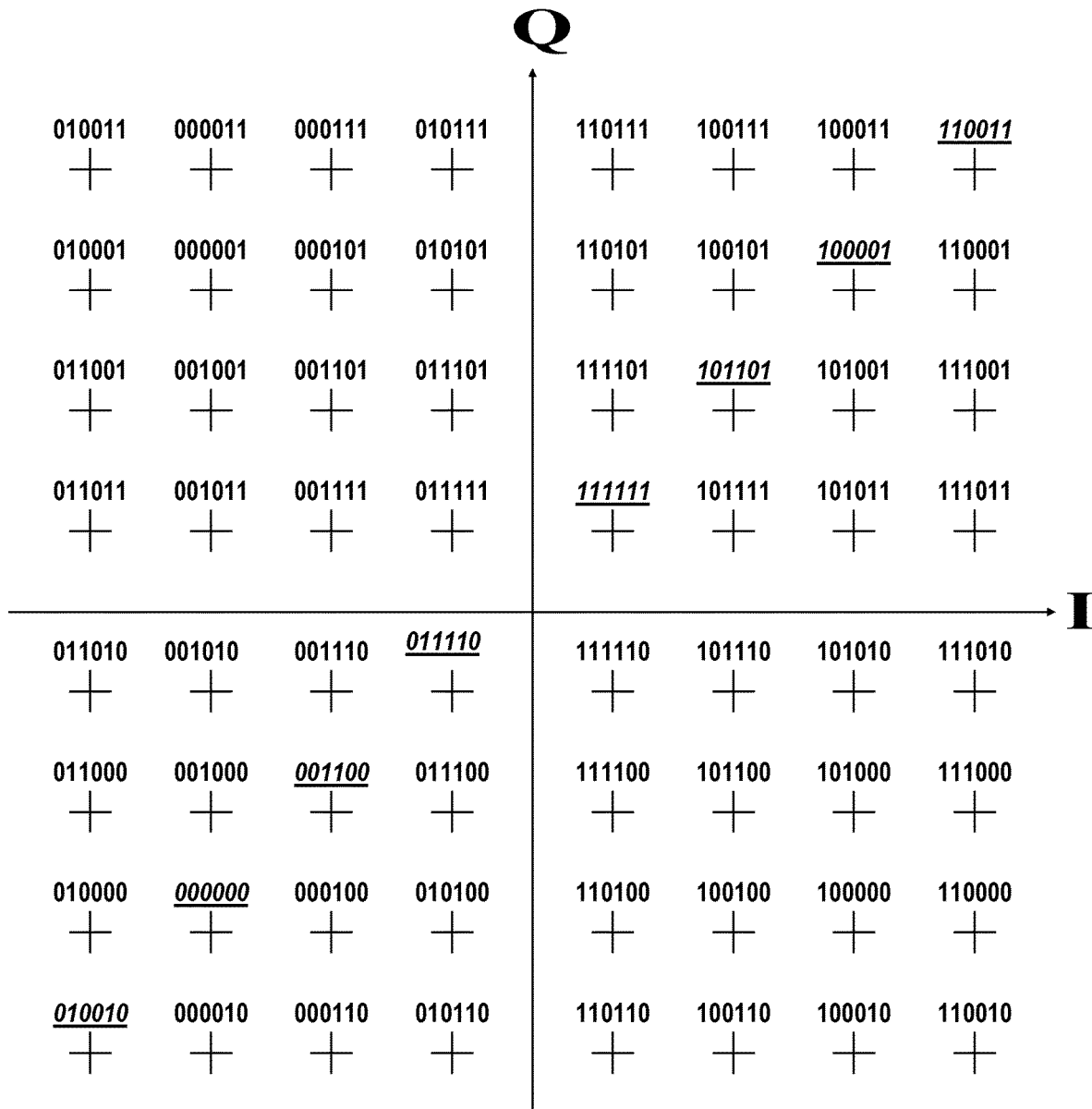

FIG. 50 is a fifteenth Gray mapping of 64 QAM symbol constellations that that flips the twelfth Gray mapping over by rotating the FIG. 47 twelfth Gray map 180° around its 010011-to-110010 diagonal axis. QAM mappers 71 and 72 using respective ones of the FIG. 46 eleventh Gray map and the FIG. 50 fifteenth Gray map of 64 QAM symbol constellations secure support BRA to provide the same shaping gain, as that associated with QAM mappers 71 and 72 using respective ones of the FIG. 46 eleventh Gray map and the FIG. 47 twelfth Gray map of 64 QAM symbol constellations. Whenever the lattice-point labels of the FIG. 46 eleventh Gray map and the FIG. 50 fifteenth Gray map of 64 QAM symbol constellations are both 010010, 010011, 110010 and 110011 throughout an entire OFDM symbol, their OFDM subcarriers are modulated antipodally, to curtail their combined peak power a way similar to that of SCC. So, when the QAM mappers 71 and 72 use respective ones of the eleventh and the fifteenth Gray maps of 64 QAM symbol constellations, PAPR is substantially lower than when the QAM mappers 71 and 72 use respective ones of the eleventh and twelfth Gray maps of 64 QAM symbol constellations.

Figure 51:
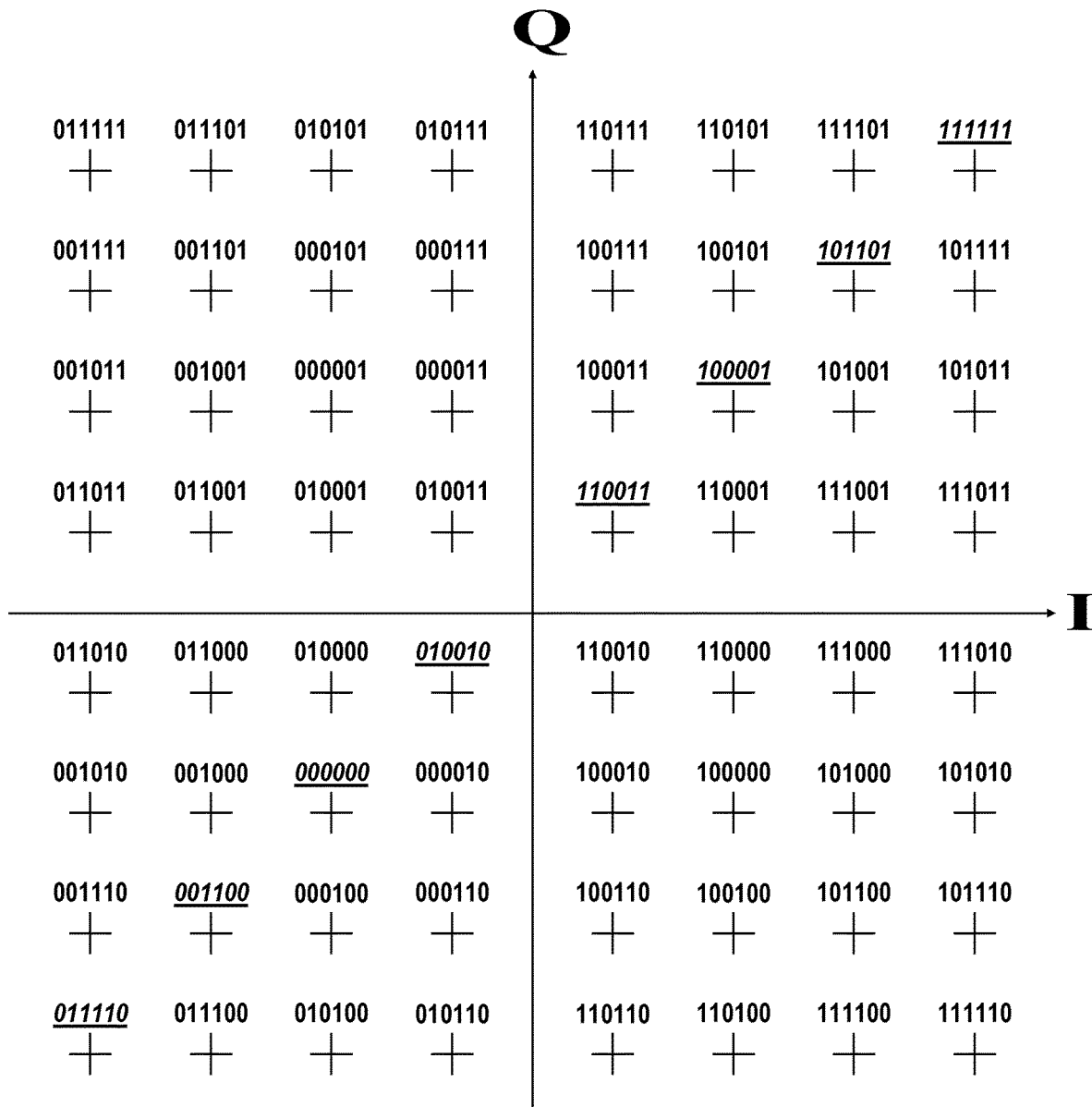

FIG. 51 is a sixteenth Gray mapping of 64 QAM symbol constellations that modifies the FIG. 50 fifteenth Gray mapping by twisting the pattern of map labels in each quadrant about one of its diagonal axes, thereby exchanging the positions of innermost and outermost lattice-point labels in each quadrant. This reduces the maximum peak power associated with any of the 010010, 010011, 110010 and 110011 lattice-point labels being associated with the respective QAM modulation of all OFDM carriers during a COFDM symbol. This should improve PAPR somewhat further when the QAM mappers 71 and 72 use respective ones of the eleventh and sixteenth Gray maps of 64 QAM symbol constellations, rather than respective ones of the eleventh and fifteenth Gray maps of 64 QAM symbol constellations.

The first group of different Gray maps of 64 QAM symbol constellations depicted in FIGS. 40, 41, 42, 43, 44 and 45 were compared with the second group of different Gray maps of 64QAM symbol constellations depicted in FIGS. 46, 47, 48, 49, 50 and 51 to discern the features they share. The FIG. 40 fifth Gray map and the FIG. 41 sixth Gray map have similar palindromic lattice-point labels in diagonally opposite corners of each of them. So do the FIG. 46 eleventh Gray map and the FIG. 47 twelfth Gray map. The lattice-point labels in the other corners of the FIG. 40 fifth Gray map have similar values to the lattice-point labels in the other corners of the FIG. 41 sixth Gray map have similar values except for a 180° respective rotation of those other corners in the two Gray maps. This is characteristic of the FIG. 46 eleventh Gray map and the FIG. 47 twelfth Gray map as well. Consideration was made as to whether similar characteristics could be obtained by re-mapping the FIG. 30 and FIG. 31 Gray maps of 64 QAM symbol constellations by translating the positions of their lattice point labels. There are more than one set such re-mappings that provide the desired characteristics, a favored one of those sets being described infra.

Figure 52:
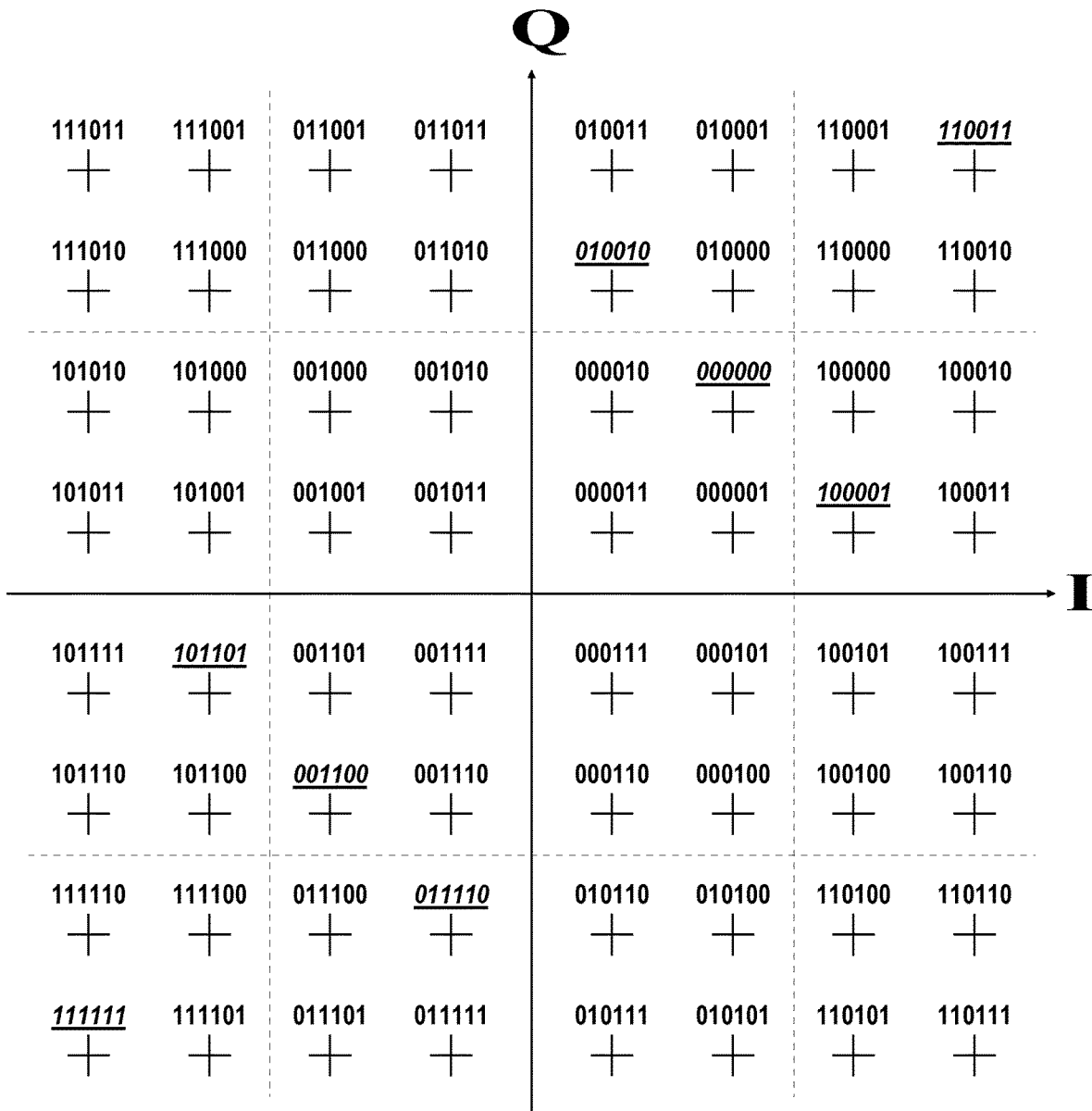
FIGS. 52, 53, 54, 55, 56 and 57 are seventeenth, eighteenth, nineteenth, twentieth, twenty-first and twenty-second different Gray mappings of 64 QAM symbol constellations each rearranging to good advantage one of the first and second Gray mappings of 64 QAM symbol constellations depicted in FIGS. 30 and 31.
Figure 53:
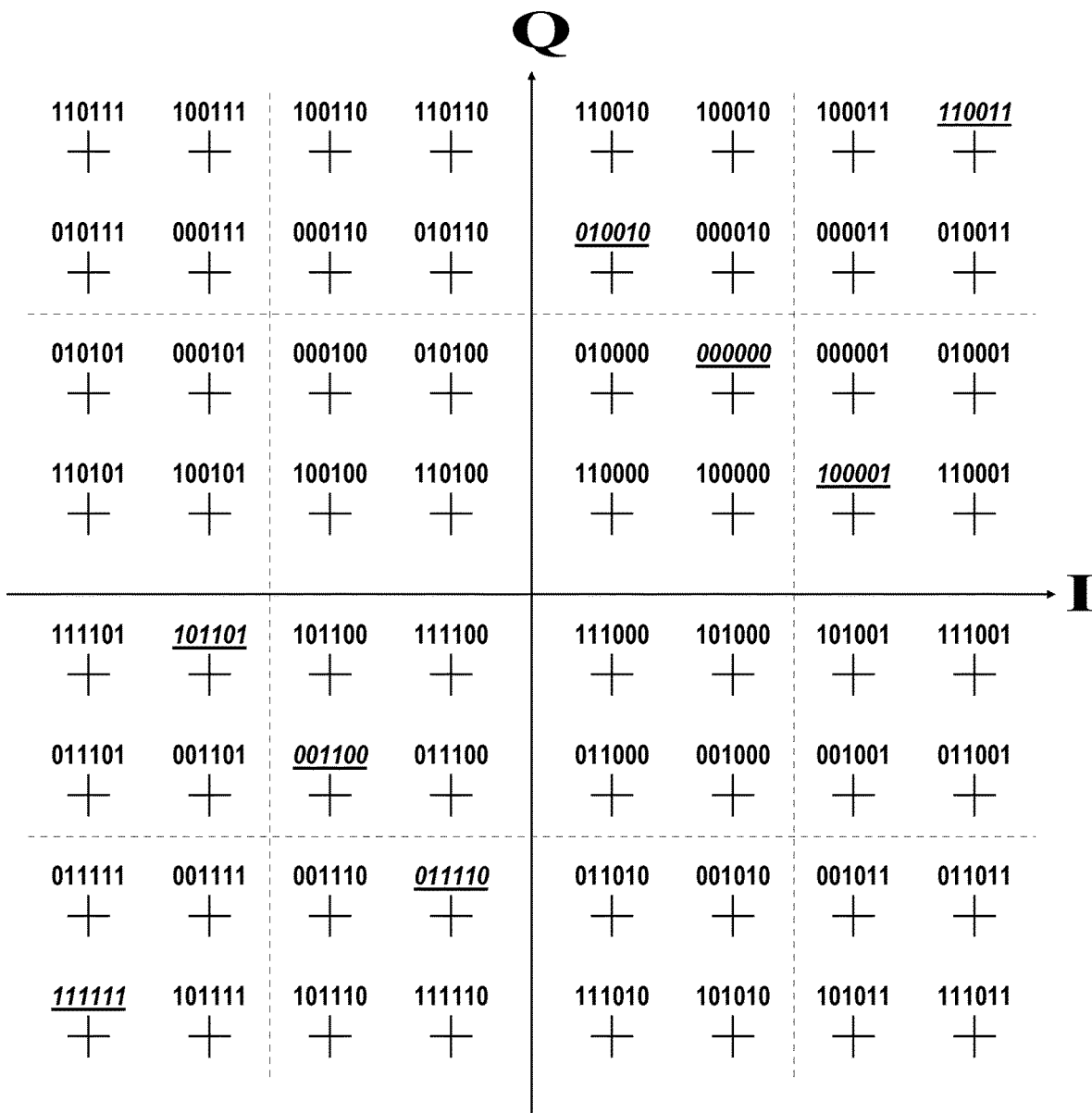

FIG. 52 is a seventeenth Gray map of a 64 QAM constellation, which repositions the +I, +Q quadrant of the FIG. 30 first Gray map of a 64 QAM constellation, to be in the center of that seventeenth Gray map of the 64 QAM constellation. FIG. 53 is a eighteenth Gray map of a 64 QAM constellation, which repositions the +I, +Q quadrant of the FIG. 31 second Gray map of a 64 QAM constellation, to be in the center of that eighteenth Gray map of the 64 QAM constellation. Palindromic lattice-point labels 110011 and 111111 are positioned at similar corners of both the seventeenth and eighteenth Gray maps of 64 QAM constellations, so PAPR of COFDM DCM using these 64 QAM constellations will be no better than for conventional COFDM. This is because peak power is as large as in conventional COFDM when both sets of QAM symbol constellations have the same 110011 and 111111 lattice-point label throughout an entire OFDM symbol. Average power over a series of COFDM symbols conveying random coded data is similar to that for conventional COFDM.

Figure 54:
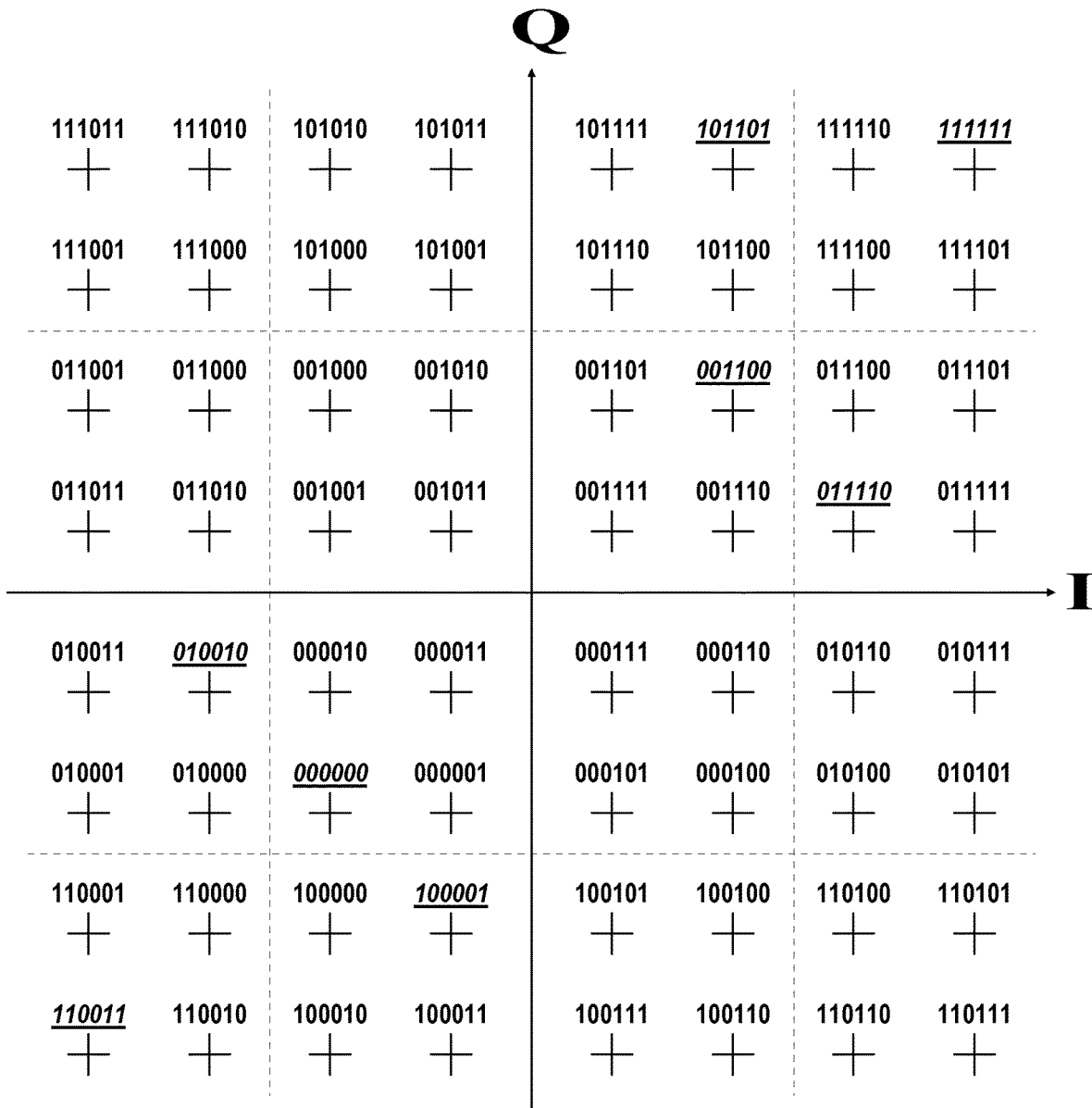

FIG. 54 depicts a nineteenth Gray mapping of 64 QAM symbol constellations that flips the seventeenth Gray mapping over by rotating the FIG. 52 seventeenth Gray map 180° around its 111011-to-110111 diagonal axis. QAM mappers 71 and 72 using respective ones of the FIG. 54 nineteenth Gray map and the FIG. 53 eighteenth Gray map of 64 QAM symbol constellations support BRA to provide the same shaping gain as associated with QAM mappers 71 and 72 using respective ones of the FIG. 52 seventeenth Gray map and the FIG. 53 eighteenth Gray map of 64 QAM symbol constellations. Whenever the lattice-point labels of the FIG. 53 eighteenth Gray map and the FIG. 54 nineteenth Gray map of 16 QAM symbol constellations are both 110011, 110111, 111011 or 111111 throughout an entire OFDM symbol, their OFDM subcarriers are modulated antipodally, to curtail their combined peak power in a way similar to that of SCC. So, when the QAM mappers 71 and 72 use respective ones of the eighteenth and nineteenth Gray maps of 64 QAM symbol constellations, PAPR is substantially lower than when the QAM mappers 71 and 72 use respective ones of the seventeenth and eighteenth Gray maps of 64 QAM symbol constellations.

Figure 55:
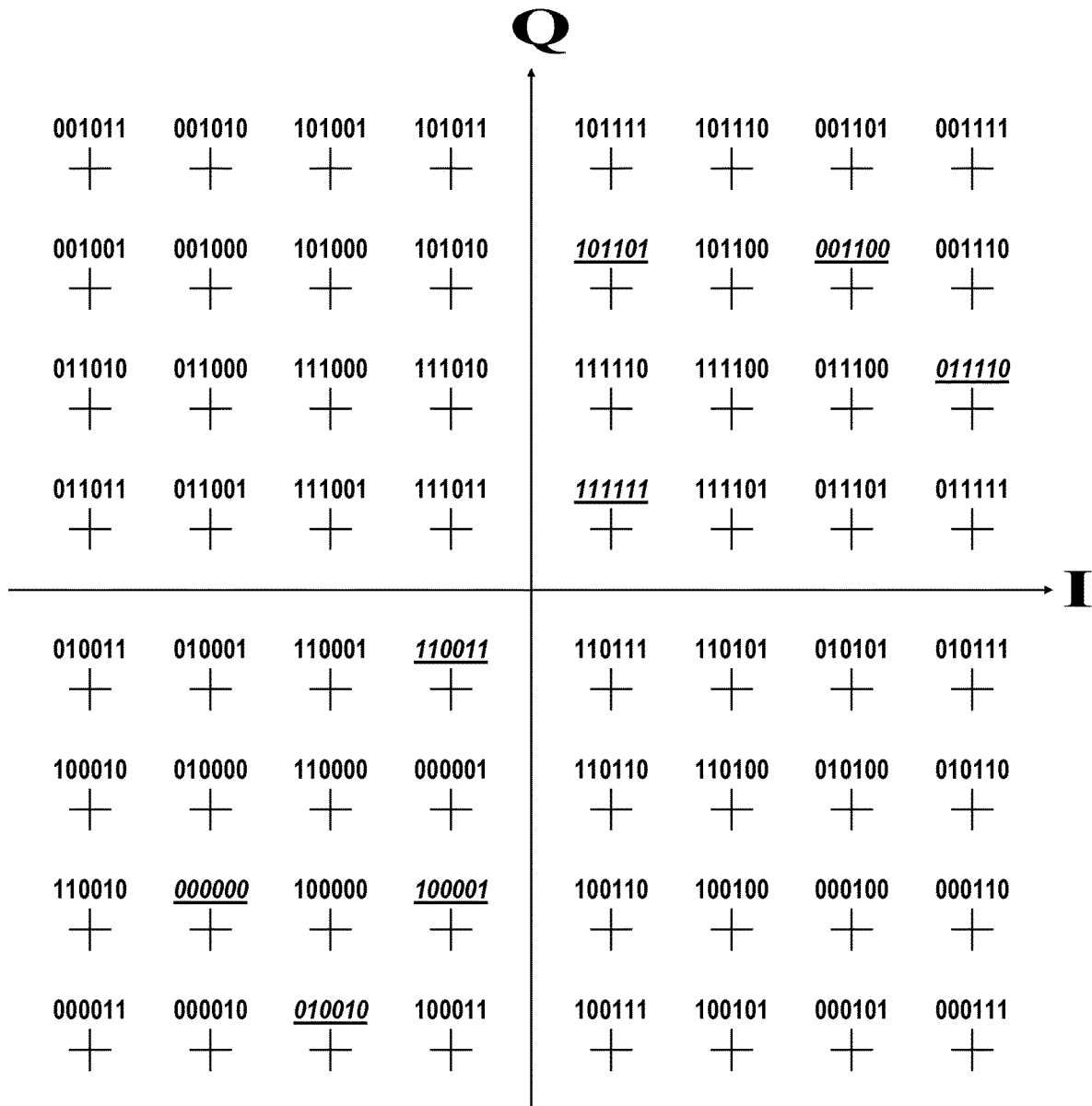

FIG. 55 is a twentieth Gray mapping of 64 QAM symbol constellations that modifies the FIG. 54 nineteenth Gray mapping by twisting the pattern of map labels in each quadrant about one of its diagonal axes, thereby exchanging the positions of innermost and outermost lattice-point labels in each quadrant. This reduces the maximum peak power associated with any of the 110011, 110111, 111011 or 111111 lattice-point labels being associated with the respective QAM modulation of all OFDM carriers during a COFDM symbol. This should improve PAPR somewhat further when the QAM mappers 71 and 72 use respective ones of the eighteenth and twentieth Gray maps of 64 QAM symbol constellations, rather than respective ones of the eighteenth and nineteenth Gray maps of 64 QAM symbol constellations.

Figure 56:
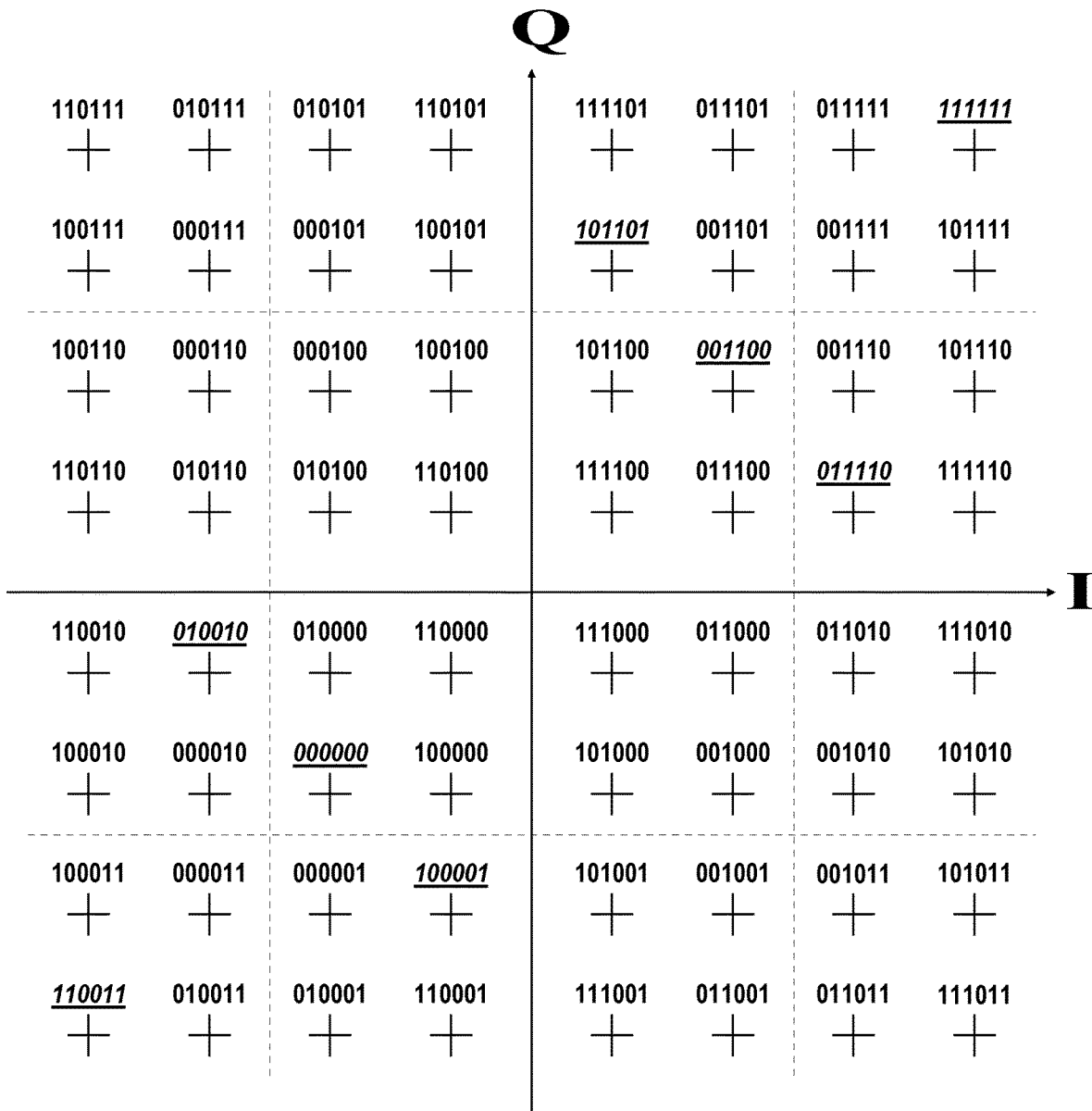

FIG. 56 depicts an twenty-first Gray mapping of 64 QAM symbol constellations that flips the eighteenth Gray mapping over by rotating the FIG. 53 eighteenth Gray map 180° around its 110111-to-111011 diagonal axis. QAM mappers 71 and 72 using respective ones of the FIG. 58 twenty-first Gray map and the FIG. 52 seventeenth Gray map of 64 QAM symbol constellations support BRA to provide the same shaping gain as associated with QAM mappers 71 and 72 using respective ones of the FIG. 52 seventeenth Gray map and the FIG. 53 eighteenth Gray map of 64 QAM symbol constellations. Whenever the lattice-point labels of the FIG. 52 seventeenth Gray map and the FIG. 56 twenty-first Gray map of 16 QAM symbol constellations are both 110011 or 111111 throughout an entire OFDM symbol, their OFDM subcarriers are modulated antipodally, to curtail their combined peak power in a way similar to that of SCC. So, when the QAM mappers 71 and 72 use respective ones of the seventeenth and twenty-first Gray maps of 64 QAM symbol constellations, PAPR is substantially lower than when the QAM mappers 71 and 72 use respective ones of the seventeenth and eighteenth Gray maps of 64 QAM symbol constellations.

Figure 57:
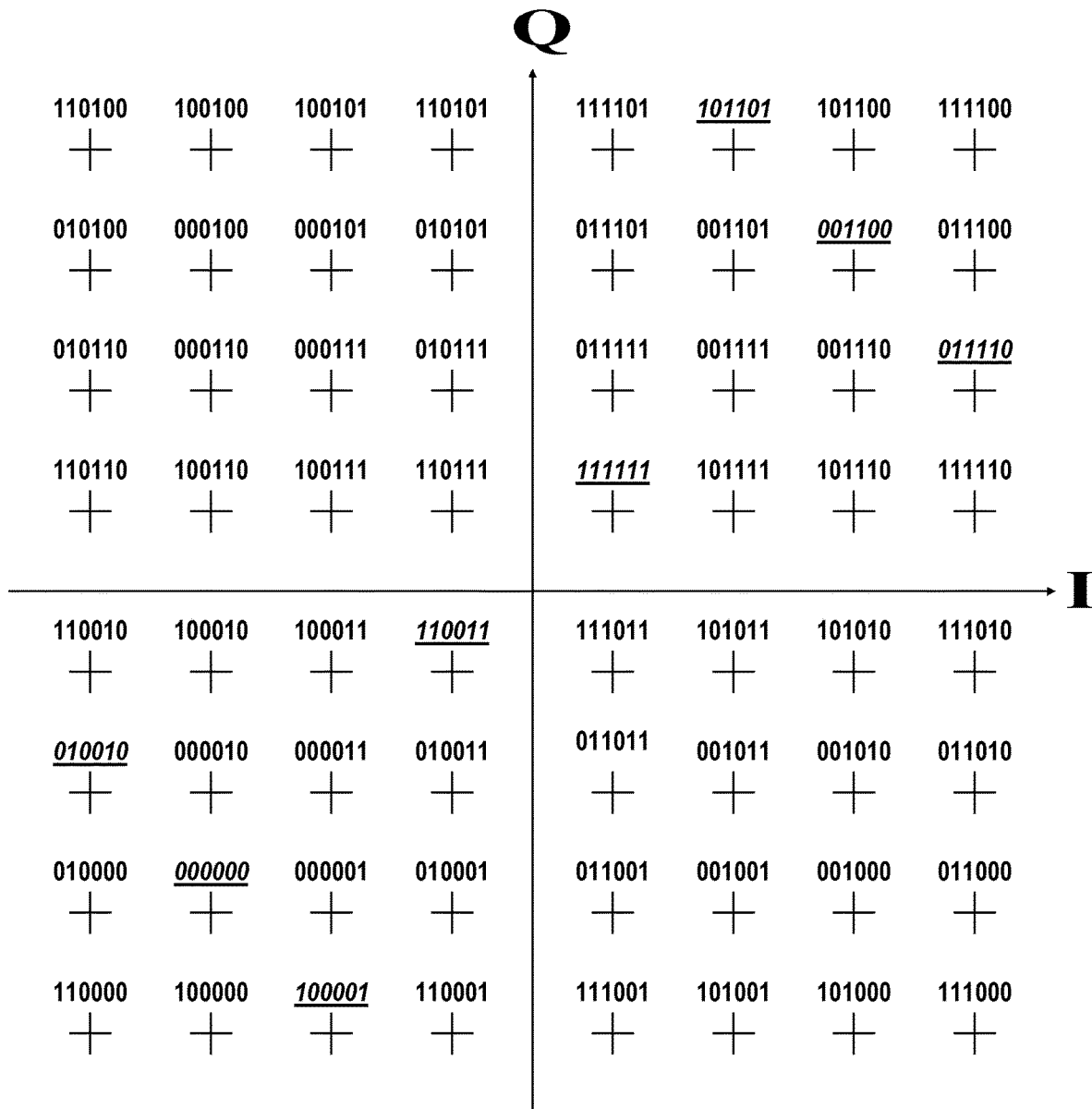

FIG. 57 is a twenty-second Gray mapping of 64 QAM symbol constellations that modifies the FIG. 56 twenty-first Gray mapping by twisting the pattern of map labels in each quadrant about one of its diagonal axes, thereby exchanging the positions of innermost and outermost lattice-point labels in each quadrant. This reduces the maximum peak power associated with any of the 110011, 110111, 111011 or 111111 lattice-point labels being associated with the respective QAM modulation of all OFDM carriers during a COFDM symbol. This should improve PAPR somewhat further when the QAM mappers 71 and 72 use respective ones of the seventeenth and twenty-second Gray maps of 64 QAM symbol constellations, rather than respective ones of the seventeenth and twenty-first Gray maps of 64 QAM symbol constellations.

Figure 58:
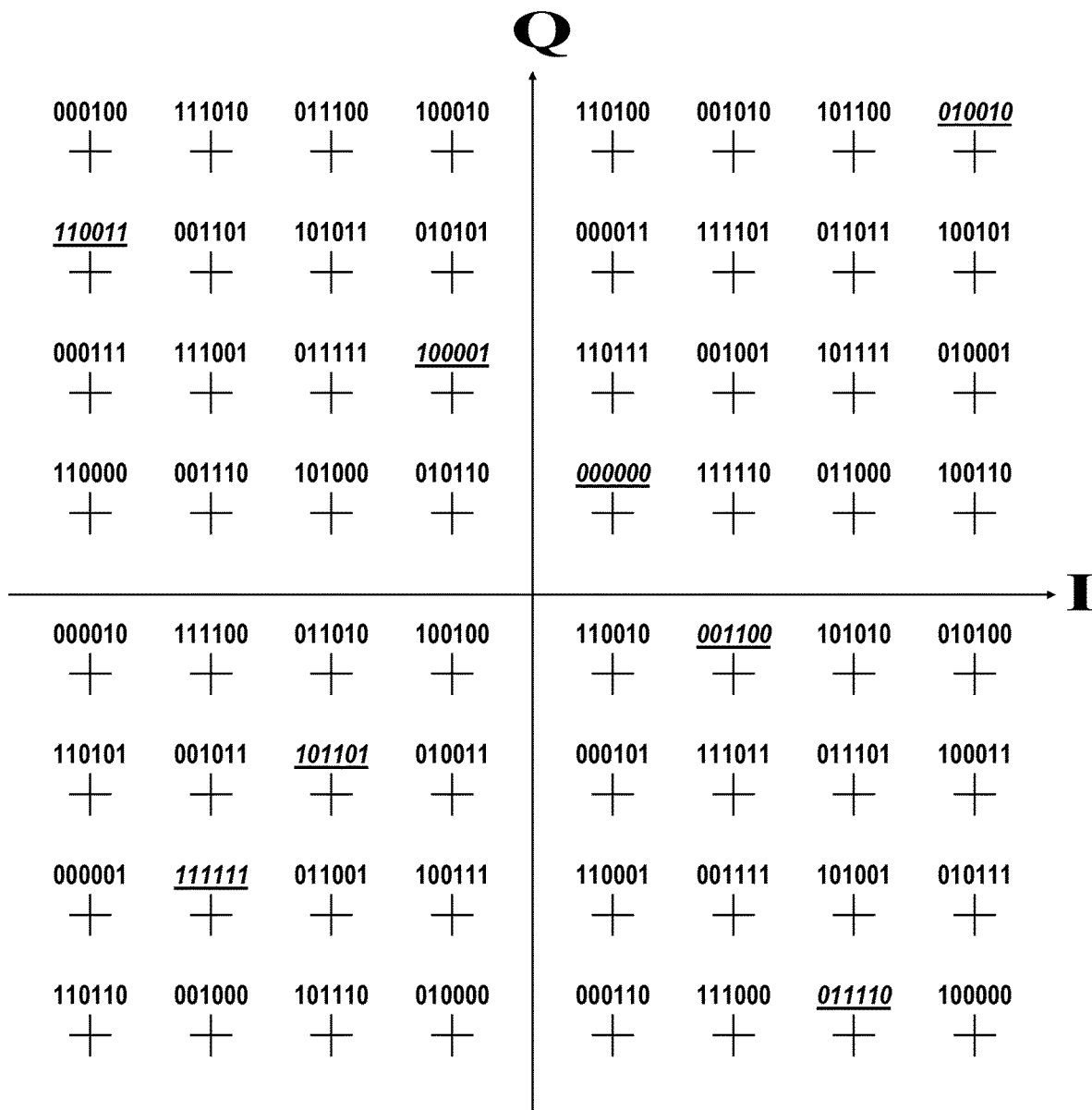
FIGS. 58 and 59 are respective optimized mappings of 64 QAM symbol constellations, with labeling diversity between them.
Figure 59:
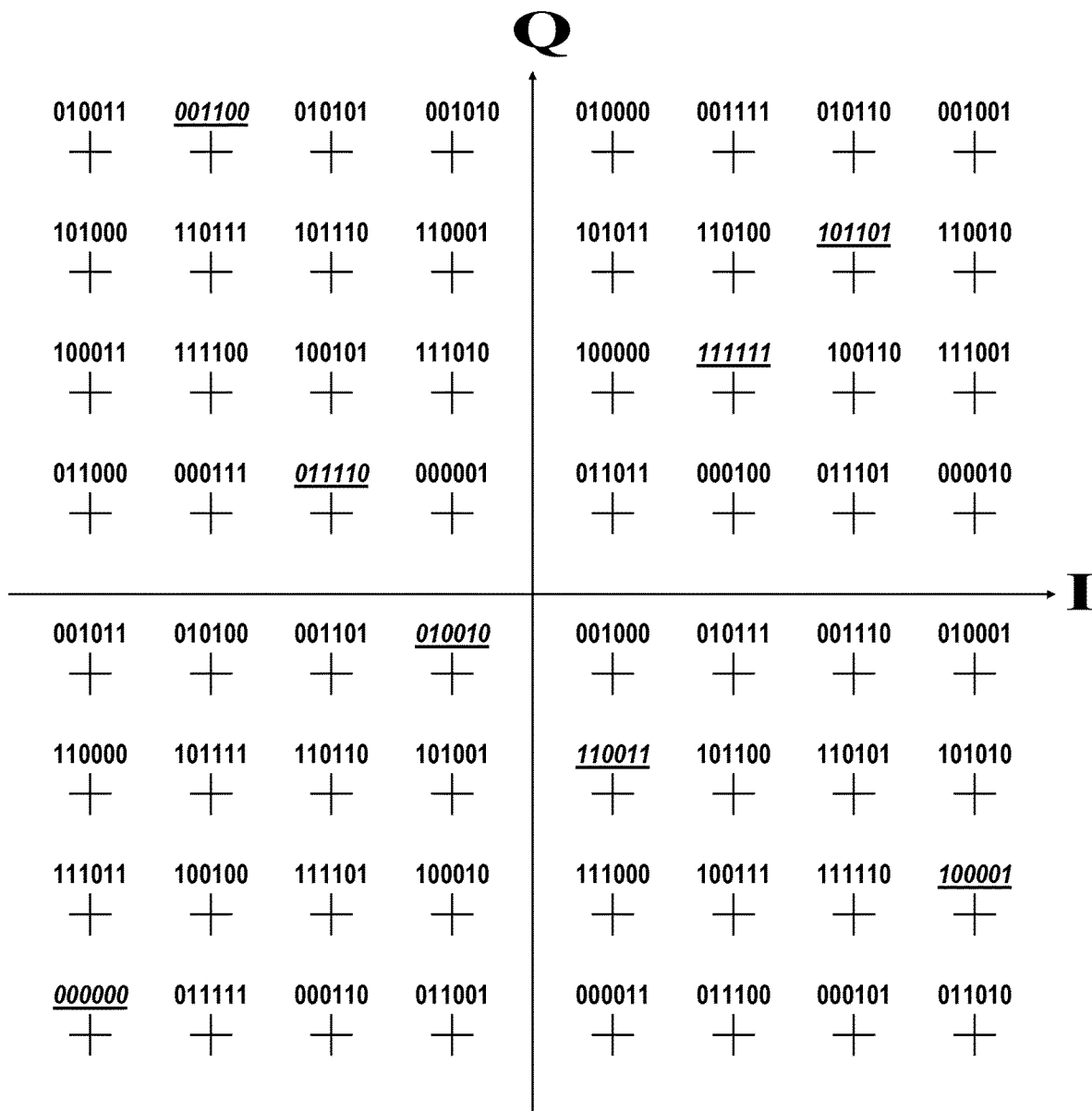

FIGS. 58 and 59 depict first and second optimized maps of lattice points in 64 QAM symbol constellations that the QAM mappers 71 and 72 respectively provide in a physical layer pipe in some COFDM DCM transmitter apparatuses embodying aspects of the invention. The respective 6-bit labels of adjacent points in the lattice of an optimized mapping of 64 QAM differ in three, four or five of their bits, rather than differing in only one or two of their bits. This benefits receiver apparatus employing iterative de-mapping and decoding procedures when reception is via a Rayleigh channel, without impairing reception via an AWGN channel too much.

The FIG. 58 optimized map of 64 QAM symbol constellations was disclosed by Kyle Govindasamy, HongJun Xu and Narushan Pillay in their paper "Space-time block coded spatial modulation with labeling diversity" published September 2017 in *Wiley Online Library* and published January 2018 in *International Journal of Communication Systems*, Vol. 31, No. 1. This paper describes using optimized and Gray maps of 64 QAM symbol constellations together in MIMO wireless transmissions.

The FIG. 59 optimized map of 64 QAM symbol constellations was derived by Allen LeRoy Limberg from the FIG. 58 optimized map using the following technique, which appears applicable for deriving the FIG. 29 optimized map of 64 QAM symbol constellations from the FIG. 28 optimized map. The map labels of the original optimized map of square QAM symbol constellations are mirrored in a first preliminary map, which is then rotated 180° around map center to generate a second preliminary map. Each quadrant of the second preliminary map is then rotated 180° around its own center to generate a final optimized map of square QAM symbol constellations having labeling diversity respective to the initial optimized map of square QAM symbol constellations. So, this pair of optimized maps of 64 QAM symbol constellations is one suited for use in COFDM DCM signals. Other pairs of optimized maps of 64 QAM symbol constellations having labeling diversity are likely possible. The preceding technique can be applied to other forms of non-Gray mapping of square QAM symbol constellations thereby to develop pairs of maps having labeling diversity. E. g., the technique can be applied to anti-Gray mapping of the sort described by Alexander Boronka and Joachim Speidel in their paper "A low complexity MIMO system based on BLAST and iterative anti-Gray-demapping" published in 14*th IEEE Proceedings on Personal, Indoor and Mobile Radio Communications*, 2003, Vol. 2, pp. 1400-1404. The technique can also be applied to maximum squared Euclidean weight (MSEW) symbol mapping.

U.S. patent application Ser. No. 16/217,120 titled "COFDM DCM Signaling that Employs Labeling Diversity to Minimize PAPR" was filed 12 Dec. 2018 by Allen LeRoy Limberg. Portions of that application are incorporated herein for its disclosure of pairs of QAM symbol constellation maps, with labeling diversity between the maps in each pair designed to minimize the PAPR of COFDM signals employing them.

FIGS. 60, 61, 62 and 63 respectively depict first, second, third and fourth Gray maps of lattice points in 16APSK symbol constellations having FEC code rate 6/15. 16APSK is sometimes referred to as non-uniform QAM with 16 lattice points or "16NuQAM". Owing to the quadrantal symmetry, a complete 16APSK symbol constellation can be described by defining just the first quadrant of its complex constellation points. The complex constellation points for the +I, +Q first quadrant have respective energy values 0.5115+j1.2092, 1.2092+j0.5115, 0.2663+j0.4530, and 0.4530+j0.2663 in each of the 16APSK mappings. The complex constellation points for the +I, −Q second quadrant are the negative complex conjugates of the complex constellation points for the +I, +Q first quadrant and have respective energy values −0.5115+j1.2092, −1.2092+j0.5115, −0.2663+j0.4530, and −0.4530+j0.2663. The complex constellation points for the −I, −Q third quadrant are the negatives of the complex constellation points for the +I, +Q first quadrant and have respective energy values −0.5115−j1.2092, −1.2092−j0.5115, −0.2663−j0.4530, and −0.4530−j0.2663. The complex constellation points for the +I, −Q fourth quadrant are the complex conjugates of the complex constellation points for the +I, +Q first quadrant and have respective energy values 0.5115−j1.2092, 1.2092−j0.5115, 0.2663−j0.4530, and 0.4530−j0.2663.

Figure 60:
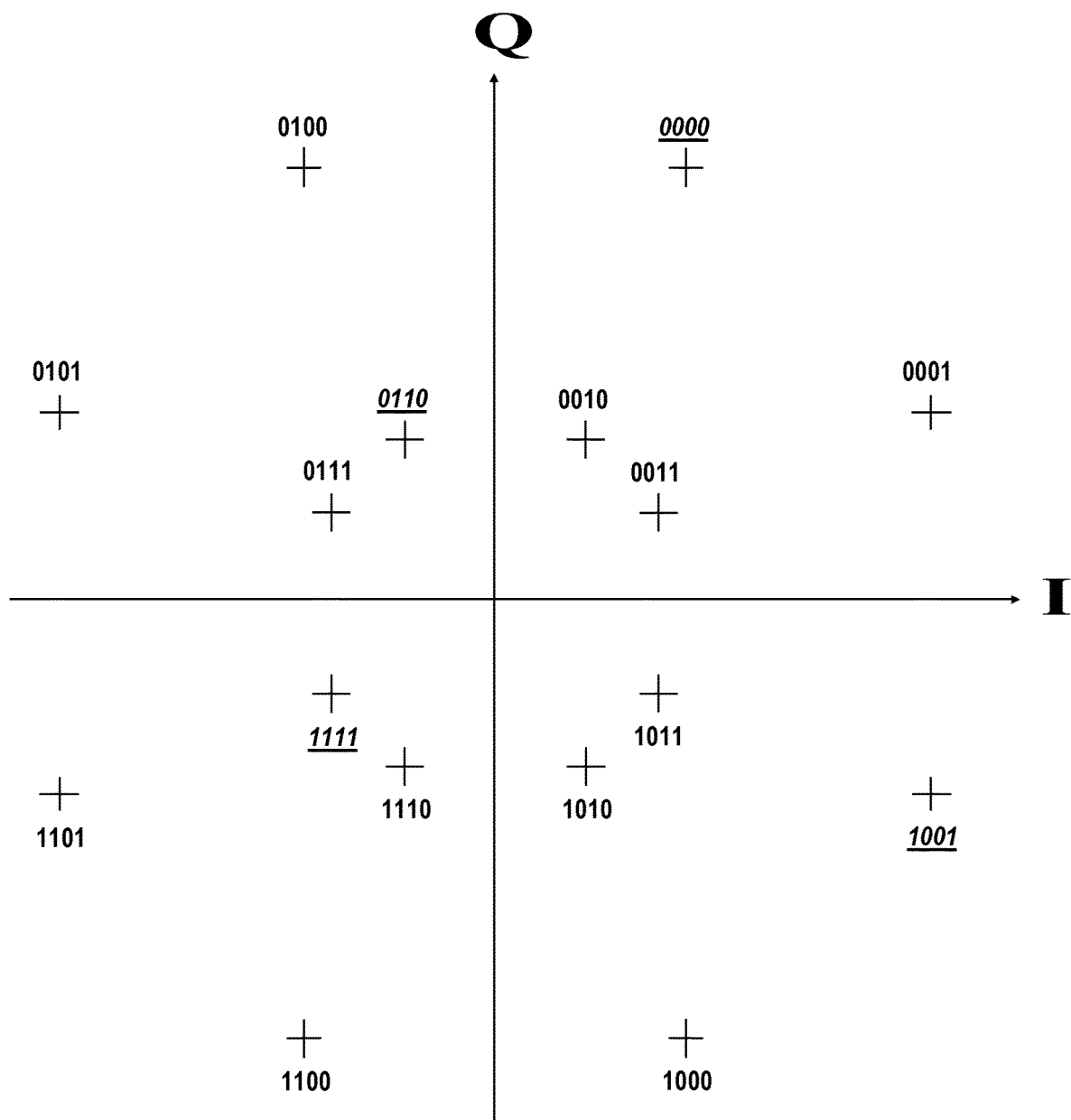
FIGS. 60, 61, 62 and 63 are first, second, third and fourth Gray mappings of 16APSK symbol constellations, which first and third Gray mappings of 16APSK symbol constellations have an antiphase-energy relationship with each other, and which second and fourth Gray mappings of 16APSK symbol constellations have an antiphase-energy relationship with each other.
Figure 61:
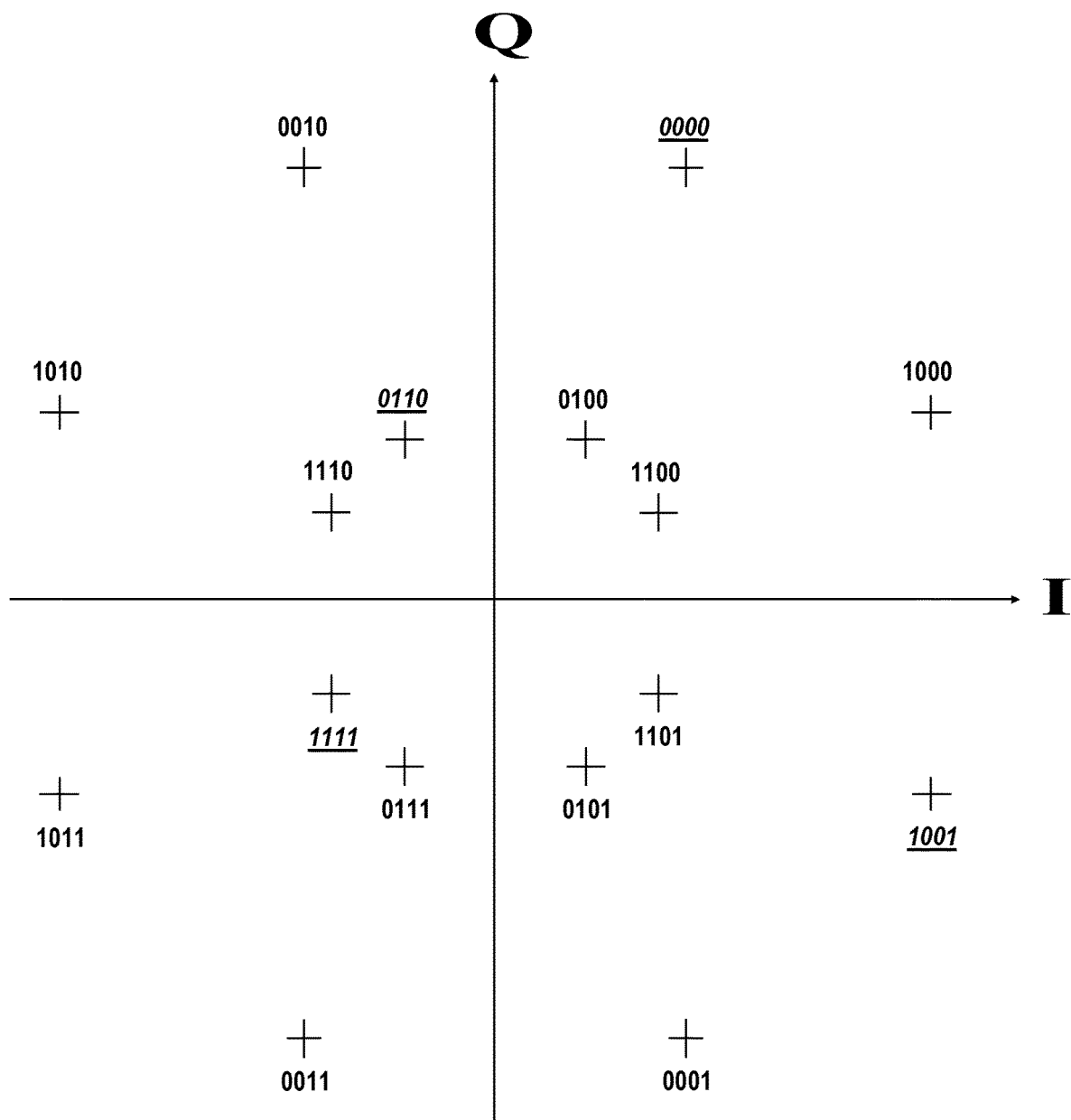

In some COFDM DCM transmitter apparatuses embodying aspects of the invention the QAM mappers 71 and 72 in a physical layer pipe provide 16APSK symbol constellations mapped per FIGS. 60 and 61 respectively. The FIG. 60 first 16APSK map implements transmission of coded data in the lower sideband of a COFDM DCM signal, and the FIG. 61 second 16APSK map implements transmission of the same coded data in the upper sideband of that COFDM DCM signal. The FIG. 60 and FIG. 61 16APSK maps govern quadrature amplitude modulation of their respective sets of OFDM carriers according to first and second patterns, respectively, to support BRA to get shaping gain. Bits of the labels for the FIG. 60 map of 16APSK symbol constellations more likely to experience error caused by accompanying AWGN correspond to bits of the labels for the FIG. 61 map of 16APSK symbol constellations less likely to experience error caused by accompanying AWGN. Bits of the labels for the FIG. 61 map of 16APSK symbol constellations more likely to experience error caused by accompanying AWGN correspond to bits of the labels for the FIG. 60 map of 16APSK symbol constellations less likely to experience error caused by accompanying AWGN.

Figure 62:
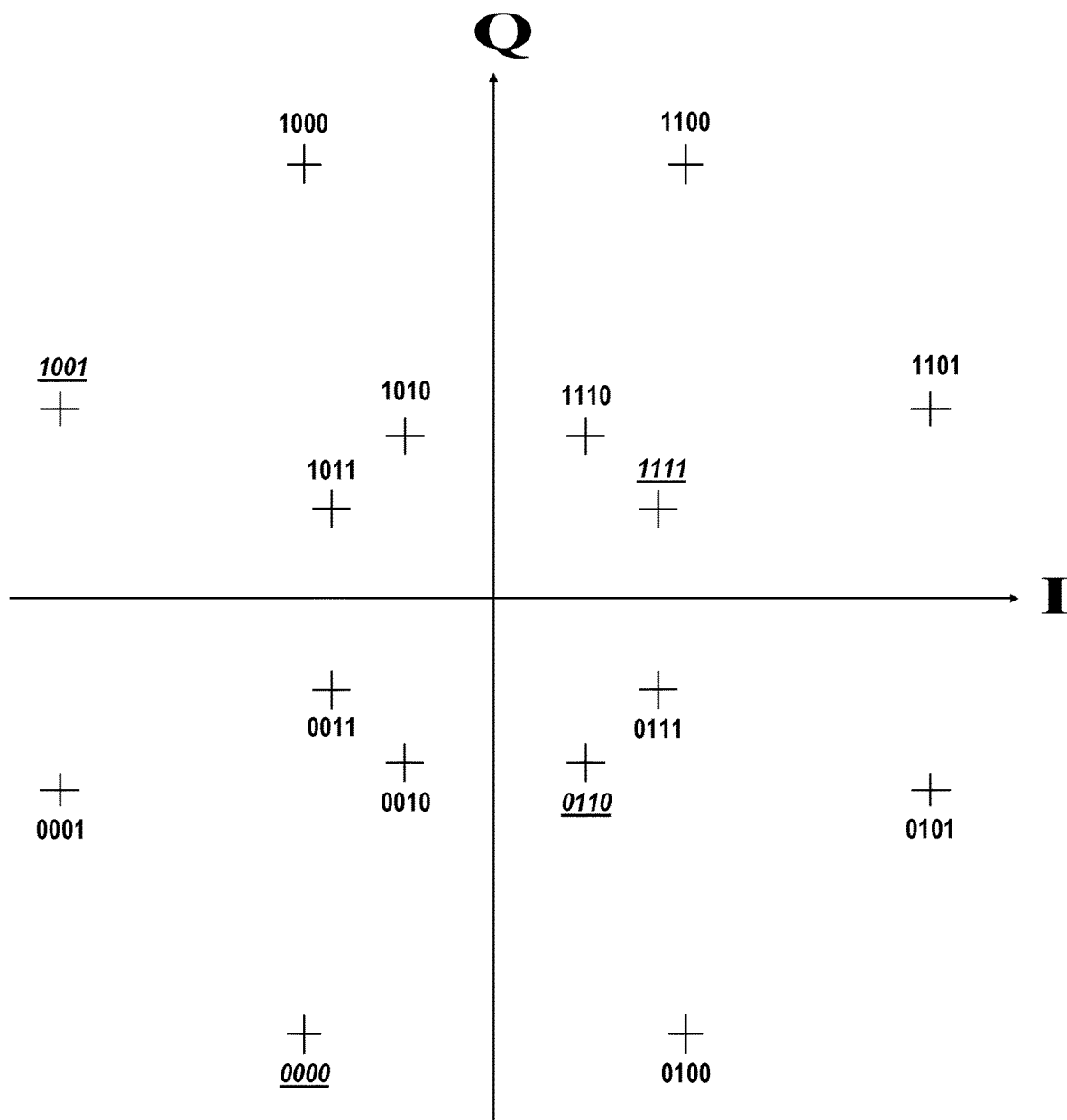

FIGS. 60 and 62 respectively depict first and third Gray maps of lattice points in 16APSK symbol constellations that the QAM mappers 71 and 72 respectively provide in a physical layer pipe in other COFDM DCM transmitter apparatuses embodying aspects of the invention. The labeling of lattice points in the FIG. 62 16APSK Gray map corresponds to the labeling of lattice points in the FIG. 60 first 16APSK map were that first 16APSK map rotated by π radians or 180°. The peak energy associated with any lattice point in the FIG. 60 first 16APSK map having an associated map label is countervailed to some degree by the peak energy associated with the lattice point in the FIG. 62 third 16APSK mapping having the same map label. The goal is to reduce PAPR of the COFDM symbols in the COFDM DCM.

Figure 63:
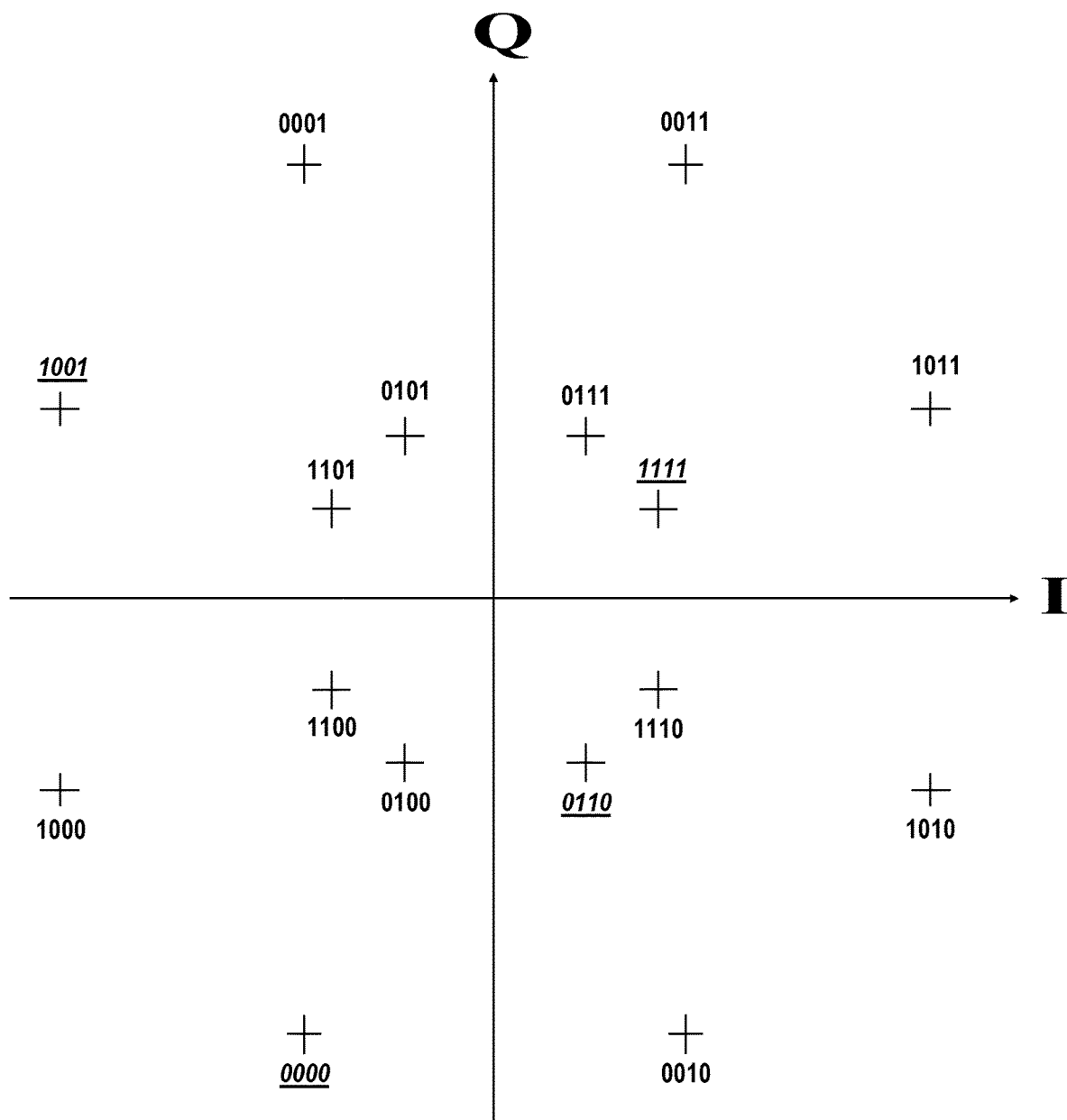

FIGS. 60 and 63 respectively depict first and fourth Gray maps of lattice points in 16APSK symbol constellations that the QAM mappers 71 and 72 respectively provide in a physical layer pipe in still other COFDM DCM transmitter apparatuses embodying aspects of the invention. The labeling of lattice points in the FIG. 63 fourth Gray map corresponds to the labeling of lattice points in the FIG. 61 second Gray map were that second Gray map rotated by π radians or 180°. Employing the first and fourth Gray maps of lattice points in 16APSK symbol constellations that the QAM mappers 71 and 72 respectively provide in a physical layer pipe provides the same improvement in SNR of reception over an AWGN channel as employing the first and second Gray maps of lattice points in 16APSK symbol constellations that the QAM mappers 71 and 72 respectively provide. However, PAPR is reduced by employing the first and fourth Gray maps of lattice points in 16APSK symbol constellations that the QAM mappers 71 and 72 respectively provide.

Mapping techniques of the sorts described in reference to FIGS. 6-59 are adaptable for application to large square QAM symbol constellations with more lattice points. Mapping techniques similar to those described in reference to FIGS. 60-63 are adaptable for application to larger APSK constellations. In variants of the mappings of any of the symbol constellations described supra, the second and fourth maps apply to the lower sideband of the COFDM DCM signal, and the first and third maps apply to the upper sideband of the COFDM DCM signal. Each pair of maps of QAM symbol constellations explicitly suggested for use by the QAM mappers 71 and 72 may be modified by ones' complementing the bits in all of their map labels to generate another pair of maps of OFDM symbol constellations to be used in the lower and upper sidebands of a COFDM DCM signal. The ordering of the bits in lattice point labels of QAM symbol constellations may be juggled, and sometimes this is done for a specific reason.

In the Gray mappings of square 16 QAM symbol constellations depicted in FIGS. 6-9, one of the two sets of alternate bits in the map labels describe the ±I coordinates of successive QAM symbols, and the other of the two sets of alternate bits in the map labels describe the ±Q coordinates of those square QAM symbols. This is also so in the Gray mappings of square 64 QAM symbol constellations depicted in FIGS. 30-34. Such labeling arrangements place the pair of bits specifying the mapping quadrant side-by-side in an effort to make it easier for viewers to sort out quadrant designations. The initial two bits of the map labels of the first map of square QAM and rearrangements thereof identify the mapping quadrants therein, and the final two bits of the map labels of the second map of square QAM and rearrangements thereof identify the mapping quadrants therein. This labeling arrangement also makes it easier to discern which bits in each pair of QAM symbols used for DCM are more or less susceptible to error caused by accompanying AWGN.

Other ordering of the bits in Gray map labels for describing square QAM symbol constellations can be used, however. Various other orderings of bits are characterized in general in the following way: the ±I coordinates and the ±Q coordinates of a succession of square QAM symbols are described by respective halves of the map labels of the QAM mapping. One specific example of this general technique is as follows. In one of the two sidebands of the COFDM DCM signal, the initial halves of map labels describe the ±I coordinates of the square QAM symbols therein, and the final halves of map labels describe the ±Q coordinates of those square QAM symbols. In the other sideband of the COFDM DCM signal the initial halves of map labels describe the ±Q coordinates of the square QAM symbols therein, and the final halves of map labels describe the ±I coordinates of those square QAM symbols. In another example of the same general technique, the initial halves of map labels describe the ±I coordinates of the square QAM symbols in both sidebands of the COFDM DCM signal, and the final halves of map labels describe the ±Q coordinates of those square QAM symbols. In yet another example of that general technique, the initial halves of map labels describe the ±Q coordinates of the square QAM symbols in both sidebands of the COFDM DCM signal, and the final halves of map labels describe the ±I coordinates of those square QAM symbols.

Figure 64:
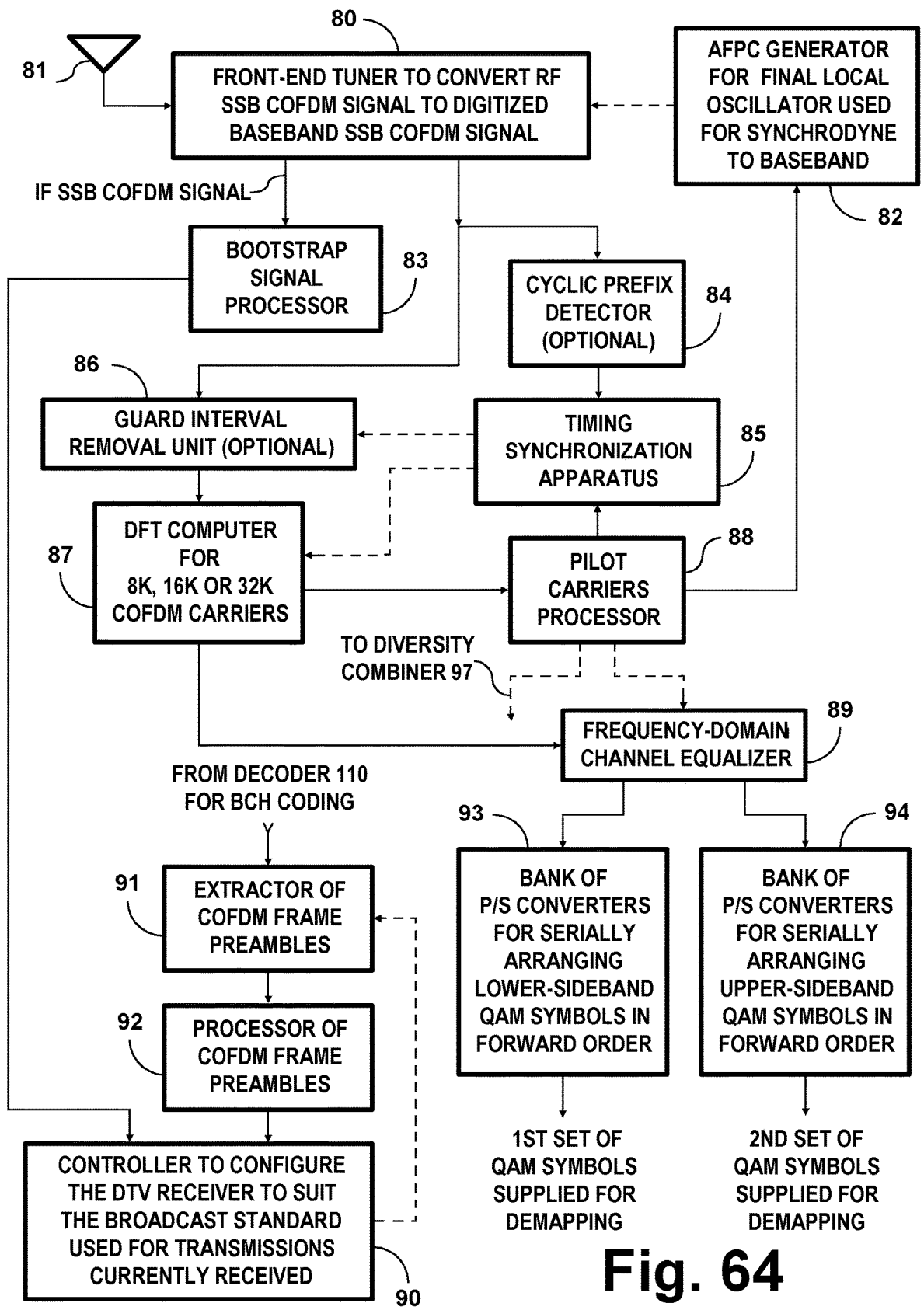
FIGS. 64 and 65 together form a schematic diagram of the general structure of single-sideband receiver apparatus adapted for receiving COFDM DCM signals in accordance with aspects of the invention.

FIG. 64 shows the initial portion of a receiver designed for iterative-diversity reception of COFDM signals as transmitted at VHF or UHF by a DTV transmitter, such as the one depicted in FIGS. 1, 2 and 3. A front-end tuner 80 of the receiver selects its input signal from one of the radio-frequency (RF) signals captured by a reception antenna 81. The front-end tuner 80 can be of a double-conversion type composed of initial single-conversion super-heterodyne receiver circuitry for converting the selected RF single-sideband COFDM signal to an intermediate-frequency (IF) single-sideband COFDM signal followed by circuitry for performing a final conversion of that IF COFDM signal to baseband single-sideband COFDM signal. The initial conversion circuitry typically comprises a tunable RF amplifier for RF single-sideband COFDM signal incoming from the reception antenna, a tunable first local oscillator, a first mixer for heterodyning the amplified RF single-sideband COFDM signal with local oscillations from the first local oscillator to obtain the IF single-sideband COFDM signal, and an intermediate-frequency (IF) amplifier for the IF single-sideband COFDM signal. Typically, the front-end tuner 80 further includes a synchronous demodulator for performing the final conversion from IF single-sideband COFDM signal to baseband single-sideband COFDM signal and an analog-to-digital converter for digitizing that baseband signal. Synchronous demodulation circuitry typically comprises a final local oscillator with automatic frequency and phase control (AFPC) of its oscillations, a second mixer for synchrodyning amplified IF single-sideband COFDM signal with local oscillations from the final local oscillator to obtain the baseband single-sideband COFDM signal, and a low-pass filter for suppressing image signal accompanying the baseband single-sideband COFDM signal. In some designs of the front-end tuner 80, synchronous demodulation is performed in the analog regime before subsequent analog-to-digital conversion of the resulting complex baseband single-sideband COFDM signal. In other designs of the front-end tuner 80, analog-to-digital conversion is performed before synchronous demodulation is performed in the digital regime.

Simply stated, the front-end tuner 80 converts radio-frequency single-sideband COFDM signal received at its input port to digitized samples of baseband single-sideband COFDM signal supplied from its output port. Typically, the digitized samples of the real component of the baseband single-sideband COFDM signal are alternated with digitized samples of the imaginary component of that baseband signal for arranging the complex baseband single-sideband COFDM signal in a single stream of digital samples. FIG. 64 depicts an AFPC generator 82 for generating the automatic frequency and phase control (AFPC) signal for controlling the final local oscillator within the front-end tuner 80.

The output port of the front-end tuner 80 is connected for supplying digitized samples of baseband single-sideband COFDM signal to the respective input ports of a bootstrap signal processor 83 and a cyclic prefix detector 84. The cyclic prefix detector 84 differentially combines the digitized samples of baseband single-sideband COFDM signal with those samples as delayed by the duration of an effective COFDM symbol. Nulls in the difference signal so generated should occur, marking the guard intervals of the baseband single-sideband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 85.

A first of two output ports of the timing synchronization apparatus 85 is connected for supplying gating control signal to the control input port of a guard-interval-removal unit 86, the signal input port of which is connected for receiving digitized samples of baseband ASB-COFDM signal from the output port of the front-end tuner 80. The output port of the guard-interval-removal unit 86 is connected for supplying the input port of discrete-Fourier-transform computer 87 with windowed portions of the baseband ASB-COFDM signal that contain effective COFDM samples. A second of the output ports of the timing synchronization apparatus 85 is connected for supplying the DFT computer 87 with synchronizing information concerning the effective COFDM samples.

The indications concerning the phasing of COFDM symbols that the cyclic prefix detector 84 supplies to the timing synchronization apparatus 85 are sufficiently accurate for initial windowing of a baseband single-sideband COFDM signal that the guard-interval-removal unit 86 supplies to the DFT computer 87. A first output port of the DFT computer 87 is connected for supplying demodulation results for at least all of the pilot carriers in parallel to the input port of a pilot carriers processor 88, and a second output port of the DFT computer 87 is connected for supplying demodulation results for each of the COFDM carriers to the input port of a frequency-domain channel equalizer 89. The processor 88 selects the demodulation results concerning pilot carriers for processing, part of which processing generates weighting coefficients for channel equalization filtering in the frequency domain. A first of four output ports of the processor 88 that are explicitly shown in FIG. 64 is connected for supplying these weighting coefficients (via wiring depicted as a dashed-line connection) to the frequency-domain channel equalizer 89, which uses those weighting coefficients for adjusting its responses to the demodulation results for each of the COFDM carriers.

A second of the output ports of the pilot carriers processor 88 that are explicitly shown in FIG. 64 is connected for supplying more accurate window-positioning information to the second input port of the timing synchronization apparatus 85. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 88 explicitly shown in FIG. 64 is connected for forwarding unmodulated pilot carriers to the input port of the AFPC generator 82. The real components of the unmodulated pilot carriers are multiplied by their respective imaginary components in the AFPC generator 82. The resulting products are summed and low-pass filtered to develop the AFPC signal that the AFPC generator 82 supplies to the front-end tuner 80 for controlling the final local oscillator therein. Other methods to develop AFPC signals for the final local oscillator in the front-end tuner 80 are also known, variants of which can replace or supplement the method described above.

E.g., the complex digital samples from the tail of each half OFDM symbol are multiplied by the conjugates of corresponding digital samples from the cyclic prefix of the half OFDM symbol. The resulting products are summed and low-pass filtered to develop the AFPC signal that the AFPC generator 82 supplies to the front-end tuner 80 for controlling the final local oscillator therein. This method is a variant of a known method to develop AFPC signals in receivers for COFDM signals described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997.

Figure 65:
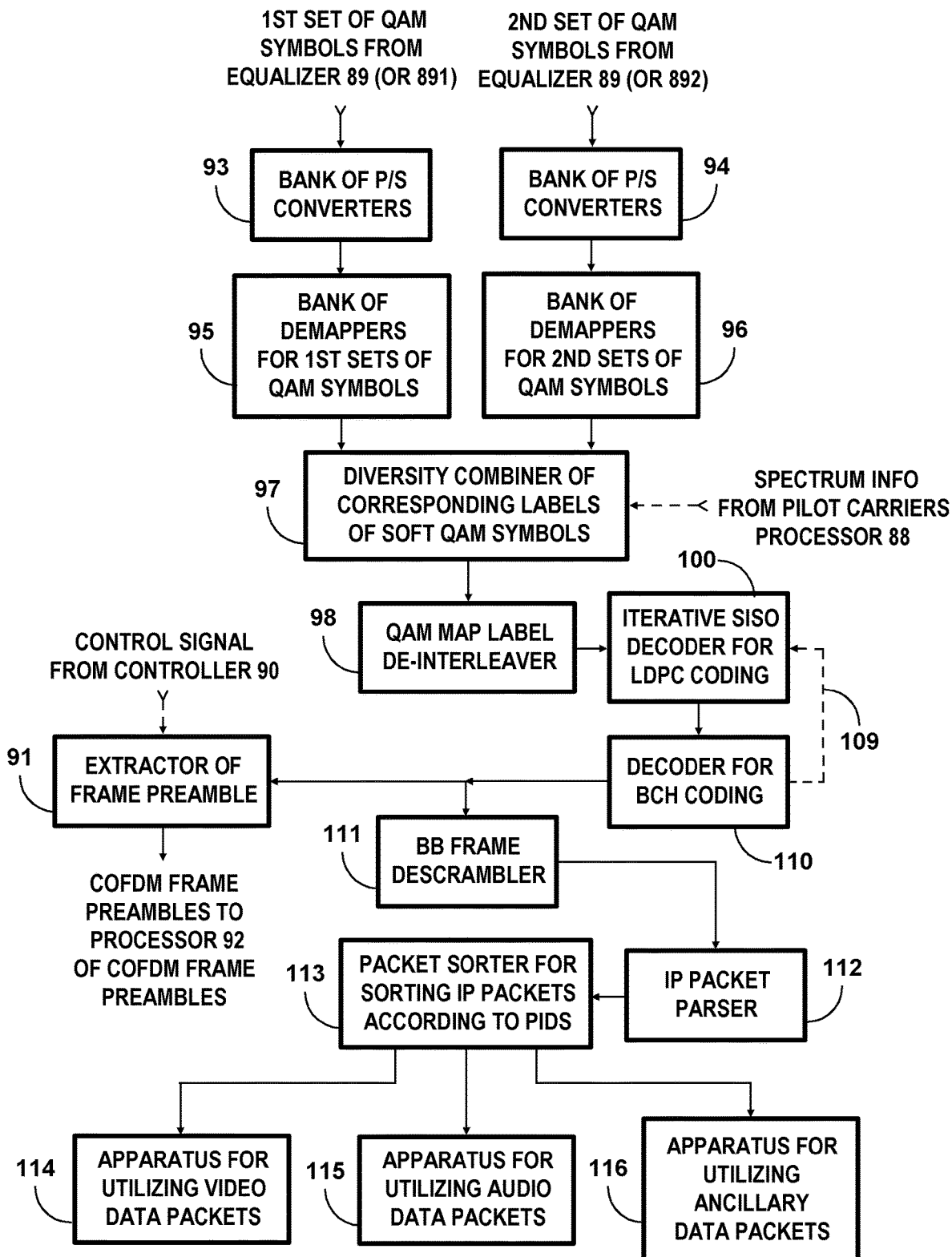

FIG. 64 indicates that a fourth of the output ports of the pilot carriers processor 88 is connected to a diversity combiner 97 (depicted in FIG. 65). Through such connection the pilot carriers processor 88 furnishes information concerning the frequency spectrum of each successive COFDM symbol, which the diversity combiner 97 can use to determine how it will combine its input signals to generate its output signal.

The DFT computer 87 is configured so it can demodulate any one of 8K, 16K and 32K options as to the number of OFDM carriers. The correct option is chosen responsive to an instruction from a controller 90 that generates a number of instructions used to configure the COFDM receiver to suit the broadcast standard used transmissions currently received. To keep the drawings from being too cluttered to be easily understood, they do not explicitly illustrate the multitudinous connections from the controller 90 to the elements of the receiver controlled by respective instructions from the controller 90.

As noted supra, the second output port of the DFT computer 87 is connected to supply demodulated complex digital samples of the complex coordinates of QAM symbol constellations in parallel to the input port of the frequency-domain channel equalizer 89. To implement a simple form of frequency-domain channel equalization, the pilot carriers processor 88 measures the amplitudes of the demodulated pilot carriers to determine basic weighting coefficients for various portions of the frequency spectrum. The pilot carriers processor 88 then interpolates among the basic weighting coefficients to generate respective weighting coefficients supplied to the frequency-domain channel equalizer 89 with which to multiply the complex coordinates of QAM symbol constellations supplied from the DFT computer 87. Various alternative types of frequency-domain channel equalizer are also known.

An extractor 91 of COFDM frame preambles selects them from COFDM frames of decoded data supplied from a decoder 110 for BCH coding, which decoder 110 is depicted in FIG. 65. The output port of the extractor 91 of COFDM frame preambles connects to the input port of a processor 92 of the COFDM frame preambles. The controller 90 is connected for responding to elements of COFDM frame preambles forwarded to a second of its input ports from an output port of the COFDM frame preambles processor 92.

The controller 90 is connected for responding to elements of the bootstrap signal forwarded to a first of its input ports from an output port of the bootstrap signal processor 83. The controller 90 supplies COFDM data frame information to the pilot carriers processor 88, which data frame information can be generated responsive to baseband bootstrap signal that the bootstrap signal processor supplies to the controller 90. (The connections for this are among the connections of the controller 90 not explicitly shown in FIG. 64.) Since the bootstrap signal is not always received acceptably free of error, it is good design to provide a source alternative to the bootstrap signal processor 83 for supplying the controller 90 back-up information as to the nature of received DTV signal. Such a source is necessary if bootstrap signal is not transmitted or if the receiver does not include a bootstrap signal processor. Accordingly the response of a decoder 110 for BCH coding, which decoder 110 is depicted in FIG. 65, is supplied to input port of an extractor 91 of FEC frame preambles from the decoder 110 response. If the frame preamble at the beginning of each COFDM data frame is repeated, the extractor 91 readily detects when frame preambles occur by correlating successive COFDM symbols in the response from the decoder 110 in accordance with the well-known Schmidl-Cox method. The output port of the extractor 91 of FEC frame preambles is connected for supplying them to the input port of a processor 92 of COFDM frame preambles. The output port of the processor 92 of COFDM frame preambles is connected for supplying an input port of the controller 90 with information as to the nature of received DTV signal, the interconnection between which ports may comprise a plurality of separate connections. FIG. 64 shows a connection from the controller 90 to the extractor 91 of FEC frame preambles through which connection the controller 90 can supply the extractor 91 a control signal including predictions of when FEC frame preambles are expected to occur.

Responsive to information supplied from the bootstrap signal processor 83 or from the processor 92 of COFDM frame preambles, the controller 90 prescribes the basic sample rate and the size of I-FFT that the controller 90 instructs the DFT computer 87 to use in its operation regarding DTV signal. The controller 90 instructs the channel equalizer 89 and the banks 93 and 94 of parallel-input/serial-output converters to configure themselves to suit the size of DFT that the controller 90 instructs the DFT computer 87 to generate.

The frequency-domain channel equalizer 89 is connected for supplying complex coordinates of the QAM symbol constellations from the lower-frequency half COFDM symbol, in parallel and in prescribed spectral order, to the bank 93 of parallel-to-serial (P/S) converters. One of these P/S converters as selected by the controller 90 supplies the complex coordinates of a first set of QAM symbol constellations extracted from the lower-frequency halves of successive COFDM symbols. The frequency-domain channel equalizer 89 is further connected for supplying complex coordinates of the QAM symbol constellations from the higher-frequency half COFDM symbol, in parallel and in prescribed spectral order, to the bank 94 of parallel-to-serial (P/S) converters. One of these P/S converters as selected by the controller 90 supplies the complex coordinates of a second set of QAM symbol constellations extracted from the higher-frequency halves of successive COFDM symbols. Each of the banks 93 and 94 of P/S converters comprises respective P/S converters that are appropriate for half the number of OFDM carriers that can convey data in a COFDM symbol of prescribed size. The pair of P/S converters selected for current reception is determined by a control signal that the controller 90 supplies in common to each of the banks 93 and 94 of P/S converters.

The first sets of QAM symbol constellations are those that originate from the first mapping procedures in the COFDM transmitter apparatus and are supplied from the output port of the bank 93 of P/S converters to the input port of a bank 95 of demappers for the first sets of QAM symbol constellations, as depicted in FIG. 65. The second sets of QAM symbol constellations are those that originate from the second mapping procedures in the COFDM transmitter apparatus and are supplied from the output port of the bank 94 of P/S converters to the input port of a bank 96 of demappers for the second sets of QAM symbol constellations, as depicted in FIG. 65. Each of the banks 95 and 96 of demappers comprises a respective set of QAM demappers for different sizes of QAM symbol constellations—e.g., one for square 16 QAM, one for 16APSK, one for square 64 QAM, one for square 256 QAM, and possibly one for larger-size square QAM or APSK. The pair of demappers selected for current reception is determined by a control signal that the controller 90 supplies in common to each of the banks 95 and 96 of QAM demappers.

The pairs of QAM demappers in the banks 95 and 96 of demappers could be paired Gray demappers, paired SCM demappers, paired natural demappers, paired anti-Gray demappers, paired "optimal" demappers of various types or some mixture of those types of paired demappers. However, if the demapping results from the antiphase-energy QAM demappers are to be maximal-ratio combined at bit level to improve effective SNR for AWGN reception, it is strongly recommended that QAM symbol constellations be Gray mapped or SCM mapped. It is practical for each of the QAM demappers to constitute a plurality of read-only memories (ROMs), one for each bit of map labeling, addressed by the complex coordinates descriptive of the current QAM symbol. Each ROM is read to provide a "hard" bit followed by a confidence factor indicating how likely that bit is to be correct. Customarily these confidence factors are expressed as logarithm of likelihood ratios (LLRs). The order of bits in a pair of Gray or SCM lattice-point labels can be similarly shuffled from ones depicted in FIGS. 6-27, 30-57 and 60-63 to facilitate alternative demapping procedures that demap the in-phase and quadrature-phase components of QAM symbols separately from each other.

The confidence factors are usually based, at least in substantial part, on judgments of the distance of the complex coordinates descriptive of the current QAM symbol from the edges of the bin containing the "hard" bit. The confidence factors can be further based on whether or not the bin containing the "hard" bit is at an edge of the current QAM symbol constellation and, if so, whether the complex coordinates descriptive of that current QAM symbol closely approach that edge or even pass beyond it. The confidence factor that the "hard" bit is correct is increased if the complex coordinates descriptive of that current QAM symbol closely approach a symbol constellation edge or even pass beyond it. This increase applies to all bits in the map label. This effect obtains if mapping of QAM symbol constellations is Gray mapping or is SCM mapping.

FIG. 65 shows connections from the output ports of the banks 95 and 96 of demappers to respective input ports of a diversity combiner 97 of corresponding soft QAM labels operative at bit level. Each soft QAM label is composed of a plurality of "soft" bits. Each of these "soft" bits constitutes a "hard" bit and a confidence factor that that "hard" bit has been correctly decided; this confidence factor is conventionally expressed as a logarithm of likelihood ratio (LLR). This information is utilized in subsequent soft decoding procedures of the FEC coding reproduced in interleaved form from the diversity combiner 97. The output port of the diversity combiner 97 serially supplies soft bits of successive QAM labels to the input port of a bit de-interleaver 98 as soft bits of interleaved LDPC coding.

FIG. 65 shows the read-output port of the QAM map label de-interleaver 98 connected to the input port of an iterative soft-input/soft-output (SISO) decoder 100 for LDPC coding. FIG. 65 further shows the output port of the decoder 100 connected for supplying the results of its decoding LDPC coding to the input port of a decoder 106 of BCH coding. FIG. 65 shows a control connection 107 from the decoder 106 of BCH coding back to the decoder 100 of LDPC coding, through which connection 107 the decoder 106 sends an indication of when it has decoded a correct BCH codeword. This indication signals the decoder 100 of LDPC coding that it can discontinue iterative decoding before reaching a limit on the maximum number of iterations permitted, which early discontinuation of iterative decoding conserves power consumption by the receiver. The output port of the decoder 106 is connected for supplying the results of its decoding BCH coding to the input port of a BB Frame descrambler 108, which includes a de-jitter buffer and null-packet re-inserter that are not explicitly shown in FIG. 65.

FIG. 65 shows the output port of the BB Frame descrambler 108 connected to supply IP packets to the input port of an internet-protocol packet parser 109. The output port of the IP packet parser 109 is connected to supply IP packets to a packet sorter 110 for sorting IP packets according to their respective packet identifiers (PIDs) to one of the respective input ports of apparatus 111 for utilizing video data packets, apparatus 112 for utilizing audio data packets, and apparatus 113 for utilizing ancillary data packets.

FIG. 65 depicts a single SISO decoder 100 for LDPC coding in cascade connection with a single decoder 106 for BCH coding thereafter. In actual practice there are apt to be at least two such cascade connections available, suitable to respective different sizes of FEC code blocks, with one of these cascade connections selected for supplying decoded data to the input port of the BB frame descrambler 108 in accordance with instructions from the controller 90. Alternatively, decoders for other types of FEC coding replace the decoders 100 and 106 in other receiver apparatus embodying aspects of the invention. For example, a cascade connection of decoders for concatenated RS and turbo coding is used instead of the cascade connection of decoders 100 and 106.

Not all COFDM communication systems will concatenate BCH coding and LDPC coding. Cyclic redundancy check (CRC) coding can be used instead of BCH coding for detecting the successful conclusion of LDPC decoding. In such case, the general structure of COFDM receiver apparatus depicted in FIGS. 64 and 65 is modified to replace the decoder 106 for BCH coding with a decoder for CRC coding. However, unlike the decoder 106 for BCH coding, the decoder for CRC coding will not be capable of correcting remnant errors from iterative decoding of LDPC coding. LDPC coding that lends itself to being successfully decoded in a few iterations will allow the decoder 106 to be replaced by direct connection from the SISO decoder 100 to the input port of the BB Frame descrambler 108. The LDPC block coding that has customarily been used in DTV broadcasting can be replaced with LDPC convolutional coding. Forward-error-correction coding can be used that does not incorporate LDPC coding at all. The techniques for PAPR reduction using single-time retransmission can be applied if multi-level coding (MLC) is used, rather than bit-interleaved coded modulation (BICM). If MLC is used, there is less reason to consider replacing uniform QAM of OFDM carriers with non-uniform QAM than there is for BICM. (Incidentally, convolutional LDPC coding is better adapted to MLC than is block LDPC coding.)

Figure 66:
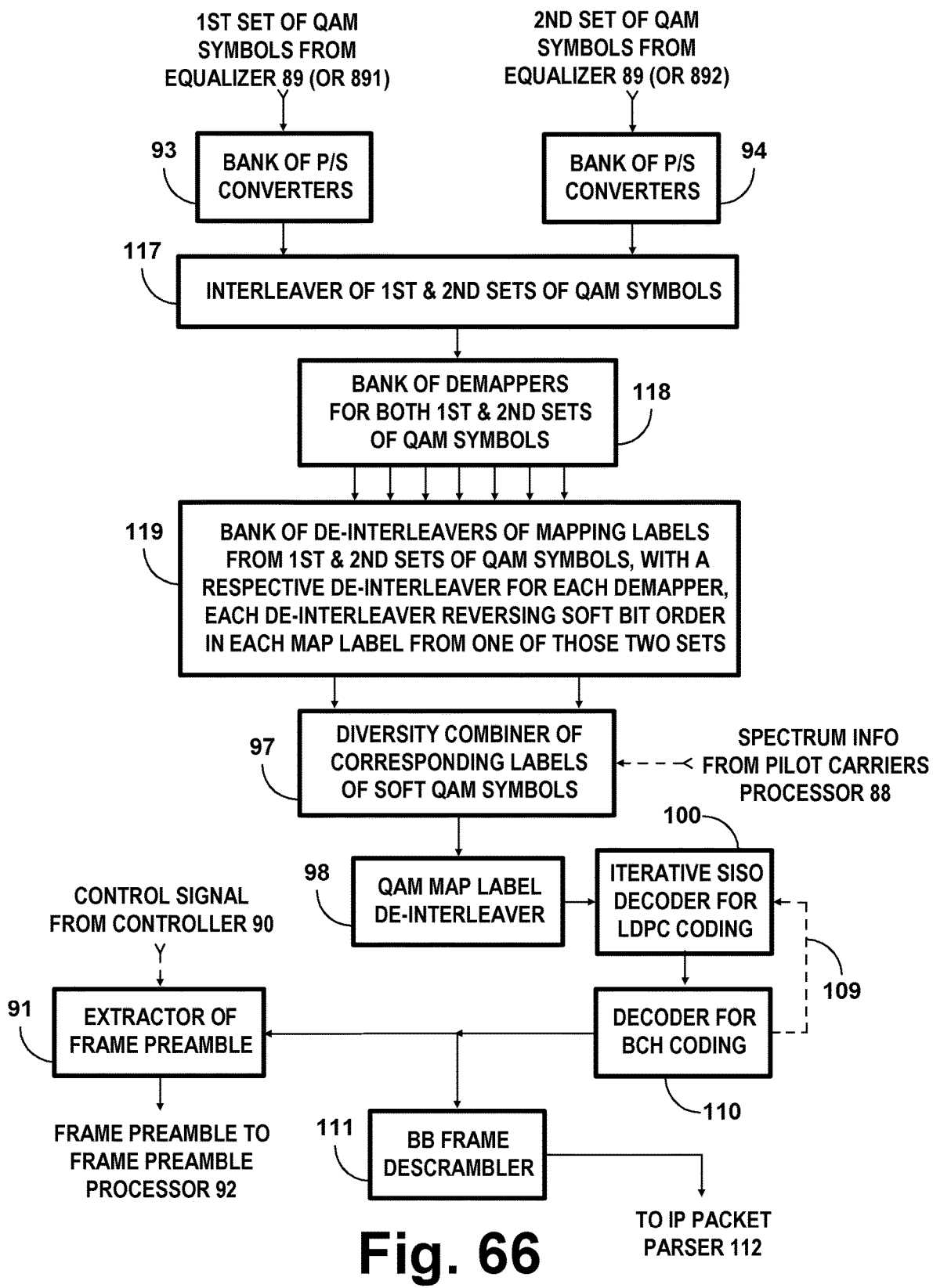
FIGS. 66, 67 and 68 are detailed schematic diagram of various modifications made to the receiver apparatus shown in FIG. 65 to allow QAM symbols from the lower sideband of a COFDM DCM signal and from its upper sideband to be demapped by a shared QAM symbol demapper.
Figure 67:
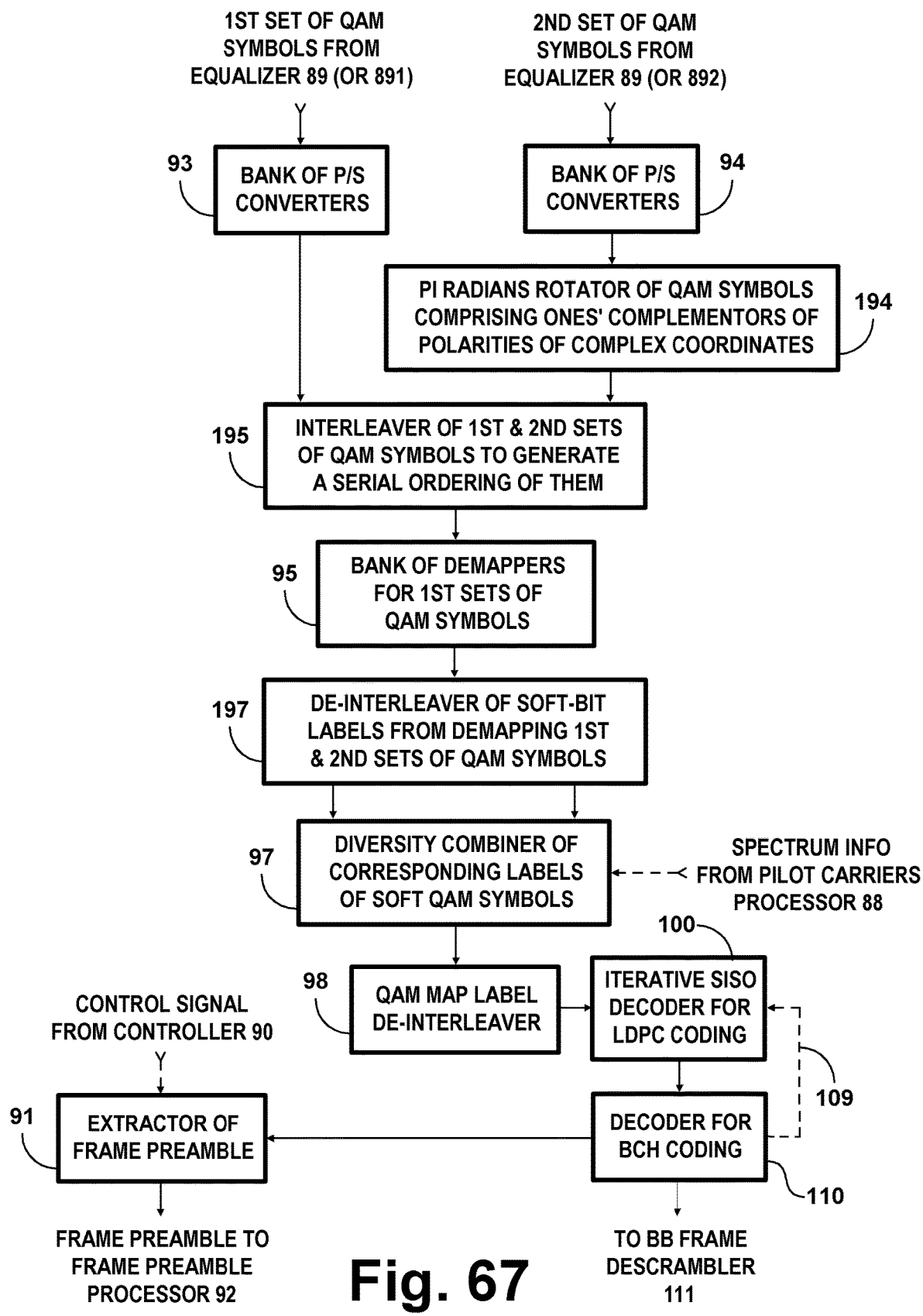
Figure 68:
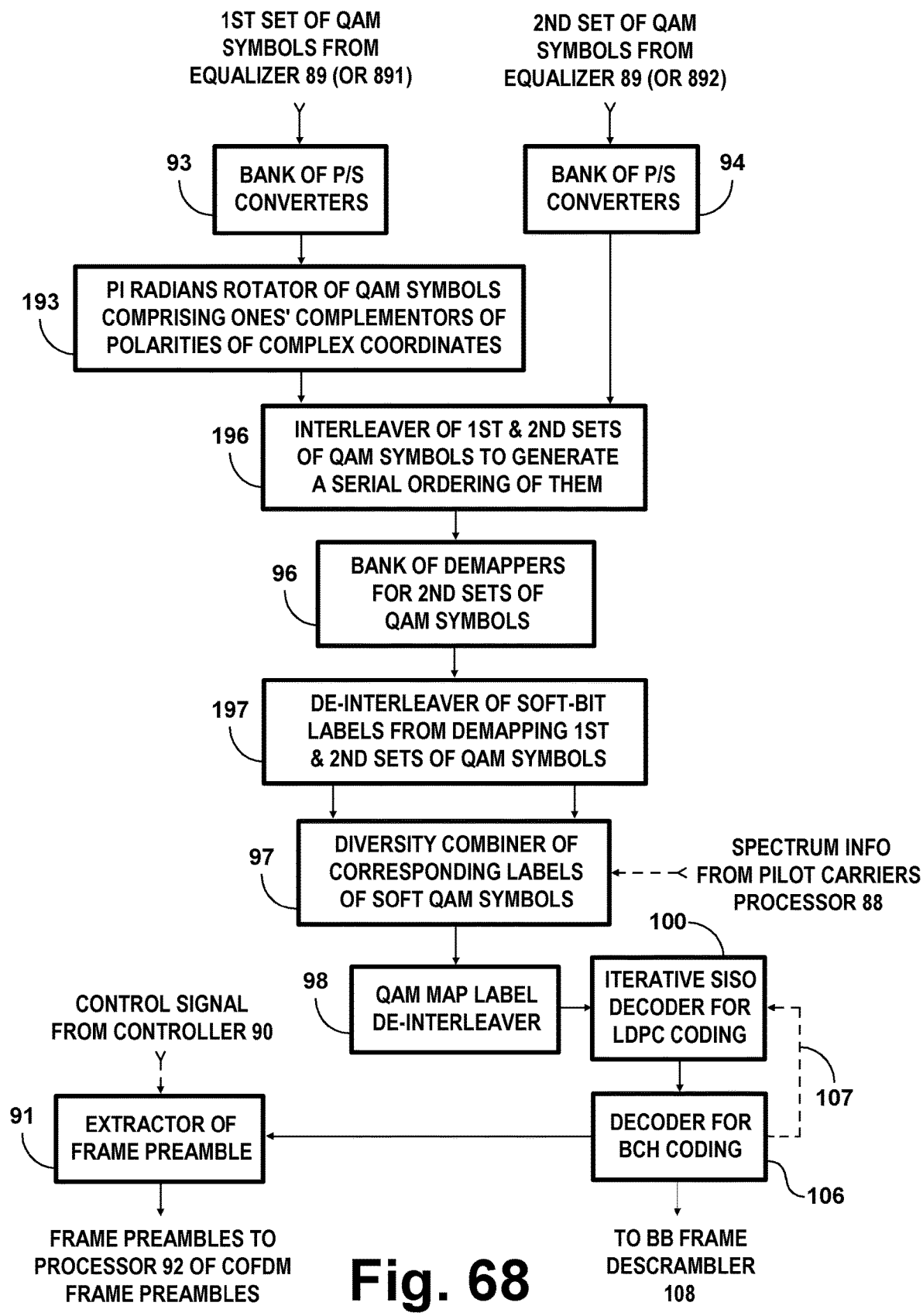

FIGS. 66, 67 and 68 depict the general forms of respective modifications of the FIG. 65 receiver apparatus for COFDM DCM signal, each of which modifications permits both the lower and upper sidebands of that signal to be demapped by shared demapping apparatus. This shared demapping apparatus replaces the separate banks 95 and 96 of demappers for QAM signals for separate portions of COFDM DCM signal that are depicted in FIG. 65. In FIG. 66 this shared mapping apparatus is a single bank 115 of demappers for demapping both the lower and upper sidebands of the COFDM DCM signal. In FIG. 67 this shared mapping apparatus is a single bank 95 of demappers for demapping both the lower and upper sidebands of the COFDM DCM signal. In FIG. 68 this shared mapping apparatus is a single bank 96 of demappers for demapping both the lower and upper sidebands of the COFDM DCM signal. U.S. Pat. No. 10,171,280 titled "Double-Sideband COFDM Signal Receivers that Demodulate Unfolded Frequency Spectrum" was granted 1 Jan. 2019 to Allen LeRoy Limberg. The general forms of the respective portions of receiver apparatus for COFDM DCM signals, as depicted in FIGS. 66, 67 and 68 each differ from somewhat similar portions of receiver apparatuses for DSB-COFDM signal disclosed in U.S. Pat. No. 10,171,280 The respective differences of the portions of receiver apparatus for COFDM DCM signals depicted in FIGS. 66, 67 and 68 are described infra.

Modifications of the FIG. 65 receiver apparatus for COFDM DCM signal per FIGS. 66, 67 and 68 are useful for fewer types of COFDM DCM signal than the FIG. 65 receiver apparatus is useful for, as also described infra. The modifications FIGS. 66, 67 and 68 do not accommodate the COFDM QAM mappings that most reduce PAPR of the COFDM DCM signal. If this more limited capability be acceptable, there is some practical advantage in using a single demapper for two sets of QAM symbols, rather than a pair of demappers for respective ones of those two sets of QAM symbols. A QAM demapper is apt to comprise a substantial amount of read-only memory (ROM) that takes up much area on a semiconductor die in monolithic integrated circuitry. This ROM is addressed by the-phase and quadrature components of the demodulated QAM symbols and stores the logarithmic likelihood ratio (LLR) of signal to error of each bit in the map label read out in soft-bit form from the ROM.

FIG. 66 is a schematic diagram of a modification of the FIG. 65 portion of some COFDM receiver apparatus, as used in alternative embodiments of the invention. The FIG. 66 modification employs a single bank 115 of demappers for QAM symbols instead of a bank 95 of demappers for the first sets of QAM symbol constellations from the lower sidebands of COFDM DCM signals and another bank 96 of demappers for the second sets of QAM symbol constellations from the upper sidebands of COFDM DCM signals. The output port of the bank 93 of P/S converters is connected for supplying the first set of QAM symbol constellations to a first input port of an interleaver 114 for QAM symbols, and the output port of the bank 94 of P/S converters is connected for supplying the second set of QAM symbol constellations to a second input port of that interleaver 114. The output port of the QAM symbols interleaver 114 is connected for supplying QAM symbol constellations alternatively selected from the first and second sets of them to the input port of the bank 115 of demappers for both sets of QAM symbols.

The respective output port of each of the demappers in bank 115 of them connects to a respective input port of one of the de-interleavers in bank 119 of them. Responsive to received COFDM signal, the controller 90 supplies control signals for selecting a suitable one of the bank 118 of demappers and the one of the bank 116 of de-interleavers that is associated with that selected demapper. The selected one of the bank 116 of de-interleavers is conditioned to supply a separated first set of lattice-point labels from a first output port thereof to the first input port of the diversity combiner 97. The selected one of the bank 116 of de-interleavers is also conditioned to supply a separated second set of lattice-point labels from a second output port thereof to the second input port of the diversity combiner 97. The output port of the diversity combiner 97 connects directly to the input port of the QAM map label de-interleaver 98. Connections following the de-interleaver 98 are similar in FIG. 66 to those described in regard to FIG. 65.

FIG. 66 indicates that each de-interleaver of mapping labels from the first and second sets of QAM symbols in the bank 116 of de-interleavers reverses the soft bit order in each map label from one of those two sets of QAM symbols. More particularly, each de-interleaver of mapping labels reverses the order of soft bits from each map label demapped from one of those two sets of QAM symbols. Accordingly, the FIG. 66 receiver apparatus is useful when the map labels of one of those two sets of QAM symbols mirror the map labels of the other of those two sets of QAM symbols. A de-interleaver of mapping labels can be designed to be appropriate when COFDM DCM signals are generated using the first and second Gray maps of 16 QAM constellations of FIGS. 6 and 7 for example. A de-interleaver of mapping labels can be designed to be appropriate when COFDM DCM signals are generated using the first and second SCM maps of 16 QAM constellations of FIGS. 10 and 11 for example. A de-interleaver of mapping labels can be designed to be appropriate when COFDM DCM signals are generated using the first and second Gray maps of 64 QAM constellations of FIGS. 30 and 31 for example. A de-interleaver of mapping labels can be designed to be appropriate when COFDM DCM signals are generated using the first and second SCM maps of 64 QAM constellations of FIGS. 34 and 35 for example.

If de-interleavers of mapping labels in the bank 116 of de-interleavers are modified so as not to reverse the soft bit order in each map label from each of those two sets of QAM symbols, the FIG. 66 receiver apparatus is useful when the QAM symbols in both the lower and the upper sidebands of the COFDM DCM signals use the same labeling of lattice points in their QAM symbol constellations. I. e., the sidebands of such COFDM DCM signals are "independent" only because the similar OFDM carriers in them are both disposed in a similar prescribed order, rather than in mirrored spectral orders as is the case in a DSB-COFDM signal.

FIGS. 67 and 68 show modifications that can be made to the receiver apparatus shown in FIG. 66 to permit a common QAM symbol demapper to be used both to demap a first set of QAM symbols from the lower sideband of a COFDM DCM signal and to demap a second set of QAM symbols from the upper sideband of a COFDM DCM signal. These modifications are suitable when QAM symbol constellations in the lower sidebands of a COFDM DCM signal are rotated pi radians or 180° respective to QAM symbol constellations in the upper sidebands of a COFDM DCM signal with similar map labeling. By way of specific examples, these modifications are suitable when QAM symbol constellations in one of these sidebands and the other of these sidebands of a COFDM DCM signal are respectively mapped per separate ones of the FIG. 6 and FIG. 8 Gray maps of 16 QAM symbol constellations, per separate ones of the FIG. 10 and FIG. 12 SCM maps of 16 QAM symbol constellations, per separate ones of the FIG. 30 and FIG. 32 Gray maps of 64 QAM symbol constellations, per separate ones of the FIG. 34 and FIG. 36 SCM maps of 64 QAM symbol constellations, or per separate ones of the FIG. 60 and FIG. 62 Gray maps of 16APSK symbol constellations. By way of further specific examples, these modifications are suitable when QAM symbol constellations in in one of these sidebands and the other of these sidebands of a COFDM DCM signal are respectively mapped per separate ones of the FIG. 7 and FIG. 9 Gray maps of 16 QAM symbol constellations, per separate ones of the FIG. 11 and FIG. 14 SCM maps of 16 QAM symbol constellations, per separate ones of the FIG. 31 and FIG. 33 Gray maps of 64 QAM symbol constellations, per separate ones of the FIG. 35 and FIG. 38 SCM maps of 64 QAM symbol constellations, or per separate ones of the FIG. 61 and FIG. 63 Gray maps of 16APSK symbol constellations.

FIG. 67 is a detailed schematic diagram of modifications made to the receiver apparatus shown in FIG. 65 to allow second sets of QAM symbols as well as first sets of QAM symbols to be demapped by the bank 95 of QAM symbol demapper for the first sets of QAM symbols. A pi radians rotator 194 is connected for changing the polarities of both the real and the imaginary components of the complex coordinates of the second set of QAM symbols supplied from the P/S converter 94. An interleaver 195 of QAM symbols from the first and second sets of them is connected for interleaving the complex coordinates of the first set of QAM symbols supplied from the P/S converter 93 with the complemented complex coordinates of the second set of QAM symbols supplied from the pi radians rotator 194. This interleaving is done on a QAM symbol by QAM symbol basis to generate a serial ordering of QAM symbols supplied as input signal to the bank 95 of demappers for the first maps of QAM symbols. The output port of the bank 95 of demappers is connected for supplying interleaved soft-bit QAM lattice-point labels to a de-interleaver 197, which separates each successive pair of soft-bit QAM lattice-point labels, supplying the soft-bit lattice-point labels of the first set of QAM symbols to the first input port of the diversity combiner 97, and supplying the soft-bit lattice-point labels of the second set of QAM symbols to the second input port of the diversity combiner 97. The output port of the diversity combiner 97 connects directly to the write-input port of the QAM map label de-interleaver 98. Connections following the de-interleaver 98 are similar in FIG. 67 to those described in regard to FIG. 65.

FIG. 68 is a detailed schematic diagram of alternative modifications made to the receiver apparatus shown in FIG. 65 to allow first sets of QAM symbols as well as second sets of QAM symbols to be demapped by the bank 96 of QAM symbol demapper for the second sets of QAM symbols. A pi radians rotator 193 is connected for changing the polarities of both the real and the imaginary components of the complex coordinates of the first set of QAM symbols supplied from the P/S converter 93. An interleaver 196 of odd and even QAM symbols is connected for interleaving the complemented complex coordinates of the first set of QAM symbols supplied from the pi radians rotator 193 with the complex coordinates of the second set of QAM symbols supplied from the P/S converter 94. This interleaving is done on a QAM symbol by QAM symbol basis to generate a serial ordering of QAM symbols supplied as input signal to the bank 96 of demappers for the second sets of QAM symbols. The output port of the bank 96 of demappers is connected for supplying interleaved soft-bit QAM lattice-point labels to the de-interleaver 197, which separates each successive pair of soft-bit QAM lattice-point labels, supplying the soft-bit lattice-point labels of the first set of QAM symbols to the first input port of the diversity combiner 97, and supplying the soft-bit lattice-point labels of the second set of QAM symbols to the second input port of the diversity combiner 97. The output port of the diversity combiner 97 connects directly to the input port of the QAM map label de-interleaver 98. Connections following the de-interleaver 98 are similar in FIG. 68 to those described in regard to FIG. 65.

Further modification of the FIG. 67 or 68 modifications of the FIG. 65 receiver apparatus can be made, which further modification reverses the order of soft bits in lattice-point labels from one of the first and second sets of QAM symbols supplied from the de-interleaver 197 to the diversity combiner 97. Such further modification of the FIG. 67 modification accommodates QAM symbol constellations in the lower sidebands and the upper sidebands of a COFDM DCM signal being respectively mapped per separate ones of the FIG. 6 and FIG. 9 Gray maps of 16 QAM symbol constellations, per separate ones of the FIG. 10 and FIG. 13 SCM maps of 16 QAM symbol constellations, per separate ones of the FIG. 30 and FIG. 33 Gray maps of 64 QAM symbol constellations, or per separate ones of the FIG. 34 and FIG. 38 SCM maps of 64 QAM symbol constellations, by way of specific examples. Such further modification of the FIG. 68 modification accommodates QAM symbol constellations in the lower sidebands and the upper sidebands of a COFDM DCM signal being respectively mapped per separate ones of the FIG. 7 and FIG. 8 Gray maps of 16 QAM symbol constellations, per separate ones of the FIG. 11 and FIG. 12 SCM maps of 16 QAM symbol constellations, per separate ones of the FIG. 31 and FIG. 32 Gray maps of 64 QAM symbol constellations, or per separate ones of the FIG. 35 and FIG. 36 SCM maps of 64 QAM symbol constellations, by way of specific examples.

Figure 69:
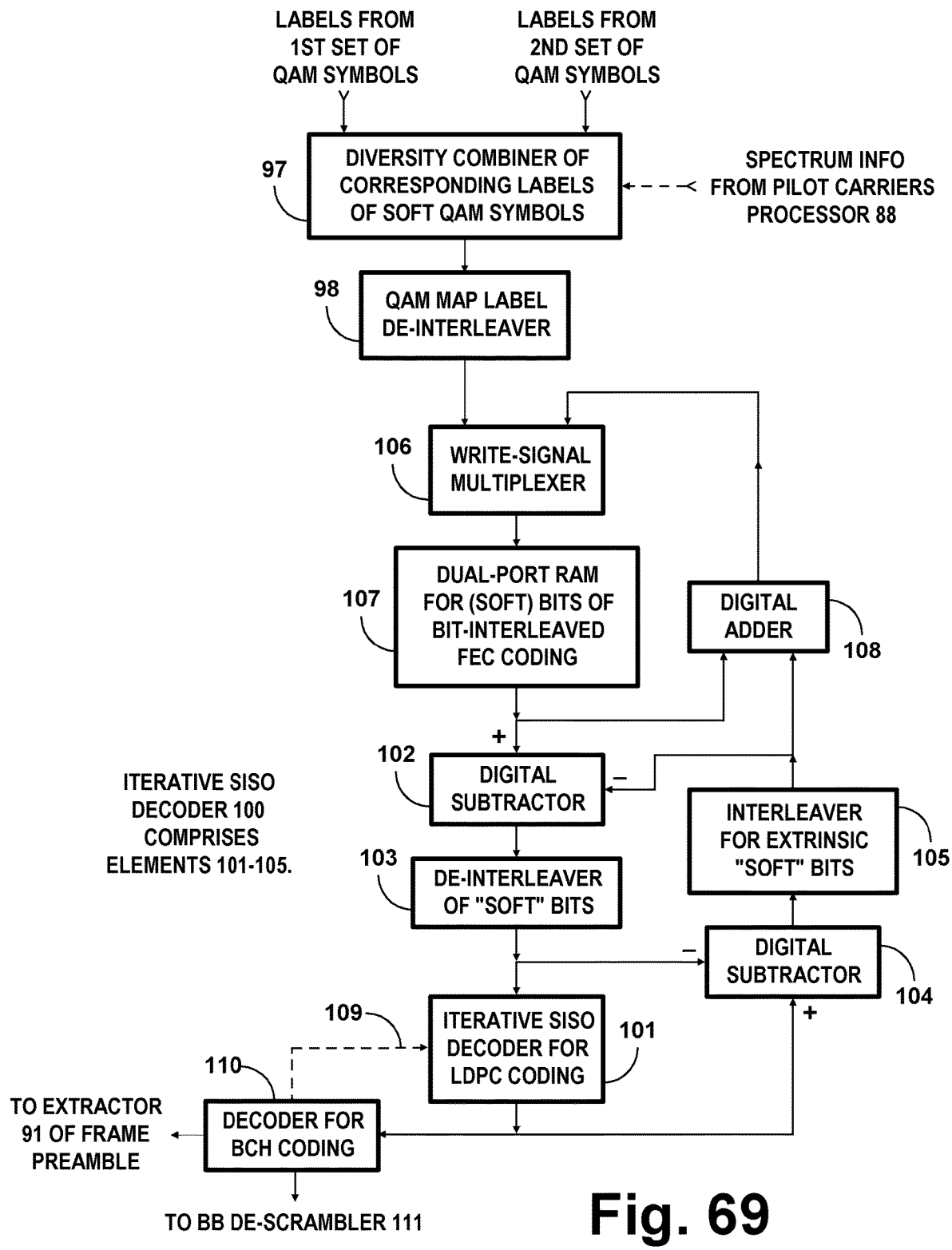
FIG. 69 is a detailed schematic diagram of modifications made to the receiver apparatus shown in FIG. 65 (and in FIGS. 66, 67 and 68) to arrange for performing soft-demapping and soft-decoding procedures iteratively in accordance with the "turbo" principle.

FIG. 69 is a detailed schematic diagram of modifications made to the receiver apparatus shown in FIG. 65—or to that receiver as modified in any of FIGS. 66, 67 and 68 to permit a single bank of demappers to demap both QAM symbols. FIG. 69 depicts the iterative SISO decoder 100 for bit-interleaved LDPC coding in further detail as comprising a component SISO decoder 101 for LDPC coding, a digital subtractor 102, a de-interleaver 103 of "soft" bits, a digital subtractor 104 and an interleaver 105 for extrinsic "soft" bits. FIG. 69 further depicts a write-signal multiplexer 117, a dual-port random-access memory 118 and a digital adder 119 arranged to cooperate with demappers of QAM symbols to perform soft-demapping and soft-decoding procedures iteratively in accordance with the "turbo" principle. U.S. Pat. No. 6,353,911 titled "Iterative demapping" granted 5 Mar. 2002 to Stefan ten Brink provides generic description of an arrangement for performing such soft-demapping and soft-decoding procedures, which arrangement includes an adaptive QAM demapper. A question that arises with regard to a receiver which includes two QAM demappers, one for the lower sideband of a COFDM DCM signal and the other for its upper sideband, concerns how adaptive demapping can be implemented.

FIG. 69 shows the output port of the diversity combiner 97 connected via the QAM map label de-interleaver 98 to a first of two input ports of the write-signal multiplexer 117. The output port of the multiplexer 117 connects to the write-input port of the dual-port RAM 118. The diversity combiner 97 periodically supplies soft bits of time-interleaved LDPC-coded data to the input port of the QAM map label de-interleaver 98. The de-interleaver 98 response is supplied to a first input port of the write-signal multiplexer 117, thence to be written into the dual-port RAM 118 via its write-input port. The read-output port of the dual-port RAM 118 connects to a first addend-input port of the digital adder 119, the second addend-input port of which adder 119 is connected for receiving a bit-interleaved extrinsic error signal. The sum output port of the adder 119 connects to the second of the two input ports of the write-signal multiplexer 117.

The read-output port of the dual-port RAM 118 is further connected for supplying a posteriori soft demapping results to the minuend-input port of the digital subtractor 102. The subtrahend-input port of the digital subtractor 102 is connected for receiving the bit-interleaved extrinsic error signal from the output port of the interleaver 105 for extrinsic "soft" bits. The difference output port of the digital subtractor 102 connects to the input port of the de-interleaver 103 for bit-interleaved soft bits. The output port of the de-interleaver 103 connects to the input port of the soft-input/soft-output (SISO) decoder 101 for LDPC coding and further connects to the subtrahend input port of the digital subtractor 104. The minuend input port of the subtractor 104 is connected to receive the soft bits of decoding results from the output port of the SISO decoder 101. The subtractor 104 generates soft extrinsic data bits by comparing the soft output bits supplied from the SISO decoder 101 with soft input bits supplied to the SISO decoder 101. The output port of the subtractor 104 is connected to supply these soft extrinsic data bits to the input port of the bit-interleaver 105, which is complementary to the de-interleaver 103. The output port of the bit-interleaver 105 is connected for feeding back bit-interleaved soft extrinsic data bits to the second addend-input port of the digital adder 119, therein to be additively combined with previous a posteriori soft demapping results read from the dual-port RAM 118 to generate updated a priori soft demapping results to write over the previous ones temporarily stored within that memory 118.

More specifically, the RAM 118 is read concurrently with memory within the bit-interleaver 105, and the soft bits read out in LLR form from the memory 118 are supplied to the first input port of the digital adder 119. The adder 119 adds the interleaved soft extrinsic bits fed back via the interleaver 105 to respective ones of the soft bits of a posteriori soft demapping results read from the RAM 118 to generate updated a priori soft demapping results supplied from the sum output port of the adder 119 to the write-input port of the RAM 118 via the write signal multiplexer 106. The soft bits of previous a posteriori demapping results temporarily stored in the RAM 118 are each written over after its being read and before another soft bit is read.

The output port of the bit-interleaver 105 is also further connected for feeding back bit-interleaved soft extrinsic data bits to the subtrahend input port of the subtractor 102. The subtractor 102 differentially combines the bit-interleaved soft extrinsic data bits fed back to it with respective ones of soft bits of the a posteriori demapping results read from the RAM 118, to generate soft extrinsic data bits for the adaptive soft demapper from the difference-output port of the subtractor 102 for application to the input port of the de-interleaver 103. As thus far described, the SISO decoder 101 and the adaptive soft demapper (comprising elements 117, 118 and 119 in addition to diversity combiner 97, QAM map label de-interleaver 98 and previous demapping elements) are effectively in a turbo loop connection with each other. The turbo cycle of demapping QAM constellations and decoding LDPC can be iterated many times to reduce bit errors in the BCH coding that the SISO decoder 101 finally supplies from its output port to the input port of the decoder 106 for BCH coding. Successful correction of BCH codewords can be used for terminating iterative demapping and decoding of LDPC coding after fewer turbo cycles than the maximum number permitted.

Figure 70:
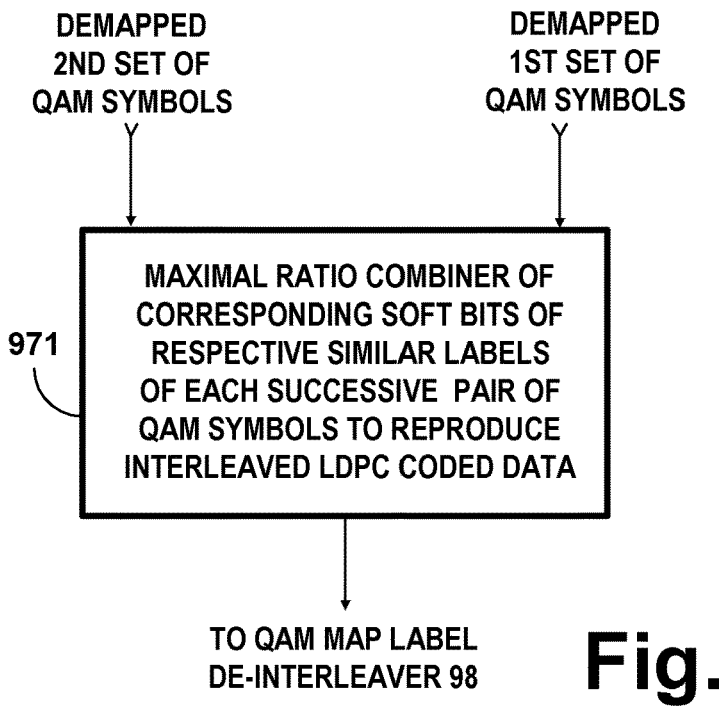
FIG. 70 is a schematic diagram of a diversity combiner that can be used for combining the results of dual QAM demapping in any of the configurations depicted in FIGS. 65-69, which diversity combiner comprises a maximal-ratio combiner of corresponding soft bits of respective similar labels of each successive pair of QAM symbols from dual QAM-symbol demapping procedures, which maximal-ratio combiner is operative on soft bits at bit level, rather than at symbol level.

FIG. 70 depicts a maximal-ratio combiner 971 that is a representative specific structure for the diversity combiner 97. The output port of the maximal ratio combiner 971 corresponds to the output port of diversity combiner 97, connecting to the input port of the QAM map label de-interleaver 98. A first of the two input ports of the maximal-ratio combiner 971 is connected to receive the demapped first set of QAM symbols, and the second of the two input ports of the maximal-ratio combiner 971 is connected to receive the demapped second set of QAM symbols. Thus, maximal-ratio combining at bit level is performed after QAM demapping, rather than before. The ratio in which a pair of corresponding QAM map labels are combined is determined by the respective strengths of their QAM symbols, as measured in the pilot carriers processor 88. Maximal-ratio combining soft bits of corresponding QAM-lattice-point labels improves SNR of reception over an AWGN channel by at least 8.5 dB. SNR is improved more than 8.5 dB, if BRA techniques are employed.

Each of the banks 95 and 96 of demappers of QAM symbols comprises a plurality of read-only memories (ROMs), one ROM for each bit of a particular size of QAM map label, which ROMs each receive as input address thereto the complex coordinates descriptive of a current one of a succession of QAM symbols. Each ROM generates a respective "soft" bit, a bit metric composed of the more likely one of the "hard" bits 1 and 0 accompanied by a confidence factor. Customarily, the confidence factors a logarithm of likelihood ratio (LLR) indicating how likely that decision as to the "hard" bit is correct. The maximal-ratio combiner 97 considers 1 and 0 "hard" bits as sign bits when combining the LLRs of each successive pair of "soft" bits in a signed addition. The sign bit of the resultant sum determines the "hard" bit in the "soft" bit response from the maximal-ratio combiner 971 and the rest of this resultant sum determines the LLR of the correctness of this "hard" bit in the "soft" bit response from the maximal-ratio combiner 971.

Maximal-ratio combining of frequency-diverse QAM signals is superior to other well-known types of diversity combining when those signals are afflicted by AWGN, atmospheric noise, Johnson noise within the receiver, or imperfect filtering of power from an alternating-current power source. However, maximal-ratio combining of frequency-diverse QAM signals performs less satisfactorily when one QAM signal is corrupted by burst noise or in-channel interfering signal and the other is not. These various conditions of unsatisfactory reception will cause errors in the reproduction of soft bits of FEC-coded data from the maximal-ratio combiner 971. The erroneous bits are dispersed by the QAM map label de-interleaver 98 and by a de-interleaver of soft "bits" within the iterative SISO decoder 100 for LDPC coding, which improves the chances for those erroneous bits to be corrected during the decoding of the forward-error-correction (FEC) coding by the decoders 100 and 106.

Figure 71:
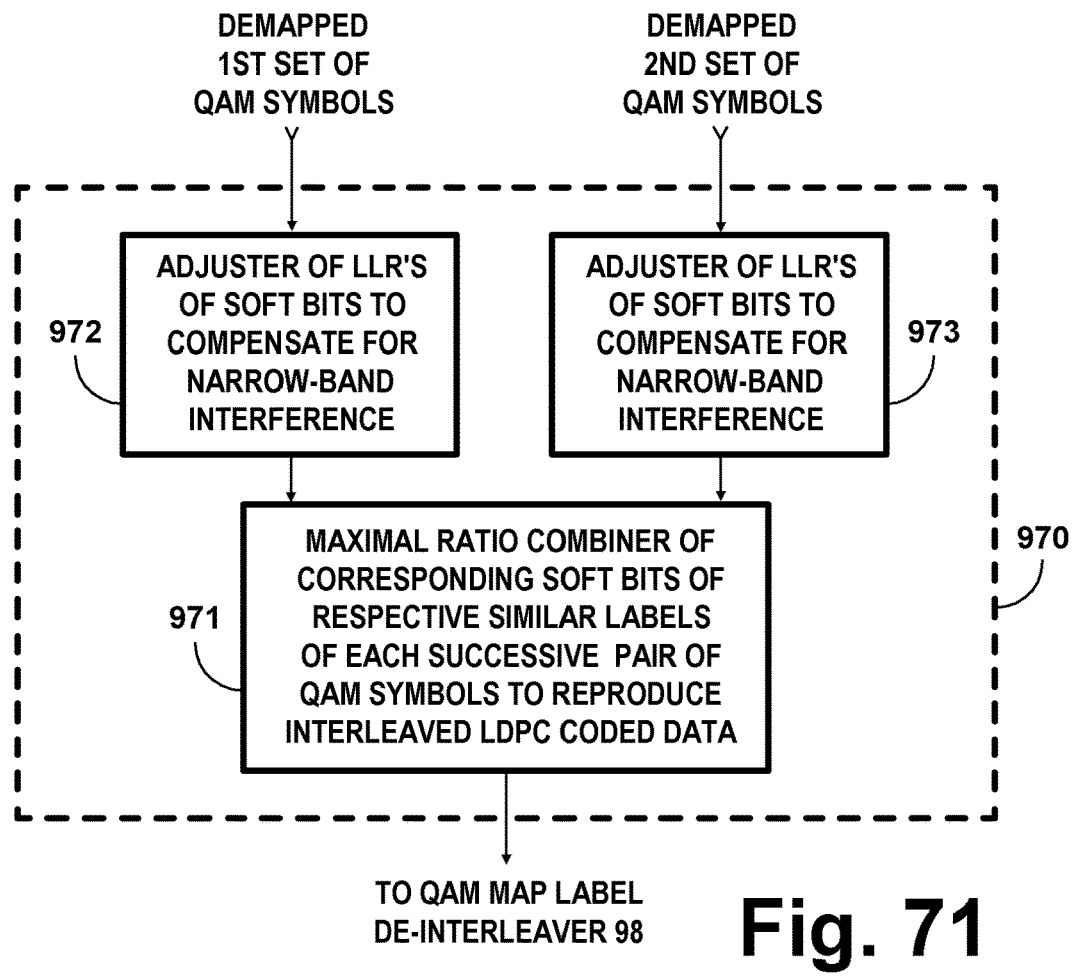
FIG. 71 is a schematic diagram of a diversity combiner that can be used for combining the results of dual QAM demapping any of the configurations depicted in FIGS. 65-69, which diversity combiner comprises a maximal-ratio combiner operative on soft bits at bit level, rather than at symbol level, the results of the dual QAM demappers being adjusted prior to application to the maximal-ratio combiner thus to implement a degree of selective diversity combining.

FIG. 71 depicts a more complex representative specific structure 970 for the diversity combiner 97, which structure 970 includes the maximal-ratio combiner 971. The structure 970 further includes an adjuster 972 of the LLRs of soft bits of the demapped first set of QAM symbols before their application to the first input port of the maximal-ratio combiner 971. The structure 970 also further includes an adjuster 973 of the LLRs of soft bits of the demapped second set of QAM symbols before their application to the second input port of the maximal-ratio combiner 971. The adjuster 972 reduces the LLRs of soft bits of the demapped first set of QAM symbols supplied to the maximal-ratio combiner 971 when the hard bit portions of those soft bits are well out of normal mapping range, as detected by the pilot carriers processor 88. This is done to compensate for narrow-band interference or drop-outs in received signal strength. The adjuster 973 reduces the LLRs of soft bits of the demapped second set of QAM symbols supplied to the maximal-ratio combiner 971 when the hard bit portions of those soft bits are well out of normal mapping range, as detected by the pilot carriers processor 88. This is done to compensate for narrow-band interference and/or for drop-outs in received signal strength.

When dual QAM mapping procedures are applied to a COFDM DCM signal, so its frequency spectrum is as illustrated in FIG. 5, the lower and upper half spectra can be detected by heterodyning them with beat-frequency oscillations of nominally the same frequency as a pilot tone at the juncture of those half spectra. Such demodulation procedures treat the SSB amplitude-modulation signal as an asymmetric-sideband (ASB) signal. These demodulation procedures are appreciably less likely to be affected by adjacent-channel interference than the previously described procedures that heterodyne the COFDM signal with beat-frequency oscillations of nominally the same frequency as a pilot tone at an edge of the RF channel. These demodulation procedures are facilitated by a front-end tuner 180, 280, 380 or 480 as described infra down-converting the RF COFDM input signal it receives signal to an IF COFDM signal. This IF COFDM signal is then synchrodyned to baseband using beat-frequency oscillations of nominally the same frequency as a pilot tone at the juncture of those half spectra.

Figure 72:
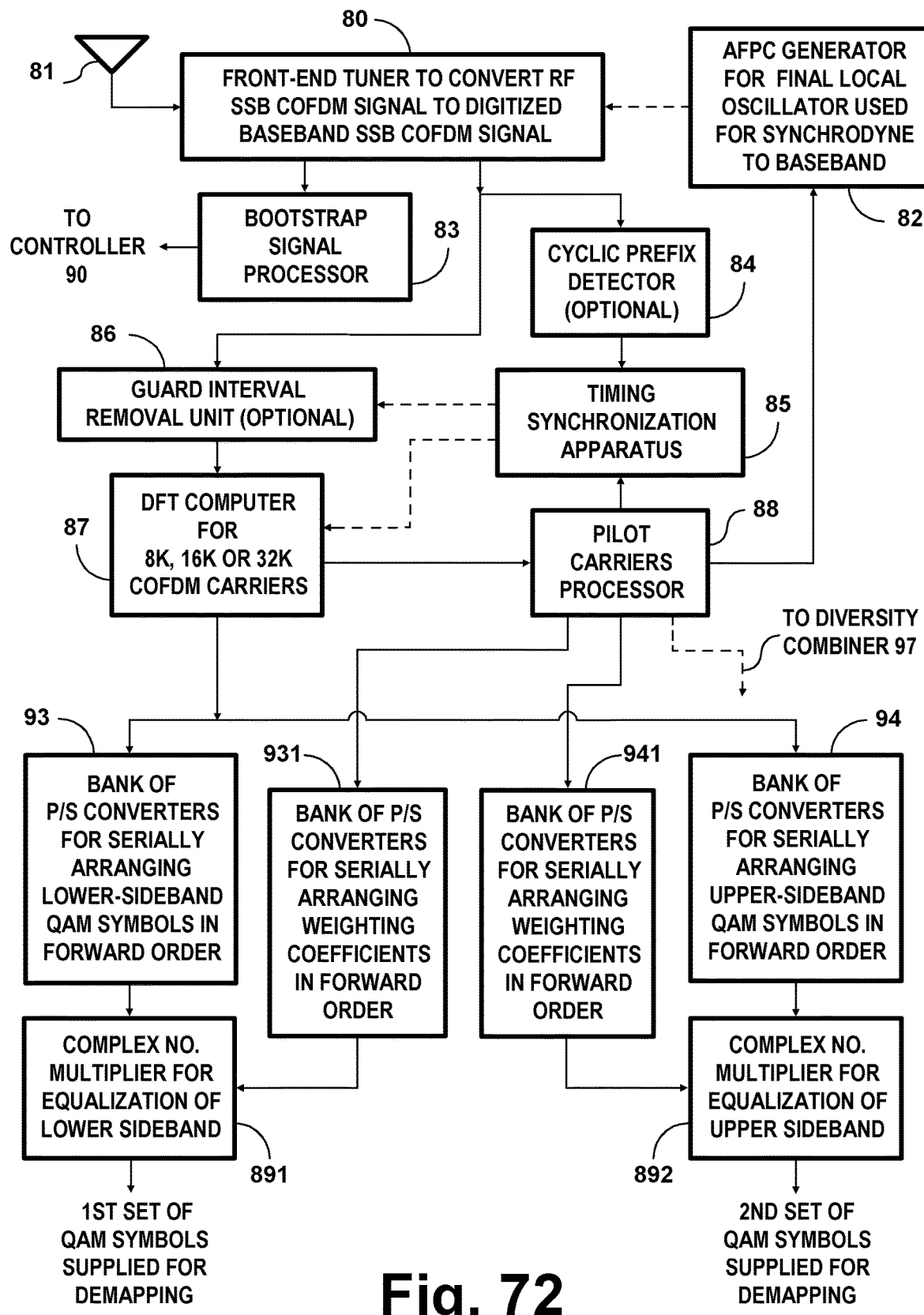
FIG. 72 is a schematic diagram of a variant of the FIG. 64 receiver structure.

FIG. 72 depicts a variant of the FIG. 64 receiver structure. The channel equalizer 89 that performed multiplications on each of the QAM symbols supplied in parallel from the DFT computer 87 is omitted. A complex-number multiplier 891 performs frequency-domain channel equalization on each of the QAM symbols extracted from the lower sideband of the COFDM DCM signal by the DFT computer 87 after their serialization by a selected one of the parallel-to-serial (P/S) converters in the bank 93 of them. Another complex-number multiplier 892 performs frequency-domain channel equalization on each of the QAM symbols extracted from the upper sideband of the COFDM DCM signal by the DFT computer 87 after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus—e.g., as depicted in any of FIGS. 65-68.

More particularly, the QAM symbols that the DFT computer 87 extracts from the lower sideband of the COFDM DCM signal are supplied, in parallel and in prescribed spectral arrangement, directly to the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 88, the weighting coefficients for frequency-domain channel equalization of the lower sideband of the COFDM DCM signal. The output port of that selected P/S converter responds to supply serialized weighting coefficients for the upper sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols that the DFT computer 87 extracts from the upper sideband of the COFDM DCM signal are supplied, in parallel and in prescribed spectral arrangement, directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 88, the weighting coefficients for frequency-domain channel equalization of the upper sideband of the COFDM DCM signal. The output port of that selected P/S converter responds to supply serialized weighting coefficients for the lower sideband of the COFDM DCM signal to the multiplier input port of the complex-number multiplier 892. The multiplier 892 responds to its multiplicand and multiplier input signals to supply from its product output port an equalized second set of QAM symbols, suitable for subsequent demapping.

Figure 73:
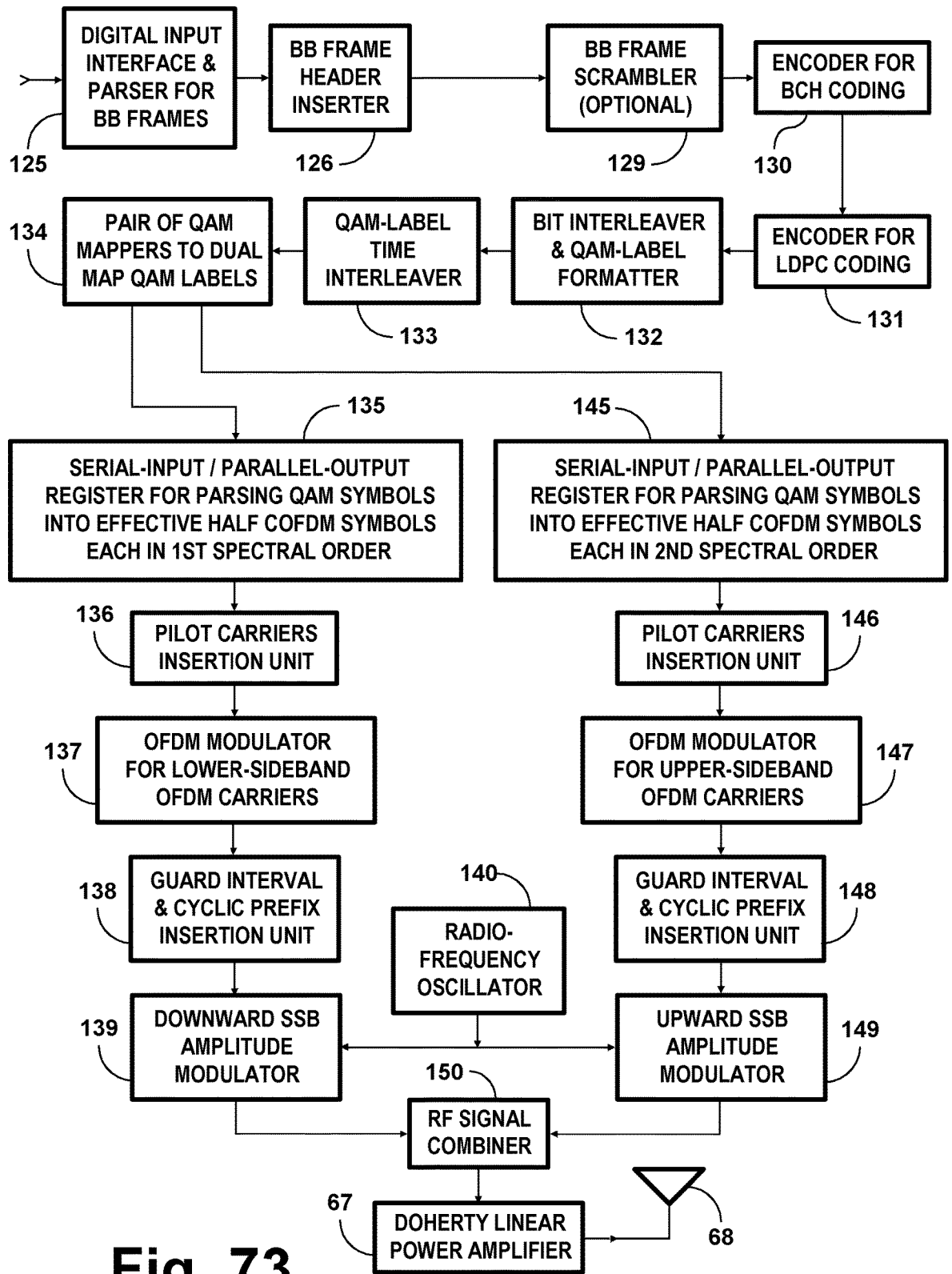
FIG. 73 is a schematic diagram of COFDM transmitter apparatus that is configured for transmitting COFDM DCM signals.

FIG. 73 depicts a transmitter structure for transmitting coded data twice, once in the lower sideband of a COFDM DCM signal and once in its upper sideband. A digital input interface and parser for baseband frames 125 responds to a digital data stream supplied to its input port for supplying baseband data frames to a baseband frame header inserter 126. FIG. 73 shows the output port of the BB FRAME header inserter 126 connected to the input port of a BBFRAME scrambler 129, which data randomizes the BBFRAME supplied from the output port of the BBFRAME scrambler 129 to the input port of an encoder 130 for BCH coding. If the BBFRAME scrambler 129 is omitted, which omission is optional, the output port of the BBFRAME header inserter 126 can connect directly to the input port of an encoder 130 for BCH coding. FIG. 73 shows the output port of the encoder 130 connected to the input port of an encoder 131 for LDPC coding. FIG. 73 shows the output port of the encoder 131 connected to the input port of a bit-interleaver and QAM label formatter 132. The cascade connection of the encoder 130 for BCH coding and the encoder 131 for LDPC coding is apt to be replaced by means for implementing other forms of forward error-correction coding in some variants of the FIG. 73 structure.

FIG. 73 shows the output port of the bit-interleaver and QAM label formatter 132 connected to the input port of a QAM-label time interleaver 133 and the output port of the QAM-label time interleaver 133 connected to the input port(s) of a pair 134 of QAM mappers that map QAM labels differently, thereby to dual map those QAM labels. The QAM-label time interleaver 133 is omitted in some variants of the FIG. 73 structure in which the output port of the bit-interleaver and QAM label formatter 132 connects directly to the input port(s) of the pair 134 of QAM mappers.

A first of the pair 134 of QAM mappers supplies a first stream of complex coordinates of QAM symbols to a serial-input/parallel-output register 135. The SIPO register 135 parses the QAM symbols into effective half COFDM symbols, arranging the QAM symbols, each in prescribed spectral order. The parallel output ports of the SIPO register 135 are connected to the parallel input ports of a pilot-carrier symbols insertion unit 136, which introduces pilot carrier symbols at suitable intervals between QAM symbols in each effective half COFDM symbol to generate a respective complete half COFDM symbol. The parallel output ports of the pilot-carrier symbols insertion unit 136 are connected to the parallel input ports of an OFDM modulator 137 for lower-sideband OFDM carriers. The OFDM modulator 137 performs an I-FFT and supplies the results from its output port to the input port of a guard interval and cyclic prefix insertion unit 138. The output port of the guard interval and cyclic prefix insertion unit 138 is connected for supplying amplitude-modulating signal to the modulating-signal input port of a downward single-sideband amplitude modulator 139, there to modulate radio-frequency carrier supplied from the output port of a radio-frequency oscillator 140 to a principal-carrier input port of the SSB amplitude modulator 139.

A second of the pair 134 of QAM mappers supplies a second stream of complex coordinates of QAM symbols to a serial-input/parallel-output register 145. The SIPO register 145 parses the QAM symbols into effective half COFDM symbols, arranging the QAM symbols in prescribed spectral order. The parallel output ports of the SIPO register 145 are connected to the parallel input ports of a pilot-carrier symbols insertion unit 146, which introduces pilot carrier symbols at suitable intervals between QAM symbols in each effective half COFDM symbol to generate a respective complete half COFDM symbol. The parallel output ports of the pilot-carrier symbols insertion unit 146 are connected to the parallel input ports of an OFDM modulator 147 for upper-sideband OFDM carriers. The OFDM modulator 147 performs an I-FFT and supplies the results from its output port to the input port of a guard interval and cyclic prefix insertion unit 148. The output port of the guard interval and cyclic prefix insertion unit 148 is connected for supplying amplitude-modulating signal to the modulating-signal input port of an upward single-sideband amplitude modulator 149, there to modulate radio-frequency carrier supplied from the output port of the radio-frequency oscillator 140 to a principal-carrier input port of the SSB amplitude modulator 149.

The pilot-carrier symbols insertion units 136 and 146 combine with the SIPO registers 135 and 145 so as to constitute a COFDM symbol generator for supplying respective halves of COFDM symbols to the OFDM modulators 137 and 147, which respective halves of COFDM symbols are respectively responsive to first and second sets of QAM symbols supplied from respective ones of the pair 134 of QAM mappers. First and second input ports of a radio-frequency signal combiner 150 are respectively connected for receiving the lower SSB amplitude-modulated RF signal from the output port of the amplitude modulator 139 and for receiving the upper SSB amplitude-modulated RF signal from the output port of the amplitude modulator 149. The RF oscillator 140, SSB amplitude modulator 139, SSB amplitude modulator 149 and RF signal combiner 150 combine to constitute a generator of COFDM DCM radio-frequency signal. Owing to arrangements of first and second sets of successive QAM symbols in the frequency spectrum carried out by the preceding generator of COFDM symbols, the lower-frequency sideband of this RF signal conveys the first set of successive QAM symbols and the upper-frequency sideband of this RF signal conveys a second set of successive QAM symbols. The output port of the RF signal combiner 150 is connected for supplying ISB signal to the input port of the linear power amplifier 67, which is preferably of Doherty type. The output port of the linear power amplifier 67 is connected for driving RF analog COFDM signal power to the transmission antenna 68. The effective COFDM symbols are caused to have a preferred prescribed spectral response as shown in FIG. 5 by (a) arranging the SIPO register 135 to parse QAM symbols that convey successive samples of coded data so as to be in ascending spectral order in each effective half COFDM symbol for the lower sideband and (b) arranging the SIPO register 145 to parse QAM symbols that convey successive samples of coded data so as to be in ascending spectral order in each effective half COFDM symbol for the upper sideband. (In variants of the aspects of the invention specifically described in detail herein, an alternative prescribed spectral response parses QAM symbols that convey successive samples of coded data so as to be in descending spectral order in each effective half COFDM symbol for the upper sideband and in each effective half COFDM symbol for the lower sideband.)

Figure 74:
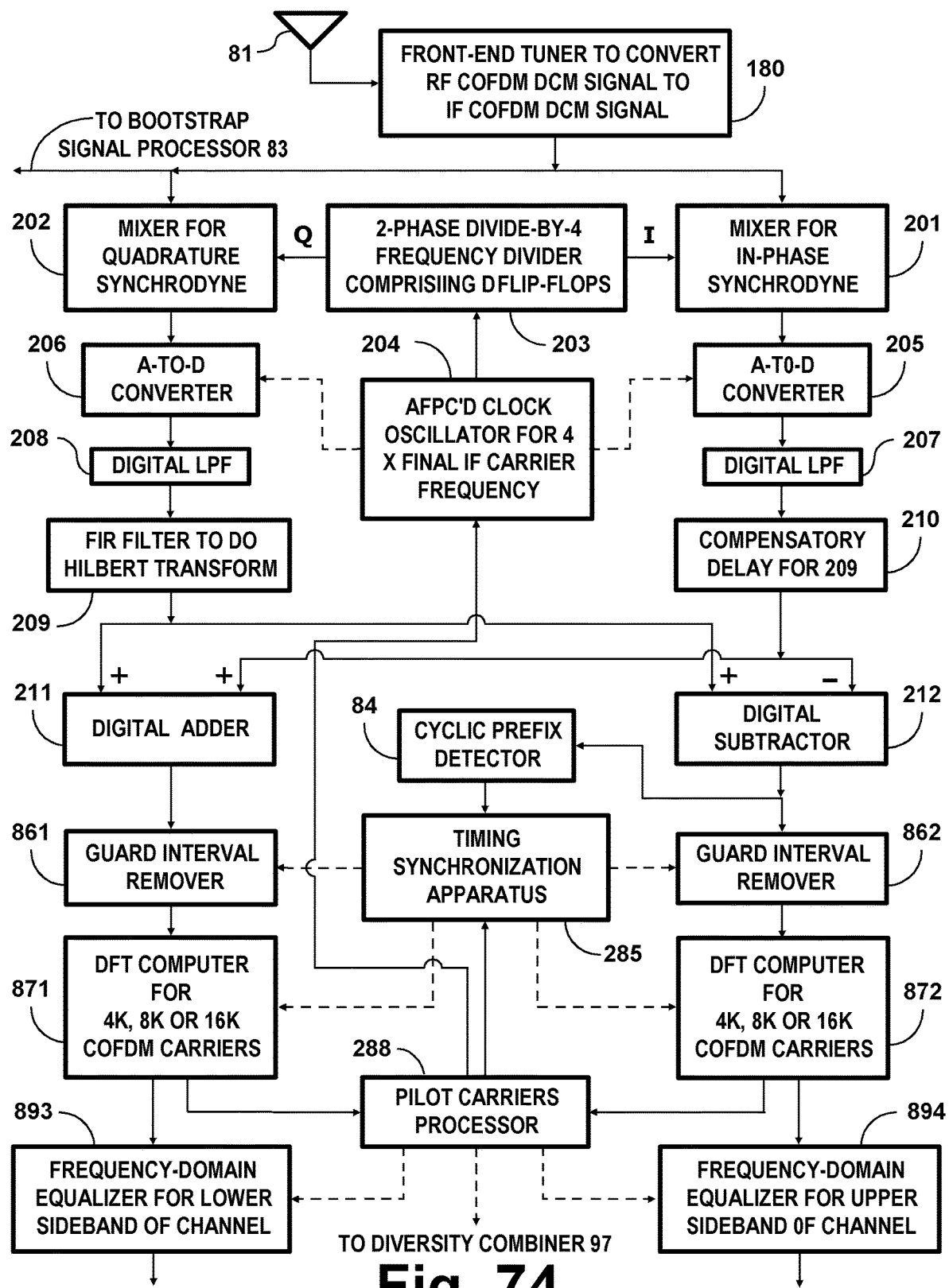

FIGS. 74 and 65 together depict receiver apparatus for independent-sideband (ISB) demodulation of COFDM signals using respective phase-shift methods to respond separately to the concurrent lower and upper sidebands of COFDM DCM signals. The receiver apparatus depicted in FIG. 74 applies the well-known phase-shift methods for demodulating SSB amplitude-modulation signals to demodulating the lower and upper sidebands of COFDM DCM signals to certain extent separately from each other. A reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202.

U.S. provisional Pat. App. 62/488,793 filed 23 Apr. 2017 by A. L. R. Limberg and titled "Double-sideband COFDM signal receivers that demodulate unfolded frequency spectrum" illustrates a beat-frequency oscillator (BFO) supplying in-phase (I) and quadrature (Q) beat-frequency oscillations to the respective carrier input ports of analog mixers and via a direct connection and via a −90° phase-shifter, respectively. Such practice is problematic in the following two respects. It is difficult to realize a phase-shifter with analog circuitry, which phase-shifter provides exact −90° phase shift despite change in BFO frequency. Also, maintaining the amplitudes of the beat-frequency oscillations to the respective carrier input ports of the two analog mixers the same is rather difficult.

Figure 75:
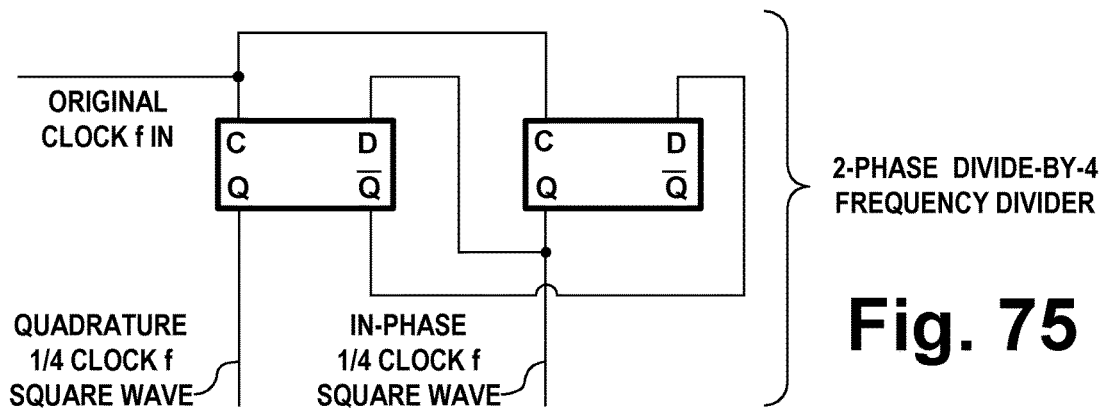
FIG. 75 is a schematic diagram of a two-phase divide-by-four frequency divider constructed from gated D flip-flops or data latches, which sort of frequency divider is an element in the receiver apparatus depicted in FIGS. 74, 77-79, and 81.

The latter of these difficulties is avoided by mixers 201 and 202 being of switching type receiving I and Q square waves at their respective carrier input ports. Fundamental-frequency components of the I and Q square waves that are at quite exactly at 0° and −90° relative phasings, despite change in frequency, are supplied from a 2-phase divide-by-4 frequency divider 203 in response to rising edges of pulses from a clock oscillator 204. The frequency divider 203 can be constructed from two gated D flip flop-flops (or data latches) suitably connected as depicted in FIG. 75. The clock oscillator 204 is subject to automatic frequency and phase control (AFPC) that adjusts the frequency of clock pulses to be four times the final intermediate-frequency (IF) carrier of the COFDM signals. A voltage-controlled crystal oscillator (VCXO) supplying oscillations nominally at 44 MHz is perhaps the optimal choice for the clock oscillator 204. The mixer 201 is conditioned to perform an in-phase synchrodyne of intermediate-frequency COFDM DCM signal to baseband, responsive to its carrier input port receiving leading in-phase (I) square wave from the frequency divider 203. The mixer 202 is conditioned to perform a quadrature synchrodyne of intermediate-frequency COFDM DCM signal to baseband, responsive to its carrier input port receiving lagging quadrature (Q) square wave from the frequency divider 203.

An analog-to-digital converter 205 performs analog-to-digital conversion of baseband signal supplied from the output port of the mixer 201. The sampling of the mixer 201 output signal by the A-to-D converter 205 is timed by a first set of alternate clock pulses received from the clock oscillator 204. An analog-to-digital converter 206 performs analog-to-digital conversion of the baseband signal supplied from the output port of the mixer 202. The sampling of the mixer 202 output signal by the A-to-D converter 206 is timed by a second set of alternate clock pulses received from the clock oscillator 204. The digitized in-phase baseband signal supplied from the output port of the A-to-D converter 205 is supplied to the input port of a digital lowpass filter 207. The digitized quadrature baseband signal supplied from the output port of the A-to-D converter 206 is supplied to the input port of a digital lowpass filter 208. The digital lowpass filters 207 and 208 are of similar design, each to supply a response to a respective sideband which response is free of components of image signal remnant from the synchrodyning procedures. Preferably, that is, the design of the digital lowpass filters 207 and 208 provides a rapid roll-off of their higher-frequency responses, so as to suppress adjacent-channel interference (ACI).

The response of the digital lowpass filter 208 to quadrature baseband signal is supplied to the input port of a finite-impulse-response digital filter 209 for Hilbert transformation. The response of the digital lowpass filter 207 to in-phase baseband signal is supplied to the input port of a clocked digital delay line 210 that affords delay to compensate for the latent delay through the FIR filter 209. The Hilbert transform response of the FIR filter 209 and the response of the digital delay line 210 are supplied to respective addend input ports of a digital adder 211 operative to recover, at baseband, the lower sideband of the COFDM DCM signal at its sum output port. The Hilbert transform response of the FIR filter 209 and the response of the digital delay line 210 are supplied respectively to the minuend input port and the subtrahend input port of a digital subtractor 212 operative to recover, at baseband, the upper sideband of the COFDM DCM signal at its difference output port.

The sum output port of the digital adder 211 connects to the input port of a guard interval remover 861. The output port of the guard interval remover 861 is connected for supplying the input port of a discrete-Fourier-transform (DFT) computer 871 with windowed portions of the baseband digitized lower sideband of the COFDM DCM signal that span respective COFDM symbol intervals. The complex coordinates of QAM symbols the DFT computer 871 extracts from lower sideband carriers in each COFDM symbol sampling interval that convey coded data are supplied as parallel input signal to a frequency-domain channel equalizer 893 for just those QAM symbols, connected for supplying equalized QAM symbols to the parallel inputs of the P/S converter 93 in the FIG. 65 portion of the television receiver.

Subsequently to the recovery of the digitized upper sideband of the COFDM DCM signal at baseband by phase shift method, it is supplied from the difference output port of the digital subtractor 212 to the input port of a guard interval remover 862. The output port of the guard interval remover 862 is connected for supplying the input port of a DFT computer 872 with windowed portions of the baseband digitized upper sideband of the COFDM DCM signal that span respective COFDM symbol intervals. The complex coordinates of QAM symbols the DFT computer 872 extracts from upper sideband carriers in each COFDM symbol sampling interval that convey coded data are supplied as parallel input signal to a frequency-domain channel equalizer 894 just for those QAM symbols. Parallel output ports of the channel equalizer 894 are connected for supplying equalized QAM symbols to the parallel inputs of the P/S converter 94 in the FIG. 65 portion of the television receiver.

The DFT computers 871 and 872 are similar in construction, each configured so it can demodulate any one of 4K, 8K or 16K options as to half the nominal number of OFDM carriers. The correct option is chosen responsive to an instruction from a controller 90 that generates a number of instructions used to configure the COFDM receiver to suit the broadcast standard used transmissions currently received. The bootstrap signal processor 83, the controller 90, the extractor 91 of FEC frame preambles, and the processor 92 of COFDM frame preambles are not explicitly depicted in any of the FIGS. 72, 74, 77, 79, 81 and 82, but such elements are implicitly included in the structure of each of the COFDM DCM receivers shown in part in these figures of the drawing.

The guard interval removers 861 and 862 are each constructed similarly to the guard interval remover 86 in the FIG. 64 receiver apparatus, removing guard intervals responsive to the occurrences of cyclic prefixes having been detected by a cyclic prefix detector 84. FIG. 74 shows the input port of the cyclic prefix detector 84 connected for detecting the occurrences of cyclic prefixes in the digitized upper sideband of the COFDM DCM signal supplied at baseband from the output port of the digital subtractor 212. Alternatively, the input port of the cyclic prefix detector 84 can instead be connected for detecting the occurrences of cyclic prefixes in the digitized lower sideband of the COFDM DCM signal supplied at baseband from the output port of the digital adder 211. The cyclic prefix detector 84 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 285. First and second output ports of the timing synchronization apparatus 285 are connected for supplying similar gating control signals to the control input ports of the guard interval removers 861 and 862. Third and fourth output ports of the timing synchronization apparatus 285 are connected for supplying indications of the phasing of COFDM symbols to the DFT computers 871 and 872 respectively.

The complex coordinates of QAM symbols extracted from pilot carriers in each COFDM symbol sampling interval are supplied as parallel input signal to a pilot carriers processor 288. The pilot carriers processor 288 responds to complex coordinates of QAM symbols extracted from lower-sideband pilot carriers to generate weighting coefficients for the frequency-domain channel equalizer 893 to apply to QAM symbols extracted from the upper sideband of the COFDM DCM signal. A first of five output ports of the processor 288 that are explicitly shown in FIG. 74 is connected for supplying these weighting coefficients (via wiring depicted as a dashed-line connection) to the frequency-domain channel equalizer 893, which uses those weighting coefficients for adjusting its responses to the demodulation results for each of the lower-sideband COFDM carriers that convey data. The pilot carriers processor 288 responds to complex coordinates of QAM symbols extracted from upper-sideband pilot carriers to generate weighting coefficients for the frequency-domain channel equalizer 894 to apply to QAM symbols extracted from the upper sideband of the COFDM DCM signal. A second of the five output ports of the processor 288 that are explicitly shown in FIG. 74 is connected for supplying these weighting coefficients (via wiring depicted as a dashed-line connection) to the frequency-domain channel equalizer 894, which uses them for adjusting its responses to the demodulation results for each of the upper-sideband COFDM carriers that convey data.

A third of the output ports of the pilot carriers processor 288 that are explicitly shown in FIG. 74 is connected for supplying more accurate window-positioning information to the second input port of the timing synchronization apparatus 285. This window-positioning information is an adjustment generated by a feedback loop that seeks to minimize the noise accompanying pilot carriers, which noise increases owing to intercarrier interference from adjoining modulated carriers when window positioning is not optimal. A fourth of the output ports of the pilot carriers processor 288 explicitly shown in FIG. 74 is connected for forwarding automatic frequency and phase control (AFPC) developed from unmodulated pilot carriers to the AFPC input port of the clock oscillator 204. The real components of the unmodulated pilot carriers are multiplied by their respective imaginary components in the pilot carriers processor 288. The processor 288 sums and low-pass filters the resulting products to develop the AFPC signal that the processor 288 supplies to the clock oscillator 204. Responsive to this AFPC signal, the clock oscillator 204 regulates the frequency of its oscillations to be four times the carrier frequency of the final IF signal that the front-end tuner 180 supplies to the input ports of the mixers 201 and 202. This AFPC signal controls the frequency and phase of the clock pulses that the clock oscillator 204 supplies to the 2-phase divide-by-4 frequency divider 203.

A fifth of the output ports of the pilot carriers processor 288 explicitly shown in FIG. 74 is connected for supplying a diversity combiner 97 (depicted in each of FIGS. 65-69) with information concerning the frequency spectrum of each successive COFDM symbol.

FIG. 75 depicts two data latches—i.e., gated D flip-flops—connected to provide a two-phase divide-by-four frequency divider, such as the frequency divider 203 depicted in FIG. 74. The respective clock (C) input connections of the two data latches are each connected for receiving an original clock signal of frequency f, which clock signal is received from the clock oscillator 204 for the frequency divider 203 depicted in FIG. 74. Each of the two data latches has its own normal (Q) output connection and its own complementary (Q) output connection. There is wire connection from the complementary (Q) output connection of the data latch at left to the data (D) input connection of the data latch at right, and there is wire connection from the normal (Q) output connection of the data latch at right to the data (D) input connection of the data latch at left. The normal (Q) output connection of the data latch at right supplies a leading square wave having an "in-phase" fundamental frequency f/4, and the normal (Q) output connection of the data latch at left supplies a lagging square wave having a "quadrature" fundamental frequency f/4 that lags the "in-phase" fundamental frequency by 90°.

Figure 76:
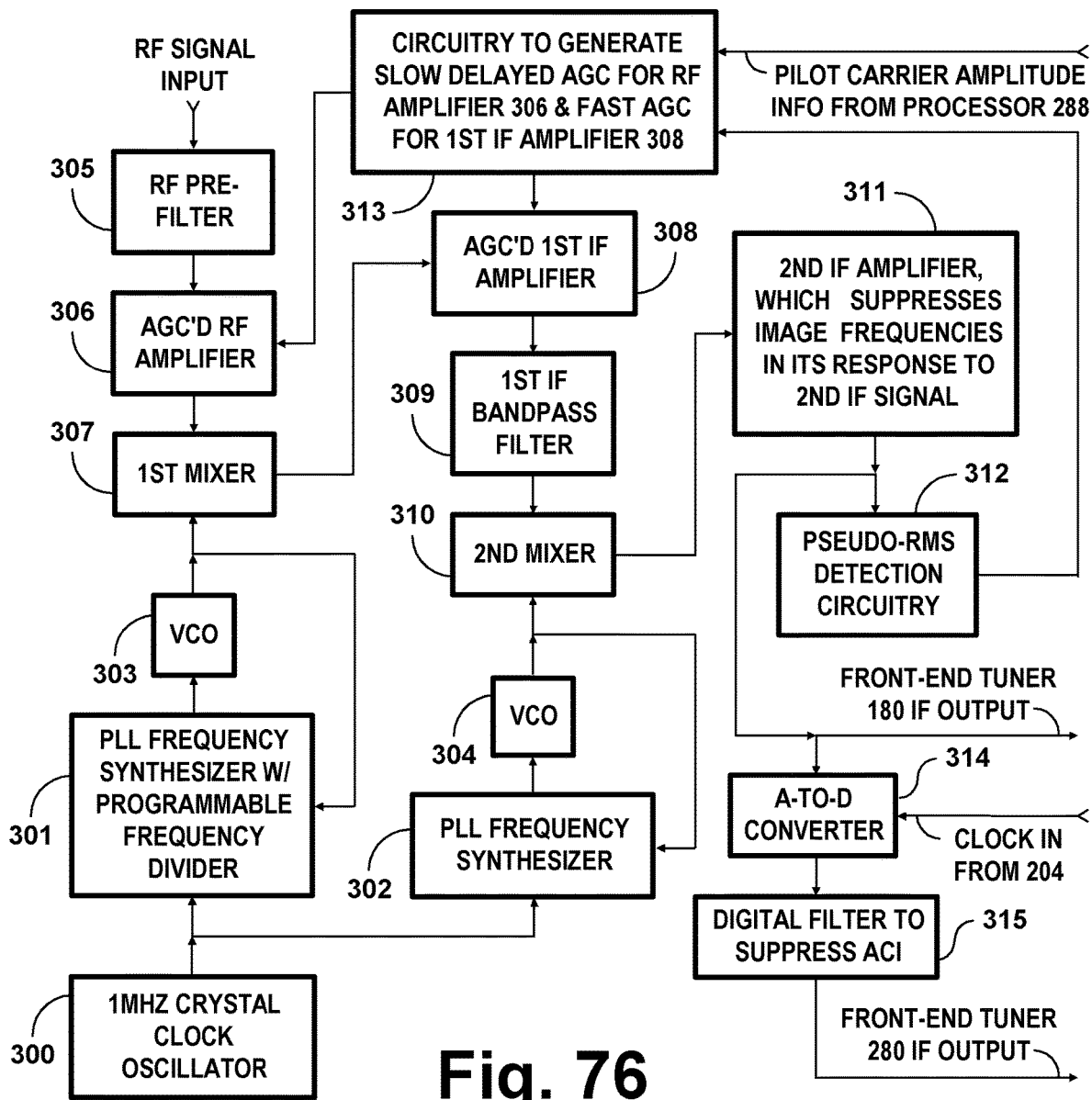
FIG. 76 is a schematic diagram of double superheterodyne front-end tuner structure suitable for inclusion in any of the apparatuses for demodulating COFDM DCM signals depicted in FIGS. 64, 72, 74, 77-79, and 81.
Figure 77:
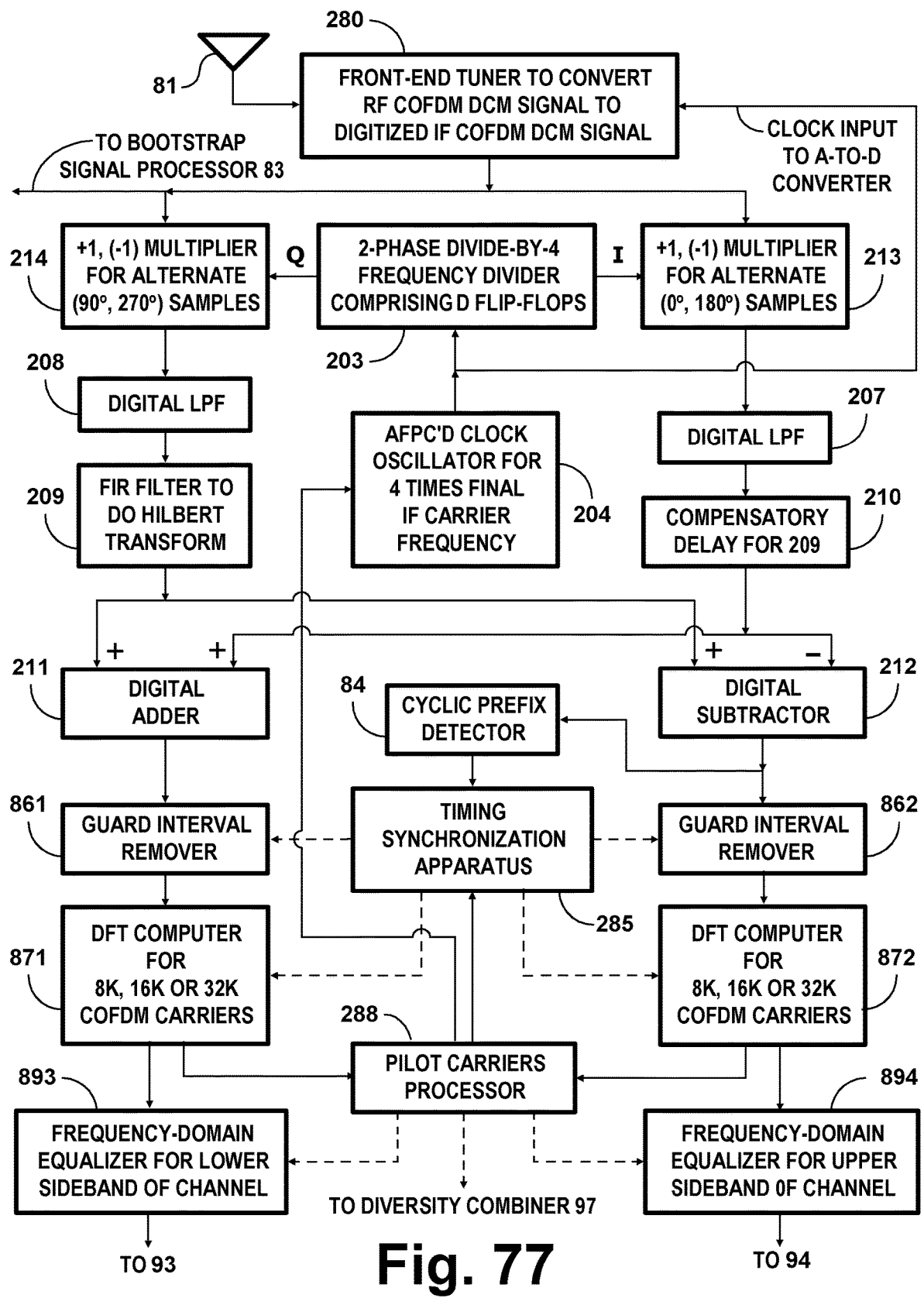
Figure 78:
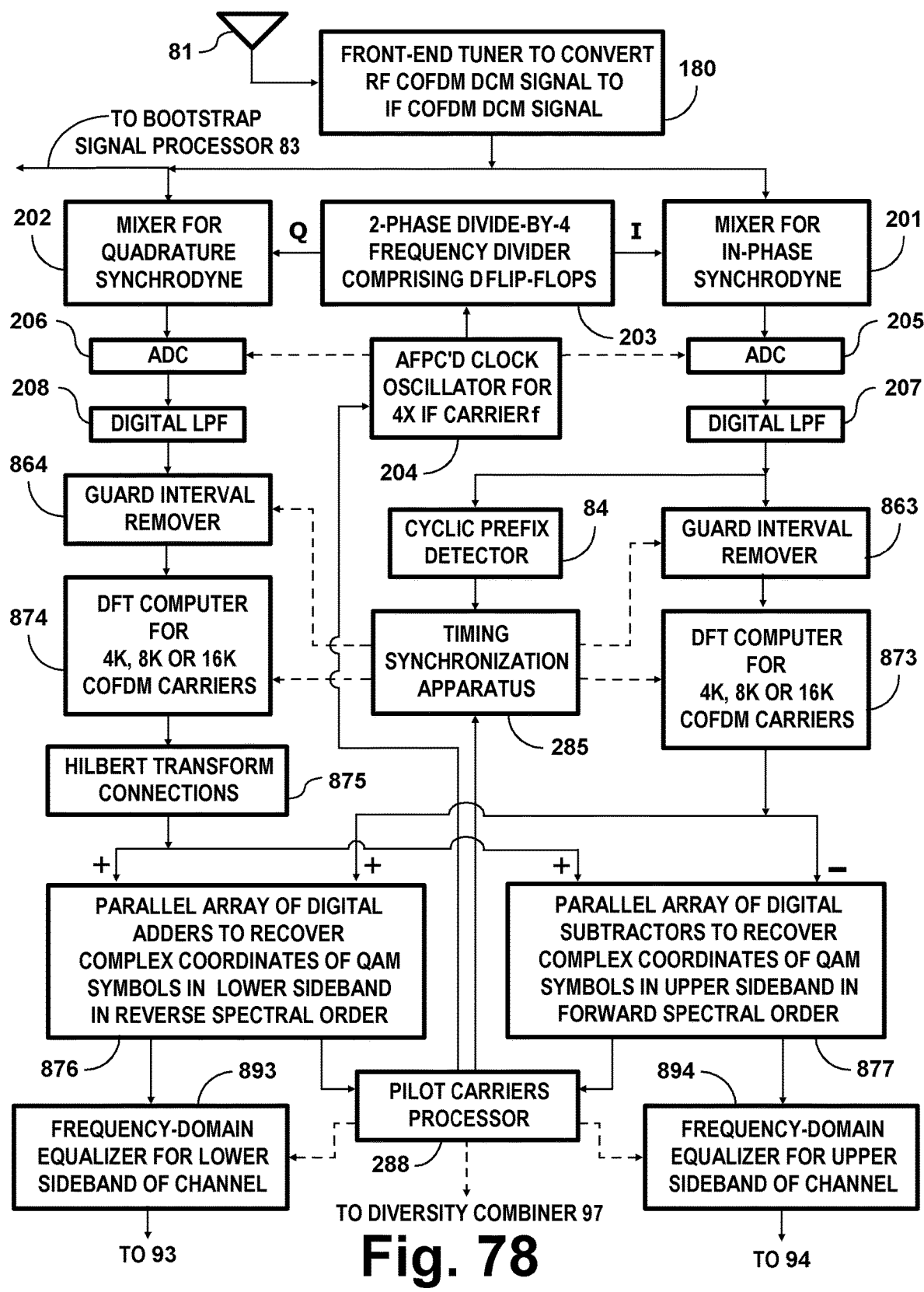
Figure 79:
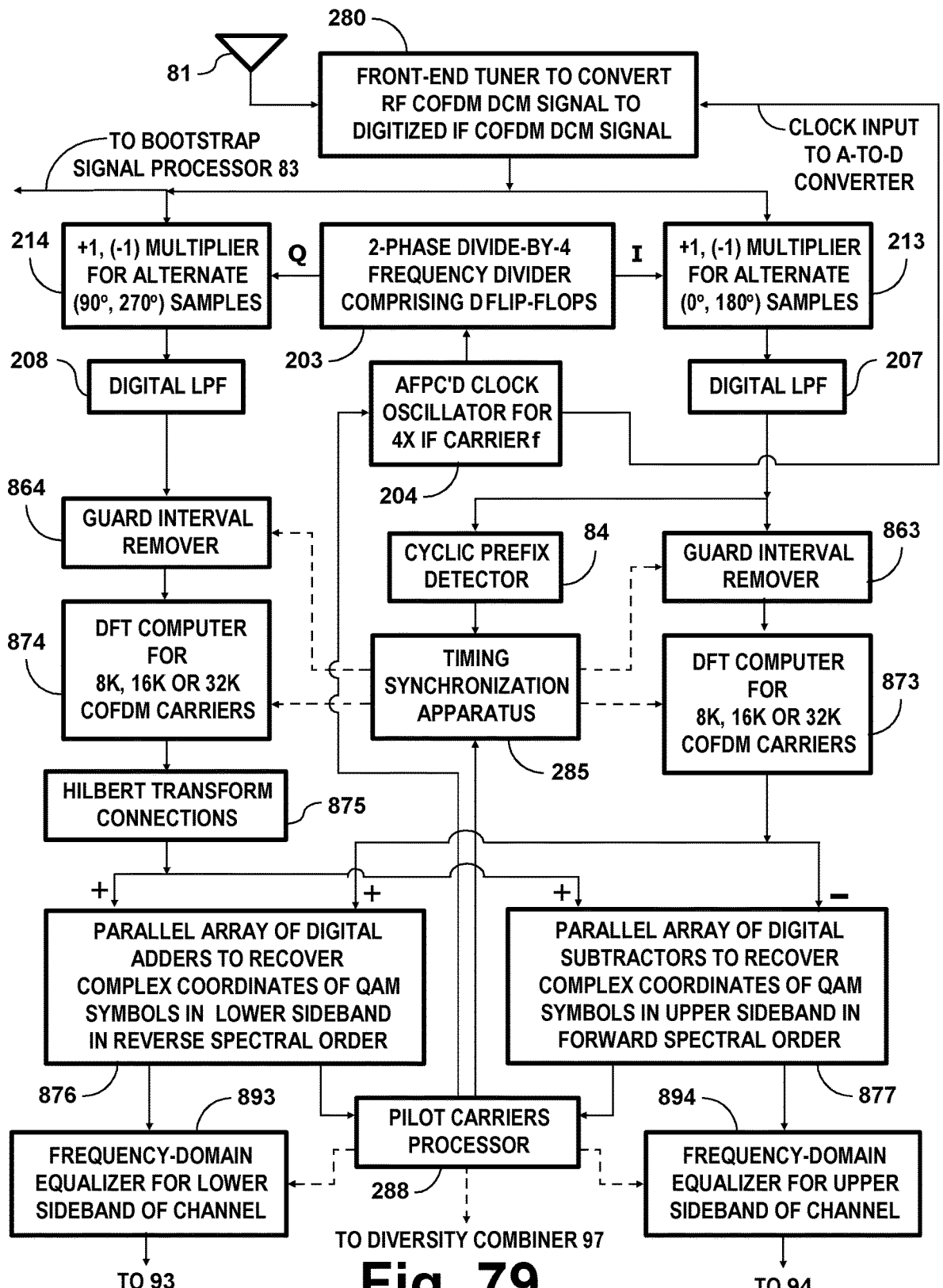

FIG. 76 depicts double-conversion front-end tuner structure suitable for the front-end tuner 180 depicted in FIGS. 74 and 78, and for the front-end tuner 280 depicted in FIGS. 77 and 79. Double-conversion front-end tuners are particularly advantageous over single-conversion front-end tuners when more television channels are more closely packed within the allocated television frequency spectrum. The structure is quite similar in general aspects to that described in U.S. Pat. No. 6,118,499 titled "Digital television signal receiver" granted to George Fang on 12 Sep. 2000. In a first frequency-conversion a selected radio-frequency COFDM DCM signal is up-converted in frequency to first-intermediate-frequency COFDM DCM signal at frequencies above the UHF television broadcasting band. The first-IF COFDM DCM signal is suitable for surface-acoustic-wave (SAW) bandpass filtering. In a second frequency-conversion the bandpass-filtered first-IF COFDM DCM signal is down-converted to second-intermediate-frequency COFDM DCM signal at frequencies substantially below the conventional "final intermediate frequency" (e.g., 41 to 47 MHz in U.S. television receivers). The second-IF COFDM DCM signal is at a sufficiently low frequency such that it can be directly sampled by an analog-to-digital converter after lowpass filtering to suppress image signal.

In FIG. 76 a crystal oscillator 300 is connected for supplying 1 MHz reference oscillations to phase-lock-loop frequency synthesizers 301 and 302. The PLL frequency synthesizer 301 is connected for supplying automatic frequency and phase control (AFPC) voltage to a voltage-controlled oscillator 303, which VCO 303 generates the first local oscillations used in the upward conversion of radio-frequency COFDM DCM signal to first-IF COFDM DCM signal. The PLL frequency synthesizer 302 is connected for supplying AFPC voltage to a voltage-controlled oscillator 304, which VCO 304 generates the second local oscillations used in the downward conversion of first-IF COFDM DCM signal to second-IF COFDM DCM signal.

The PLL frequency synthesizer 301 includes a programmable frequency divider, a clocked counter that counts the first local oscillations supplied to its counter input connection from the VCO 303. When the count reaches a selected large positive integer, the counter resets to zero count and generates a carry pulse supplied to an AFPC detector within the PLL frequency synthesizer 301. Responsive to carry pulses from the counter, that AFPC detector samples the 1 MHz oscillations from the crystal oscillator and integrates the response of such sampling to generate the AFPC voltage applied to the VCO 303. The crystal oscillator 300 is designed for supplying 1 MHz reference oscillations, because 1 MHz is the largest common submultiple of the central carrier frequencies of all the allocated TV broadcast channels in the U.S.A.

The PLL frequency synthesizer 302 includes a fixed frequency divider, a clocked counter that counts the second local oscillations supplied to its counter input connection from the VCO 304. When the count reaches a prescribed large positive integer, the counter resets to zero count and generates a carry pulse supplied to an AFPC detector within the PLL frequency synthesizer 302. Responsive to carry pulses from the counter, that AFPC detector samples the 1 MHz oscillations from the crystal oscillator and integrates the response of such sampling to generate the AFPC voltage applied to the VCO 304. Choosing the prescribed large positive integer at which the counter in the PLL frequency synthesizer 302 resets to zero count is preferably done so as to position the central carrier frequency of the second-IF COFDM DCM signal at 11 MHz. This frequency is low enough that analog-to-digital conversion of the second-IF COFDM DCM signal is practical. Also, the fourth harmonic of the central carrier frequency of the second-IF signal is at 44 MHZ, which is at the center of the 41-47 megahertz final IF signals commonly used in prior-art television receivers. Since these frequencies are not allocated for high-power RF transmissions, this reduces the possibility of strong interference with operation of the clock oscillator 204 depicted in FIGS. 74, 77, 78, 79, 81 and 82.

The input port of a pre-filter 305 is connected for receiving radio-frequency (RF) COFDM signal supplied by an antenna or a cable distribution system. (The pre-filter 305 is typically constructed either as a group of fixed frequency band pass filters, or as a tracking type of filter.) The pre-filter 305 reduces the bandwidth of the signal entering the subsequent radio-frequency amplifier 306, which RF amplifier 306 is subject to automatic gain control (AGC). The pre-filter 305 reduces the number of channels amplified by the AGC'd RF amplifier 306, thereby reducing the intermodulation interference generated by the amplifier 306 and subsequent circuits. In a pre-filter 305 comprising a group of fixed-frequency bandpass filters, the proper band is selected according to channel selection information supplied from a controller not explicitly depicted in FIG. 76. Alternatively, in a tracking type pre-filter, an analog control voltage is generated responsive to channel selection information supplied from the controller. The controller also supplies the channel selection information to the PLL frequency synthesizer 301 for determining the frequency division its programmable frequency divider affords to oscillations supplied thereto from the VCO 303.

The RF output of the pre-filter 305 is amplified or attenuated to a desired level by the AGC'd RF amplifier 306 and then supplied to a first mixer 307, there to be mixed with first local oscillations from the VCO 303. The signal at the output port of first mixer 307, resulting from the desired TV channel signal being multiplied by the VCO 303 oscillations, is defined as the first intermediate frequency signal. The frequency of this first IF signal is the difference between the frequency of the VCO 303 first local oscillations and the frequency of the COFDM DCM signal to be received. Since the mixer 307 shifts the spectrum of the desired TV channel to a frequency higher than the TV broadcast frequency, this operation is referred to as an up-conversion. The first IF is chosen to be above all of the spectrum used by terrestrial or cable distribution TV broadcasting in the particular environment in which the tuner operates in. By this choice, the image frequency (the frequency which is the numerical sum of the VCO 303 signal and the first IF frequency) generated in the up-conversion process can be rejected by the pre-filter 305. This choice of first intermediate frequencies also requires the frequency of the VCO 304 to be above the spectrum used by TV broadcasting, thereby avoiding other possible interference.

The first IF output signal supplied from the mixer 307 is amplified by a narrow-band amplifier 308 and then supplied to a first-IF bandpass filter 309 such as a dielectric resonance filter, a strip-line filter or a SAW filter. The characteristics of the first-IF BPF 309 are designed, with consideration to the characteristics of subsequent digital filtering that will be used to suppress ACI (adjacent-channel interference). I.e., the bandwidth of the first-IF BPF 309 is no less than that of a single digital TV channel, and the passband group delay response is sufficiently linear so as not to cause adverse effects on subsequent demodulation of a second-intermediate-frequency (second-IF) COFDM DCM signal. Furthermore, the first-IF BPF 309 is designed to have sufficient out-of-band attenuation at the image frequency range of the subsequent down-conversion process by a second mixer 310 so as not to introduce excessive image frequency interference to degrade the performance of the subsequent demodulation of the second-IF COFDM DCM signal. (In alternative front-end tuner designs the positions of the first-IF amplifier 308 and the first-IF BPF 309 within their cascade connection are interchanged.)

The output signal from the first-IF BPF 309 principally consists of just the desired TV channel signal as up-converted, possibly accompanied by small amounts of up-converted adjacent-channel signals that have not been completely attenuated owing to the band-edge roll-off characteristics of BPF 309. This signal is supplied to a second mixer 310 to be mixed with second local oscillations, which are supplied from the VCO 304. The signal supplied from the output port of the mixer 310, resulting from the first-IF COFDM DCM signal being multiplied by second local oscillations from the VCO 304, is defined as the second-intermediate-frequency (second-IF) COFDM DCM signal. The frequency of this second-IF COFDM DCM signal is the numerical difference between the frequency of second local oscillations from the VCO 304 and the somewhat lower frequencies of the first-IF COFDM DCM signal. The second-IF COFDM DCM signal supplied from the output port of the mixer 310 is amplified by a second IF amplifier 311 of such design as to suppress image signals that have frequencies almost twice that of the frequency of the second local oscillations above the UHF TV band. Since the mixer 310 shifts the first IF signal to a lower frequency, this operation is referred to as a down-conversion.

The amplified second-IF COFDM DCM signal supplied from the output port of the second IF amplifier 311 is applied to the input port of pseudo-RMS detection circuitry 312. The output port of the pseudo-RMS detection circuitry 312 is connected for supplying an approximation of the RMS (root-mean-square) voltage of the response from the second IF amplifier 311 to a first input port of circuitry 313 for generating respective automatic gain control (AGC) signals for the RF amplifier 306 and for the first IF amplifier 308. The peak-to-average ratio (PAPR) of COFDM signals is very high, and occasional peak clipping of them is better design. Detecting the peak voltage of the response from the second IF amplifier 311 would not provide a good basis from which to develop AGC signals.

A second port of the circuitry 313 for generating AGC signals is connected for receiving pilot carrier amplitude information from the pilot carriers processor 288 depicted in FIG. 74 or any of FIGS. 77-82. The pilot carrier amplitude information provides a more precise basis for assuring that the level of response from the second IF amplifier 311 is adjusted to suit subsequent analog-to-digital conversion and QAM demapping procedures.

Designs of circuitry for generating AGC signals in double-conversion radio receivers are known in the prior art. The circuitry 313 generates delayed AGC signal for the RF amplifier 306, avoiding reduction of the RF amplifier 306 gain as long as RF signal strength is not so strong that RF amplifier 306 response consistently drives the first mixer 307 outside its range of acceptably linear response. During the reception of such weaker strength RF signals, the circuitry 313 generates AGC signal for the first IF amplifier 308 that regulates its gain control to maintain desired value of the approximate RMS value of the second IF amplifier 311 response. This maintains the second mixer 310 within its range of acceptably linear response. The circuitry 313 generates the delayed AGC signal for the RF amplifier 306 so as to exhibit slower response to second IF amplifier 311 output signal than the AGC signal for the first IF amplifier 308. This accommodates clipping of occasional extraordinarily large peaks of received COFDM signal in the first mixer 307 and the RF amplifier 306. The AGC signal for the first IF amplifier 308 that circuitry 313 generates no longer reduces the gain of the first IF amplifier 308 when circuitry 313 supplies delayed AGC signal to the RF amplifier 306 for reducing its gain.

In a front-end tuner 280 configuration as used in FIGS. 77 and 79, the amplified second-IF COFDM DCM signal supplied from the output port of the second IF amplifier 311 is supplied to the input port of an analog-to-digital converter 314. The A-to-D converter 314 samples the amplified second-IF COFDM DCM signal at a clock rate determined by the clock oscillator 204 depicted in FIG. 77 or 79. The output port of the A-to-D converter 314 is connected for supplying the resulting digitized second-IF COFDM DCM signal to the input port of a digital bandpass filter 315. Both the lower- and higher-frequency roll-offs of the bandpass response at the output port of the filter 315 are very steep, better to suppress adjacent-channel interference (ACI). The bandpass-filtered digital second-IF COFDM DCM signal supplied from the output port of the filter 315 is suitable to provide the intermediate-frequency COFDM DCM output signal for a front-end tuner 280 configuration.

The amplified second-IF COFDM DCM signal supplied from the output port of the second IF amplifier 311 is suitable to provide the intermediate-frequency COFDM DCM output signal for a front-end tuner 180 configuration. In such front-end tuner 180 configuration the A-to-D converter 314 and the digital bandpass filter 315 are unnecessary and can be omitted.

FIGS. 77 and 65 together depict a variant of the receiver apparatus for independent-sideband (ISB) demodulation of COFDM DCM depicted in FIGS. 74 and 65, digital circuitry shown in FIG. 77 replacing some of the analog circuitry shown in FIG. 74. The front-end tuner 180 of FIG. 74 that converts a selected radio-frequency COFDM DCM signal to an analog intermediate-frequency COFDM DCM signal is replaced in FIG. 77 by a front-end tuner 280 that converts a selected RF COFDM DCM signal to a digitized intermediate-frequency COFDM DCM signal. This digitized COFDM DCM signal is supplied from the output port of the front-end tuner 280 to respective signal input ports of +1, (−1) multipliers 213 and 214. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals. The clock oscillator 204 is connected for supplying the clock pulses to an analog-to-digital converter in the front-end tuner 280, which A-to-D converter digitizes the intermediate-frequency COFDM DCM signal supplied to respective signal input ports of the +1, (−1) multipliers 213 and 214.

The leading I square wave that the frequency divider 203 supplies to the control input port of the +1, (−1) multiplier 213 conditions the +1, (−1) multiplier 213 to perform a 2-to-1 decimation of the 0°, 90°, 180° and 270° digital samples of COFDM DCM signal supplied to its input port, selecting the 0° digital samples for multiplication by +1 responsive to positive half cycles of I square wave, and selecting the 180° digital samples for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal. FIG. 77 shows the output port of the lowpass filter 207 connected for supplying its response to the input port of the clocked digital delay line 210 providing compensatory delay for the latent delay of the digital FIR filter 209 used to perform Hilbert transformation.

The lagging Q square wave that the frequency divider 203 supplies to the control input port of the +1, (−1) multiplier 214 conditions the +1, (−1) multiplier 214 to perform a 2-to-1 decimation of the 0°, 90°, 180° and 270° digital samples of COFDM DCM signal supplied to its input port, selecting the 90° digital samples for multiplication by −1 responsive to negative half cycles of Q square wave, and selecting the 270° digital samples for multiplication by +1 responsive to positive half cycles of Q square wave. The output port of the +1, (−1) multiplier 214 is connected for supplying quadrature synchrodyne results to the input port of to the input port of a digital lowpass filter 208. The lowpass filter 208 responds to the baseband portion of the quadrature synchrodyne results, but not to image signal. FIG. 77 shows the output port of the lowpass filter 208 connected for supplying its response to the input port of the FIR filter 209 for performing Hilbert transformation.

If the front-end tuner 280 contains digital lowpass filtering of the digitized IF COFDM DCM signal with rapid roll-off to suppress ACI, there is no reason for the digital lowpass filters 207 and 208 necessarily having to have sharp roll-offs of higher frequencies to suppress ACI. The Hilbert transform response of the FIR filter 209 and the response from digital delay line 210 are utilized in the subsequent portions of the FIG. 77 and FIG. 65 receiver apparatus in the same way as in the corresponding portions of the FIG. 74 and FIG. 65 receiver apparatus.

FIGS. 78 and 65 together depict another general structure of receiver apparatus for ISB demodulation of COFDM DCM signals. In accordance with further aspects of the invention, the FIG. 78 portion of this receiver apparatus employs phase-shift methods of ISB demodulation modified in a novel first manner particularly well suited for COFDM DCM signals. However, initial portions of the FIG. 78 apparatus are similar to the initial portions of the FIG. 74 apparatus.

As with the FIG. 74 apparatus, a reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202. The mixers 201 and 202 are of switching type connected for receiving I and Q square waves at their respective carrier input ports, as supplied from a 2-phase divide-by-4 frequency divider 203 in response to rising edges of pulses from a clock oscillator 204. The clock oscillator 204 is subject to AFPC that adjusts the frequency of clock pulses to be four times the final IF carrier of the COFDM signals. The leading, in-phase (I) square wave that the frequency divider 203 supplies to the carrier input port of the mixer 201 conditions the mixer 201 to provide an in-phase synchrodyning of intermediate-frequency COFDM DCM signal to baseband. The lagging, quadrature (Q) square wave that the frequency divider 203 supplies to the carrier input port of the mixer 202 conditions the mixer 202 to provide a quadrature synchrodyning of intermediate-frequency COFDM DCM signal to baseband.

As with the FIG. 74 apparatus, an A-to-D converter 205 performs analog-to-digital conversion of the baseband signal supplied from the output port of the mixer 201. The digitized in-phase baseband signal supplied from the output port of the A-to-D converter 205 is supplied to the input port of a digital lowpass filter 208. An A-to-D converter 206 performs analog-to-digital conversion of the baseband signal supplied from the output port of the mixer 202. The digitized quadrature baseband signal supplied from the output port of the A-to-D converter 206 is supplied to the input port of a digital lowpass filter 208.

Subsequent portions of the FIG. 78 apparatus differ from subsequent portions of the FIG. 74 apparatus. The digital FIR filter 209 that the FIG. 74 apparatus includes for performing Hilbert transform is complex in nature and takes up considerable area on the silicon die in a monolithic integrated circuit construction. The FIG. 78 apparatus dispenses with the digital FIR filter 209, the digital delay line 210, the digital adder 211, and the digital subtractor 212.

The digital lowpass filter 207 is connected for supplying digitized samples of baseband folded COFDM DCM signal to the input port of the cyclic prefix detector 84. (Alternatively, the digital lowpass filter 208 is connected for supplying digitized samples of baseband folded COFDM DCM signal to the input port of the cyclic prefix detector 84 instead). The cyclic prefix detector 84 differentially combines the digitized samples of baseband folded COFDM DCM signal with those samples as delayed by the duration of an effective COFDM symbol. Nulls in the difference signal so generated should occur, marking the guard intervals of the baseband folded COFDM DCM signal. The nulls are processed to reduce any corruption caused by noise and to generate better-defined indications of the phasing of COFDM symbols. The output port of the cyclic prefix detector 84 is connected to supply these indications to the first of two input ports of the timing synchronization apparatus 285.

The signal input port of a guard interval remover 863 is connected for receiving digitized samples of an in-phase baseband COFDM signal from the output port of the digital lowpass filter 207. The output port of the guard interval remover 863 is connected for supplying the input port of a discrete-Fourier-transform (DFT) computer 873 with windowed portions of the quadrature baseband signal that span respective COFDM symbol intervals. The signal input port of the guard interval remover 864 is connected for receiving digitized samples of a quadrature baseband COFDM signal from the output port of the digital lowpass filter 208. The output port of the guard interval remover 864 is connected for supplying the input port of a discrete-Fourier-transform (DFT) computer 874 with windowed portions of the in-phase baseband signal that span respective COFDM symbol intervals. The DFT computers 873 and 874 are similar in construction, each having the capability of transforming COFDM carriers nominally 4K, 8K or 16K in number to the complex coordinates of respective QAM symbols. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 78 structure.

The timing synchronization apparatus 285 is connected for supplying gating control signals to respective control input ports of the guard interval removers 863 and 864. The timing synchronization apparatus 285 is further connected for supplying COFDM symbol timing information to the DFT computers 873 and 874. The indications concerning the phasing of COFDM symbols that the cyclic prefix detector 84 supplies to the timing synchronization apparatus 285 are sufficiently accurate for (a) initial windowing of the in-phase baseband folded COFDM signal that the guard interval remover 863 supplies to the DFT computer 873 and (b) initial windowing of the quadrature baseband folded COFDM signal that the guard interval remover 862 supplies to the DFT computer 874.

The output port of the DFT computer 874 is connected via Hilbert transformation connections 875 for supplying complex coordinates of QAM symbols conveyed by respective ones of the received COFDM carriers to first addend input ports of a parallel array 876 of digital complex-number adders and to minuend input ports of a parallel array 877 of digital complex-number subtractors. These connections 875 are such as to perform Hilbert transform of the complex coordinates of QAM symbols, which procedure is explained in greater detail in the remaining portion of this paragraph. The real coordinates of the complex coordinates of QAM symbols are applied as imaginary components of input signals to the first addend input ports of the parallel array 876 of digital adders and to the minuend input ports of the parallel array 877 of digital subtractors. The imaginary coordinates of the complex coordinates of QAM symbols are applied as real components of input signals to the first addend input ports of the parallel array 876 of digital adders and to the minuend input ports of the parallel array 877 of digital subtractors. There is essentially no delay in this Hilbert transformation procedure, and it takes up little, if any, extra area on the silicon die in a monolithic integrated circuit construction. The output port of the DFT computer 873 is connected for supplying complex coordinates of QAM symbols conveyed by respective ones of the received COFDM carriers to second addend input ports of the parallel array 876 of digital complex-number adders and to subtrahend input ports of the parallel array 877 of digital complex-number subtractors.

The parallel array 876 of digital adders additively combines the complex coordinates of QAM symbols the DFT computer 873 generates, as transformed by the Hilbert transformation connections 875, with the complex coordinates of corresponding QAM symbols the DFT computer 874 generates. The sum output ports of the parallel array 876 of digital adders recover at baseband the complex coordinates of QAM symbols from the lower sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 893 for QAM symbols extracted from the lower sideband of the COFDM DCM signal.

The parallel array 877 of digital subtractors differentially combines the complex coordinates of QAM symbols the DFT computer 874 generates, as transformed by the Hilbert transformation connections 875, with the complex coordinates of corresponding QAM symbols the DFT computer 873 generates. The difference output ports of the parallel array 877 of digital subtractors recover at baseband the complex coordinates of QAM symbols from the upper sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 894 for QAM symbols extracted from the upper sideband of the COFDM DCM signal.

FIGS. 79 and 65 together depict a variant of the receiver apparatus for ISB demodulation of COFDM DCM depicted in FIGS. 78 and 65, digital circuitry depicted in FIG. 79 replacing some of the analog circuitry depicted in FIG. 78. FIG. 79 depicts modification of FIG. 78 morphologically and operationally similar to the modification of FIG. 74 depicted in FIG. 77. The components 180, 201, 202, 205 and 206 of FIG. 78 are replaced in FIG. 79 by components 280, 213 and 214 previously described in reference to FIG. 77. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 79 structure.

Figure 80:
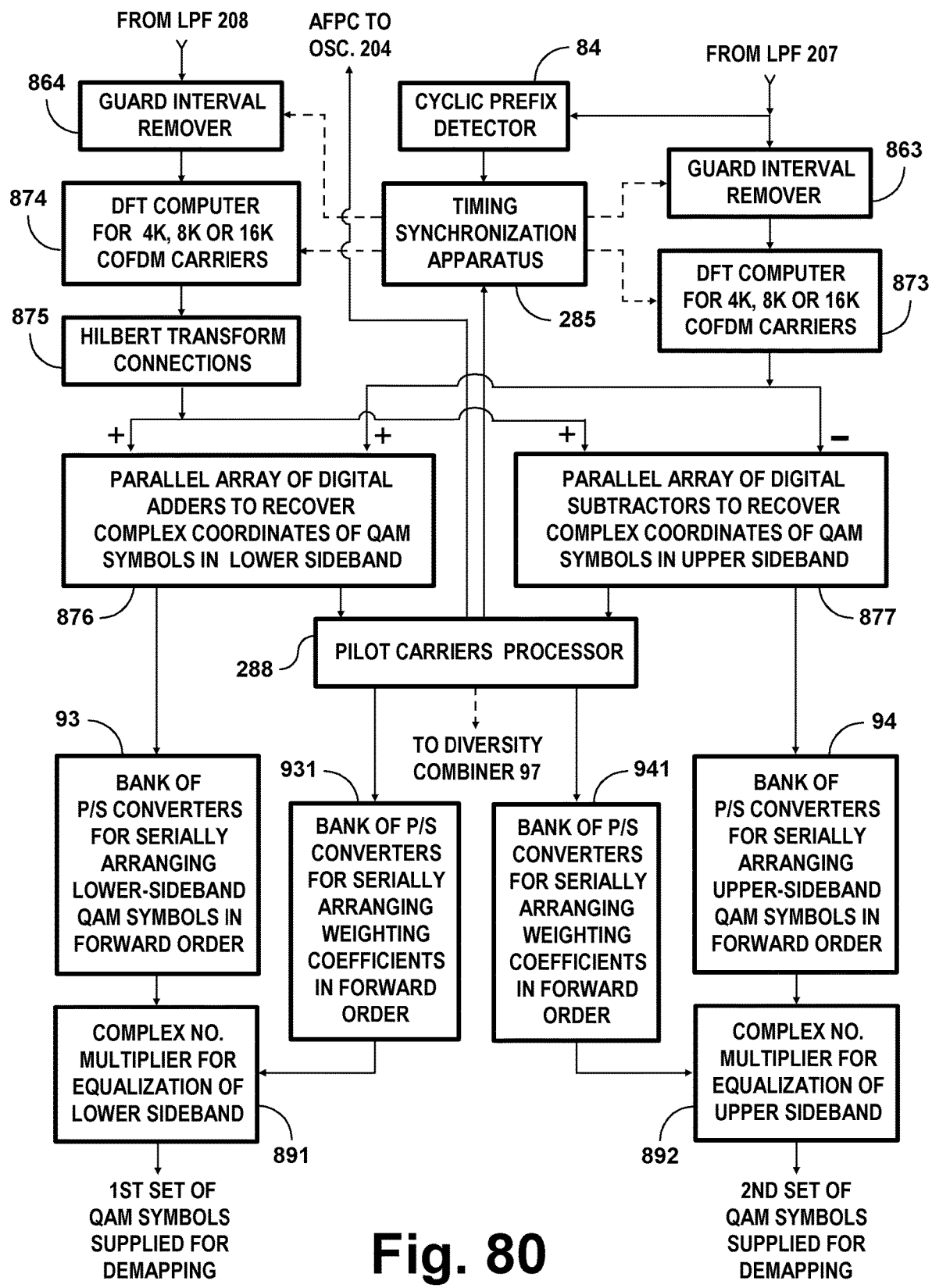
FIG. 80 is a schematic diagram of a modification suitable for both the FIG. 74 receiver structure and the FIG. 79 receiver structure.

FIG. 80 depicts modifications of either of the receiver structures depicted in FIGS. 78 and 79, which modifications reduce the number of complex-number multipliers needed for frequency domain channel equalization. The channel equalizer 893 that performed multiplications on each of the QAM symbols supplied it in parallel from the parallel array 876 of digital adders is omitted, and the channel equalizer 894 that performed multiplications on each of the QAM symbols supplied to it in parallel from the parallel array 877 of digital subtractors is also omitted. A complex-number multiplier 891 performs frequency-domain channel equalization on each of the QAM symbols from the lower sideband of the COFDM DCM signal furnished it by the parallel array 876 of digital adders after their serialization by a selected one of the parallel-to-serial (P/S) converters in the bank 93 of them. Another complex-number multiplier 892 performs frequency-domain channel equalization on each of the QAM symbols from the upper sideband of the COFDM DCM signal furnished it by the parallel array 877 of digital subtractors after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus—e.g., as depicted in any of FIGS. 65-68.

More particularly, the QAM symbols from the lower sideband of the COFDM DCM signal that convey data are supplied by respective ones of the parallel array 876 of digital adders directly to respective ones of the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 288, the weighting coefficients for frequency-domain channel equalization of the lower sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols from the upper sideband of the COFDM DCM signal that convey data are supplied by respective ones of the parallel array 877 of digital subtractors directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 288, the weighting coefficients for frequency-domain channel equalization of the upper sideband of the COFDM DCM signal. The output port of that selected P/S converter responds to supply serialized weighting coefficients for the lower sideband of the COFDM DCM signal to the multiplier input port of the complex-number multiplier 892. The multiplier 892 responds to its multiplicand and multiplier input signals to supply from its product output port an equalized second set of QAM symbols, suitable for subsequent demapping.

The modified phase shift method of ASB demodulation as described in connection with FIGS. 78-80 avoids the need for a digital FIR filter to perform Hilbert transform, but introduces parallel arrays of digital adders and digital subtractors to separate the lower-sideband QAM symbols from the upper-sideband QAM symbols. Receiver apparatus using a Weaver method of ASB demodulation as described in connection with FIGS. 81 and 82 also avoids the need for a digital FIR filter to perform Hilbert transform, but the modified phase shift method of ASB demodulation is more practical to implement.

Figure 81:
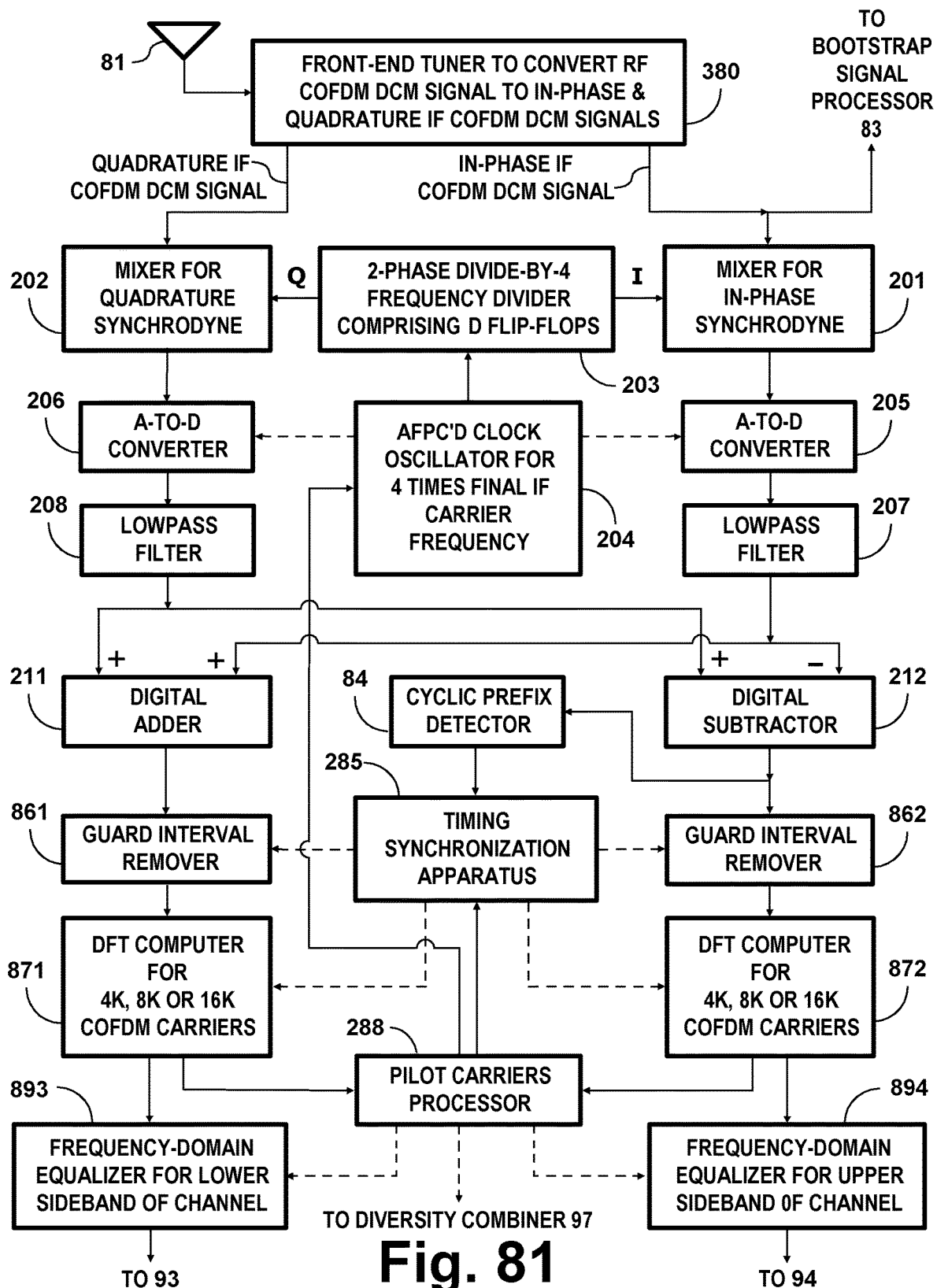

FIGS. 81 and 65 together depict the general structure of receiver apparatus for ISB demodulation of COFDM DCM signals using methods based on methods for demodulating SSB amplitude-modulation signals described by Donald K. Weaver, Jr. in his paper "A third method of generation and detection of single sideband signals", Proceedings of the IRE, vol. 44, December 1956 issue, pp. 1203-1205. The FIG. 81 structure for ISB demodulation of COFDM DCM signals differs from the FIG. 74 structure for ISB demodulation of COFDM DCM signals in the following regards. The front-end tuner 180 to convert RF COFDM DCM signal to IF COFDM DCM signal for application to the multiplicand input ports of the mixers 201 and 202 is replaced by a front-end tuner 380 to convert RF COFDM DCM signal to (a) an in-phase IF COFDM DCM signal for application to the multiplicand input port of the mixer 201 and (b) a quadrature IF COFDM DCM signal for application to the multiplicand input port of the mixer 202. The application of quadrature IF COFDM DCM signal, rather than in-phase IF COFDM DCM signal, to the multiplicand input port of the mixer 202 obviates the need for an FIR digital filter 209 for Hilbert transformation. Accordingly, there is no call for digital delay line 210 to compensate for latent delay through the filter 209.

An A-to-D converter 205 performs analog-to-digital conversion of the in-phase and quadrature components of the baseband signal supplied from the output port of the mixer 201. An A-to-D converter 206 performs analog-to-digital conversion of the in-phase and quadrature components of the baseband signal supplied from the output port of the mixer 202. The digitized in-phase baseband signal supplied from the output port of the A-to-D converter 205 is supplied to the input port of a digital lowpass filter 207. The digitized quadrature baseband signal supplied from the output port of the A-to-D converter 206 is supplied to the input port of a digital lowpass filter 208. Preferably, the design of the digital lowpass filters 207 and 208 provides a rapid roll-off in frequency response, so as to suppress adjacent-channel interference (ACI). The DFT computers 871 and 872 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 81 structure.

The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the subtrahend input port and the minuend input port of the digital subtractor 212, which is operative to recover at baseband the upper sideband of the COFDM DCM signal at its difference output port. The responses from the sum output port of the digital adder 211 and from the difference output port of the digital subtractor 212 are utilized in the subsequent portions of the FIG. 81 and FIG. 65 receiver apparatus in the same way as in the corresponding portions of the FIG. 74 and FIG. 65 receiver apparatus.

Figure 82:
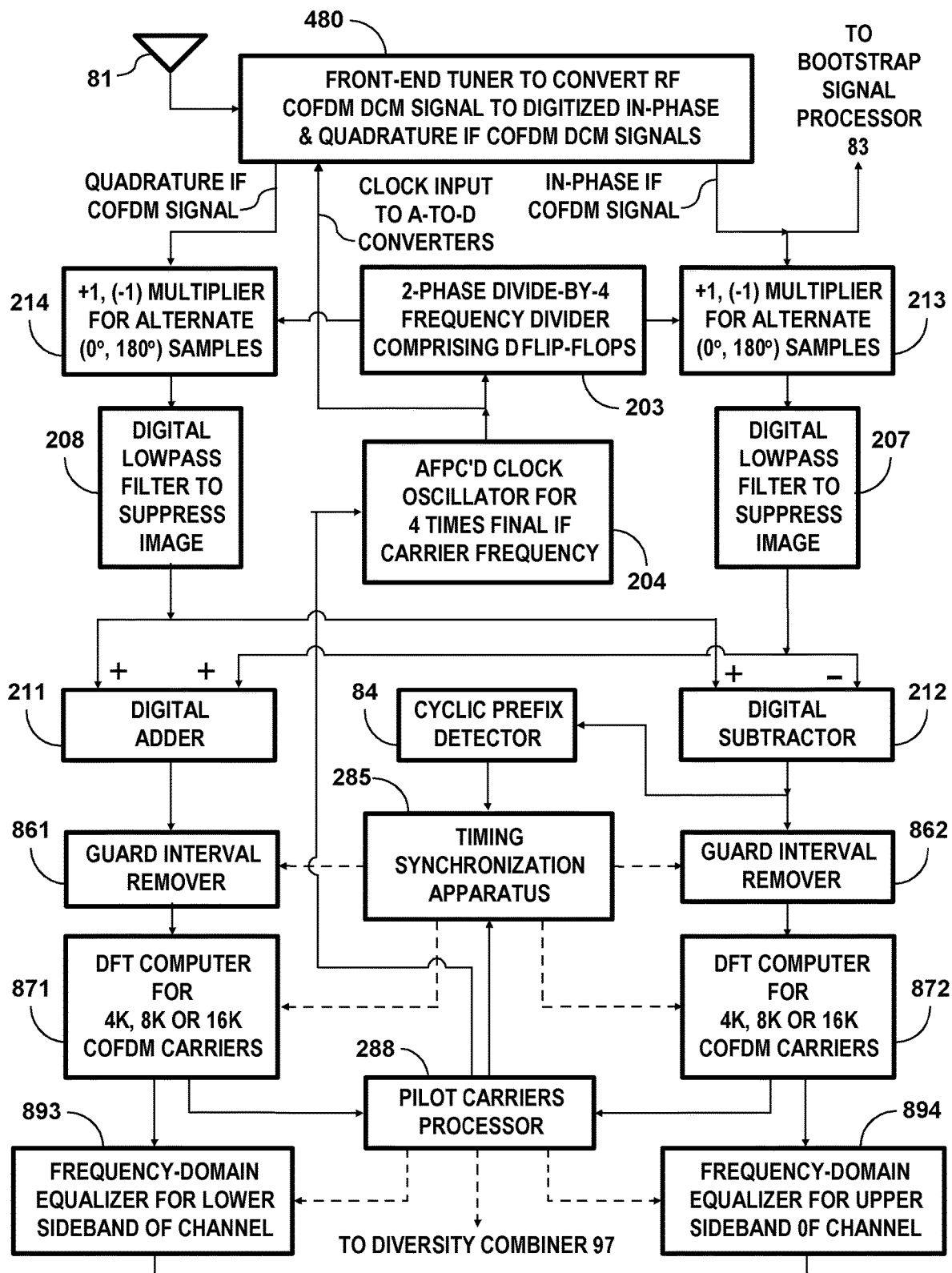

FIGS. 82 and 65 together form a schematic diagram of a variant of the receiver apparatus for ISB demodulation of COFDM DCM depicted in FIGS. 81 and 65, digital circuitry depicted in FIG. 82 replacing some of the analog circuitry depicted in FIG. 81. The front-end tuner 380 depicted in FIG. 81 that is operable to convert RF COFDM signal to both in-phase and quadrature analog IF COFDM signals is replaced in FIG. 82 by a front-end tuner 480 operable to convert RF COFDM signal to both in-phase and quadrature digital IF COFDM DCM signals. The front-end tuner 480 is connected to supply the in-phase digital IF COFDM DCM signals to the multiplicand input port of the +1, (−1) multiplier 213 for in-phase synchrodyne to baseband. The front-end tuner 480 is connected to supply the quadrature digital IF COFDM DCM signals to the multiplicand input port of a +1, (−1) multiplier 214 for quadrature synchrodyne to baseband. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals.

The leading I square wave that the frequency divider 203 supplies to the control input port of the +1, (−1) multiplier 213 conditions the +1, (−1) multiplier 213 to select the 0° digital samples of the in-phase second-IF COFDM DCM signal for multiplication by +1 responsive to positive half cycles of I square wave, and selecting the 180° digital samples of the in-phase second-IF COFDM DCM signal for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal.

The lagging Q square wave that the frequency divider 203 supplies to the control input port of the +1, (−1) multiplier 214 conditions the +1, (−1) multiplier 214 to select the −90° digital samples of the quadrature second-IF COFDM DCM signal for multiplication by +1 responsive to positive half cycles of Q square wave, and selecting the 90° digital samples of the quadrature second-IF COFDM DCM signal for multiplication by −1 responsive to negative half cycles of Q square wave. The output port of the +1, (−1) multiplier 214 is connected for supplying quadrature synchrodyne results to the input port of to the input port of a digital lowpass filter 208. The lowpass filter 208 responds to the baseband portion of the quadrature synchrodyne results, but not to image signal.

If the front-end tuner 480 contains digital lowpass filtering of the digitized IF COFDM DCM signal with rapid roll-off in frequency response for suppressing ACI, there is no reason for the digital lowpass filters 207 and 208 necessarily having to have rapid roll-offs in frequency response to suppress ACI. The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the minuend input port and the subtrahend input port of the digital subtractor 212, which is operative to recover at baseband the upper sideband of the COFDM DCM signal at its difference output port. The responses from the sum output port of the digital adder 211 and from the difference output port of the digital subtractor 212 are utilized in the subsequent portions of the FIG. 82 and FIG. 65 receiver apparatus in the same way as in the corresponding portions of the FIG. 77 and FIG. 65 receiver apparatus. The bandpass filtering of individual OFDM carriers in DFT computers 871 and 872 may allow digital lowpass filters 207 and 208 to be replaced by respective direct connections in modified FIG. 82 structure.

Figure 83:
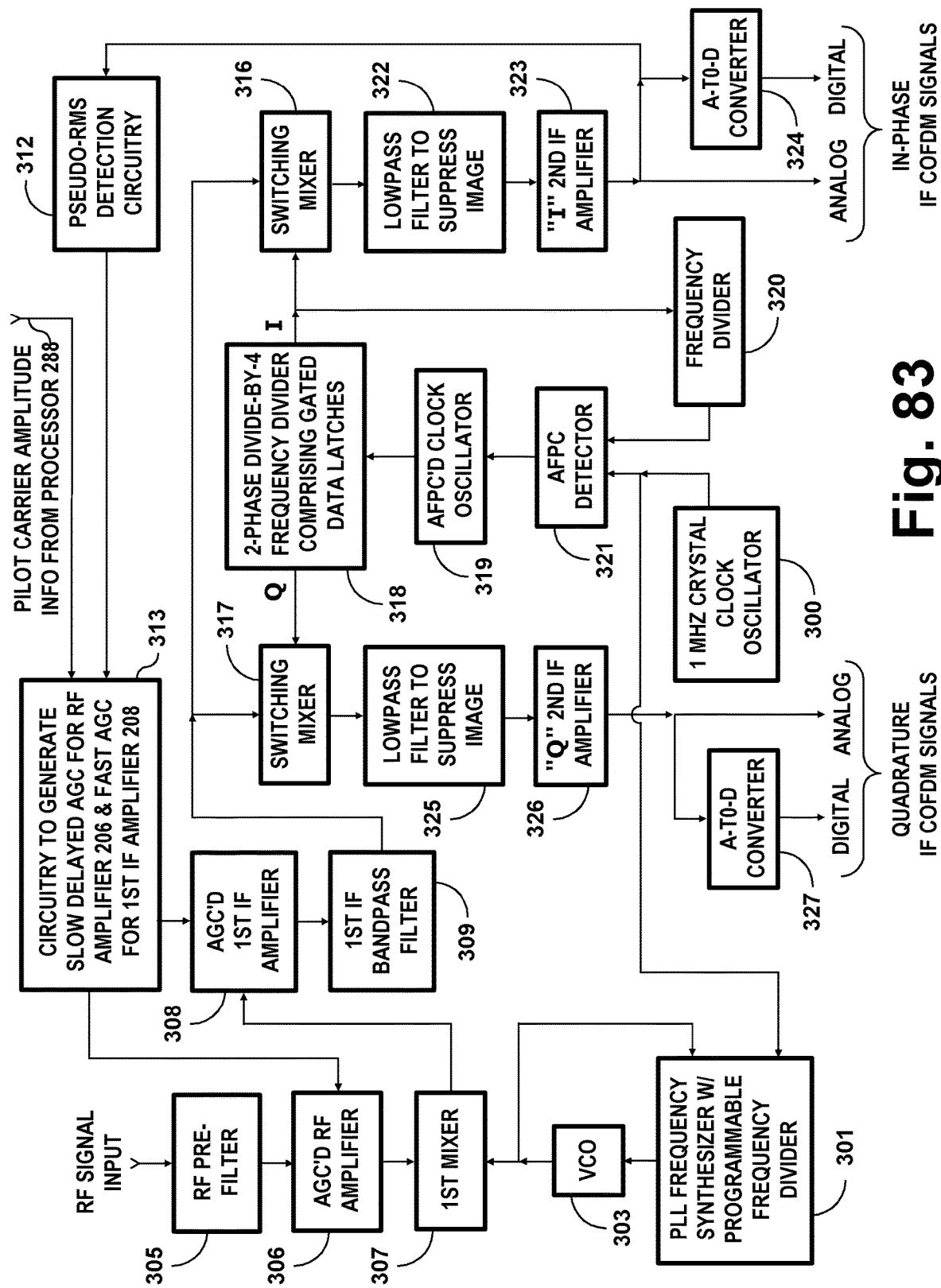
FIG. 83 is a schematic diagram of a double superheterodyne front-end tuner structure suitable for inclusion in either of the apparatuses for demodulating COFDM DCM signals depicted in FIGS. 81 and 82.

FIG. 83 depicts plural superheterodyne front-end tuner structure suitable for implementing the front-end tuner 380 depicted in FIG. 81 or for implementing the front-end tuner 480 depicted in FIG. 82. Elements 300-309, 312 and 313 of the FIG. 83 structure are similar to the elements 300-309, 312 and 313 in the FIG. 76 double-superheterodyne front-end tuner structure. A crystal clock oscillator 300 is connected for supplying 1 MHz reference oscillations to a PLL frequency synthesizer 301 that supplies AFPC voltage to a voltage-controlled oscillator 303. VCO 303 generates the first local oscillations used in the upward conversion of radio-frequency COFDM DCM signal to first-IF COFDM DCM signal. The input port of a pre-filter 305 is connected for receiving RF COFDM DCM signal supplied by an antenna or a cable distribution system. The RF output of the pre-filter 305 is amplified or attenuated to a desired level by an AGC'd RF amplifier 306 and then supplied to a first mixer 307, there to be mixed with oscillations from the first local oscillator 303 to generate first IF signal. The first IF output signal supplied from the mixer 307 is amplified by a narrow-band amplifier 308 and then supplied to a first-IF bandpass filter 309 such as a dielectric resonance filter, a strip-line filter or a SAW filter. The input port of pseudo-RMS detection circuitry 312 is connected for receiving amplified second-IF COFDM DCM signal supplied from the output port of a second IF amplifier. The output port of the pseudo-RMS detection circuitry 312 is connected for supplying an approximation of the root-mean-square RMS voltage of the amplified second-IF COFDM DCM signal to a first input port of circuitry 313 for generating respective automatic gain control (AGC) signals for the RF amplifier 306 and for the first IF amplifier 308. A second port of the circuitry 313 for generating AGC signals is connected for receiving pilot carrier amplitude information from the pilot carriers processor 288 depicted in FIG. 81 or in FIG. 82.

The single second mixer 310 of the FIG. 76 front-end tuner structure is replaced by two switching mixers 316 and 317 in the front-end tuner structure depicted in FIG. 83. A 2-phase divide-by-4 frequency divider 318 responds to rising edges of pulses from a clock oscillator 319, by supplying I and Q square waves to respective carrier input ports of the switching mixers 316 and 317. The fundamental frequency of the Q square wave lags the fundamental frequency of the Q square wave by 90° ($\pi/4$ radians). The clock oscillator 319 is subject to automatic frequency and phase control (AFPC) responsive to voltage supplied from a PLL frequency synthesizer comprising the divide-by-4 frequency divider 318, a further frequency divider 320 and an AFPC detector 321. The input port of the frequency divider 320 is connected to receive the I square wave applied to the carrier input port of the switching mixer 316. The output port of the frequency divider 230 is connected to a first input port of the AFPC detector 321. A second input port of the AFPC detector 321 is connected for receiving reference-frequency oscillations from the crystal oscillator 300. The output port of the AFPC detector 321 is connected for supplying voltage to the clock oscillator 319 to implement automatic frequency and phase control (AFPC) thereof.

The output port of the switching mixer 316 connects to the input port of a lowpass filter 322 that suppresses image signal in the response supplied from its output port to the input port of an amplifier 323 of the in-phase ("I") second-IF signal. The output port of the "I" second-IF amplifier 323 is connected to supply analog amplified in-phase second-IF signal suitable for an output signal from the FIG. 81 front-end tuner 380. FIG. 83 shows this amplified in-phase second-IF signal applied to the input port of an analog-to-digital converter 324 that responds to supply digital amplified in-phase second-IF signal suitable for a digital output signal from the FIG. 82 front-end tuner 480.

The output port of the switching mixer 317 connects to the input port of a lowpass filter 325 that suppresses image signal in the response supplied from its output port to the input port of an amplifier 326 of the quadrature ("Q") second-IF signal. The output port of the "Q" second-IF amplifier 326 is connected to supply analog amplified quadrature second-IF signal suitable for an output signal from the FIG. 81 front-end tuner 380. FIG. 83 shows this amplified quadrature second-IF signal applied to the input port of an analog-to-digital converter 327 that responds to supply digital amplified quadrature second-IF signal suitable for an output signal from the FIG. 82 front-end tuner 480.

FIG. 83 shows the input port of the pseudo-RMS detection circuitry 312 connected for receiving amplified in-phase second-IF signal from the output port of the "I" second-IF amplifier 323. With such connection the measurement of second-IF signal amplitude by the pseudo-RMS detection circuitry 312 takes into account the amplitudes of the pilot carriers in the COFDM DCM signal. Alternatively, the pseudo-RMS detection circuitry 312 is connected instead for receiving amplified quadrature second-IF signal from the output port of the "Q" second-IF amplifier 326. With such connection the measurement of second-IF signal amplitude by the pseudo-RMS detection circuitry 312 is nonresponsive to the amplitudes of the pilot carriers in the COFDM DCM signal.

Each of the FIG. 81 and the FIG. 82 COFDM demodulation apparatuses obviates the need for an FIR digital filter to perform Hilbert transformation. However, in order for a Weaver method of demodulation to perform well, these front-end tuners 380 and 480 each need to convert RF COFDM DCM signal to both in-phase and quadrature IF COFDM DCM signals subject to the same amplification. The orthogonal relationship between the in-phase and quadrature IF COFDM DCM signals that either of these front-end tuners 380 and 480 supplies has to be scrupulously maintained, if a Weaver method of ISB demodulation is to perform well. Also, the respective gains of the in-phase and quadrature IF COFDM DCM signals that the front-end tuner supplies have to match closely, if a Weaver method of ISB demodulation is to perform well. The FIG. 83 structure for front-end tuners addresses these problems by using the 2-phase divide-by-4 frequency divider 318 responsive to output signal from the clock oscillator 319. However, the frequency of oscillations supplied from the clock oscillator 319 will approach 3 GHz, in order to position the fundamental frequencies of the I and Q square waves from the frequency divider 318 above the UHF band for television broadcasting.

The structures depicted in FIGS. 74, 77, 81 and 82 are preferred over variants of them that defer lowpass digital filtering to suppress unwanted image frequencies until after the digital adder 211 and the digital subtractor 212.

The communication systems described supra convey the same data concurrently in the lower- and upper-frequency sidebands of the COFDM DCM signal. U.S. Pat. No. 8,958,490 granted to Allen LeRoy Limberg on 17 Feb. 2015, titled "COFDM broadcasting with single-time retransmission of COFDM symbols", describes transmitting the same COFDM signal twice a second or more apart. Such retransmission is made better to accommodate reception in a moving vehicle, where drop-outs in received signal are likely to occur frequently because of objects obstructing a sufficiently strong signal path. A problem with such retransmission of COFDM signals is that it halves data rate.

The COFDM DCM communication systems described supra can be modified to transmit the same data in the lower- and upper-frequency sidebands of the COFDM DCM signal, but differentially delayed a second or more, so the same data is retransmitted during a COFDM symbol interval later than the one in which the data was previously transmitted. The advantage of such retransmission technique is that data throughput is not further halved. In a receiver for such COFDM DCM signal, the same data from the lower- and upper-frequency sidebands that is earlier demodulated is delayed to concur with that same data as later demodulated, before diversity combining the two sets of the same data. Such compensatory delay can be introduced after DFT computation of QAM subcarriers of the COFDM DCM signal and before QAM symbol demapping procedures, for example. Alternatively, such compensatory delay can be introduced after QAM symbol demapping procedures, but before diversity combining the two sets of QAM symbol demapping results. Still another alternative is possible if the lower- and upper-frequency sidebands are subjected to DFT computations separately from each other; compensatory delay is afforded to the demodulated sideband conveying the same data earlier than the other demodulated sideband.

As noted supra in the summary of the invention, the use of DCM halves the data rate of COFDM having a prescribed number of OFDM carriers conveying coded data. The embodiments of the invention specifically described supra use the 8K, 16K and 32K nominal numbers of OFDM carriers prescribed in the DVB-T2 and ATSC 3.0 standards for DTV broadcasting so FFT sizes in OFDM demodulators are similar to those already in use. Thus, the data rate for DCM-COFDM signal using a nominal number of 16K OFDM carriers can be similar to the data rate for conventional "single-sideband" COFDM using a nominal number of 8K OFDM carriers, and the data rate for DCM-COFDM signal using a nominal number of 32K OFDM carriers can be similar to the data rate for conventional "single-sideband" COFDM using a nominal number of 16K OFDM carriers.

Elsewhere, COFDM using a nominal number of 64K OFDM subcarriers have been proposed for future DTV broadcasting. DCM-COFDM signal using a nominal number of 64K OFDM carriers can be similar to the data rate for conventional "single-sideband" COFDM using a nominal number of 32K OFDM carriers. DCM can increase the range of reception from a transmitter of given power by a factor of about 4/3 at least, if the receiver uses SBMRC to combine the two transmissions of the same coded data. The maximum size of FFT that COFDM demodulators in DTV receivers are required to compute will be doubled, but this may well be acceptable. (A nominal number of 58K OFDM subcarriers has been used in wireless telephony.)

Rather than operating two DFT computers in parallel in the in-phase and quadrature branches of the receiver apparatus shown in any of FIGS. 74 and 77-82, it is possible to use a single DFT computer in time-division multiplex to serve both branches. While this can reduce "hardware" requirements, higher operating speeds will be required to implement such multiplex.

The improved methods of demodulating independent-sideband digital amplitude-modulation signals described supra can be broadly applied in a number of digital communications systems. Such methods can be utilized by the bootstrap signal processor 83 depicted in FIG. 65, by way of specific example.

Various other modifications and variations can be made in the specifically described apparatuses without departing from the spirit or scope of the invention in certain broader ones of its aspects. For example, in variations of the structures depicted in FIGS. 74 and 77-82, the AFPC'd clock oscillator 204 or 304 is replaced by a fixed-frequency clock oscillator, such as a crystal-controlled oscillator. AFPC signals from the pilot carriers processor 288 are supplied to the front-end tuner for fine-tuning a local oscillator therein, so that the principal carrier of intermediate-frequency COFDM DCM signal(s) supplied from the front end tuner is appropriate for in-phase and quadrature synchrodynes to baseband in those variations of the structures depicted in FIGS. 74 and 77-82.

Persons skilled in the art of designing DTV systems and acquainted with this disclosure are apt to discern that various modifications and variations can be made in the specifically described apparatuses without departing from the spirit or scope of the invention in certain broader ones of its aspects. Accordingly, it is intended that such modifications and variations of the specifically described apparatuses be considered to result in further embodiments of the invention, to be included within the scope of the appended claims and their equivalents in accordance with the doctrine of equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A transmitter apparatus configured for transmitting coded orthogonal frequency-division modulation (COFDM) dual-carrier-modulation (DCM) signal via a communication channel, a lower-frequency sideband and an upper-frequency sideband of which said COFDM DCM signal convey the same data but do not mirror each other in frequency around a mid-channel frequency between them, said transmitter apparatus comprising:

coding means for forward-error-correction (FEC) coding digital data that is to be transmitted and arranging the resulting FEC-coded digital data in successive map labels for quadrature-amplitude-modulation (QAM) symbols;

a pair of QAM mappers consisting of a first QAM mapper and a second QAM mapper, said first QAM mapper configured for generating complex coordinates of a first set of successive QAM symbols respectively responsive to said successive map labels in accordance with a first mapping pattern, and said second QAM mapper configured for generating complex coordinates of a second set of successive QAM symbols respectively responsive to said successive map labels in accordance with a second mapping pattern, said first and second mapping patterns differing so as to afford labeling diversity between said first and second sets of successive QAM symbols;

a COFDM symbol generator connected for arranging successive ones of said first set of successive QAM symbols in first prescribed spectral order in first halves of successive COFDM symbols and arranging successive ones of said second set of successive QAM symbols in second prescribed spectral order in second halves of said successive COFDM symbols;

means, responsive to said first halves of said successive COFDM symbols and said second halves of said successive COFDM symbols, for generating a COFDM DCM radio-frequency signal, the lower-frequency sideband of which conveys said first set of successive QAM symbols and the upper-frequency sideband of which conveys said second set of successive QAM symbols; and a power amplifier connected for amplifying said COFDM DCM radio-frequency signal before transmitting the amplified COFDM DCM radio-frequency signal.

2. The transmitter apparatus of claim 1, wherein said means for generating said COFDM DCM radio-frequency signal comprises:

a pilot-carrier symbols insertion unit connected for introducing pilot carrier symbols at regular intervals among the first and second sets of successive QAM symbols in said first and second halves of each one of said successive COFDM symbols;

an orthogonal frequency-division multiplex modulator responsive to said first and second halves of successive COFDM symbols in the frequency domain to generate respective inverse discrete Fourier transform responses thereto in the time domain;

a guard interval insertion unit arranged for introducing guard intervals between successive inverse discrete Fourier transform responses;

a digital-to-analog converter connected for converting said successive inverse discrete Fourier transform responses and any guard intervals therebetween to an analog modulating signal;

a source of radio-frequency oscillations; and a single-sideband amplitude modulator for modulating the amplitude of its response to said radio-frequency oscillations in accordance with the amplitude of said analog modulating signal to generate said COFDM DCM radio-frequency signal for amplification by said power amplifier before being transmitted.

3. The transmitter apparatus of claim 1, wherein said means for generating said COFDM DCM radio-frequency signal comprises:

a source of radio-frequency oscillations;

a first pilot-carrier symbols insertion unit connected for introducing pilot carrier symbols at regular intervals among the first set of successive QAM symbols in said first halves of each one of said successive COFDM symbols;

a first orthogonal frequency-division multiplex modulator responsive to said first halves of successive COFDM symbols in the frequency domain to generate in the time domain respective inverse discrete Fourier transform responses to said first halves of successive COFDM symbols;

a first single-sideband amplitude modulator for modulating the amplitude of its response to said radio-frequency oscillations in accordance with the amplitude of said successive inverse discrete Fourier transform responses to said first halves of successive COFDM symbols, thereby to generate the lower-frequency sideband of said COFDM DCM radio-frequency signal;

a second pilot-carrier symbols insertion unit for introducing pilot carrier symbols at regular intervals among the second set of successive QAM symbols in said second halves of each one of said successive COFDM symbols;

a second orthogonal frequency-division multiplex modulator responsive to said second halves of successive COFDM symbols in the frequency domain to generate in the time domain respective inverse discrete Fourier transform responses to said second halves of successive COFDM symbols;

a second single-sideband amplitude modulator for modulating the amplitude of its response to said radio-frequency oscillations in accordance with the amplitude of said successive inverse discrete Fourier transform responses to said second halves of successive COFDM symbols, thereby to generate the upper-frequency sideband of said COFDM DCM radio-frequency signal; and a signal combiner connected for combining the lower-frequency and upper-frequency sidebands of said COFDM DCM radio-frequency signal to generate said COFDM DCM radio-frequency signal for amplification by said power amplifier before being transmitted.

4. The transmitter apparatus of claim 1, wherein said power amplifier connected for amplifying said COFDM DCM radio-frequency signal is of Doherty type.

5. The transmitter apparatus of claim 1, wherein said second prescribed spectral order is substantially the same as said first prescribed spectral order, so that in said COFDM DCM radio-frequency signal there is uniform frequency diversity between QAM symbols that convey similar FEC-coded digital data in the first and second halves respectively of each one of said successive COFDM symbols.

6. The transmitter apparatus of claim 1, wherein said first and second mapping patterns are antipodal to each other.

7. The transmitter apparatus of claim 6, wherein said first QAM mapper and said second QAM mapper are respectively configured such that:

(a) said first and second mapping patterns are square QAM mapping patterns of the same size, and (b) all of the map labels in said first and second mapping patterns that are palindromic are positioned along similar diagonals of said first and said second mapping patterns.

8. The transmitter apparatus of claim 6, wherein said first QAM mapper and said second QAM mapper are respectively configured such that said first and second mapping patterns are amplitude phase-shift keying (APSK) mapping patterns of the same size.

9. The transmitter apparatus of claim 8, wherein said first QAM mapper and said second QAM mapper are respectively configured such that:

(a) said first and second mapping patterns are respective first and second Gray mapping patterns of the same size;

(b) the bits more likely to experience error in the labeling of said first set of successive QAM symbols in accordance with said first Gray mapping pattern correspond to the bits less likely to experience error in the labeling of said second set of successive QAM symbols in accordance with said second Gray mapping pattern; and (c) the bits more likely to experience error in the labeling of said second set of successive QAM symbols in accordance with said second Gray mapping pattern correspond to the bits less likely to experience error in the labeling of said first set of successive QAM symbols in accordance with said first Gray mapping pattern.

10. The transmitter apparatus of claim 9, wherein said first QAM mapper and said second QAM mapper are also configured such that none of the map labels in said first and second Gray mapping patterns that is palindromic is in corresponding outside corners of both said first and second Gray mapping patterns.

11. The transmitter apparatus of claim 9, wherein said first QAM mapper and said second QAM mapper are also configured such that any of the map labels in an outside corner of one of said first and second mapping patterns which map label happens to be palindromic is in an antipodally opposite corner of the other of said first and second Gray mapping patterns.

12. The transmitter apparatus of claim 8, wherein said first QAM mapper and said second QAM mapper are respectively configured such that:
(a) said first and second mapping patterns are respective first and second superposition coded modulation (SCM) mapping patterns of the same size;
(b) the bits more likely to experience error in the labeling of said first set of successive QAM symbols in accordance with said first SCM mapping pattern correspond to the bits less likely to experience error in the labeling of said second set of successive QAM symbols in accordance with said second SCM mapping pattern; and
(c) the bits more likely to experience error in the labeling of said second set of successive QAM symbols in accordance with said second SCM mapping pattern correspond to the bits less likely to experience error in the labeling of said first set of successive QAM symbols in accordance with said first SCM mapping pattern.

13. The transmitter apparatus of claim 12, wherein said first QAM mapper and said second QAM mapper are also configured such that none of the map labels in said first and second SCM mapping patterns that is palindromic is in corresponding outside corners of both said first and said second SCM mapping patterns.

14. The transmitter apparatus of claim 12, wherein said first QAM mapper and said second QAM mapper are also configured such that any of the map labels in an outside corner of one of said first and second SCM mapping patterns which map label happens to be palindromic is in an antipodally opposite corner of the other of said first and second SCM mapping patterns.

15. The transmitter apparatus of claim 1, wherein said first and second mapping patterns exhibit labeling diversity between them.

16. The transmitter apparatus of claim 15, wherein said first QAM mapper and said second QAM mapper are respectively configured such that said first and second mapping patterns are amplitude phase-shift keying (APSK) mapping patterns of the same size.

17. The transmitter apparatus of claim 15, wherein said first QAM mapper and said second QAM mapper are respectively configured such that:
(a) said first and second mapping patterns are square QAM mapping patterns of the same size; and
(b) none of the map labels in said first and said second mapping patterns that is palindromic is in corresponding outside corners of both said first and second mapping patterns.

18. The transmitter apparatus of claim 1, wherein said first QAM mapper and said second QAM mapper are respectively configured such that:
(a) said first and second mapping patterns are respective square QAM mapping patterns of the same size; and
(b) any of the map labels in an outside corner of one of said first and said second mapping patterns that is palindromic is in an antipodally opposite corner of the other of said first and said second mapping patterns.

19. The transmitter apparatus of claim 1, wherein said first and second mapping patterns are respective optimal-labels mapping patterns.

20. The transmitter apparatus of claim 1, wherein the lower-frequency and upper-frequency sidebands of said COFDM DCM radio-frequency signal convey the same data concurrently.

21. The transmitter apparatus of claim 1, wherein the lower-frequency and upper-frequency sidebands of said COFDM DCM radio-frequency signal convey the same data with differential delay therebetween.

22. A method of employing coded orthogonal frequency-division multiplexed (COFDM) dual-subcarrier-modulation (DCM) in a communication system, in which a lower frequency subband and an upper-frequency subband of a COFDM DCM signal convey the same coded digital data in respective formats, said method comprising steps of:
parsing said coded digital data into successive digital words, each having the same even number of bits therein;
generating from said successive digital words a first succession of digital mapping labels of a prescribed size;
providing a first mapping of said first succession of said digital mapping labels to successive ones of a first succession coded amplitude modulation symbol constellations;
generating from said successive digital words a second succession of digital mapping labels of said prescribed size;
providing a second mapping of said second succession of said digital mapping labels to successive ones of a second succession coded amplitude modulation symbol constellations, such first and second mappings being designed so as to provide labeling diversity as between them, such that the bits of said digital map labels more susceptible to transmission errors in said first mapping are less susceptible to transmission errors in said second mapping, and such that the bits of said digital map labels more susceptible to transmission errors in said second mapping are less susceptible to transmission errors in said first mapping;
arranging coded amplitude modulation of subcarriers in said lower frequency subband of said COFDM DCM signal to convey said coded digital data via respective ones of said first succession of coded amplitude modulation symbol constellations;
arranging coded amplitude modulation of subcarriers in said upper frequency subband of said COFDM DCM signal to convey said coded digital data via respective ones of said second succession of coded amplitude modulation symbol constellations; and
transmitting said lower frequency subband and said upper-frequency subband of said COFDM DCM signal together so as to convey the same said coded digital data concurrently in said lower frequency subband and said upper-frequency subband.

23. The method of claim 22, wherein said prescribed size of said digital mapping labels in said first and second successions thereof is larger than four bits apiece.

* * * * *